(12) United States Patent
Ortiz et al.

(10) Patent No.: US 11,354,651 B2
(45) Date of Patent: Jun. 7, 2022

(54) SYSTEM AND METHOD FOR LOCATION-BASED TOKEN TRANSACTION PROCESSING

(71) Applicant: ROYAL BANK OF CANADA, Montreal (CA)

(72) Inventors: Edison U. Ortiz, Orlando, FL (US); Arnold Badal-Badalian, Toronto (CA); Ambica Pawan Khandavilli, Orlando, FL (US); Rasha Khayat, Montreal (CA); Iustina-Miruna Vintila, Bucharest (RO); Nikhil Singh Shekhawat, Orlando, FL (US)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 16/007,955

(22) Filed: Jun. 13, 2018

(65) Prior Publication Data

US 2018/0293573 A1 Oct. 11, 2018

Related U.S. Application Data

(63) Continuation-in-part of application No. 15/884,847, filed on Jan. 31, 2018, which is a continuation-in-part
(Continued)

(51) Int. Cl.
*G06Q 20/36* (2012.01)
*G06Q 20/10* (2012.01)
(Continued)

(52) U.S. Cl.
CPC ......... *G06Q 20/367* (2013.01); *G06Q 20/023* (2013.01); *G06Q 20/102* (2013.01);
(Continued)

(58) Field of Classification Search
None
See application file for complete search history.

(56) References Cited

U.S. PATENT DOCUMENTS

| 5,668,760 A | 9/1997 | Hazen |
| 5,668,876 A | 9/1997 | Falk et al. |

(Continued)

FOREIGN PATENT DOCUMENTS

| CA | 2837208 | 12/2012 |
| CA | 2852059 | 4/2013 |

(Continued)

OTHER PUBLICATIONS

R. K. Balan and N. Ramasubbu, "The Digital Wallet: Opportunities and Prototypes," in Computer, vol. 42, No. 4, pp. 100-102, Apr. 2009, doi: 10.1109/MC.2009.134. (Year: 2009).*
(Continued)

*Primary Examiner* — Gregory S Cunningham, II
(74) *Attorney, Agent, or Firm* — Norton Rose Fulbright Canada LLP

(57) ABSTRACT

Systems, methods, and machine-executable data structures for the processing of data for the secure creation, administration, manipulation, processing, and storage of electronic data useful in the processing of electronic payment transactions. Aspects of such methods, systems, and data structures include providing at an electronic device, an output indicating that a dynamically-configured electronic token is in a transaction-ready state, where the dynamically-configured electronic token is associated with a plurality of loyalty accounts; in response to one or more signals providing information regarding a location of the electronic device, obtaining token data associated with a loyalty account of the plurality of loyalty accounts corresponding to the location of the electronic device; and via a data communication inter-
(Continued)

face, route a token, generated from the token data, for processing at a transaction processing system.

20 Claims, 63 Drawing Sheets

Related U.S. Application Data of application No. 15/201,428, filed on Jul. 2, 2016, now Pat. No. 11,080,701, which is a continuation-in-part of application No. 15/000,685, filed on Jan. 19, 2016, now Pat. No. 11,080,700.

(60) Provisional application No. 62/559,069, filed on Sep. 15, 2017, provisional application No. 62/557,447, filed on Sep. 12, 2017, provisional application No. 62/542,590, filed on Aug. 8, 2017, provisional application No. 62/534,358, filed on Jul. 19, 2017, provisional application No. 62/518,778, filed on Jun. 13, 2017, provisional application No. 62/452,629, filed on Jan. 31, 2017, provisional application No. 62/200,859, filed on Aug. 4, 2015, provisional application No. 62/188,067, filed on Jul. 2, 2015, provisional application No. 62/105,061, filed on Jan. 19, 2015.

(51) Int. Cl.
| | | |
|---|---|---|
| *G06Q 30/02* | (2012.01) | |
| *G06Q 20/32* | (2012.01) | |
| *G06Q 20/12* | (2012.01) | |
| *G06Q 20/38* | (2012.01) | |
| *G06Q 20/40* | (2012.01) | |
| *G06Q 20/20* | (2012.01) | |
| *G06Q 20/02* | (2012.01) | |
| *G06Q 40/02* | (2012.01) | |

(52) U.S. Cl.
CPC .............. *G06Q 20/12* (2013.01); *G06Q 20/20* (2013.01); *G06Q 20/3224* (2013.01); *G06Q 20/3278* (2013.01); *G06Q 20/382* (2013.01); *G06Q 20/387* (2013.01); *G06Q 20/3821* (2013.01); *G06Q 20/405* (2013.01); *G06Q 30/0229* (2013.01); *G06Q 40/025* (2013.01)

(56) References Cited

U.S. PATENT DOCUMENTS

| | | | |
|---|---|---|---|
| 6,439,464 | B1 | 8/2002 | Fruhauf et al. |
| 6,763,399 | B2 | 7/2004 | Margalit et al. |
| 6,883,715 | B1 | 4/2005 | Fruhauf et al. |
| 6,988,657 | B1 | 1/2006 | Singer et al. |
| 6,991,173 | B2 | 1/2006 | Fruhauf |
| 7,011,247 | B2 | 3/2006 | Drabczuk et al. |
| 7,150,397 | B2 | 12/2006 | Morrow et al. |
| 7,249,266 | B2 | 7/2007 | Marglait et al. |
| 7,438,218 | B2 | 10/2008 | Dooley et al. |
| 7,529,700 | B1 | 5/2009 | Kessler |
| 7,647,404 | B2 | 1/2010 | Cooper et al. |
| 7,761,380 | B2 | 7/2010 | Katz |
| 7,848,980 | B2 | 12/2010 | Carlson |
| 8,046,495 | B2 | 10/2011 | Cooper et al. |
| 8,112,353 | B2 | 2/2012 | Li et al. |
| 8,121,874 | B1 | 2/2012 | Guheen et al. |
| 8,151,345 | B1 | 4/2012 | Yeager |
| 8,260,199 | B2 | 9/2012 | Kowalski |
| 8,332,272 | B2 | 12/2012 | Fisher |
| 8,352,749 | B2 | 1/2013 | von Behren et al. |
| 8,391,837 | B2 | 3/2013 | Corda |
| 8,417,643 | B2 | 4/2013 | Mardikar |
| 8,468,580 | B1 | 6/2013 | Casey et al. |
| 8,548,924 | B2 | 10/2013 | Yeager |
| 8,549,279 | B1 | 10/2013 | Sahasranaman et al. |
| 8,560,449 | B1 | 10/2013 | Sears et al. |
| 8,655,787 | B1 | 2/2014 | Griffin et al. |
| 8,682,802 | B1 | 3/2014 | Kannanari |
| 8,686,802 | B1 | 4/2014 | Brown et al. |
| 8,751,294 | B2 | 6/2014 | Bhattacharya |
| 8,818,867 | B2 | 8/2014 | Baldwin et al. |
| 9,082,119 | B2 | 7/2015 | Ortiz et al. |
| 9,177,313 | B1 | 11/2015 | Silverman |
| 9,195,984 | B1 | 11/2015 | Spector |
| 9,269,083 | B1 | 2/2016 | Jarajapu |
| 9,305,295 | B2 | 4/2016 | Laracey |
| 9,336,519 | B2 | 5/2016 | Young |
| 9,715,681 | B2 | 7/2017 | Hammad |
| 9,721,238 | B2 | 8/2017 | Salmon |
| 9,792,593 | B2 | 10/2017 | Hayhow |
| 9,836,727 | B1 | 12/2017 | Brennan |
| 9,836,739 | B1 | 12/2017 | Borovsky |
| 10,055,740 | B2 | 8/2018 | Hanson |
| 10,521,780 | B1 * | 12/2019 | Hopkins, III .......... G06Q 20/10 |
| 2002/0002538 | A1 | 1/2002 | Ling |
| 2002/0169984 | A1 | 11/2002 | Kumar |
| 2003/0028481 | A1 | 2/2003 | Flitcroft |
| 2004/0073688 | A1 | 4/2004 | Sampson |
| 2005/0097060 | A1 | 5/2005 | Lee et al. |
| 2006/0080545 | A1 | 4/2006 | Bagly et al. |
| 2006/0235761 | A1 | 10/2006 | Johnson |
| 2006/0235795 | A1 | 10/2006 | Johnson |
| 2006/0235796 | A1 | 10/2006 | Johnson |
| 2006/0255158 | A1 | 11/2006 | Margalit et al. |
| 2007/0088952 | A1 | 4/2007 | Hewitt et al. |
| 2007/0125838 | A1 | 6/2007 | Law et al. |
| 2007/0143828 | A1 | 6/2007 | Jeal |
| 2007/0255653 | A1 | 11/2007 | Tumminaro et al. |
| 2007/0256124 | A1 | 11/2007 | Ih |
| 2008/0040285 | A1 | 2/2008 | Wankmueller |
| 2008/0103923 | A1 | 5/2008 | Rieck et al. |
| 2008/0133350 | A1 | 6/2008 | White |
| 2008/0163257 | A1 | 7/2008 | Carlson |
| 2008/0283591 | A1 | 11/2008 | Oder et al. |
| 2009/0064294 | A1 | 3/2009 | Cook |
| 2009/0104886 | A1 | 4/2009 | Minamino et al. |
| 2009/0104888 | A1 | 4/2009 | Cox |
| 2009/0240620 | A1 | 9/2009 | Kendrick et al. |
| 2009/0254440 | A1 | 10/2009 | Pharris |
| 2009/0271262 | A1 | 10/2009 | Hammad |
| 2009/0294527 | A1 | 12/2009 | Brabson et al. |
| 2010/0030697 | A1 | 2/2010 | Goodrich et al. |
| 2010/0042538 | A1 | 2/2010 | Dheer et al. |
| 2010/0063893 | A1 | 3/2010 | Townsend |
| 2010/0094755 | A1 | 4/2010 | Kloster |
| 2010/0145860 | A1 | 6/2010 | Pelegero |
| 2010/0148928 | A1 | 6/2010 | Yeager et al. |
| 2010/0257612 | A1 | 10/2010 | McGuire et al. |
| 2010/0274692 | A1 | 10/2010 | Hammad |
| 2010/0306076 | A1 | 12/2010 | Taveau et al. |
| 2011/0161233 | A1 | 6/2011 | Tieken |
| 2011/0166992 | A1 | 7/2011 | Dessert |
| 2011/0208659 | A1 | 8/2011 | Easterly et al. |
| 2011/0225090 | A1 | 9/2011 | Hammad |
| 2011/0251892 | A1 | 10/2011 | Laracey |
| 2011/0307710 | A1 | 12/2011 | McGuire et al. |
| 2011/0320344 | A1 | 12/2011 | Faith et al. |
| 2012/0005038 | A1 | 1/2012 | Soman |
| 2012/0028609 | A1 | 2/2012 | Hruska |
| 2012/0030044 | A1 | 2/2012 | Hurst |
| 2012/0030047 | A1 | 2/2012 | Fuentes |
| 2012/0031969 | A1 | 2/2012 | Hammad |
| 2012/0036042 | A1 * | 2/2012 | Graylin ................ G06Q 20/322 705/26.41 |
| 2012/0041881 | A1 | 2/2012 | Basu et al. |
| 2012/0078735 | A1 | 3/2012 | Bauer et al. |
| 2012/0078782 | A1 | 3/2012 | Schoenberg et al. |
| 2012/0084210 | A1 | 4/2012 | Farahmand |
| 2012/0116902 | A1 | 5/2012 | Cardina et al. |
| 2012/0131655 | A1 | 5/2012 | Bender et al. |
| 2012/0150668 | A1 | 6/2012 | Wade |
| 2012/0159163 | A1 | 6/2012 | von Behren |

(56) References Cited

U.S. PATENT DOCUMENTS

| | | |
|---|---|---|
| 2012/0173432 A1 | 7/2012 | Yeager |
| 2012/0197797 A1 | 8/2012 | Grigg |
| 2012/0203700 A1 | 8/2012 | Omce et al. |
| 2012/0209749 A1 | 8/2012 | Hammad |
| 2012/0214443 A1 | 8/2012 | Daigle |
| 2012/0239417 A1 | 9/2012 | Pourfallah et al. |
| 2012/0259782 A1 | 10/2012 | Hammad |
| 2012/0260324 A1 | 10/2012 | Lenon et al. |
| 2012/0267432 A1 | 10/2012 | Kuttuva |
| 2012/0271705 A1 | 10/2012 | Postrel |
| 2012/0259781 A1 | 11/2012 | Fote et al. |
| 2012/0290376 A1 | 11/2012 | Dryer |
| 2012/0296725 A1 | 11/2012 | Dessert |
| 2012/0316992 A1 | 12/2012 | Obome |
| 2012/0317036 A1 | 12/2012 | Bower et al. |
| 2012/0317628 A1 | 12/2012 | Yeager |
| 2013/0006860 A1 | 1/2013 | Balasubramanian et al. |
| 2013/0018793 A1 | 1/2013 | Wong |
| 2013/0024383 A1 | 1/2013 | Kannappan |
| 2013/0031006 A1 | 1/2013 | McCullagh et al. |
| 2013/0036048 A1 | 2/2013 | Campos et al. |
| 2013/0041823 A1 | 2/2013 | Wagner |
| 2013/0054474 A1 | 2/2013 | Yeager |
| 2013/0030618 A1 | 3/2013 | Barton et al. |
| 2013/0060618 A1 | 3/2013 | Barton et al. |
| 2013/0060708 A1 | 3/2013 | Oskolkov et al. |
| 2013/0091061 A1 | 4/2013 | Caulkett et al. |
| 2013/0095810 A1 | 4/2013 | Moreton et al. |
| 2013/0097081 A1 | 4/2013 | Leavitt et al. |
| 2013/0110658 A1 | 5/2013 | Lyman et al. |
| 2013/0110675 A1 | 5/2013 | Bouw |
| 2013/0138521 A1 | 5/2013 | Want et al. |
| 2013/0151405 A1 | 6/2013 | Head et al. |
| 2013/0166913 A1 | 6/2013 | Lenon |
| 2013/0179352 A1 | 7/2013 | Dwyre |
| 2013/0218657 A1 | 8/2013 | Salmon |
| 2013/0238455 A1 | 9/2013 | Laracey |
| 2013/0254117 A1 | 9/2013 | von Mueller |
| 2013/0275308 A1 | 10/2013 | Paraskeva et al. |
| 2013/0339188 A1 | 12/2013 | Mohamed et al. |
| 2014/0006280 A1 | 1/2014 | Scipioni |
| 2014/0025581 A1 | 1/2014 | Calman |
| 2014/0025958 A1 | 1/2014 | Calman et al. |
| 2014/0032419 A1 | 1/2014 | Anderson et al. |
| 2014/0040133 A1 | 2/2014 | Lee |
| 2014/0040148 A1 | 2/2014 | Ozvat et al. |
| 2014/0058951 A1 | 2/2014 | Kuppuswamy |
| 2014/0067677 A1 | 3/2014 | Ali |
| 2014/0074637 A1 | 3/2014 | Hammad |
| 2014/0074701 A1 | 3/2014 | Kingston |
| 2014/0081838 A1 | 3/2014 | Calman |
| 2014/0108263 A1 | 4/2014 | Ortiz et al. |
| 2014/0108785 A1 | 4/2014 | Lindteigen |
| 2014/0164243 A1 | 6/2014 | Aabye et al. |
| 2014/0278894 A1 | 9/2014 | Toumayan |
| 2014/0279552 A1 | 9/2014 | Ortiz et al. |
| 2014/0344153 A1 | 11/2014 | Raj |
| 2015/0012428 A1 | 1/2015 | Gray |
| 2015/0032627 A1 | 1/2015 | Dill et al. |
| 2015/0046330 A1 | 2/2015 | Hanafi |
| 2015/0052064 A1 | 2/2015 | Karpenko et al. |
| 2015/0058191 A1 | 2/2015 | Khan |
| 2015/0100495 A1* | 4/2015 | Salama ............... G06Q 20/405 705/65 |
| 2015/0112870 A1 | 4/2015 | Nagasundaram |
| 2015/0112871 A1 | 4/2015 | Kumnick |
| 2015/0120472 A1 | 4/2015 | Aabye et al. |
| 2015/0186871 A1* | 7/2015 | Laracey ............... G06Q 30/06 705/41 |
| 2015/0213435 A1 | 7/2015 | Douglas et al. |
| 2015/0235212 A1 | 8/2015 | Ortiz |
| 2015/0254635 A1* | 9/2015 | Bondesen ............ G06Q 20/36 705/41 |
| 2015/0254643 A1 | 9/2015 | Bondesen |
| 2015/0254655 A1 | 9/2015 | Bondesen |
| 2015/0262180 A1* | 9/2015 | Hambleton ........... G06Q 40/02 705/71 |
| 2015/0332246 A1 | 11/2015 | Lafeer |
| 2015/0332264 A1* | 11/2015 | Bondesen ............ G06Q 20/405 705/44 |
| 2016/0019536 A1 | 1/2016 | Ortiz |
| 2016/0071094 A1* | 3/2016 | Krishnaiah .......... G06Q 20/308 705/66 |
| 2016/0086166 A1 | 3/2016 | Pomeroy |
| 2016/0104155 A1 | 4/2016 | McGaugh |
| 2016/0189291 A1 | 6/2016 | Nair |
| 2016/0210626 A1 | 7/2016 | Ortiz |
| 2016/0224977 A1 | 8/2016 | Sabba |
| 2016/0358172 A1* | 12/2016 | Ziat .................... G06Q 20/3227 |
| 2016/0371668 A1 | 12/2016 | Priebatsch |
| 2017/0017958 A1 | 1/2017 | Scott |
| 2017/0161733 A1* | 6/2017 | Koletsky ............ G06Q 20/3829 |
| 2017/0249622 A1 | 8/2017 | Ortiz |
| 2017/0323283 A1 | 11/2017 | Todasco |
| 2018/0137498 A1 | 5/2018 | Kim |
| 2018/0225660 A1* | 8/2018 | Chapman ........... G06Q 20/3827 |
| 2019/0156326 A1 | 5/2019 | Todasco |

FOREIGN PATENT DOCUMENTS

| | | |
|---|---|---|
| CA | 2858203 | 6/2013 |
| CA | 2830260 | 4/2014 |
| CA | 2890335 | 5/2014 |
| CN | 101071490 A | 11/2007 |
| CN | 101226616 A | 7/2008 |
| CN | 103679443 A | 3/2014 |
| EP | 1843277 | 10/2007 |
| EP | 2048594 A1 | 4/2009 |
| EP | 2365469 A1 | 9/2011 |
| EP | 2145399 B1 | 7/2012 |
| WO | 2002048846 | 6/2002 |
| WO | 2007122224 A1 | 1/2007 |
| WO | 2009001020 | 12/2008 |
| WO | 2010015734 A1 | 2/2010 |
| WO | 2012021864 A2 | 2/2012 |
| WO | 2013003372 A1 | 1/2013 |
| WO | 2013072613 A1 | 5/2013 |
| WO | 2015025282 A2 | 2/2015 |

OTHER PUBLICATIONS

Final Office Action dated Jul. 3, 2019 in U.S. Appl. No. 15/000,685.

Non-Final Office Action dated Jul. 11, 2019 in U.S. Appl. No. 15/453,193.

Non-Final Office Action dated Jul. 24, 2019 in U.S. Appl. No. 15/414,065.

Non-Final Office Action dated Sep. 18, 2019 in U.S. Appl. No. 14/879,913.

Final Office Action dated Sep. 18, 2019 in U.S. Appl. No. 15/201,428.

Extended European Search Report dated Sep. 20, 2019 in EP Application No. 17762362.6.

White, Ron, How Computers Work, Oct. 15, 2003, Paul Boger, Illustrated by Timothy Edward Downs, 7th Edition (Year: 2003).

Non-Final Office Action dated Feb. 14, 2019 in U.S. Appl. No. 14/869,186.

Non-Final Office Action dated Feb. 5, 2019 in U.S. Appl. No. 15/201,428.

Extended European Search Report dated Feb. 14, 2019 in EP Application No. 16816879.7.

Non-Final Office Action dated Apr. 15, 2019 in U.S. Appl. No. 14/705,477.

Chen, et al., NFC Mobile Transactions and Authentication based on GSM Network, Second Internation Workshop on Near Field Communication; pp. 83-89 IEE Computer Society.

Mantoro et al.; Online Payment Procedure Involving Mobile Phone Network Infrastructure and Devices; Dept of Computer Science, University Malaysia.

Tang e tal.; A Mobile Identity Authentication Scheme of E-Commerce Based on Java-SIM Card, V2-114 to V2-118 School of Electronics Engineering, Beijing University.

(56) References Cited

OTHER PUBLICATIONS

USCIS Form I-9 "Instructions for Employment Eligibility Verification", 9 pages, Jan. 31, 2014, including p. 9 listing "Lists of Acceptable Document" used to establish identity and employment authorization.
"First Time Applicants", Department of State, retrieved Feb. 12, 2015, 4 pages citing documents needed for applying for a passport.
EESR mailed May 7, 2018 in EP Application No. 15846067.5.
EESR mailed Jan. 24, 2018 in EP Application No. 15848487.3.
EESR mailed Jul. 3, 2018 in EP Application No. 16739695.1.
International Search Report and Written Opinion dated Jan. 7, 2016 in Application No. PCT/CA2015/000519.
International Preliminary Report on Patentability dated Apr. 4, 2017 in Application No. PCT/CA2015/000519.
International Search Report and Written Opinion dated Jan. 19, 2016 in Application No. PCT/CA2015/000532.
International Preliminary Report on Patentability dated Apr. 11, 2017 in Application No. PCT/CA2015/000532.
International Search Report and Written Opinion dated May 2, 2016 in Application No. PCT/CA2016/000014.
International Preliminary Report on Patentability dated Jul. 25, 2017 in Application No. PCT/CA2016/000014.
International Search Report and Written Opinion dated Oct. 14, 2016 in Application No. PCT/CA2016/000186.
International Preliminary Report on Patentability dated Jan. 2, 2018 in Application No. PCT/CA2016/000186.
International Search Report and Written Opinion dated Jun. 23, 2017 in Application No. PCT/CA2017/000050.
International Search Report and Written Opinion dated Oct. 12, 2017 in Application No. PCT/CA2017/000173.
International Search Report and Written Opinion dated Apr. 27, 2018 in Application No. PCT/CA2018/000017.
Office Action dated Feb. 5, 2018 in U.S. Appl. No. 14/705,477.
Office Action dated Aug. 27, 2014 in U.S. Appl. No. 14/056,440.
Office Action dated Aug. 3, 2016 in U.S. Appl. No. 14/142,072.
Office Action dated Oct. 15, 2014 in U.S. Appl. No. 14/287,134.
Office Action dated Feb. 19, 2015 in U.S. Appl. No. 14/287,134.
Office Action dated Oct. 22, 2015 in U.S. Appl. No. 14/287,134.
Office Action dated Aug. 6, 2014 in U.S. Appl. No. 14/287,134.
International Search Report dated Jul. 6, 2010 for Application No. PCT/AU2010/000546.
Office Action dated Aug. 23, 2018 in U.S. Appl. No. 14/705,477.
Final Office Action dated Aug. 23, 2018 in U.S. Appl. No. 14/705,477.
Non-Final Office Action dated Oct. 18, 2018 in U.S. Appl. No. 15/000,685.
Office Action dated Mar. 26, 2020 issued in CN 201580064986.1.
Office Action dated Mar. 26, 2020 issued in CN 201580067059.5.
Office Action dated Mar. 12, 2020 issued in CN 201680016674.8.
Office Action dated Jun. 3, 2020 issued in U.S. Appl. No. 14/869,186.
Office Action dated Jun. 10, 2020 issued in U.S. Appl. No. 15/000,685.
Knott, What is Private Key Encryption, Koolspan, Mar. 6, 2014 retrieved from https://web.archive.org/web/20140306101755/http://www.koolspan.com/blog/private-key-encryption/(Year:2014).
Examination Report dated May 19, 2020 issued in EP 15846067.5.
Final Office Action dated Nov. 18, 2019 in U.S. Appl. No. 14/705,477.
Non-Final Office Action dated Nov. 12, 2019 in U.S. Appl. No. 15/884,847.
Non-Final Office Action dated Dec. 6, 2019 in U.S. Appl. No. 15/648,942.
Final Office Action dated Dec. 26, 2019 in U.S. Appl. No. 14/869,186.
Final Office Action dated Jan. 24, 2020 in U.S. Appl. No. 15/453,193.
Non-Final Office Action dated Jan. 29, 2020 in U.S. Appl. No. 15/201,428.
Notice of Allowance dated Mar. 12, 2020 in U.S. Appl. No. 15/414,065.
Examination Report dated Feb. 11, 2020 in EP 15848487.3.
Office Action dated Nov. 16, 2020 issued in AU 2016208989.
Office Action dated Dec. 3, 2020 issued in CN 201580064986.1.
Office Action dated Nov. 30, 2020 issued in CN 201580067059.5.
Office Action dated Jan. 13, 2021 issued in U.S. Appl. No. 14/869,186.
Office Action dated Jan. 26, 2021 issued in EP 16739695.1.
Office Action dated Jan. 26, 2021 issued in U.S. Appl. No. 15/453,193.
Notice of Allowance dated Mar. 30, 2021 issued in CA 2830260.
Notice of Allowance dated Mar. 25, 2021 issued in U.S. Appl. No. 15/201,428.
Notice of Allowance dated Mar. 24, 2021 issued in U.S. Appl. No. 15/000,685.
Office Action dated Jul. 20, 2020 issued in U.S. Appl. No. 15/648,942.
Office Action dated Jul. 2, 2020 issued in U.S. Appl. No. 15/201,428.
Notice of Allowance dated Jun. 23, 2020 issued in U.S. Appl. No. 14/705,477.
Office Action dated Jul. 6, 2020 issued in EP 17762362.6.
Office Action dated Jul. 6, 2020 issued in U.S. Appl. No. 15/884,847.
Office Action dated Jun. 24, 2020 issued in U.S. Appl. No. 14/879,913.
Office Action dated Oct. 8, 2020 issued in U.S. Appl. No. 15/453,193.
Verified by Visa Acquirer and Merchant Implementation Guide U.S. Region, May 2011, Visa, 114 pages (Year: 2011).
Visa 3-D Secure vs. MasterCard SPA, Gpayments Pty Ltd, Mar. 1, 2002, 37 pages (Year: 2002).
Office Action dated May 19, 2020 issued in AU 2015330644.
Office Action dated Jun. 3, 2020 issued in AU 2015327722.
Office Action dated Nov. 25, 2020 issued in CN 201680016674.8.
Office Action dated May 25, 2021 issued in U.S. Appl. No. 14/879,913.
Gao, J et al., "A 2D Barcode-Based Mobile Payment System," 2009 Third International Conference on Multimedia and Ubiquitous Engineering, 2009, pp. 320-329, doi: 10.
Office Action dated Apr. 14, 2021 issued in CN 201580067059.5.
Office Action dated Jun. 9, 2021 issued in EP 15848487.3.
Office Action dated Apr. 12, 2021 issued in AU 2016287789.
Office Action dated May 18, 2021 issued in AU 2015330644.
Office Action dated Apr. 16, 2021 issued in AU 2015330644.
Office Action dated Apr. 30, 2021 issued in AU 2015327722.
Office Action dated May 4, 2021 issued in EP 16816879.7.
Notice of Allowance dated May 8, 2021 issued in CN 201680016674.8.
Office Action dated Apr. 13, 2021 issued in CN 201580064986.1.
Office Action dated Apr. 21, 2021 issued in U.S. Appl. No. 15/884,847.
Summons to Oral Proceedings dated Jul. 1, 2021 issued in EP 17762362.6.
Office Action dated Jun. 30, 2021 issued in Cn 201780028338.X.
Notice of Allowance dated Aug. 19, 2021 issued in U.S. Appl. No. 15/453,193.
Office Action dated Aug. 30, 2021 issued in U.S. Appl. No. 15/648,942.
Office Action dated Oct. 13, 2021 issued in U.S. Appl. No. 15/884,847.
Office Action dated Oct. 25, 2021 issued in CA 2963287.
Office Action dated Octobers, 2021 issued in CA2961916.
Office Action dated Nov. 26, 2021 issued in U.S. Appl. No. 14/879,913.
Office Action dated Dec. 27, 2021 issued in U.S. Appl. No. 14/869,186.
Office Action dated Mar. 21, 2022 issued in U.S. Appl. No. 15/884,847.
Office Action dated Mar. 30, 2022 issued in U.S. Appl. No. 14/879,913.
Office Action dated Mar. 4, 2022 issued in U.S. Appl. No. 15/648,942.

\* cited by examiner

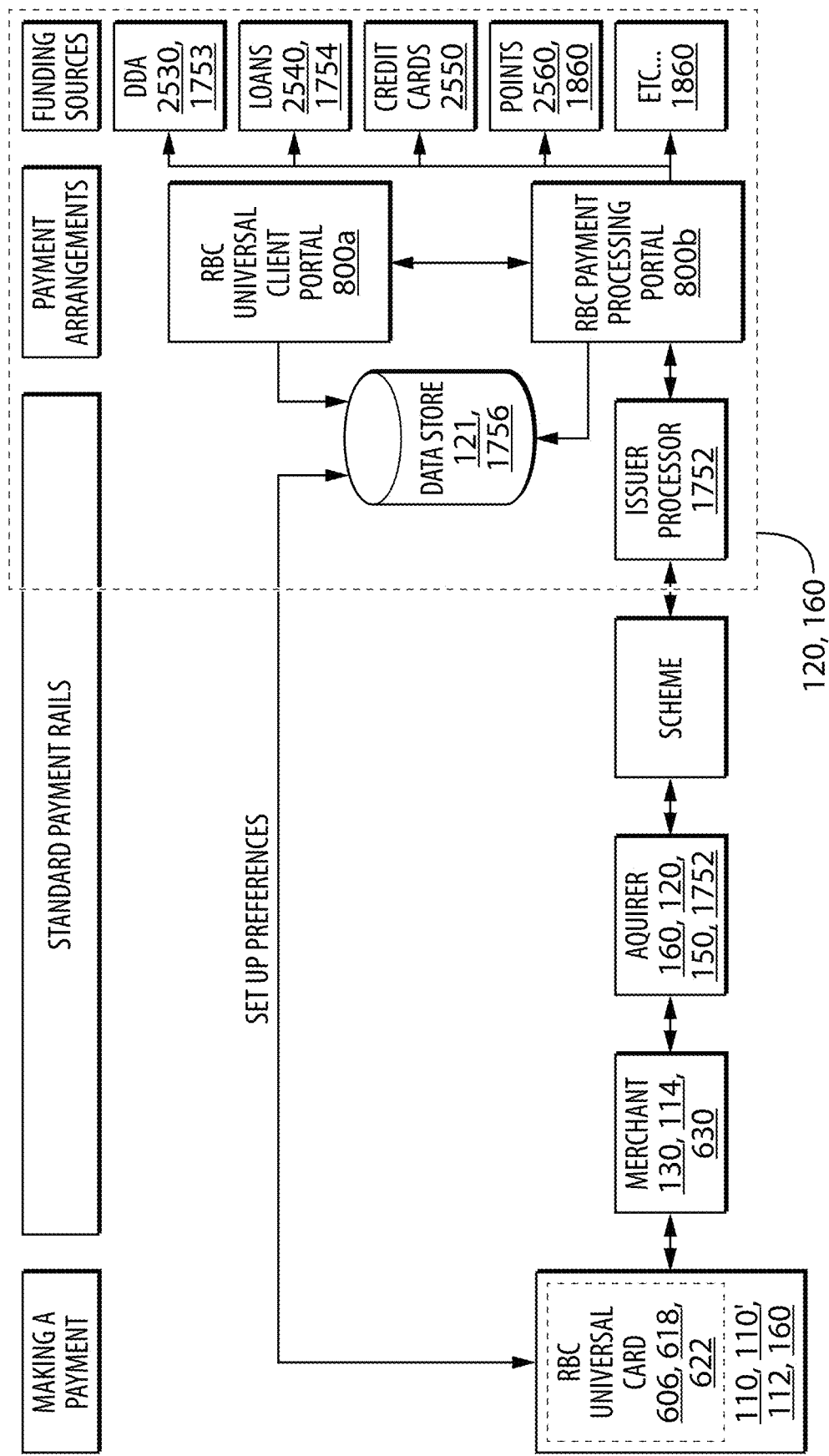

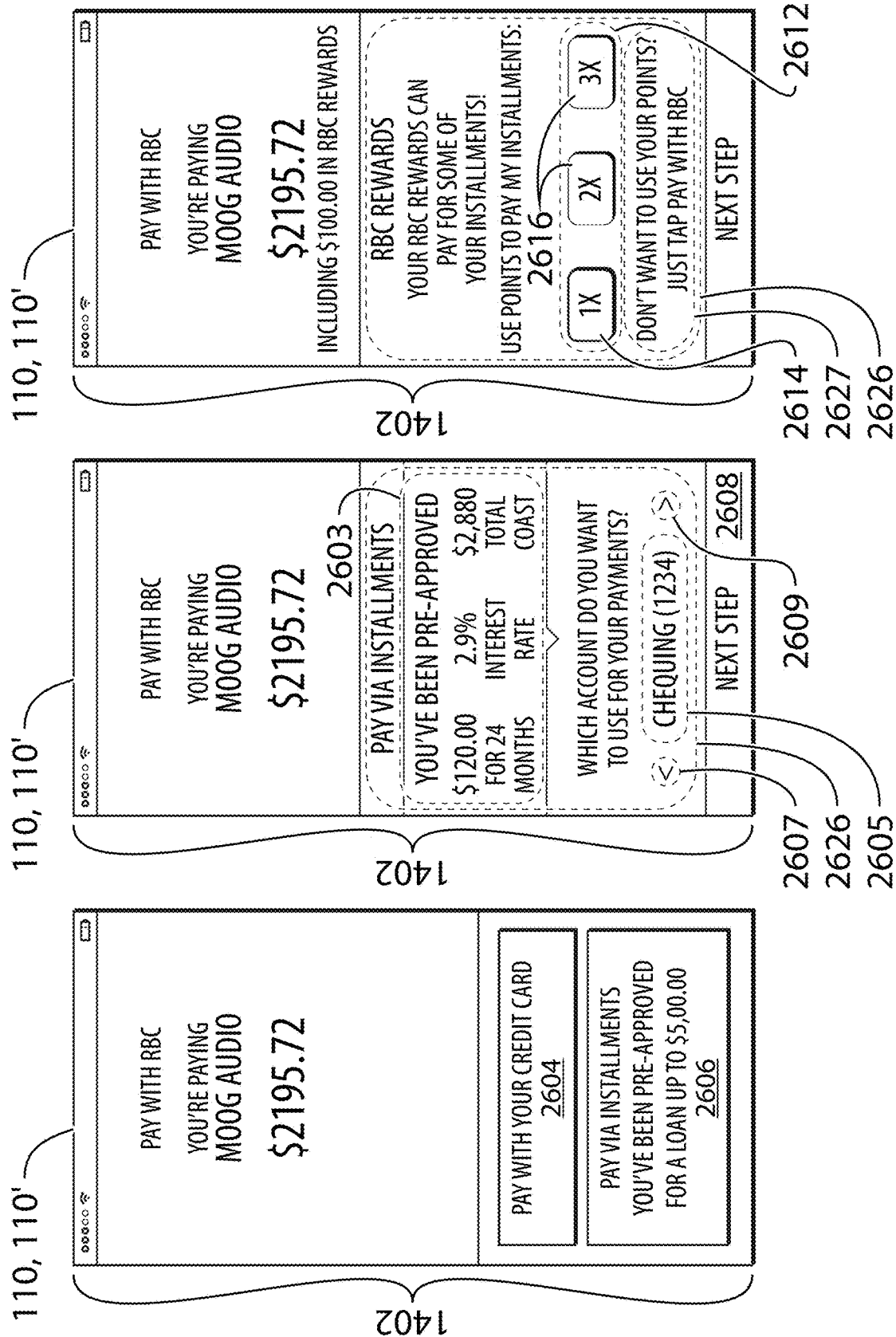

Any loyalty program partner can participate and users would just need to add their loyalty pass through the partner's mobile app Merchant 1 opts-in and integrates the iLoyalty API into their mobile application (also available in mobile payment platforms)

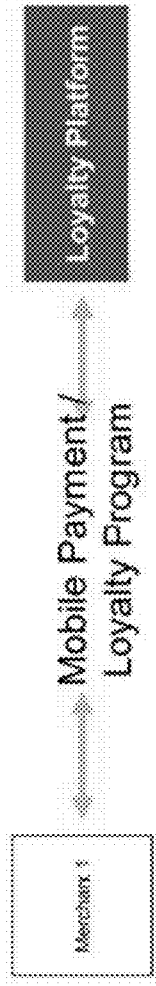

Mobile Payment/ Loyalty Program

The consumer adds their Merchant 1 loyalty card into a mobile wallet using the existing Merchant 1 mobile app (status quo)

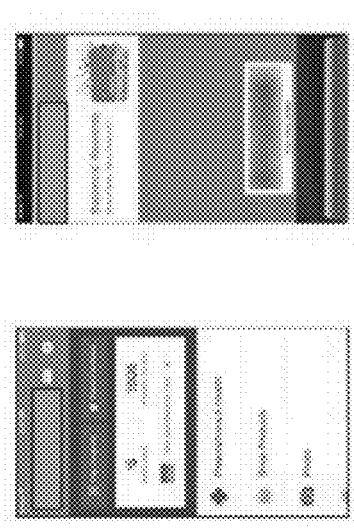

FIG. 28

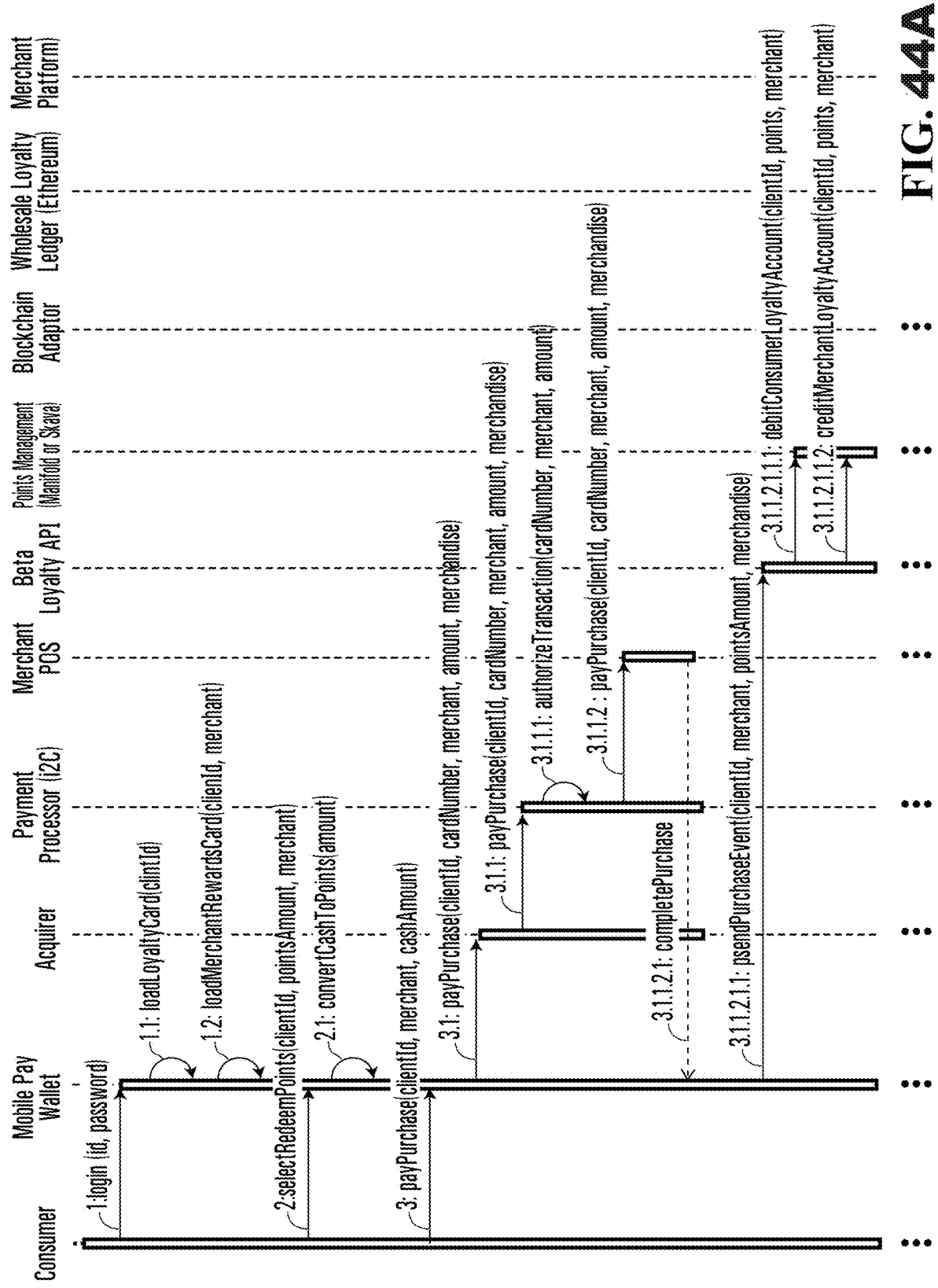

SYSTEM AND METHOD FOR LOCATION-BASED TOKEN TRANSACTION PROCESSING

CROSS-REFERENCE TO RELATED APPLICATIONS

This application claims all right and benefit, including priority, of each of:
U.S. Provisional Application No. 62/518,778, filed Jun. 13, 2017, and entitled "SYSTEM AND METHOD FOR LOCATION-BASED TOKEN TRANSACTION PROCESSING";
U.S. Provisional Application No. 62/534,358, filed Jul. 19, 2017, and entitled "SYSTEM AND METHOD FOR LOCATION-BASED TOKEN TRANSACTION PROCESSING";
U.S. Provisional Application No. 62/542,590, filed Aug. 8, 2017, and entitled "SYSTEM AND METHOD FOR LOCATION-BASED TOKEN TRANSACTION PROCESSING";
U.S. Provisional Application No. 62/557,447, filed Sep. 12, 2017, and entitled "SYSTEM AND METHOD FOR TOKEN TRANSACTION PROCESSING"; and
U.S. Provisional Application No. 62/559,069, filed Sep. 15, 2017, and entitled "SYSTEM AND METHOD FOR TOKEN TRANSACTION PROCESSING".

The application is also a continuation-in-part of U.S. patent application Ser. No. 15/884,847, filed Jan. 31, 2018, and entitled "SECURE FUNDING OF ELECTRONIC PAYMENTS"; which:
a. claims the benefit of U.S. Provisional Application No. 62/452,629, filed Jan. 31, 2017; and
b. is a continuation-in-part of U.S. patent application Ser. No. 15/201,428, filed Jul. 2, 2016, and entitled "SECURE FUNDING OF ELECTRONIC PAYMENTS"; which:
  i. claims the benefit of U.S. Provisional Application No. 62/200,859, filed Aug. 4, 2015;
  ii. claims the benefit of U.S. Provisional Application No. 62/188,067, filed Jul. 2, 2015; and
  iii. is a continuation-in-part of U.S. patent application Ser. No. 15/000,685, filed Jan. 19, 2016, and entitled "SECURE PROCESSING OF ELECTRONIC PAYMENTS; which claims the benefit of:
    1. U.S. Provisional Application No. 62/200,859, filed Aug. 4, 2015;
    2. U.S. Provisional Application No. 62/188,067, filed Jul. 2, 2015; and
    3. U.S. Provisional Application No. 62/105,061, filed Jan. 19, 2015.

Each of the above applications are hereby incorporated by reference in their entireties.

DISCLAIMER

Aspects of the material disclosed in this application relate to the creation, administration, manipulation, processing, and storage of data useful in processing of payment transactions. Aspects of such creation, administration, manipulation, processing, and storage may be subject to regulation by governmental and other agencies. The disclosure herein is made solely in terms of logical, functional, economic, and communications possibilities, without regard to statutory, regulatory, or other legal considerations. Nothing herein is intended as a statement or representation that any of the materials proposed or discussed herein, or the use thereof, does or does not comply with any statute, law, regulation, or other legal requirement in any jurisdiction.

TECHNICAL FIELD

The present disclosure relates generally to the field of computerized transaction processing, and more specifically, to systems, methods, and devices for tokenized transaction processing.

BACKGROUND

Electronic payments are a type of electronic signal exchange, or electronic data transaction, that have provided significant benefits to human kind. In addition to numerous benefits, such transactions are associated with numerous risks. Although many different forms of such transactions have been proposed, there remains significant room for improvement, including for example in terms of security, efficiency, and convenience in usability, particularly for purchasers, account administrators, and merchants.

Mobile and other e-commerce payments are categories of electronic payment initiated from mobile, desktop, and/or other devices, as opposed to more conventional forms of payments, such as cash, debit cards, credit cards, and/or pre-paid cards. Some mobile and e-commerce payment transactions utilize mobile or other virtual wallets, which are programs or applications on a user's device that store the user's personal information, including credentials for one or more authorized payment methods. For example, the user may input and store multiple credit card numbers, bank account numbers, coupons, loyalty, gift, and reward program account numbers, and others, and, using logical functionality built into the wallet(s), select which of several payment forms to use in association with a transaction, designate and confirm payment amounts and other transaction details, and otherwise manage or control transactions and accounts to be used in transactions. The use of secure elements, encryption, tokenization, and other techniques can be used to enhance the security of mobile and other virtual wallets and protect the user's payment credentials and other sensitive information stored inside.

While virtual wallets have provided improved convenience for purchasers and account holders, they have tended to be limited to the use of single funding or payment accounts. Moreover, to date such wallets have been tied to individual account administrators, such as issuing financial institutions (FIs) for credit cards, banks for demand/deposit accounts, etc. This can result in significant inconvenience for the consumer, or other purchaser, who is authorized to complete transactions by drawing on accounts administered by more than one FI and who, in order to do so, must deal with multiple virtual wallets on a single device.

To initiate many types of transaction using a virtual wallet, a user can approach a merchant point-of-sale (POS) terminal and present the mobile device for scanning or some other type of data exchange. For example, in a Near Field Communication (NFC) transaction, an NFC reader will request payment credentials and/or other transaction-specific information from the mobile device when the two are brought into close proximity with one another. Similarly, payment credentials and transaction information can be exchanged between the mobile wallet and merchant POS terminal using visual patterns, such as barcodes and QR codes, which are displayed on the mobile device for scanning by the merchant POS terminal. Mobile payment transactions may also require some type of user authentication, such as the inputting of a PIN or identifying biometric, before they will be processed, although user authentication is not always required.

Alternatively, electronic transactions may be initiated by using mobile or stationary computing devices to navigate to or otherwise access merchant e-commerce websites and/or applications, and thereafter using input devices such as keyboards, keypads, touchscreens, etc., to enter commands adapted to initiate communications sessions with associated merchant transaction systems.

Whether initiated at a merchant POS terminal or from a networked mobile or desktop device accessing a website, such as an application or other program associated with a merchant, transaction data may also be transmitted via one of potentially many different payment networks for processing, authorization, and settlement with a bank or financial institution. However, as each merchant or merchant program or application may be associated with a different payment network, the user may be left limited in the types and/or methods of payment that are available from that merchant or application. For example, although it may be convenient or otherwise advantageous for a purchaser to use one of many accounts available to the purchaser to complete a transaction, which accounts may or may not be associated with an bank or other account administrator acceptable to a merchant, or may offer or not offer advantageous interest rates, loyalty points, or other rewards, a particular merchant may not accept a certain type of payment, and/or one or more demand deposit accounts may not have adequate funds (or other payment resources) available to complete a transaction.

Transaction settlement is a process upon which performance metrics, security concerns, and ease of traversal are considerations that need to be factored into potential solutions. Various trade-offs may need to be made between each consideration, and the structure and architecture of a potential solution may aid in improving performance across one or more factors.

For these and other reasons it would be advantageous to improve user control over electronic transactions such as purchases, including where a purchaser is authorized to access multiple accounts or other funding sources in order to complete a transaction.

SUMMARY

In accordance with one aspect of the present disclosure, there is provided: an electronic device comprising: at least one processor; one or more output devices comprising at least one display screen; a data communication interface; and stored, machine-readable data representing instructions. The instructions are configured to cause the at least one processor to: providing via the one or more output devices an output indicating that a dynamically-configured electronic token is in a transaction-ready state, where the dynamically-configured electronic token is associated with a plurality of loyalty accounts; in response to one or more signals providing information regarding a location of the electronic device, obtaining token data associated with a loyalty account of the plurality of loyalty accounts corresponding to the location of the electronic device; and via the data communication interface, route a token, generated from the token data, for processing at a transaction processing system.

In accordance with another aspect, there is provided: a method of processing data representing a transaction request, the method comprising: providing at an electronic device, an output indicating that a dynamically-configured electronic token is in a transaction-ready state, where the dynamically-configured electronic token is associated with a plurality of loyalty accounts; in response to one or more signals providing information regarding a location of the electronic device, obtaining token data associated with a loyalty account of the plurality of loyalty accounts corresponding to the location of the electronic device; and via a data communication interface, route a token, generated from the token data, for processing at a transaction processing system.

In accordance with another aspect, there is provided a non-transitory, computer readable medium or media having stored thereon instructions which when executed by at least one processor, configure the at least one processing for: providing at an electronic device, an output indicating that a dynamically-configured electronic token is in a transaction-ready state, where the dynamically-configured electronic token is associated with a plurality of loyalty accounts; in response to one or more signals providing information regarding a location of the electronic device, obtaining token data associated with a loyalty account of the plurality of loyalty accounts corresponding to the location of the electronic device; and via a data communication interface, route a token, generated from the token data, for processing at a transaction processing system.

BRIEF DESCRIPTION OF THE DRAWINGS

Reference will be made herein to the accompanying drawings, in which:

FIGS. 24A and 24B are schematic representations of systems for processing mobile payments in accordance with aspects and embodiments of the invention.

FIGS. 26A, 26B, 26C, 26D, and 26E show embodiments of graphical user interfaces adapted for use in implementing various aspects and embodiments of the invention.

FIGS. 28, 29, and 30 are flow charts showing aspects of an example payment processing transaction.

FIGS. 44A and 44B illustrate a method diagram relating to the redemption of points, according to some embodiments.

For clarity and ease of description, like reference numerals will be used in the drawings to describe the same or like parts.

DETAILED DESCRIPTION

Figure 1:
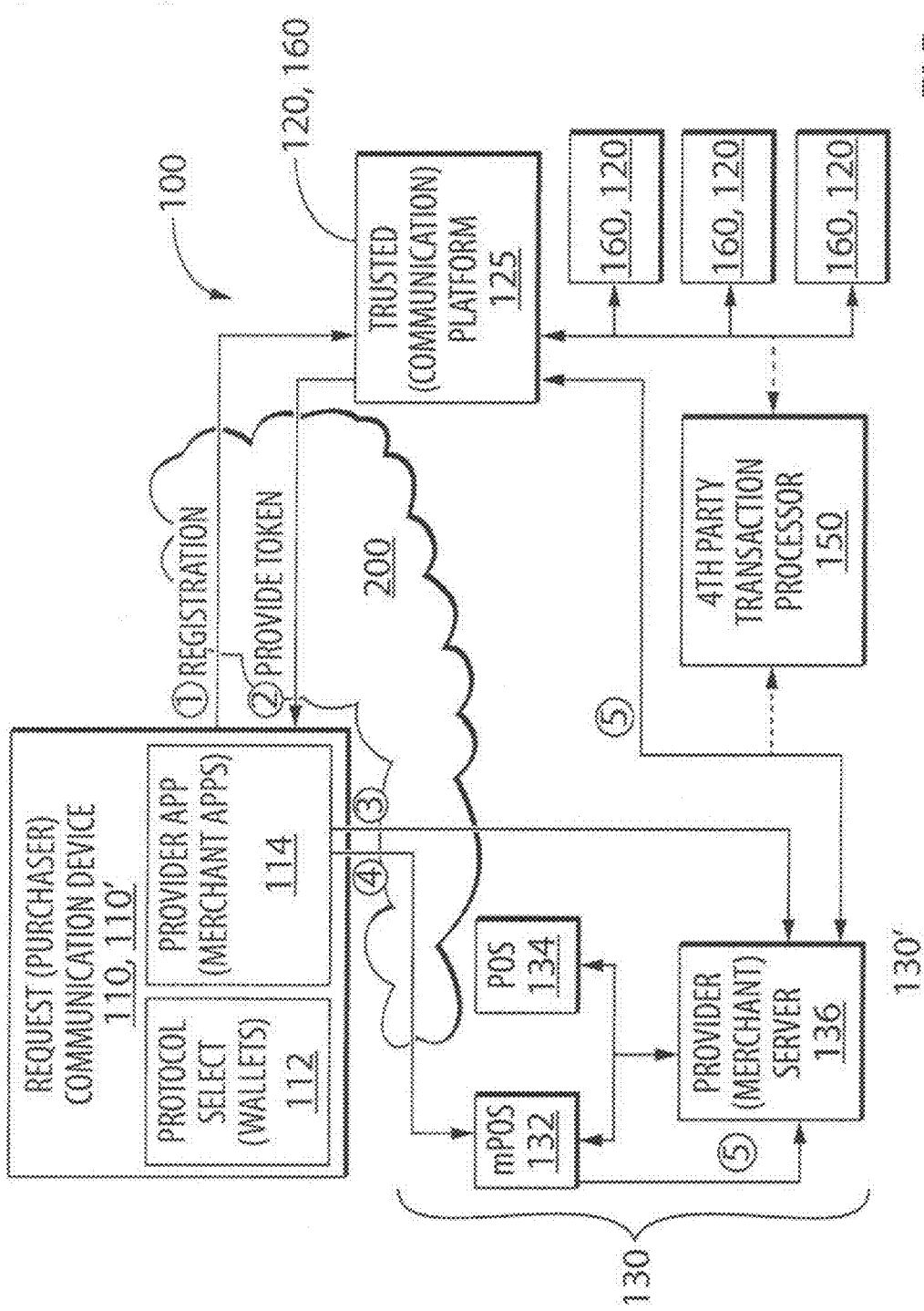
FIGS. 1, 2, 3, 4 and 5 show schematic representations of example systems suitable for use in processing data in accordance with aspects of the disclosure.

Aspects of the disclosure herein provide systems, methods, and machine-executable programming structures stored in persistent (i.e., non-transitory), computer-readable media for the secure execution of electronic signal exchanges, and more particularly improved systems, methods, and programming structures for the rapid and secure negotiation, authorization, execution, and confirmation of multi-party data processes, including payment transactions, in accordance with preferences of holders and/or administrators of multiple financial accounts.

Systems and devices in accordance with the disclosure can comprise a wide variety of components, including for example trusted authentication servers, or platforms, for use in simplifying, expediting, and improving the security of data processes such as purchases and other financial transactions. In embodiments of the invention adapted for use in the processing of financial transactions, such trusted platform(s) may, for example, be implemented by banks, credit card, loyalty, gift, rewards, or other account administrators; payment processing services; and/or other financial service providers. Suitably-configured request communications devices, such as mobile, desktop, and/or other network communication devices for use by consumers, institutional purchasers, and others, and suitably-configured merchant and payment processing devices, may also be included.

In addition to improved transaction security; faster authentication, adjudication, and/or other processing; and improved efficiency in the use of communications equipment (e.g., data transmission bandwidth), the use of systems, devices, and methods in accordance with the disclosure offers a number of advantages, including more convenient or less burdensome user interfaces, which provide account holders or administrators greater degrees of control, particularly with respect to the ability to draw on multiple sources of transaction funds and/or other payment sources, which can be held, administered and/or otherwise controlled by single or multiple financial institutions and/or other financial services providers, and increased ability on the part of purchasers, merchants, and FIs to complete transactions, which in some circumstances may be critical to their physical and/or economic health or well-being. Many further advantages will be apparent to those skilled in the relevant arts from the disclosure herein.

Among the numerous advantages provided by implementation of systems, methods, and programming structures disclosed herein are the use of trusted platforms and improvements in 'in-app' processing of purchases and other transactions using applications or other programming structures provided by merchants, FIs, and other service or goods providers.

For example, a transaction communication device, transaction request processor, or transaction controller, such as a purchaser's or other user's mobile or desktop computer, and/or one or more applications installed thereon, including for example one or more virtual wallet and/or merchant applications, may be registered with a trusted authentication platform, or 'trusted platform,' such as a server operated by a bank or other account administrator, or which may be operated by or on behalf of a central registration or certification authority, over a communications network such as the internet. Upon completion of registration, or at any time(s) thereafter, such device(s) and/or application(s) may be provided with one or more secure electronic tokens useable by the trusted platform and other devices, such as payment account administration servers, to verify or otherwise identify the request communication device as, e.g., a 'trusted device', which is pre-authorized for the completion of various form(s) of electronic transactions, such as purchases. As described herein, such tokens may be the included with, or distinct from, secure tokens that can be provisioned to such request communication devices for use in the processing and completion of mobile payments.

Such a trusted transaction controller or processor device may then be used, for example, by a consumer or other user to pay for goods or services through a direct Internet connection such as a merchant's application running on the trusted device (an 'in-app payment'). As a further example, such a trusted device may be used to communicate locally with a merchant system, such as a mobile point of sale or transaction processor ("mPOS") bound to a merchant, which itself may be registered as a trusted device with the server. The mPOS can in such circumstances be enabled to also communicate directly with the trusted server with respect to a transaction or other data process relating to the trusted user, without having to communicate with any further transaction processing intermediaries, such as—in the example of a purchase or other financial transaction—VisaNet or an equivalent proprietary payment network. This can be advantageous, as communications with such intermediaries typically require the exchange of sensitive data in order to authenticate the parties and/or otherwise authorize the transaction; and such exchanges can be costly in terms of time and processing resources, as well as risky.

It will be appreciated that aspects and embodiments of the invention, as described throughout this disclosure, may be advantageously implemented or optimized for either mobile or non-mobile platforms. It is specifically noted, however, that in some cases, while efficiencies and other advantages are opened for both mobile and non-mobile applications, such possibilities are particularly well adapted to increase possibilities for the initiation and execution of payments and other transactions using mobile devices, without in any way taking anything away from their utility for non-mobile applications.

Trusted platforms or transaction processing systems in accordance with the invention may be used in authenticating, expediting the processing of, and increasing the security of many types of data processing transactions, in addition to purchases or other transactions involving payments. For example, such systems may be used for the verification of identities of individuals, entities, etc. For example, if a trusted transaction processing system in accordance with the invention is implemented by, or on behalf of, a bank or other financial services provider (FSP), and the FSP (a) administers one or more bank, credit, loyalty, gift, reward and/or other account(s) on behalf of a user, or otherwise trusts a user, and (b) trusts a merchant or other service provider with whom the user wishes to do business, then indirect verification/authorization may be made as a result of the aggregated individual trust relationships.

Trust between multiple banks or other FSPs cooperating in the administration one or more trusted platforms (including distributed virtual platforms) operated on behalf of a group or consortium may be established and used in a similar manner. For example, each bank may be validated and verified with the other banks authenticated by the trusted platform. Trusted relationships between any or all of request communication devices, merchant systems, and FIs and/or other FSPs in accordance with the invention can be implemented through the use of trusted network communication protocols as disclosed herein.

In further embodiments, trusted platform(s) in accordance with the invention may be used to authenticate and/or otherwise complete transactions based on identity, such that for example users may in effect be enabled to pay for, or otherwise control the processing of, transactions based on their personal identities, or information uniquely association with their identities. In such transactions signal data associated with such a user's identity can be received and registered, or otherwise validated and verified, through a strict onboarding process and maintained at a server in the trusted platform, and thereafter relied upon as pre-authorized for purposes of adjudicating transactions. Each individual purchaser or other transaction initiator (human or juristic) may have or be associated with multiple identities, for example in different jurisdictions or in different transactional contexts, for different social media platforms, for particular online services (iTunes), etc. Such verification can be implemented and employed through provision of a token or other representation of, or a link to, data representing a validated account user for storage on an ID card, on the user's smart phone, wearable device, or other mobile device, desktop device, or other request communication device. Such card/device may be tapped to, or otherwise caused to communicate with, a POS or another mobile device. The identity may be forwarded by the POS/device to a server which will verify that the ID is trusted to pay or meet other obligations using any one or more sets of payment accounts. The form of payment can be agreed upon between the user and the merchant, communicated to the bank by the POS. The methods of payment are all registered with the bank so no other information need by transmitted.

In various aspects and embodiments, the invention provides methods and further components, including persistently-stored machine executable instruction sets, for implementing the various functions and processes described herein on automatic data processing systems (computers).

According to various further aspects and embodiments of the disclosure, there are provided systems and methods for completing in-app payments quickly and securely within mobile or desktop device environments. For example, in some embodiments, one or more virtual wallet applications may be installed on a mobile or desktop user request communication device, and configured to securely store one or more payment credentials, such as host card emulation ("HCE") tokens, each wallet being associated with one or more methods of payment a user has chosen to provision the device with. Tokens and other payment credentials stored within (i.e., subject to the control of) such virtual wallet(s) may be available generally to complete transactions according to various different payment protocols, such as by way of NFC readers located at merchant POS terminals, merchant websites, etc.

As will be appreciated by those skilled in the relevant arts, once they have been made familiar with this disclosure, in-app, in-browser, and other payment transaction processes, including mobile- or cloud-based processes reliant on use of virtual wallets and/or other features disclosed herein, may be implemented advantageously through the use of, or otherwise in conjunction with, trusted platform architectures, using for example trusted devices and device relationships as disclosed herein. However, in various embodiments it may be advantageous dispense to with, or to rely partially or wholly on processes which do not include, the establishment of trusted relationships between user request communication devices, merchant devices, and other devices such as trusted platforms, payment processors, and/or card or issuer systems. In some embodiments it may, for example, be sufficiently advantageous to provide alternative means of enabling secure access to payment or other tokens, and of communicating such tokens between purchaser devices, merchant devices, and devices controlled by payment processors and other parties.

As will be further appreciated by those skilled in the relevant arts, once they have been made familiar with this disclosure, various aspects, components, and embodiments of the invention(s) disclosed herein may be implemented on desktop, server class, and other non-mobile network request communication devices, in addition to or in lieu of mobile devices. Any type of communications device suitable for use in communicating transaction requests or otherwise implementing the objects and processes disclosed herein may be used. These can, for example, include any or all of smart phones, tablet computers, wearable devices such as wrist phones and smart watches or jewelry, laptop computers, desktop computers, server-class and mainframe computers, etc.

Additionally, HCE tokens or other payment credentials stored in mobile wallets may further be made accessible to other applications installed on a request communication device, such as those provided by or otherwise associated with a given merchant, in addition to virtual wallet application(s) issued by FSPs. To access tokens or payment credentials stored in such "merchant wallets," a merchant application may be authorized, by means of suitable prior signal exchanges, to access information from within the virtual wallet application through implementation of a pull architecture. This may, in desired cases, be facilitated by provision on the user communication request device of a system level application programming interface (API) that is common to both the wallet(s) and merchant application(s). Such an API can, for example, be provided through use of a separate API (sometimes referred to as a "software development kit" or "SDK") or other programming feature made accessible by the trusted user request device and adapted to communicate with separate, stand-alone wallet and merchant APIs provided on the trusted device. Because tokens already stored in FI-based wallets may, in such implementations, be pulled by the merchant application, the user may be relieved of the requirement of inputting any credit card information directly into the merchant application in order to complete a transaction.

A merchant's identity and/or individual merchant application(s) may be registered with a trusted platform, such as a certification authority, which authenticates the merchant and/or trusted user request communication device(s) during transactions. In some cases, a common central certification authority may be provided so that multiple merchants or merchant applications can be registered for completion of secure in-app transactions according to the embodiments described herein. For example, a common central certification authority may be established or operated by one or more financial institutions, such as one or more banks, acting in cooperation or association. To facilitate in-app payments by multiple different users of multiple different merchant applications, an industry-wide standard for the issuance of certificates used to authorize the merchant and/or the merchant application can be agreed upon and implemented. In some cases, a user's request communication device and/or one or more virtual wallet applications on the request communication device may also be registered with the certification authority.

As a part of completing a mobile or other payment that has been initiated from within a registered merchant application, data representing a certificate (e.g., a identification token) issued to the merchant or merchant application may be transmitted to the merchant application, for storage under the control of such application on the user's request communication device and subsequent presentation by the user's request communication device to the central certification authority, and/or other transaction processors, for use in verifying or otherwise authenticating a transaction. For example, as part of a checkout or payment sequence, the merchant application may send a request to a merchant server or some other networked system or resource where the merchant's certificate has been stored. The merchant application may then use the merchant's certificate to query a user's mobile wallet through the common API. Such a query may be initiated automatically by the merchant application in response to receipt of the merchant's certificate or, alternatively, following a manual confirmation prompt presented to the user on the mobile device.

In response to being queried by the merchant application, in some cases, a virtual wallet application may cause presentation on an output screen of the requesting communication device of a user interface soliciting authorization to proceed (a 'prompt' for confirmation of authorization). Where the virtual wallet is storing tokens or payment credentials for more than one method of payment (i.e., source of funding for a transaction), the virtual wallet may also prompt the user for a selection of one or more of the stored payment options for use with the current transaction. If only a single method of payment is stored, the virtual wallet may or may not prompt the user for selection of a payment method. In some cases, a user may specify a default method of payment in the virtual wallet, which the virtual wallet may then automatically select for use in the current transaction, and cause presentation of an overidable (or non-overidable) prompt to confirm the default selection, even though multiple different payment options may be stored. Such default may be specified for all merchant applications or only certain merchant applications and, in some cases, may also be disabled.

Following selection by the user of the requesting device, or by the virtual wallet, of one or more payment options, the virtual wallet may respond to the merchant application, via communications subsystems of the requesting device, with a token or credential representing the selected method(s) or source(s) of payment of the user. The merchant application may then transmit the received token or credential to the merchant server along with other information needed to complete the transaction. Payment information sent to the merchant server may be encrypted so that the merchant may not be able to view or otherwise access any of the user's sensitive information. Encryption of the payment information may be performed by the virtual wallet prior to transmission to the merchant application, by the merchant application, or by some other application or program on the requesting communication device. To complete transactions and process the selected payment, the merchant server may forward the token or payment credential received from the virtual device and other required transaction information to a payment gateway or other transaction processor.

In some cases, a payment credential sent to a merchant server may be an exact copy of a token previously stored in the mobile wallet in association with a particular payment method. Alternatively, or in addition, the virtual wallet application may generate a single-use token for the transaction that is wholly or partially derived from, or otherwise associated with, the token permanently stored in the virtual wallet and respond to the merchant application with the single-use token rather than the permanent token. In some cases, the payment credential used to complete the transaction (either directly or through generation of a single-use token) can be generated in advance, and stored in the virtual wallet prior to commencement of the transaction. In such a case, it may not be necessary for the virtual wallet to communicate with any trusted servers at the time of the transaction so as to obtain the required payment token. Although in some cases, the virtual wallet may also be configured to obtain or validate payment tokens generated by other systems and/or applications at the time of each transaction.

In some embodiments, tokens stored in, or otherwise accessible to or controlled by, a virtual wallet application may represent different types or sources of payment. For example, in addition to one or more separate credit card types, or protocols, payment tokens linked to individual or multiple bank accounts, and/or lines of credit may be generated and stored by the mobile wallet for use in mobile payments, including secure in-app payments. In general, each authorized method of payment may be associated with one or more different payment tokens. In some cases, payment tokens for still other asset types, such as coupons and/or loyalty programs, may be utilized, alone or in addition to demand, deposit, or credit account funds. Whichever type of payment(s) are selected to serve as a funding source, the merchant application and the virtual wallet may configure the transaction so as to be suitably identifiable by the payment gateway. Depending on the type of transaction, once identified, the payment gateway may then route the token or payment credential to an appropriate FSP server for processing.

In addition to different types of payment, tokens stored in or otherwise accessible to or controlled by, virtual wallet applications in accordance with various aspects and embodiments of the invention can include multiple tokens useful for completing payments of the same type (e.g., credit, debit, pre-paid, rewards, or loyalty), but drawn or otherwise provided from accounts held, controlled, or otherwise administered by independent FIs or FSPs, i.e., by FIs or FSPs subject to independent legal rights and obligations, and/or independent owners or administrators. Such independent FIs or FSPs can impose many different distinct requirements, including successful submission of unique security codes and/or compliance with other secure features procedures, which are all accounted for by various aspects and embodiments of the invention.

In some further aspects, embodiments of the inventions described herein may also incorporate trusted platforms into mobile and/or non-mobile environments to process electronic payments. For example, after a user's request communication device has been authenticated as a trusted device, when a payment with a merchant is initiated, the user's device may cause a payment token, a reference to such a token, and/or other encrypted data stored in a mobile wallet application or elsewhere on the mobile device, or in a secure cloud, to be transmitted to the merchant system, along with any other data desired or required to complete a payment transaction. The merchant or merchant application may electronically sign or otherwise evidence or confirm authorization of the token by adding to or associating with the token data representing, or otherwise associated with, the merchant's certificate status (using data signals recognizable as such by a certification authority or trusted platform), and may forward such 'signed' message to a payment network.

Transaction authorization data sets and other payment messages may be configured, by either the mobile device or the merchant, to resemble a payment data set in accordance with a recognized payment protocol such as Interac™, or any other suitable type of payment protocol, regardless of the form of payment selected by the purchaser. In such a case an acquirer within the payment network may receive the message and, identifying it as an Interac™ or other type of transaction, forward the message to an issuing FI, such as a bank, instead of to another destination. The issuing FI may then verify/decrypt the message and process payment to the merchant, directly or indirectly. In some cases, the issuing FI may arrange for payment directly from the selected method of payment indicated in the message. Optionally, the issuing FI may instead pay the merchant from the FI's own funds, and the issuing FI may thereafter settle separately with the user by any payment methods that the user has registered with the trusted platform. In some cases circumstances, as will be understood by those skilled in the relevant arts, it can be more efficient and secure, and/or otherwise advantageous, for such a payment message to be forwarded directly to the issuing FI, instead of to a third-party acquirer by way of a payment network, for 'in-house' settlement. For example, transaction adjudication processing times may be decreased, and payments to third party processors may be eliminated or reduced.

As will be understood by those skilled in the relevant arts, a 'token', as used in this disclosure, is a secure data device adapted for communication of sensitive information. Such a device may comprise data any such sensitive information, encrypted or otherwise, substitute data adapted to serve as a proxy for such data, and/or pointers to resources such as IP addresses at which data is stored and may be securely accessed. A particular type or item of data that may be included in such tokens, and/or in such token references, is a security key uniquely associated with a server, such as a transaction processing server (120, 160) which is used to control access to the sensitive data. Such a security key can include any data, including any identifier(s), sufficient to evidence or gain authority to access the information. Such a security key is not limited, for example, to PKI keys or certificates, etc.

As noted, a variety of different payment methods, or funding source types, may be used in processing payment or other transactions through use of the systems, methods, and devices disclosed herein, including for example lines of credit, cash accounts and other accounts based on currency values, and/or on non-currency-based values such as loyalty, gift, and/or rewards point balances, etc. As described, the selected method(s) of payment may be designated in a message in a manner that will be routed by the merchant to an acquirer or other authorized FSP using existing payment networks and/or infrastructure, and for routing by the acquirer or FSP to issuing FI. Each method of payment represented in an electronic wallet may or may not correspond to a method of payment registered with a corresponding issuing FI and/or trusted platform. Typically a merchant does not need to know, and often does not care, which method(s) of payment the user has selected for the transactions, so long as payment is ultimately tendered in a form and amount satisfactory to the merchant. By such devices the merchant may be relieved of the need for systems or applications configured to accept any particular method(s) of payment. Issuing FI(s) associated with tendered payments may pay the merchant from the FIs' funds, and settle with the purchaser or other requesting user through reimbursement from the user's selected method(s) of payment. Consequently, no or only minimal changes to a merchant or other payment processor backend entity to implement aspects of the invention(s) described herein, and thereby reduce processing times and the need for additional payment systems and/or applications. In some cases, all that may be required is for a merchant to receive a certificate data set from an FI or trusted platform, which may be used to electronically sign payment tokens provided from users or their mobile or non-mobile devices.

In some embodiments, systems, methods, and machine-executable instruction sets in accordance with the disclosure may be utilized to initiate and transact payments from within general purpose network browser applications installed on a mobile or other device, rather than from within an application or program that is provided by or otherwise associated with a merchant. For example, when a user navigates to a web page or site that requires a payment, an option may be presented in order to enable selection by the user of payment using a virtual or electronic wallet installed on the user's request communication device. Such an option may be presented in addition to or in lieu of other types and/or method(s) of payment that may be available, and may appear in any desirable or otherwise suitable location, such as in a list of payments options or as a graphically or functionally distinct user interface object, such as a selectable 'button.' When a requesting user selects to pay via a virtual wallet, the user's network browser application may interface with a corresponding wallet application present on or otherwise accessible by the requesting device, obtain a payment token from the wallet, and include the token in a payment message to be processed through the merchant backend. Processing of the electronic payment through a payment network or other entities may then proceed according to any of the applicable embodiments described herein.

A significant advantage offered by the invention is that the user experience of implementing a payment transaction can be substantially the same, regardless of platform. For example, in each case, when selecting to pay with an electronic wallet, a list or other visual representation of multiple applicable payment cards/accounts may be presented to the user for selection, as previously described. The requesting user may select the method of payment, and the mobile device or personal computer may transmit a suitably-configured token to the merchant or, in the case of a cloud wallet, the bank may route the respective token to the merchant or directly to the merchant's acquirer.

As previously noted, according to various aspects of the invention, electronic transactions may be initiated and completed from within applications or other programming devices on non-mobile devices, such as personal computers. For example, in some cases, a user may navigate to a website on which a good or service may be purchased, leased, etc., from a merchant. A login or other prompt allowing selection of a virtual wallet payment option may be displayed to the user on the merchant's checkout/payment web page. Upon selection of the virtual wallet payment option by the requesting user, the merchant's web page may present a secure login, for example, rendered in a nested browsing context (e.g. an iframe or other graphical overlay or insert) with interactive fields adapted to enable the requesting user to log in to the user's authorized bank, credit, loyalty, rewards, and/or other payment account(s). Upon successful log-in or other authorization, FI(s) associated with the designated payment accounts may respond by providing one or more payment tokens to the merchant, or to an acquirer or other third party payment processor designated by or otherwise associated with the merchant, the token representing one or more method(s) of payment identified within the user's electronic wallet and adequate for satisfying the transaction payment. Such payment token(s) may be stored on the user's device and/or in a secure cloud resource. After the merchant or merchant backend has received the payment token(s), the transaction may be processed according to any of the method described herein.

Accordingly, in some embodiments, regardless of how or from what program or application a user has initiated a transaction (in-app, mobile or non-mobile network browser), the user's device may not even store a virtual wallet application or payment token(s). Instead, in such cases, the device may provide means for securely authenticating the device/user to the FI(s) administering the user's payment accounts, such as by way of a trusted platform. Once the user and/or device have been authenticated, the user's FI(s) may transmit electronic payment token(s) to the merchant/acquirer for processing of the transaction. A variety of secure authentication methods may be used as described herein, including fingerprint or other biometric verification, including for example voice or facial recognition, login/password, or any other secure verification means supported by particular capabilities of the user's device.

Further details of various embodiments and embodiments of the invention(s), including at least one preferred embodiment of each of the various aspects, will now be provided with reference to the drawings. Any headings and subheadings used herein are intended for convenience only, to organize the disclosure into logical groupings of subject matter, so as to facility rapid and clear understanding by the reader, without limitation of any kind to the scope of the described embodiments. As will be appreciated by those skilled in the relevant arts, many of the features disclosed herein may be employed in a very wide variety of combinations and alternatives, depending upon payment network configurations; user, merchant, and/or FSP preferences, etc.

Trusted Platform

Reference is initially made to FIG. 1, which shows a schematic diagram of a system 100 suitable for use in implementing various aspects and embodiments of the invention. In the example shown, a system 100 includes at least a user or request communication device 110 (alternatively referred to, in various contexts, as a network transaction communication device, network communication device, transaction request processor, or transaction controller), for use by purchasers or other users 190 (FIG. 3; FIGS. 14A-14F); a trusted authentication platform (also a 'trusted platform' or 'transaction processing system') 120; and a merchant system 130 comprising merchant point of sale (POS) and/or other transaction device(s) 132, 134, and merchant or other FSP server 136.

While only one of each of devices 110, 120, 130, 132, 134, 136 is shown in FIG. 1, those skilled in the relevant arts will readily understand that a system 100 can include any desired or otherwise advantageous numbers of such devices.

In various embodiments, user or request communication device(s) 110 may comprise or consist of any suitably-configured smart phone, tablet, wearable, laptop, or other mobile devices; desktop or other stationary computer(s) or terminals, etc. A large number and variety of suitable devices are now available commercially, and doubtless others will be developed subsequent to the preparation of this specification. Further details of request or user communication device(s) 110 are provided below with reference to FIG. 6-8.

Trusted platform(s) and other transaction processing system(s) 120, 120' may comprise or consist of any enterprise, server, desktop, laptop, or other suitably-configured types or class(es) of electronic data processing (computer) systems. A large number and variety of suitable devices are now available commercially, and doubtless others will be developed subsequent to the preparation of this specification. Further details of trusted platform(s) 120 are provided below with reference to FIGS. 9-11.

Merchant system(s) 130 and device(s) 132, 134, 136 may comprise or consist of any suitably-configured POS, mPOS, and backend data processing devices. A large number and variety of suitable devices are now available commercially, and doubtless others will be developed subsequent to the preparation of this specification. Further details of merchant system(s) 130 and device(s) 132, 134, 136 are provided below with reference to FIG. 9-11.

Devices 110, 120, 130, 132, 134, 136, or any of them, may communicate between themselves by wireless (including radio, wireless telephone, optical, RFID, and infrared), wireline, or other means, using for example suitably-configured signal processors, transmitters, and receivers configured to communicate via the internet, the PSTN, and/or other communications networks, using any suitable protocols or combinations of protocols. Very commonly, such devices incorporated one or more dedicated communication subsystems, operating under the control of one or more central processing units (CPUs) and/or other processors, for such purposes.

As a part of implementing the processes enabled herein, as shown at (1) in FIG. 1, a user 190's mobile device 110 may be registered with a trusted platform server 120 by means of suitably-configured signal exchanges over a communications network 200 (e.g., the Internet and/or PSTN), and at (2) be provided by the trusted platform 120 with a secure data set, representing a certificate or other token, to be stored in volatile or non-volatile (i.e., transitory or non-transitory) memory of the device 110 and thereby make the device 110 a trusted device 110'. Once received and stored in device 110, such certificate or token may be used by the device 110 and trusted platform 120 for rapidly and securely identifying the device 110 as a "trusted device" 110', for example for transmission to and interpretation by the trusted platform 120, for use in rapidly authorizating and/or otherwise verifying data processes such as purchases or other financial transactions with third parties such as one or more merchant systems 130.

Registration of a device 110 with a trusted platform 120 to create a trusted device 110' can comprise any means of establishing means for suitably unambiguous and secure communications that are consistent with the purposes herein. For example, one or more unique and secure identifiers of the device 110, and/or one or more authorized users 190 thereof, may be used, in a wide variety of alternatives and combinations. These can include for example, names, 'secret' personal information, serial numbers, random or pseudo-random codes, account numbers, etc.

Such a trusted device 110' may then, for example at (3), be used to negotiate and complete one or more 'in-app' payments or other data processing transactions through a direct Internet connection such as a merchant, game, or other application ('app') provided by a merchant/provider 130 or some other entity, including general purpose web (i.e., network) browsers and the like, using suitably configured hypertext links, provided to a user display screen or other I/O component 610 (see, e.g., FIG. 6) of the trusted device 110', and transfer of touchscreen, keyboard/keypad and/or other user-generated inputs, signal transmitters and receivers, etc.

In the same and other embodiments, at (4) a trusted device 110' may communicate locally with a mobile POS ("mPOS") device 132 logically bound to a merchant system 130, 136, which itself may be registered with the trusted platform 120 as a trusted entity, for what is sometimes called direct, or "off the rails" of the conventional payments systems, processing. In other words, the mPOS 132 and/or bound merchant processor 136 may be enabled by such means to communicate, as shown at (5), directly with the same or another trusted platform 120 without having to negotiate, by means of suitable signal exchanges, with a fourth-party transaction processor 150 such as a payment processor such as VisaNet or equivalent proprietary payment network. By obviating the necessity of involving fourth-parties 150 such as payment processors for "on the rails" processing by more conventional means a number of advantages, including faster and more secure processing of often sensitive transaction data such as identities, account identifiers, etc., may be realized.

In some embodiments, such an mPOS 132 and/or other bound merchant processor 136 may be enabled to also and/or alternatively communicate, instead of directly with a platform 120, by means of suitable signal exchanges, with such fourth-party transaction processor 150, which as noted could be a payment processor such as VisaNet or other proprietary payment network. Transactions negotiated between an mPOS 132 and/or bound merchant processor 136 and a fourth party transaction processor 150 may then be settled subsequently with an issuer bank 160 and/or with a trusted platform 120 so that a merchant is paid and a user is debited a corresponding amount regardless of the account (s) or other sources of funds or the protocol(s) or type(s) used in presenting payment to the merchant. One possible advantage of such configuration is that an mPOS 132 and/or bound merchant processor 136 may be already configured for communication and/or transaction processing with a fourth party processor 150. Thus, any and all benefits of authentication with a trusted platform 120 may be realized in mobile transactions, while taking advantage of existing merchant system architectures.

In addition to payments and other financial transactions, trusted platform architectures 100 may be used for a variety of other purposes. For example, as noted above, identity verification is another possible application (e.g., the bank trusts me, you trust the bank, so you, arbitrary third party, trust me). Trust between banks or other account administrators or trustees 160 associated with a trusted platform 120 may work in a similar manner. Each bank or FSP 160 may be validated and verified with the other banks or FSPs 160 in the trusted platform system 100.

In various embodiments, a trusted platform 120 may be used to enable users of devices 110' to consummate purchases and/or process other transactions based on personal, device, or other non-payment identity(ies) or identifier(s) associated with one or more accounts to be used to effect payment, rather than account numbers and the like. Data representing a user's true identity, or other identity acceptable to a trusted platform 120 as a guarantee of completion of payment or other obligation(s) associated with a transaction, such as an employer's or other associated institution's identity, may be received, validated, and verified through, for example, an onboarding process or other process, and maintained at one or more servers 120 in the trusted platform architecture 100; and one or more suitable tokens, comprising data representing authenticating identifier(s), may be returned to the user device 110 for storage in memory associated with the device 11, so that it may be thereafter be used to return to the issuing trusted platform 120 data (which may be or include the token) suitable for use in establishing and/or re-establishing the device 110 as a trusted device 110'.

As will be appreciated by those skilled in the relevant arts, any user or request device 110 may be associated with multiple authorized human and/or juristic users, and/or with multiple accounts associated with such user(s). For example, each such device may be used by different authorized users and/or entities in different jurisdictions, or in different data processing contexts, as for example different social media platforms vs inside a brick-and-mortar merchant premises or particular online services (e.g., an online music or media source), each such user being potentially associated with rights to access different sets or pluralities of payment accounts. A representation of, link to, and/or other data or instruction associated with each validated identity may be stored on or in an ID card, such as a physical credit or debit card, or in separate or general memory of a device 110, 110', such as an SD card or other removable device, or in general memory or memory otherwise associated with or accessible by such a device, as for example in one or more virtual wallet application(s) 112, dedicated software, firmware, or hardware, or a separate device of similar functionality, such as a USB key. A card or device 110, 110' comprising such trusted identifier(s) can be tapped to or otherwise caused to interact with a POS device 132, 134, or another mobile device 110, 110', etc.; and at any suitable point in the process any one of the multiple identifiers may be selected for use in connection with a transaction, using for example suitably-configured I/O devices of the device 110, 110'. Identifier(s) associated with the selected identity may be forwarded by the POS/device 110, 110' to a server 120 which will verify that the ID is trusted for completion of the transaction.

In embodiments adapted for completion of purchases and other transactions involving payments, one or more forms of payment to be used in completing a transaction can be agreed upon in advance, at the time of a transaction, and/or after the transaction has been confirmed, between the user 110' and the merchant system 130, and communicated to the bank/trusted platform/transaction processor 120, 160, for example, by the POS 132, 134, or server 136, etc. Such methods of payment may be registered with or otherwise authenticated by the bank 160 or other trusted platform 120, so that the need for transmitting and interpreting information identifying such methods may be obviated or otherwise reduced. In this manner, for example, payment may be completed with use of an instruction to the bank 160 or other trusted platform 120 to process payment according to the agreed upon method of payment, without having to provide any details (which may be of a sensitive nature) related to the selected source or method of payment in the payment message itself.

Thus, for example, a novel variety of types or modes of payment settlement processing are enabled by the invention. For example, at or before the time of a transaction, any or all of the user of a device 110', the merchant system 130, and an FI acting as administrator of one or more accounts or other funding sources associated with the user may agree on one or more types, modes, or protocols of payment protocol to use (e.g. credit, debit, pre-paid card, cash bank transfer, loyalty point redemption, including one or more specific accounts associated with each such type of payment), and identifier(s) associated with the selected protocol can be transmitted to the trusted platform server 120. Such protocol(s) may be agreed and designated for use in processing, irrespective of the type(s) of payment accounts to be used in completing the transaction. The server 120 can itself have the ability to process the payment with the selected protocol, particularly where the server 120 is associated with a bank or other account-controlling FSP 160. From the perspective of the merchant' 130, the transaction data flow can be the same, or essentially the same, regardless of the payment protocol selected, in accordance with the preferences of itself or its payment systems service providers.

The ability of a trusted platform 120 to communicate with any one or more merchant systems 130 and/or FSPs 160, or to act as a bank or FSP in its own right in completing a transaction, and to complete such transaction using any one or more of a wide variety of payment types or protocols, without any requirement for differences in processing by merchant system(s) 130, is one of the significant advantages offered by the invention.

Optionally, or in addition, a trusted platform 120 may designate or otherwise associate one or more default accounts, or other payment protocol(s) or method(s), to be used in processing transaction requests generated by user device(s) 110', based on a variety of criteria, applied in advance or at any point in processing of the transaction, including for example user identity, account characteristics (including the identity of any FIs associated with the account(s)), and/or user preference(s).

Any or all of the above options may be controlled and/or otherwise implemented by a trusted payment application operating on a user device 110'. For example, a virtual wallet application 112 may be associated with a specific user identity, as for example an individual, one or more of the individual's accounts, one or more distinct FIs or FSPs, and/or one or more user/merchant applications or combinations; and a specific authorized user of a device 110' may be enabled, for example by means of suitably-configured user interfaces, to select which identity(ies)/app(s)/account(s) or combination(s) thereof are to be used to conduct transaction(s); and any one or more of such selections may be identified as overidable or non-overidable default selections under desired conditions. Such pre-selection by means of defaults can, for example, eliminate the need for a user to select, and a trusted platform 120 and/or merchant 130 to accept, a specific payment method at the time of a transaction.

Optionally, a trusted platform 120 acting as or on behalf of an FSP 160 may offer to the user, either through the user's device 110, 110' and/or through an mPOS 132/POS 134, opportunity(ies) to open, extend, expand, or otherwise access or create one or more new or existing lines of credit or other new funding source(s) at the time of payment, through the use of suitably-configured user interfaces and data exchanges. A wide variety of further possibilities are enabled by the invention, including the creation of loyalty, reward, gift, and other types of accounts.

As will be appreciated by those skilled in the relevant arts, a trusted platform 120 can be used to assure a merchant associated with a merchant system 130 (which may for example be operated by or on behalf of an association of merchants) that the merchant will be paid an amount owing to the merchant as a result of a transaction in accordance with the disclosure, regardless of the source(s) of funds used to pay for the transaction. From the merchant's perspective, where the money comes from on the user's side is generally not important, so long as the merchant is paid. This is a further significant advantage offered by the invention. For example, a user of a device 110' can be enabled to pay with any method acceptable to the trusted platform 120 and/or an associated FSP 160, without having to consider the merchant's preferences for payment. For example, in many prior art systems, when a merchant does not accept a specific form of payment such as AMEX™, then the user is required to find another, acceptable method of payment. A trusted platform 120 can, for example, be adapted to accept and make payments in accordance with such preferred protocol(s), and to cause payment to be transferred to the merchant in accordance therewith, and subsequent settlement between the trusted platform 120 and the purchaser using the device 110' to take place according to any desired, mutually-acceptable form of payment. This can, for example, be accomplished by advancing payment to the merchant system 130 from funds controlled by the trusted platform 120 itself in the AMEX or any other desired protocol, and collecting reimbursement from the paying user separately. Without authenticating the merchant system 130 as a trusted entity, settlement by the trusted platform 120 first with the merchant and then separately with the user may be more difficult or not even possible at all.

In further embodiments, including those in which a trusted platform 120 settles with the purchasing user separately from the merchant, a trusted platform 120 or other FSP 160 may provide for payment using a combination of funding sources associated with one or more users or device(s) 110', without identifying the designated the sources to merchant system 130. For example, a user can pay for half of a transaction with one credit card account, and the other half using a debit, pre-paid, or loyalty account.

In various embodiments, a trusted platform 120 or other FSP 160 may allow for a user of a device 110' to wholly or partially pay for a transaction using loyalty points registered with the trusted platform 120, 160, whether or not the merchant would otherwise be willing to receive points as a form of payment. This is possible in any circumstance where the points may be redeemed by or upon authorization of the trusted platform, 120, 160, without necessity for considering the preferences or requirements of the merchant system 130. Thus, the trusted platform 120, 160 is enabled to pay the merchant in the merchant's preferred format (including choice of currency, such as dollars, euros, pounds, rubles, or yen, or electronic currency such as bitcoin) using suitably-configured signals and data exchanges. For example, a trusted platform 120, 160 can provide to a merchant system 130 signals representing payment of $50 when the user of the device 110' has settled, or has agreed to settle, with the trusted platform/FSP 160 for $25 plus points associated with or otherwise acknowledged by the FSP, in an amount sufficient to compensate the remaining $25, either before or after settlement. The merchant system will only see that it received $50.

When a user taps the user's mobile or other transaction communication device 110', or otherwise puts the device 110' into an operating state configured for payment to complete a transaction, the trusted platform 120 may directly communicate with the mobile device 110' to determine payment options. Real-time offers, including coupon, redemption, discount, credit, and other options may be presented to the user, optionally in conjunction with opportunities to pay by various methods, including for example new credit, loyalty, or other accounts. Again, a wide variety of such options and communications can be handled through a virtual wallet or other payment app 112, 114.

Among the many advantages offered by the trusted data processing relationships that may be established between devices in accordance with the invention, particularly where a trusted platform 120 is operated by or on behalf of a bank or other FSP 160, is the ability to enable a user of a device 110' to change a selected method of payment following completion of the transaction, and even after the merchant system 130 has received and processed final payment data from the trusted platform/FSP 120, 160. Since the merchant is paid by the trusted platform/FSP 120, 160 regardless, the trusted platform/FSP (the bank) may allow the user, through the user's trusted device 110', to select new or revised form(s) of payment, optionally within a specified time limit (e.g. during the same business day, within 24 hours or a standard transaction clearance period, or within some other predefined cutoff). In such embodiments the trusted platform/FSP 120, 160 may be configured to send a reminder to the trusted device 110' regarding the pending expiry of the time limit to change the method of payment. Before this cutoff time, the trusted platform 120, 160 can settle with the merchant system 130, regardless of payment status as between the trusted platform/FSP 120, 160 and the user of the device 110'.

Among the advantages offered by various embodiments of the invention is that, at the time of payment, a trusted request communication device 110' may not require a network connection with the trusted platform 120 and/or FSP 160, because the trusted device 110' is configured (see e.g., (1) in FIG. 1) with a token which, among other possibilities, may be forwarded via the merchant system 130, including for example an mPOS 132, to the trusted platform 120 for payment and/or other settlement, without need for communication between the device 110' and platform 120 at the time of the transaction.

A trusted platform 120 also may facilitate payments between parties without a merchant mPOS 132, including for example between pairs or other multiples of user communication devices 110'. For example, a pair of parties may each have a mobile device 110 registered as a trusted device 110' with a trusted platform 120. As long as the trusted platform 120 has established a trusted data interchange relationship with each party's device 110', the trusted platform 120 will trust commands received from each device 110'. Instant money transfers between parties may therefore be possible since the trusted platform 120 trusts both parties individually, especially where both parties are customers of the same bank 160.

A trusted platform 120 may also facilitate the transfer of tokens representing pre-authorized transaction values (e.g., pre-paid value) between user devices 110'. Where network communications are available, this can be handled using processes described above. Where network communications are not available, it may for example be accomplished by associating such a prepaid token with trusted identifiers associated uniquely with each of the transferring and receiving devices 110'. Where necessary, transfer may be confirmed when network communications are restored. Alternatively a payment token can be deleted from the first device 110', and a new but financially equivalent one be generated on, by, or for the recipient device 110'.

Figure 2:
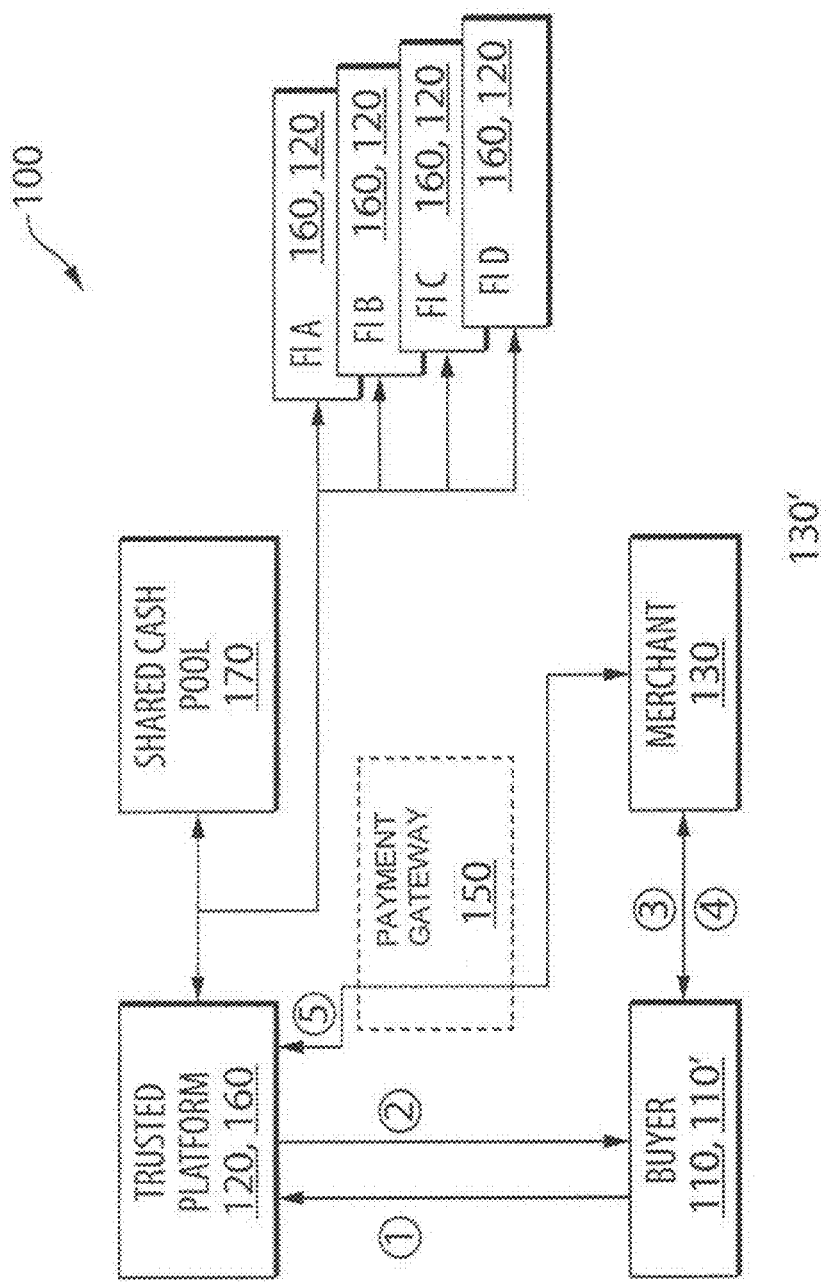

In FIG. 2, there is shown a schematic diagram of an embodiment of a system 100 in accordance with the invention. Among variations shown in FIG. 2 is a "stored cash" or "shared cash" pool 170, in the form of a secure data set 125 (see FIG. 1) stored in memory controlled by one or more trusted platforms 120. Such a secure data set 125 can represent a pool of monetary value, in the form of data representing any desired form of real or virtual currency(ies) or value(s), or indicia thereof, which can be contributed to, and drawn from, by, for example, a plurality of trusted FSPs 120, 160 such as shown in FIG. 1, for use in the secure and potentially very fast clearance of transactions conducted between parties 110, 130 holding accounts at the various trusted FSPs 120, 160. As those skilled in the relevant arts will appreciate, once they have been made familiar with this disclosure, FSPs 120, 160 can be, include, or otherwise be administered by or associated with any of a wide variety of entities, including banks and other financial institutions such as the Royal Bank of Canada ("RBC"), the Bank of Montreal ("BMO"), the Canadian Imperial Bank of Commerce ("CIBC") and others.

Figure 3:
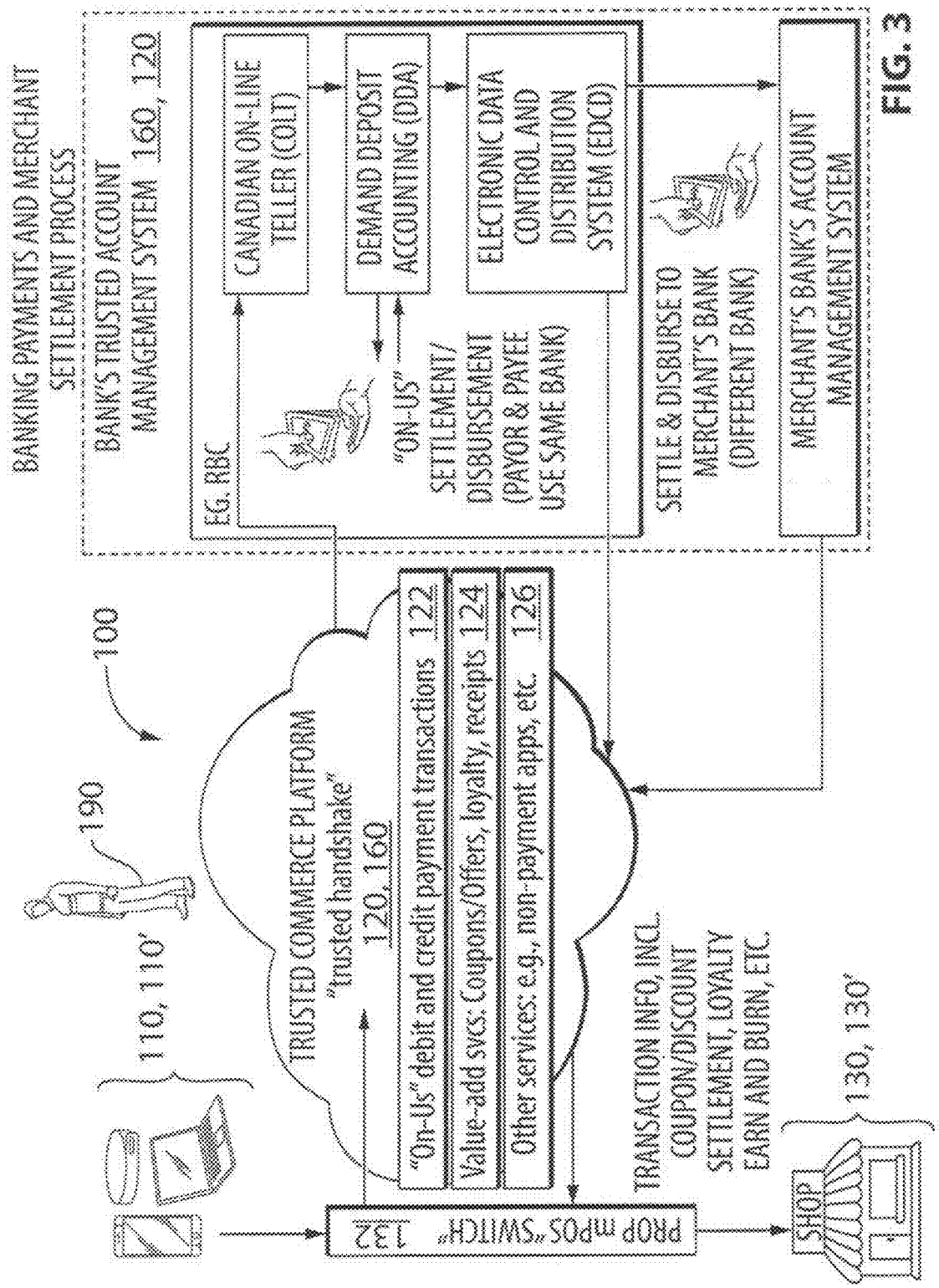
Figure 4:
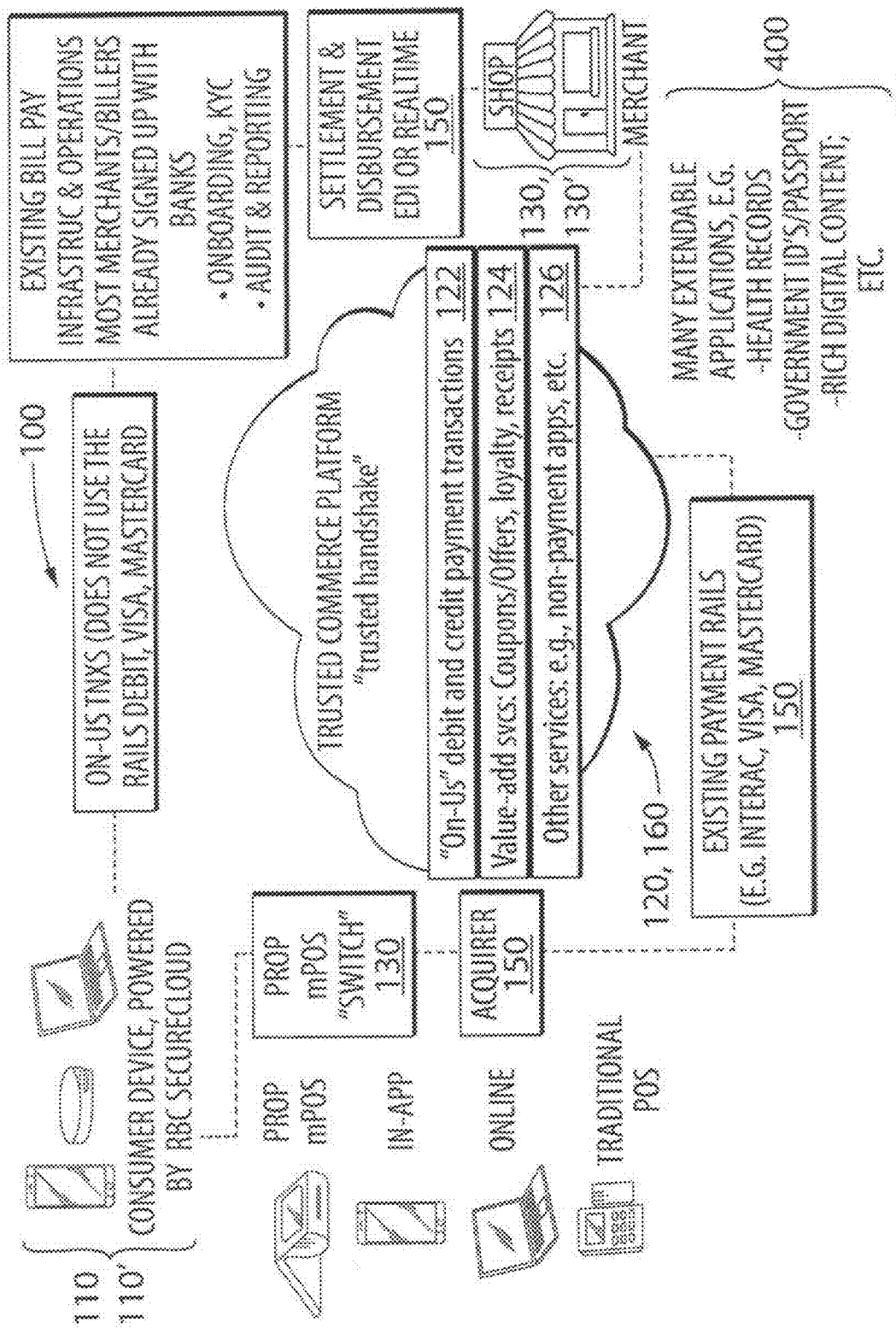

Referring now to FIGS. 3 and 4, there are shown schematic diagrams of further embodiments of a system 100 in accordance with the invention. Among variations shown in FIGS. 3 and 4 are several specific examples of services that can be provided with improved efficiency and effectiveness by placing a trusted platform 120, 160 between a merchant system 132, 130 and one or more FSP systems 160 in the transaction process. These include, for example, expedited settlement and clearance of 'on-us', and/or other 'off the traditional payment system rails' payments between parties (e.g., users 110' and merchants 130) who are both registered with the trusted platform, as shown at 122 and described herein, as an alternative or in addition to more conventional processing through fourth party systems 120. Note that, as shown at 302, if/when one or more of the parties 110, 130 to a transaction are not registered with the trusted platform 120, con-us' transactions can be completed by other FSP's 160 if, for example, both parties hold accounts with the FSP 160.

Another example, shown at 124 in FIGS. 3 and 4, of services that can be provided with improved efficiency by a trusted platform 120 of a system 100 are value-added services such as offering and/or redemption of coupons, loyalty points, discounts, and generation of data sets representing enhanced or other receipts pertaining to transactions processed by the trusted platform 120. For example, as previously described, such services may be provided by for example the use of additional and/or substitute protocols, such as loyalty or gift protocols, when interpreting and processing payments for transactions between users 110' and merchant systems 130.

As noted at 126, a trusted platform 120 can offer or perform any desired ancillary or other services, including for example services offered through non-payment related applications, etc. These can include, for example, links to other goods or services offered by the trusted platform 120, merchants 130, etc.

As previously noted, system(s) 100 in accordance with the invention are suitable for use in a number of applications in addition to, or as alternatives to, payment and other financial transactions. As noted at 400 in FIG. 4, such applications can include a wide variety of sensitive or otherwise desirably secure data processes, including for example maintenance, use, and analysis of electronic health records; government records such as identification records, including for example passports and other identifiers, tax records, criminal and other court records, police and intelligence data, etc.; and a wide variety of rich or otherwise valuable digital content.

Figure 5:
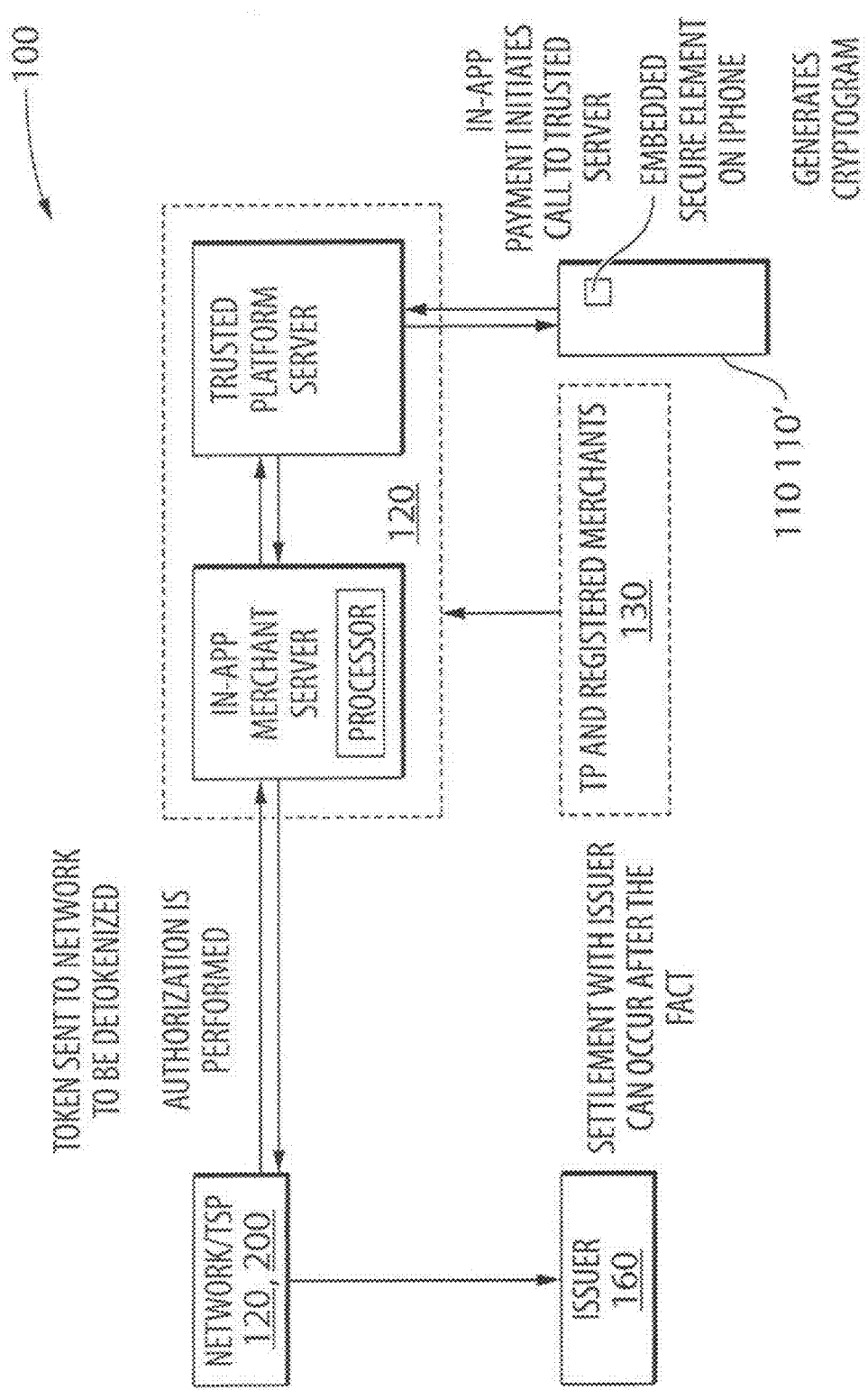

Now referring to FIG. 5, a further embodiment of a system 100 in accordance with the invention is shown. As previously noted, devices 110, 110' may comprise or consist of any device(s) or combination(s) of device(s) suitable for use in accomplishing the purposes disclosed herein. For example, a user device 110, 110' may comprise a user's desktop computer, which may in some cases lack hardware/communications resources typically provided by mobile devices such as smart phones, tablet or wearable devices, etc. In such cases, when a user initiates a purchase or other transaction with a merchant system 130, as for example through the use of the PSTN/Internet and a desktop merchant application, a variety of data and/or other signals, including for example transaction confirmation signals, may be generated by any or all of systems 120, 160, 130, and passed to a user's registered device 110' for use by the device 110' in acquiring confirmation from the purchasing user, or a financially-responsible party such as an account holder. For example, when a purchase or other transaction request is generated by a registered desktop device 110', prior to completion of the transaction a trusted platform 120 may route to a trusted mobile device 110', such as a smart phone, associated with an account associated with the transaction, a request for confirmation by a user of the registered mobile device 110'. Such embodiments may significantly increase the security of transactions, and reduce fraud and other forms of abuse, mistake, etc. Moreover, the amount of information exchanged between servers can be reduced, and privacy increased, by elimination of FIs/FSPs 160 and fourth-party FSPs 150 from the transaction data stream. Card issuers, for example, need be informed only of the final values of transactions, and not further details.

Figure 6:
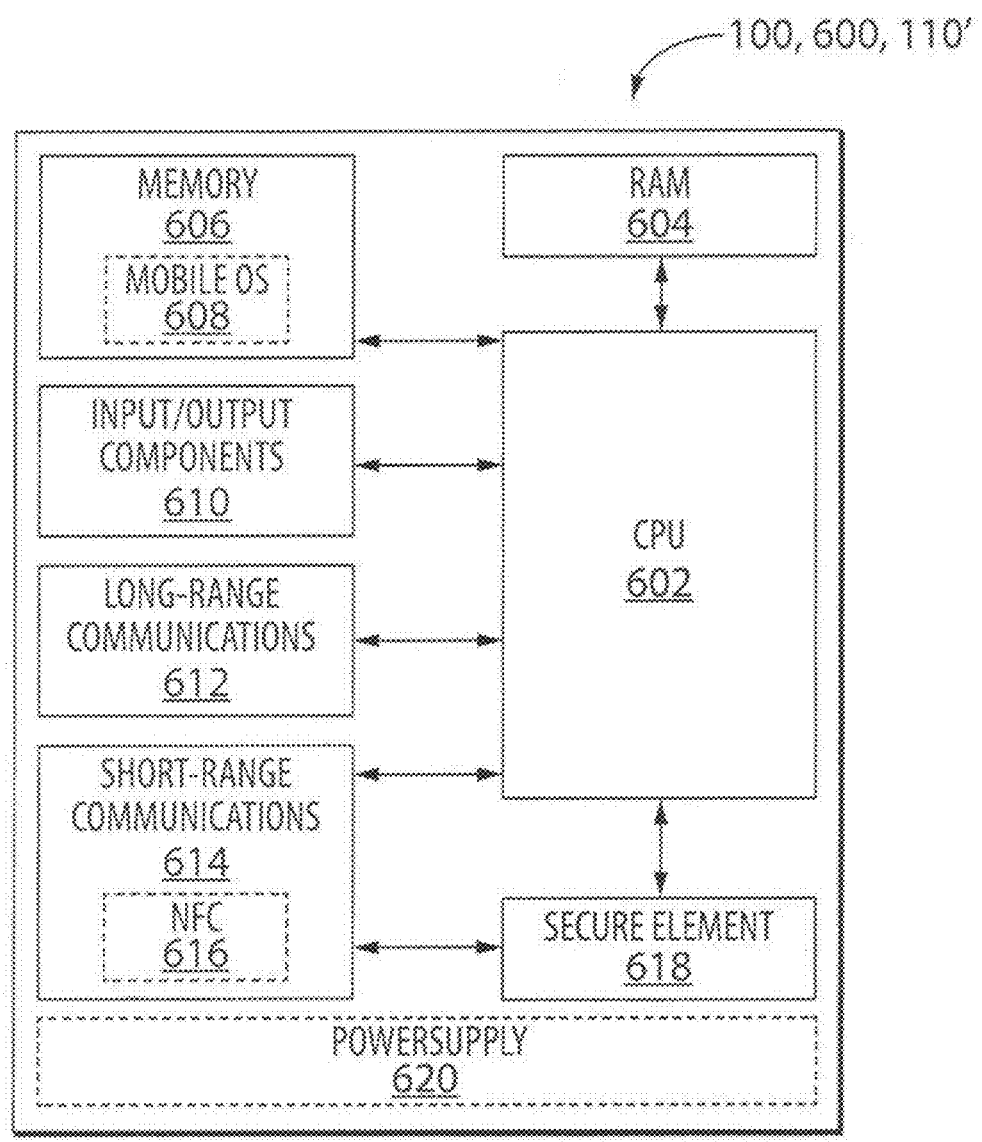
FIGS. 6, 7 and 8 show schematic representations of example transaction communication devices, or transaction controllers, suitable for use in implementing various aspects and embodiments of the invention.

Referring now to FIG. 6, there is shown a schematic representation of a network transaction communication (e.g. transaction request) device or controller 110, in the form of a mobile device 600, which can be registered or otherwise established as a trusted device 110', in accordance with embodiments of the invention. As previously noted, a device 110, 600 may generally be any portable electronic device comprising an assembly of electronic, structural and/or electro-mechanical components within a suitable housing, and which provides a user with various voice and/or data functions including short and/or long-range network connectivity. As will be understood, terms such as "portable" or "mobile" may be used herein throughout to indicate that device 110, 600 may generally be transported between different physical locations with greater or lesser degrees of convenience by a user, without resort to physical aids. In particular, mobile device 110, 600 may include devices that may be carried or worn on a user's person or clothing, such as cellular or other radio telephones, personal data assistants (PDA), tablets, notepads, portable computers, smart watches or jewelry, and the like. However, various aspects and embodiments of the invention may be implemented using non-mobile communication devices 110 such as laptop or personal computers.

Accordingly, in some embodiments, a mobile or other device 110, 600 may include one or more CPUs and/or other processors 602, random access memory (RAM) 604, and other physical memory 606, either or both of which may store non-transient (i.e., persistent) data and machine interpretable instruction sets. In general, CPU(s) 602 can be any microprocessor or other general or special purpose processing unit(s) configured to control the overall operation of mobile device 110, 600 and its various components, with which CPU 602 may be connected by a bus or other electronic link(s) or path(s) adapted for transferring data, power, and/or other signals on mobile device 110, 600. Read and write operations of CPU 602 may be facilitated by RAM 604 or some other integrated circuit or volatile memory storage associated with or integrated within CPU 602 or to which CPU 602 has access.

Memory(ies) 606 may include one or more persistent (i.e., non-transitory) memory stores, such as flash memory or read-only memory (ROM), which are either physically embedded within mobile device 110, 600 or which may alternatively be removably loaded or inserted into mobile device 110, 600 by a user, such as on a subscriber identity module (SIM) card or secure digital (SD) memory card. Memory 606 may be used to store any type of data and/or executable machine instruction files, such as but not limited to media files (music and photos), as well as software used to implement a mobile device operating system (OS) 608 and other programs or applications, as described herein. Memory(ies) 606 may also be used to store one or more files used by CPU 602 or mobile OS 608 to execute different functions or control different components on mobile device 110, 600, such as contact information, network preferences, application data, and other files.

In various embodiments, a mobile device 110, 600 may also be equipped with one or more components for enabling user(s) to interact with the device 110, 600. Such components, which are generally denoted herein as 610, may provide both for the user to input data or commands into mobile device 110, 600, as well as to perceive data or information outputted by mobile device 110, 600. Without limitation, different possible input components 610 may include touch pads, dials, click wheels, touchscreens, keyboards, and other buttons, as well as cameras, microphones, and biometric sensors (e.g., fingerprint scanners). Example output components 610 may include speakers, screens and visual displays, rumble packs, and combinations thereof. Other I/O components 610 not specifically mentioned herein may also be included in different embodiments.

In some embodiments, as seen in FIG. 6, mobile device 110, 600 further includes one or more long-range or network communications components 612 and/or one or more short-range network communications components 614 that provide mobile device 110, 600 with various different voice and data communication functions. As will be appreciated, the terms "long-range" and "short-range" may be used herein to denote relative distances and are not intended to denote any specific limitations or ranges. Thus, long-range communications components 612 and short-range communications components 614 allow mobile device 110, 600 to communicate with other proximately or remotely located targets, which can be other similarly or differently configured mobile devices, servers, systems, and other network-enabled devices.

For example, long-range or network communications component(s) 612 may be used by a mobile device 110, 600 to communicate with a suitable target over cellular or other distributed network using a suitable voice and/or data communications protocols, such as but not limited to Time Division Multiple Access (TDMA), Code Division Multiple Access (CDMA), Global System for Mobile Communication (GSM), Wireless Application Protocol (WAP), and others. Following such protocols, a mobile device 110, 600 may be able to send communications to arbitrarily remote devices of various types, including voice, data, and text-based messages without limitation. To enable long-range communications, various hardware and/or software components may be included in component 612, such as an antenna, transmitter, receiver, and digital signal processor. The specific configuration of long-range communications 612 may depend generally upon the communication protocol(s) that are implemented.

Short-range or near-field communications component(s) 614 may enable communication between mobile device 110, 600 and other relatively proximately located devices, servers, or systems. For example, short-range communications 614 may include one or more short-range transceivers, such as for connection to Wi-Fi (802.11 standard) or Bluetooth networks, as well as other modes of short-range communication, like RFID, infrared or optical. In some embodiments, short-range communications 614 may in particular include a near field communications (NFC) subsystem 616 that may be utilized to communicate with an NFC reader, among various different purposes or functions, so as to initiate contactless mobile payments with a merchant POS terminal as described further below.

In some embodiments, mobile device 110, 600 may further include one or more secure elements 618 configured as a tamper-resistant, limited-access storage environment for sensitive data and other information, such as payment credentials or cryptographic data and programming structures, as will be described further below. For example, secure element(s) 618 may include any or all of an integrated circuit (IC), an operating system (OS), and application(s) or program(s), including virtual wallet application(s) 112, 622, merchant application(s) 114, card emulation applications 628 and the like. Secure element(s) 618 may be either embedded (integrated) physically within mobile device 110, 600 or, alternatively, provided on a card such as a SIM or SD card that is insertable into mobile device 110, 600. As shown, both CPU 602 and NFC subsystem 616 may in some cases have access to the contents of secure element 616. Alternatively, access may be limited to only one or the other of CPU 602 and NFC subsystem 616 depending on the application or configuration of mobile device 110, 600.

Mobile device 110, 600 may further include one or more power supply(ies) 620 configured with any components or circuitry that are suitable for generating, receiving, storing, or transmitting power to or for processor(s) 602 and other components of mobile device 110, 600. For example, a power supply 620 may include circuitry for processing power received from an external power source, such as an electrical utility or grid, when mobile device 110, 600 is plugged into or otherwise connected to such external power source. In some cases, power supply 620 may further include one or more batteries, such as nickel metal hydride, nickel cadmium, and lithium-ion batteries, which may provide a source of power when mobile device 110, 600 is not able to connect to an external power source. Other power generating or processing circuity, such as solar panels or inductive coils, may also be included so that power supply 620 may deliver energy to different components within mobile device 110, 600. It should be noted that individual connections between power supply 620 and other components within mobile device 110, 600 are not shown in FIG. 6 and instead power supply 620 is indicated for convenience only as an isolated element.

As previously mentioned, in many embodiments transaction request communication device(s) or processor(s) 110, 110' are not "mobile" device(s). Thus, for example, a device 110, 110' may have a size, shape and/or weight that make it difficult, inconvenient, or not practical for user to transport over more than trivial distances without some physical assistance or assistance. In particular, a non-mobile user device 110, 110' may be one that a user cannot practically carry on their person or clothing. Examples of a non-mobile device 110, 110' include a user's desktop computer and other computing devices.

Non-mobile embodiments of device 110, 110' may or may not differ, in terms of communications ability, secure memory, etc., from mobile device 600 shown in FIG. 6. For example, a non-mobile device 110, 110' may (or may not) lack one or more of the components shown in FIG. 6 or, in some cases, may include additional or differently configured components. In some cases, a non-mobile device 110, 110' may lack a secure element 618 because such device 110, 110' is not configured to receive a SIM or SD card. In some cases, at least one of long-range communications 612 and short-range communications 614 may differ. For example, instead of long-range communications 612 that is configured for wireless communication over distance, a user device 110, 110' may include a modem or other network component for connecting to a distributed network, such as the Internet, in place of a cellular antenna. In some cases, short-range communications 614 may not include an NFC receiver 616, but may include WI-FI and/or Bluetooth antennae or others. Embodiments of the systems and processes described herein may utilize either a mobile device 600 or a non-mobile device without limitation.

Figure 7:
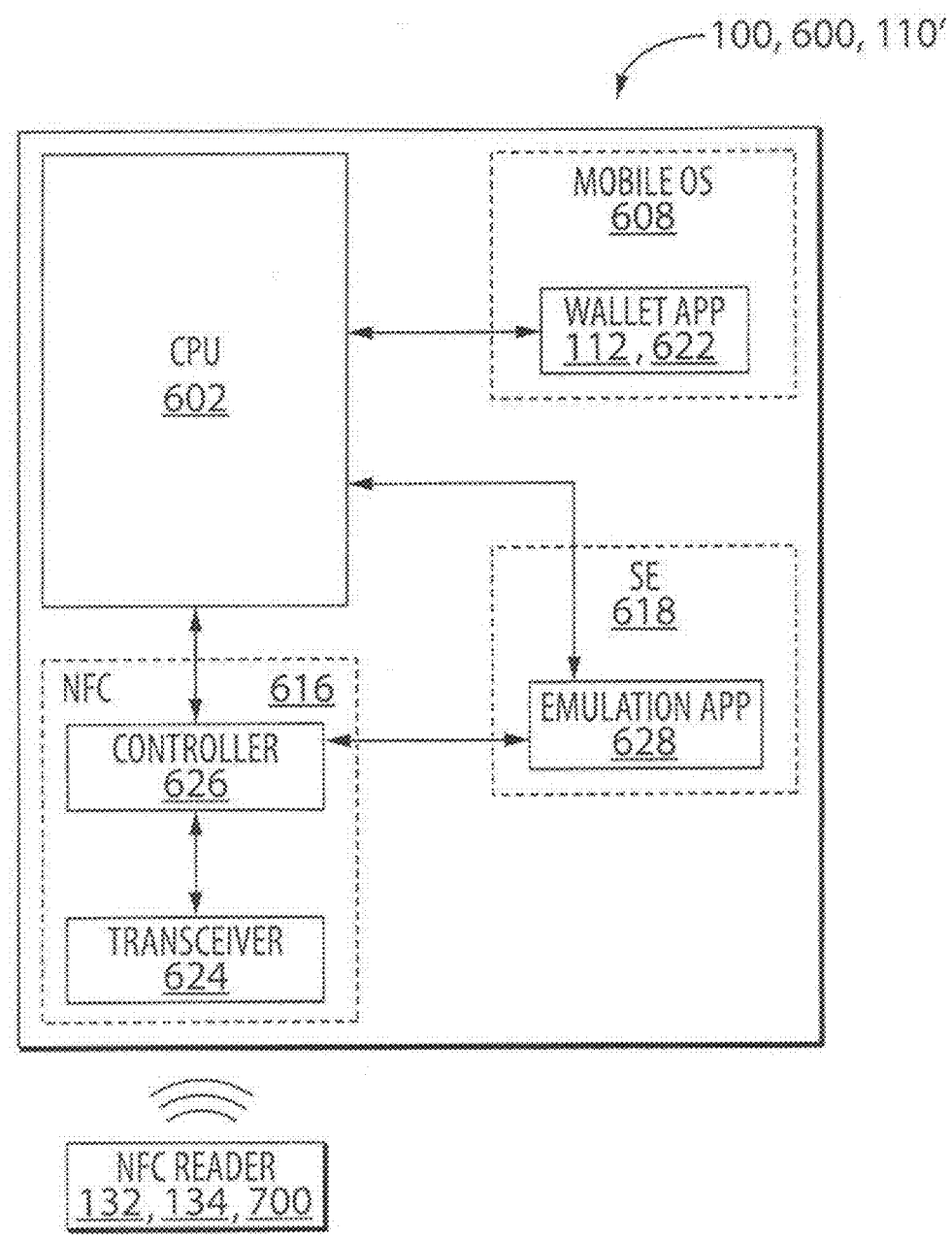

Referring now to FIG. 7, mobile devices 110, 600 may according to various embodiments be utilized to initiate contactless signal exchanges representing proximity-based payment transactions to a merchant POS terminal, in some cases in conjunction with trusted platforms 120, as described herein. Such contactless payments may utilize payment credentials stored within a secure element 618 or, alternatively, using payment tokens stored within a wallet application 112, 622 configured as an HCE environment. In further embodiments, payment tokens may be stored in a secure cloud that is accessible by a mobile device 110, 600.

Accordingly, in some embodiments, an NFC subsystem 616 may include any suitable proximity-based communication component(s) or combination of components that enables contactless proximity-based communication with a corresponding NFC reader 132, 134, 700 or other similarly enabled target device. For example, NFC subsystem 616 may include an antenna or transceiver 624 and a controller 626 that are configured to operate on the globally available, unlicensed radio frequency ISM band of 13.56 MHz (as specified in a relevant standard such as ISO/IEC 14443 and ISO/IEC 18092). In some cases, NFC subsystem 616 may alternatively operate according to other communication technologies or standards.

Prior to initiation of a contactless payment, a user may provision mobile device 110, 600 with one or more payment credentials or sets of payment credentials, which may be stored in a secure element 618 and/or elsewhere in mobile device 110, 600. For example, in some cases, a user may directly enter payment credentials into a wallet application 112, 622 for storage in secure element 618. When stored in secure element 618, it may be possible for such payment credentials to be entered and stored directly without tokenization.

Alternatively, mobile device 110, 600 may be provisioned by an issuing bank or other entity, such as a trusted platform, with tokenized payment credentials corresponding to an authorized method of payment. For example, a wallet application 112, 622 or some other program or application, including those not located on mobile device 110, 600 may be used to request payment tokens from the user's issuing bank or some other entity. Such payment tokens, which may be multi or single-use or subject to other restrictions or limitations on use, once received at mobile device 110, 600 may be stored within wallet application 112, 622 or somewhere else on mobile device 110, 600. In some cases, payment tokens may be stored in a secure element 616 and accessible to a wallet application through CPU 602.

To initiate a contactless payment, mobile device 110, 110', 600 may be brought within range of an NFC reader 132, 134, 700 that is acting as or forms part of a merchant POS terminal or system 130. When within range, NFC reader 132, 134, 200 may transmit a signal to mobile device 110, 600, which is received in NFC transceiver 624, requesting initiation of a transaction and supply of payment credentials. Depending on the configuration and type of protocol being implemented on mobile device 110, 600, NFC controller 626 may respond and process the contactless transaction in different ways.

For example, in some embodiments, mobile device 110, 110', 600 may be configured to act in a card emulation (CE) mode whereby mobile device 110, 600 emulates a contactless payment card through storage of payment credentials within a secure element 617. In this mode of processing, NFC controller 626 may route the transaction request received by NFC transceiver 624 to secure element 618 in which the user's payment credentials can be stored in an emulation application 628. Retrieved payment credentials may then be routed by NFC controller 626 back to NFC transceiver 624 for transmission to NFC reader 132, 134, 700. The transaction may then be processed through a backend or payment network associated with the merchant POS terminal.

Alternatively, mobile device 110, 600 may be configured for HCE through the provision of payment tokens, as described herein, which may be stored within wallet application 112, 622 instead of a secure element 618. Thus, in this mode of processing, NFC controller 626 may route the transaction request received by NFC transceiver 624 to CPU 602 and not secure element 618 so as to retrieve payment credentials from within wallet application 112, 622. Retrieved payment credentials may then be returned by CPU 602 to NFC controller 626 and routed back to NFC transceiver 624 for transmission to NFC reader 132, 134, 700. The transaction may again be processed through a backend or payment network associated with the merchant POS terminal.

Figure 8:
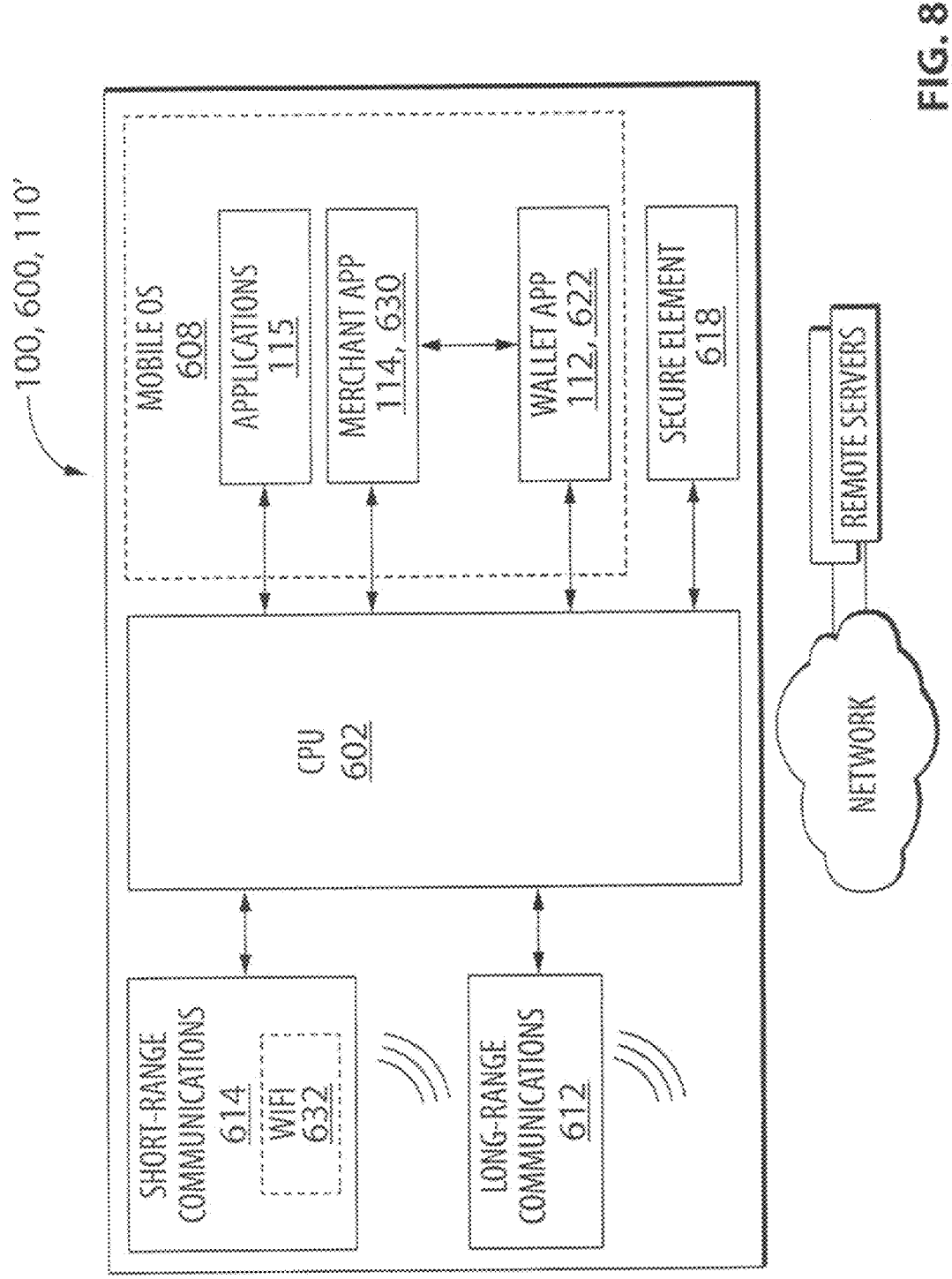

Referring now to FIG. 8, a mobile or other device 110, 110' 600 may in accordance with embodiments of the invention also be configured to initiate mobile payments directly from within an application or program provided by or otherwise associated with a merchant or, as described further below, from some other non-dedicated application(s) or program(s), such as one or more web browsers or merchant applications 114. Thus, unlike contactless payments that are completed using NFC communications between mobile device 110, 600 and a merchant POS terminal, such electronic payments do not require physical proximity to a merchant POS terminal and may be initiated from within a merchant application anywhere that a mobile, desktop, or other device 110, 600 has network connectivity.

Accordingly, one or more different merchant applications 114, 630 or other programs may be installed by a user of a device 110, 110', 600 into mobile or other OS 608. Only one such merchant application 114, 630 is shown in FIG. 8 for convenience, but any number may be installed in different embodiments according to the user's preferences. Among other possible functions, merchant application 114, 630 may allow for the user to purchase a product or service that the merchant displays or advertises to the user from within merchant application 114, 630. Different possible merchant applications 114, 630 can include those which are dedicated to a merchant's goods and/or services, as well as third party applications, such as auction sites, which offer a merchant's goods and/or services indirectly to customers.

In some embodiments, as described further below, merchant application(s) 114, 630 may be configured so that payment credentials or other information stored within one or more wallet applications 112, 622 may be pulled by merchant application 114, 630 without having to open or launch any corresponding wallet application 112, 622. For example, when a payment transaction is initiated within a merchant application 114, 630, a user may be presented with a screen or prompt providing the user with a choice which payment credential stored in any of one or more wallet applications 112, 622 to pull for use in executing the transaction. Alternatively, merchant application 114, 630 may automatically pull a default or pre-selected payment credential from wallet application 112, 622 without prompting the user.

Such polling of devices and pulling of HCE and other payment credentials can be of significant advantage. For example, such processes can greatly increase the number of payment options open to purchasers and other users 190 at the time of completing transactions, and therefore increase transaction opportunities for merchants and FIs/FSPs. In order to facilitate polling of devices 110, and optionally FIs/FSPs 120, 160, and pulling of payment credentials, some or all of merchant application(s) 114, 130, 630, wallet application(s) 112, 622, and FI/FSP systems 120, 150, 160 may be configured to process payment and transaction data according to common standards, including for example common communications and data record generation and processing protocols. Such protocols can, for example, be used to facilitate implementation of inter-application data exchange through the use of common or universal APIs 116 in accordance with the invention, as shown for example in FIG. 12 and discussed further below. The use of such universal APIs can be a significant advantage: by working, for example, in accordance with common or universal token and/or HCE credential protocol(s), universal APIs 116 can offer purchasers such as users 190 a wide range of payment options at the time of executing transactions. Thus, such APIs 116 can in many cases be referred to as payment options APIs. Suitable implementations of such aspects and embodiments of the invention are discussed further below.

Prior to or during initiation of a transaction, merchant application 114, 630 and/or one or more wallet applications 112, 622 may communicate with one or more remote servers 800, such as one or more servers 800 associated with a central certification authority or trusted platform, over a network 850 (via either or both of communications components 632, 612), such as a cellular network or the Internet, or combinations of different network types. For example, merchant application 114, 630 may be configured to pull information or data from a merchant server related to the goods and/or services that are being offered for sale, such as price and availability. Additionally, as explained further below, merchant application 114, 630 as well as wallet application 112, 622 may also be in communication with remote server(s) 800 in order to obtain authorization, such as in the form of a certificate or other cryptographic data, for a pending or future transaction initiated by the user on mobile device 110, 600.

Thus, in some embodiments, mobile OS 608 may be coupled to one or both of long-range communications 612 and short-range communications components 614 so as to provide wallet application(s) 112, 622 and/or merchant application(s) 114, 630 or other application(s) 115 with network connectivity. Long-range communications 612 may provide connectivity to a cellular data network such as through implementation of a WAP communication protocol. Alternatively, network connectivity may be provided through a WI-FI antenna 632 by which mobile device 110, 600 is able to connect to wireless networks and hotspots. Other communication protocols, such as Bluetooth, may also be used by wallet application 112, 622 and merchant application 114, 630 to provide connectivity to network 350.

As further shown for example in FIG. 8, in some embodiments, mobile OS 608 may further incorporate or otherwise support one or more non-merchant applications or programs 115, such as games, general purpose web browsers, readers, and the like from which it may be possible to initiate electronic transactions. Such non-merchant applications may be coupled to one or more mobile wallet applications 112, 622 in order to retrieve payment tokens or other credentials that may be stored therein and, via CPU 602, to a network communication component such as short-range communications 614 or long-range communication 612 or to any other network component, such as a modem installed in a non-mobile user device 110, 110'.

To initiate an electronic transaction, a user may navigate to a web page or website using, e.g., any suitably-configured I/O devices 610 as described herein. After the user 190 has generated a suitably-configured transaction request data set (or 'requested transaction data set'), comprising for example data representing one or more items the user wishes to purchase, and perhaps a full or partial description thereof, along with item, subtotal, and/or total purchase prices, by for example selecting the items for addition to the merchant application's virtual shopping cart, and has initiated a payment (e.g., 'checkout') process, merchant application 115 may display an option to the user to pay for the transaction using a wallet application 112, 612 installed in mobile OS 608. Alternatively, the payment tokens selected for use in the transaction may be located in or other memory or locations on mobile device 110, 110', 600 or, in some cases, in virtual wallet(s) 112 or other memory(ies) or application(s) in a secure cloud resource. When the user selects to pay by wallet application 112, 612, the browser may interface with such application 112, 612 so as to obtain a suitable payment token depending on the selected form of payment. The obtained payment token may be transmitted over short-range communications 614 or long-range communication 612 for processing by a merchant backend. Alternatively, a user may securely log in to a bank account from within an application or program on user device 110, 110' using some form of identification information and, once authenticated, the user's bank may transmit electronic payment tokens to the merchant/acquirer for processing of the transaction. Processing of the electronic payment through a payment network or other entities may then proceed as described herein.

Thus, for example, in various aspects and embodiments the invention provides systems, processes, and persistently stored, machine-accessible and machine-readable programming structures that enable one or more request devices 110, such as smart phones, tablet computers, wearable devices, or other mobiled devices, to be registered with a trusted platform server 120 by means of suitably-configured signal exchanges over a communications network 200, and, as a result of such registration, to be provided with a secure data set, such as a certificate or token data set, to be stored in volatile or non-volatile memory of the device 110 and thereby cause the device 110 to be authorized by the trusted platform server 120, in processing later purchases or transactions, as a trusted device 110'. For example, a certificate data set can comprise any data associated uniquely with any one or more of the device 110' and/or a specific payment account associated with such device. Such certification/identification data can include, for example, names, 'secret' personal information, serial numbers, random or pseudo-random codes, account numbers, etc.

In various aspects and embodiments the invention further provides systems, processes, and persistently stored, machine-accessible and machine-readable programming structures that enable one or more merchant devices 132, 134, 136, 130, including for example POS and back-end processing systems, to be registered with the same and/or other trusted platform server(s) 120 by means of suitably-configured signal exchanges over a communications network 200, and, as a result of such registration, to be provided with secure data set(s), such as certificate or token data set(s), to be stored in volatile or non-volatile memory of the device(s) 132, 134, 136, 130 thereby cause the merchant devices to be recognized by the trusted platform server 120, in processing later purchases or transactions, as trusted device(s) 130'. For example, such certificate data sets can comprise any data associated uniquely with any one or more of the device(s) 132, 134, 136, 130 and/or a specific payment account(s) associated with such device(s). Such certification/identification data can include, for example, names, 'secret' personal information, serial numbers, random or pseudo-random codes, account numbers, etc.

Copies of such certificate data sets may be provided to the device(s) 132, 134, 136, 130 and stored in secure memory associated with the trusted platform 120, in association with further identifiers associated with the device(s) 132, 134, 136, 130, one or more merchants or other entities associated with the device(s) 132, 134, 136, 130, and/or one or more accounts associated with such entities. As will be understood by those skilled in the relevant arts, such data processing devices as spreadsheets, relational databases, look-up tables, and other tabulations may be used for such purpose.

Once received and stored in device 110, all such certificates or tokens are usable by the device(s) 110, merchant device(s) 132, 134, 136, 130, and trusted platform(s) 120 for rapidly and securely identifying the device(s) 110 as "trusted", for example for transmission to and interpretation by the trusted platform 120, of data sets configured for use in authorization and/or verification of data processes such as purchases or other financial transactions with third parties such as one or more merchant systems 130. For example, a payment token data set may be received by a trusted platform 110 from a trusted device 110', 130', the token comprising a certification data set which may be looked up in a database 125, along with associated user and/or account information, for use in processing payments and other transactions.

In such aspects and embodiments the invention further provides use of a trusted device 110' to negotiate and complete one or more 'in-app' payments or other data processing transactions through a direct Internet connection such as a merchant, game, or other application ('app') provided by a merchant/provider 130 or some other entity, including general purpose web browsers and the like, using suitably configured hypertext links, provided to a user display screen or other I/O component 610 (see, e.g., FIG. 6) of the trusted device 110', and transfer of touchscreen, keyboard/keypad and/or other user-generated inputs, signal transmitters and receivers, etc.

Thus, for example, in various aspects and embodiments the invention provides systems, processes, and persistently stored, machine-accessible and machine-readable programming structures represent machine-executable instructions that enable a trusted platform 120 to register one or more trusted request or user devices 110' and one or more trusted merchant systems 130', and thereby process purchases and/or other transactions through direct communications with (a) the request devices 110' and (b) the merchant system(s) 130', without need for communication between the trusted device(s) 110' and merchant system(s) 130' of sensitive account information, such as accounts to be used as the source of payment funds, purchaser identities, etc. In such embodiments payments associated with the transaction may be processed by the trusted platform in such manner that the transaction is conditionally or finally closed. For example, where both a transaction system 120 and a trusted request device 110' are associated with accounts administered by the trusted platform 120, the transaction may be closed immediately and finally. Where either or both of trusted devices 110', 130' are not associated with such accounts, the trusted platform 120 may work offline to complete final confirmation and clearance of the transactions, either by offsetting a day's or other accumulation of such transactions against one another, and settling balances with fourth-party platforms 160, or by simply working with one or more fourth-party platforms 160 to balance payments at end of day or other accounting period.

As further examples, in various aspects and embodiments, systems, processes, and persistently stored, machine-accessible and machine-readable programming structures in accordance with the disclosure can enable one or more trusted request or user devices 110' and merchant devices 132, 134, 136, 130, 130' to negotiate a transaction and build a transaction execution data set comprising the data representing the merchant's digital certificate, and optionally further data identifying a transaction, including for example a digital certificate or other identifier associated with a purchaser, one or more account(s) to be applied toward satisfaction of the transaction(s), and/or purchase or other amount(s) associated with the transaction(s). Such transaction data sets can be routed to a trusted platform 120 either directly, using 'off the conventional rails' routing, or through a more conventional payment system via one or more fourth-party transaction processor(s) 150, such as other banks, credit card processors, etc.

In examples in which such transaction data set(s) are routed to a trusted platform 120 authorized to settle or otherwise adjudicate a transaction, the trusted platform can settle with the merchant system 130, 130' by routing back to the merchant system 130 payment adequate to complete the transaction, using funds associated directly with the trusted platform itself (e.g., a bank's own accounts), rather than from account(s) controlled by the purchaser, leaving final settlement between the trusted platform 120 and account(s) designated by application(s) associated with the trusted device 110' for a later time, such as end of the day or other transaction period. As will be appreciated by those skilled in the relevant arts, such later transactions to settle accounts between the trusted platform 120 and accounts associated with the trusted device 110' can be settled using transaction data sets adapted for internal communications among the trusted platform's own network, according to suitable encryption and other security means, which may be different from, faster, and/or more efficient than security means suitable for use across public networks.

Moreover, such transactions may be completed, whether routed directly between trusted devices 110', trusted merchants 130', and trusted platforms 120, or via public or other existing or less-trusted payment networks, according to any desired payment protocol(s), such as VISA, MasterCard, etc. As a particular example, a payment transaction routed through a more conventional (less trusted) payment network may be formatted as an interac payment, and processed according to Interac™ protocols.

In examples in which transactions are initially settled between a merchant system 130, 130' and a trusted platform 120, and settled later between the trusted platform 120 and accounts designated by applications associated with an authorized trusted device 110', user(s) associated with the trusted device 110' can be given an absolute, timed, or relative period in which to make a final designation of which account or accounts are to be used to settle the transaction. For example, such a user may be provided one or two hours, until a specified time of day, the end of a day or transaction reporting period, or the end of the month, etc., in which to make a final designation of payment account(s). Affording such users time in which to change or affirm which account(s) are to be used can provide time for user(s) to ensure that charges will clear designated accounts, decide whether to apply awards or loyalty points to a transaction, or otherwise determine the numbers of accounts to be used and the amount to be drawn from each. Such ability can provide considerable flexibility, convenience, and other advantages to users and trusted platforms alike.

Among the many advantages offered by trusted platforms, trusted devices, and other systems, devices, and processes in accordance with the invention is the ability they provide to adapt to developing technologies. For example, one or more trusted devices, including for example one or more mPOSs, may participate in, or otherwise be associated with, various forms of public ledgers, such as blockchains. For example, in some embodiments one or more mPOSs or other trusted devices 110' may be established as a node in a blockchain ledger system. In such an implementation, each trusted device 110', including any trusted mPOSs 134, may route transaction data sets securely from merchant system(s) 130 to FSP systems 160, 120 while complying with applicable blockchain/public ledger protocols.

As will be appreciated by those skilled in the relevant arts, a block chain is a distributed and typically encrypted or otherwise secure data store that acts as a virtual public ledger of transactions, and is particularly useful in implementing cryptocurrencies such as bitcoin. In such ledger schemes a plurality of devices are implemented as node, each node controlling or otherwise having access to a distinct, complete or partial stored copy of the ledger; the ledger comprises data sets representing legal or otherwise recognized tender for transactions. As a transaction progresses, each involved network node can validate the transaction, or a portion of it, and generate data representing suitable ledger annotations, enter the annotations in the node's portion or copy of the ledger, and push or make available updated ledger annotations to other nodes.

Processing of Payments

Figure 9:
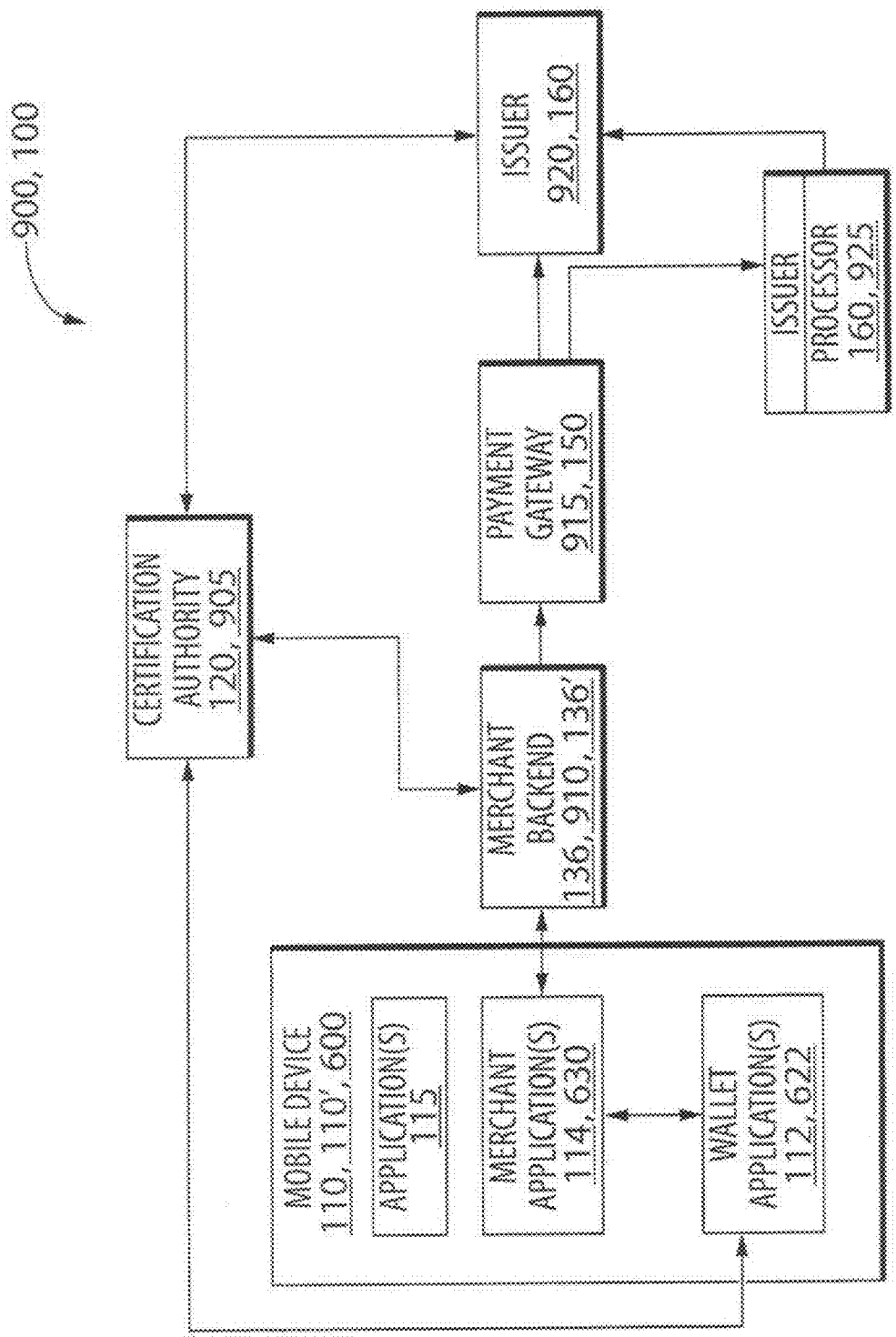
FIGS. 9, 10, 11 and 12 show schematic representations of further example systems suitable for use in processing mobile payments in accordance with various aspects and embodiments of the invention.

Referring now to FIG. 9, there is shown an example system 100, 900 for processing mobile or other payments in accordance with embodiments of the invention. System 900 may include at least a user device 110, 600, such as is shown in FIGS. 6-8, a trusted platform or certification authority, or other transaction processing system 120, 905, a merchant backend 136, 910, and a payment gateway 915, in various different embodiments. As described herein, system 900 may provide a networked environment in which a trusted or not-trusted device 110, 110', 600 may be used to initiate CNP transactions with one or more trusted or not-trusted merchant systems 130, 130' in connection with goods and/or services. Such CNP transactions may be available to the user of device 110, 110,' 600 as an alternative, or in addition to, contactless transactions initiated by a merchant POS terminal (such as NFC reader 132, 134, 700 in FIG. 7).

While in each of the process descriptions that follow reference may be made occasionally or predominantly to mobile device(s) 110, 110' 600, it is to be understood that in alternative embodiments, a non-mobile device 110, 110', 600 may also be used in all transactions and other processes, as described herein, unless clearly inconsistent in the circumstances.

Accordingly, in some embodiments, one or more virtual wallet applications 112, 622 may be installed on mobile or other device 110, 110', 600 and provisioned with data representing at least one payment credential. As described herein, such payment credential(s) may be issued any one or more of a variety of entities, including banks, credit card companies, and other FIs or FSPs, and may generally include HCE tokens of different kinds, such as single-use or multiple-use tokens. Virtual wallet application(s) 112, 622 may be provisioned with HCE token(s) for only a single authorized method of payment or, alternatively, multiple authorized payment tokens methods depending on user preference(s) and/or other factors. In some cases, HCE token(s) may be provisioned into other memory or storage components on a user device 110, 10', 600. In some cases, payment tokens may be stored instead in a secure cloud that is accessible by a device 110, 110', 600.

Additionally, one or more merchant applications 114, 630, games, or general purpose network browsers, etc. 115, may be installed on mobile or other device 110, 600. The type and functionality of such merchant application(s) 114, 630 may vary, but generally may include at least the ability for a user of mobile device 110, 600 to initiate a transaction for the purchase of some good and/or service offered for sale through merchant application 114, 630. While FIG. 9 only depicts a single merchant application 114, 630 on mobile device 110, 600, the quantity and type is generally not limited and may vary in different embodiments.

In some embodiments, a merchant application 114, 630 may be registered with a certification authority 120, 905 or trusted platform so that, for example, the merchant associated with the merchant application 114, 630 will itself be authenticated and/or authorized to complete CNP transactions with the user's payment credentials stored in wallet application 114, 630 or elsewhere. For example, such a merchant may communicate ahead of time with certification authority 120, 905 through a merchant backend 136, 910 to request that certification authority 120, 905 issue the merchant a certificate that may be used later to via any or all of merchant devices 132, 134, 136, 130, 130' to authenticate transactions on device(s) 110, 110', 600. Such a certificate may, for example, be represented by any type of secure data set suitable for the purposes disclosed herein, including for example a code or token uniquely identifying or otherwise representing the certification status. Once issued, such a merchant certificate may be stored in merchant backend 136, 910 or some other networked resource that is accessible by merchant application 114, 630.

Certification authority 120, 905 may in some cases be only one of multiple certification entities by which a merchant system 130' is certified, each such certification authority 120, 905 associated specifically with one or more different merchant applications 114, 630, or variations and/or groupings thereof. Alternatively, in some cases, a certification authority 120, 905 may be a single, central registration or certification authority that is common to all merchant applications 114, 630 within a system 100, 900 so that, among other advantages, certificates issued to merchant application(s) 114, 630 may follow a common or standard format or protocol, which may facilitate execution and processing of electronic payments across a variety of industries, platforms, etc. For example, a central certification authority 120, 905 common to all merchant applications 114, 630 may be established or operated by one or more FIs or FSPs, such as banks, acting in cooperation or association and having agreed upon standard practices and formats for processing mobile and/or other transactions. However, a central certification authority 120, 905 may also be established and operated by independent third-party entities as well.

In some cases, a user device 110, 600 and/or wallet application 112, 622 on a device 110, 600 may also be registered with the same or another certification authority 120, 905. Thus, wallet application 112, 622 and/or device 110, 600 may become a trusted device 110'. For example, wallet application 112, 622 may be configured for communication with certification authority 120, 905 to request a certificate or other cryptographic credentials that are specific to user device 110, 600 as opposed to merchant application 114, 630. When the user does later initiate a mobile or e-commerce transaction within merchant application 114, 630, such device-specific certificate may be used in addition to any other certificate or cryptographic process to authenticate the source of the transaction. Registration of any or all of users, devices 110, 600, and/or wallet applications 112, 622, as well as merchant systems or applications 114, 630 with a single central certification authority 120, 905 can provide a number of advantages in security and efficiency of transaction processing: such arrangements can significantly reduce the number of network communications required between authorities 120, 905, merchant systems 136, 910, issuers 920, and acquirers 925, and thereby reduce or eliminate communications risks and delays.

To initiate a transaction, a user may execute a merchant application 114, 630 on a device 110, 600 and select an item (good or service) to be purchased. For example, upon accessing a merchant application 114, 630, the user can use any suitably-configured keyboards, keypads, pointers, touch screen devices, and/or other input/output device(s) 610 in conjunction with suitably-configured user interface display screens to designate such goods or services. As part of a checkout sequence, merchant application 114, 630 may then transmit (directly of via any other suitable components, such as mPOS or POS device(s) 132, 134) a request to merchant backend 136, 910 for provision of the certificate issued to the merchant by certification authority 120, 905. After the request has been fulfilled, merchant application 114, 630 may then use the received merchant's certificate to query wallet application 114, 630 for permission to access payment credentials, such as HCE tokens. In some cases, merchant application 114, 630 may query wallet application 112, 622 automatically following receipt of the merchant's certificate from merchant backend 136, 910. Alternatively, merchant application 114, 630 may display a prompt to the user asking for express authorization to query wallet application 112, 622.

Alternatively, a user may initiate a transaction from within any other application or program; 115, other than a merchant application 114, 630, which is installed on a device 110, 110', 600 by selecting an item (good or service) to be purchased. As part of a checkout sequence, for example, a user can use any suitably-configured I/O devices 610, in conjunction with suitably-configured user interface I/O display screens, to select a wallet application 114, 630 for payment. This selection may be in response to presentation of multiple different payment options, including those which do not use a wallet application 114, 630.

Wallet application 112, 622 may be configured, upon receipt of the query from merchant application 114, 630, or some other application or program 114, 115, to verify the source of or otherwise authenticate a merchant's certificate included in the query. For example, wallet application 112, 622 may be provisioned with a private key and/or other cryptographic data that may be used to ensure that the merchant's certificate is valid. If a wallet application 112, 622 is not able to verify the merchant's certificate, the query sent by merchant application 114, 630 can be denied; optionally the wallet application 112, 622 can generate a request targeted to either or both of the user of the device 110, 110', 600 and merchant 136, 136', 910 to retry or override the denial of authorization. If the wallet application is able to verify the certificate, the wallet application 112, 622 may respond with an indication or signal that merchant application 114, 630 is authorized to access payment credential(s) stored therein.

Upon a successful query of wallet application 112, 622, merchant application 114, 630 may pull a wallet interface authorization from wallet application 112, 622 that effectively gives merchant application 114, 630 access to and control over at least part of the payment credentials and other data stored in wallet application 112, 622. Thus, merchant application 114, 630 can be enabled to handle or manipulate the user's payment credentials in the same manner that would be possible from within wallet application 112, 622.

For example, depending on the number and/or type of HCE tokens or other payment credentials that have been provisioned, merchant application 114, 630 may either automatically select one payment credential for use in the initiated transaction or may instead prompt the user from within merchant application 114, 630 for selection of a payment method. Automatic selection may occur, for example, where HCE token(s) for only one payment type have been provisioned or where HCE token(s) for multiple different payment methods have been provisioned, but the user has specified in wallet application 112, 622 that one of the available payment methods is to be used as a default. If, on the other hand, no default has been specified, as noted, merchant application 114, 630 may prompt the user for selection of a payment method, using I/O components of the device 110, 110', 600 as previously mentioned.

Whether through prompting or automatic selection, merchant application 114, 630 may pull a payment credential from wallet application 112, 622 representing the payment method to be used in the transaction. Merchant application 114, 630 may then transmit signals representing the HCE token or other payment credential to merchant backend 136, 136', 910 along with other information (date, merchant identification, amount, etc.) needed or otherwise used to complete the transaction. In some cases, the payment information sent to the merchant backend 136, 136', 910 may be encrypted so that even the merchant may not be able to view any of the user's sensitive information. Encryption of payment information may be performed by merchant application 114, 630 or by some other application or program on device 110, 110', 600 in different embodiments. Merchant backend 136, 136', 910 may then forward the HCE token or payment credential received from mobile device 110, 110', 600 to payment gateway 150, 915 along with any other transaction information to be processed.

In some embodiments, a transaction may be initiated from device 110, 110', 600 even though there are no payment tokens stored thereon and instead stored in a secure cloud. For example, a user may be navigating an application or program, such as a general purpose web browser, and decide to initiate a payment or checkout sequence. In such case, the user may be presented with a secure login to the user's bank or trusted platform 120, 160, 905 and prompted to enter authenticating information, such as a password or biometric. If the user is able to successfully authenticate, then the bank or trusted platform 120, 160, 905 may cause a payment token to be transmitted to a merchant backend 136, 136', 910 for use in processing the transaction.

In some embodiments, rather than a merchant certificate being used to query a mobile or other wallet application 112, 622 to retrieve payment tokens, such merchant certificate may be used only to digitally sign payment token(s) that have been retrieved from a wallet application 112, 622 or some other memory on, or otherwise accessible by, a device 110, 110', 600 or from a secure cloud. Thus, in such cases, a user may be operating within a merchant application 114, 630 or some other application or program 115, such as a web browser, and may initiate an electronic transaction. In that case, the application or program currently being accessed by a user may directly access payment tokens(s) for transfer to a merchant backend 136, 136', 910 as part of a payment message. In some cases, as described herein, payment token(s) may also be provided to a merchant backend 136, 136', 910 directly from a bank or trusted platform 120, 905 following identity verification of a user or user's mobile device 110, 600.

Payment gateway 150, 915 may generally be or include any FSP or application service provider that authorizes, adjudicates, or otherwise processes credit card and other transactions on behalf of e-businesses, online retailers, or other traditional brick and mortar retailers. Thus, payment gateway 150, 915 may be some entity that processes all mobile and/or other transactions on behalf of a given merchant or group of merchants, including mobile transactions that are initiated from within merchant application 114, 630. Each merchant or merchant application 114, 630 may therefore be associated with one or more different payment gateways 150, 915, although only one of each are illustrated for convenience. In addition to facilitating the processing of mobile or other transactions, payment gateway 150, 915 may also perform services, such as encryption or further encryption of sensitive information, fraud detection, and others.

As shown in FIG. 9, system 100, 900 may in some embodiments be configured so that payment gateway 150, 915 may process mobile transactions differently than transactions conducted using non-mobile user communication devices 110, depending on the payment method selected for the transaction and, in some cases, depending on whether a trusted platform 120, 905 has authorized the transaction. For example, payment gateway 150, 915 may be configured to detect the selected payment method based on the HCE token or payment credential that has been received and then route the transaction accordingly to one or more further downstream entities. To ensure that HCE tokens or other payment credentials are identifiable, in some cases, the configuration of payment gateway 150, 915 and/or such HCE tokens or other payments may be undertaken jointly or in conjunction with a central certification authority 120, 905, which has been delegated authority to authenticate transactions. In this manner, payment gateway 150, 915 may thereby be capable of detecting a wide range of different tokens regardless of which user or merchant application 130 has initiated the transaction.

For example, in some cases, payment gateway 150, 915 may be configured to detect that the received HCE token represents or otherwise indicates an Interac™ (debit) transaction, in which case payment gateway 150, 915 may route the transaction directly to an issuer 160, 920 associated with the selected payment method, e.g., a bank controlling a demand or deposit account held by the user. Such issuer 160, 920 may then be able to settle the transaction by debiting the correct amount from the account specified in the token. Such transactions may in fact be Interac™ transactions or, as described further below, may be some other type of transaction that has been encoded to appear like an Interac™ transaction so that it will be processed directly by an issuer bank as opposed to some other intermediary or fourth party processor, such as an acquirer bank.

Payment gateway 150, 915 may also detect that the received HCE token represents a credit card transaction, in which case payment gateway 150, 915 may then query to determine how the transaction will be settled. Some issuers 160, 920 may consent to have transactions routed directly from payment gateway 150, 915 for settlement. Alternatively, some mobile or other transactions representing credit card payments may be routed first by payment gateway 150, 915 to an acquirer 150, 925 or the acquirer's processor and thereafter to issuer 920 for settlement.

Accordingly, in some embodiments, a payment token transmitted to merchant backend 136, 136', 910 may be signed using the merchant's certificate, which has been issued and provided to the merchant by certification authority 120, 905 or some other trusted platform. When the payment message is forwarded through the payment gateway 150, 915, in some cases it will be detected as an Interac™ transaction because it has been configured, either by the device 110, 110', 600 or the merchant backend 136, 136', 910, to take on this appearance. Thus, instead of being forwarded to an acquirer 150, 925 or their processor, which might otherwise have been the decision of payment gateway 150, 915, the payment message may instead be relayed directly to an issuer 160, 920. The payment message may then be verified and/or decrypted before payment to the merchant is processed. The issuer bank 160, 920 may in some cases arrange for payment directly from the method of payment indicated in the message. Optionally, however, in some cases, the issuer bank 160, 920 may pay the merchant from the bank's funds, and then settle with the user of the mobile device 110, 110', 600 by any of the means described herein.

In some embodiments, when a payment token transmitted to a merchant backend 136, 136', 910 is 'signed' or otherwise authenticated using the merchant's certificate, payment gateway 150, 915 may be by-passed altogether and instead merchant backend 136, 136', 910 may communicate directly with issuer 160, 920 to process transactions. In such cases, issuer 160, 920 may settle with the merchant using a payment type and/or funds specified in the payment message. Alternatively, as described herein, issuer 160, 920 may in some cases settle first with the merchant 136, 136' using funds supplied by the issuer and thereafter with the user according to an agreed upon method of settlement.

Figure 10:
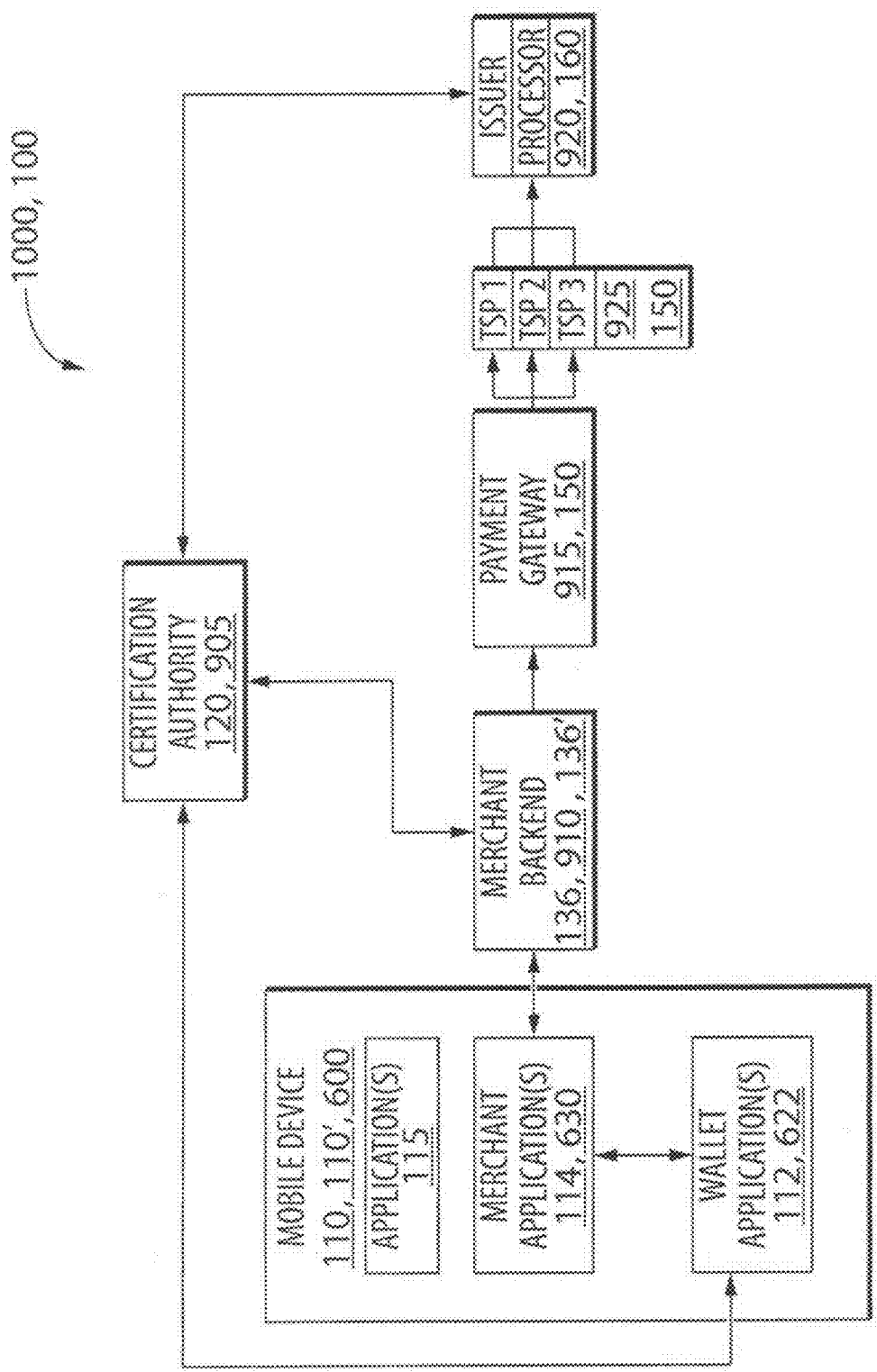

Referring now to FIG. 10, there is shown an example system 100, 1000 for processing payments in accordance with embodiments of the invention. Similar to system 900 shown in FIG. 9, system 1000 may in various different embodiments include at least a mobile or other device 110, 110', 600, certification authority 120, 905, and merchant backend 136, 136', 910 as described herein. For convenience and ease of illustration, therefore, description of these elements may be somewhat abbreviated, except for certain differences that may be specifically highlighted.

While in system 900 payment credentials may be standardized across different payment methods (debit, credit) and/or scheme, system 1000 may be configured to process mobile and other transactions in which payment tokens have not been standardized. Thus, for example, mobile transactions may still be initiated by, for example, merchant application 114, 630 pulling a wallet interface from wallet application 114, 630 for selection of a particular payment method, or a user initiating a transaction from within a web browser or other application on mobile device 110, 110', 600. However, tokens stored in wallet application 114, 630 or elsewhere in memory may have been provisioned by multiple different token service providers (TSP) as opposed to a single authority, such as a central certification authority 120, 905.

Accordingly, system 1000 may further include one or more token service providers 925, 160 interposed between payment gateway 915, 150 and issuer 160, 920. When transactions are received from merchant backend 136, 136', 910, payment gateway 150, 915 may determine which TSP 150, 925 issued the received token and then route the transaction accordingly. For example, each TSP 150, 925 may operate in accordance with a different credit card scheme (Visa™, Mastercard™), as well as other payment methods, such as Interac™ (debit) transactions. Such TSP(s) 150, 925 may then authenticate and route the transaction to issuer system 920, 160.

Figure 11:
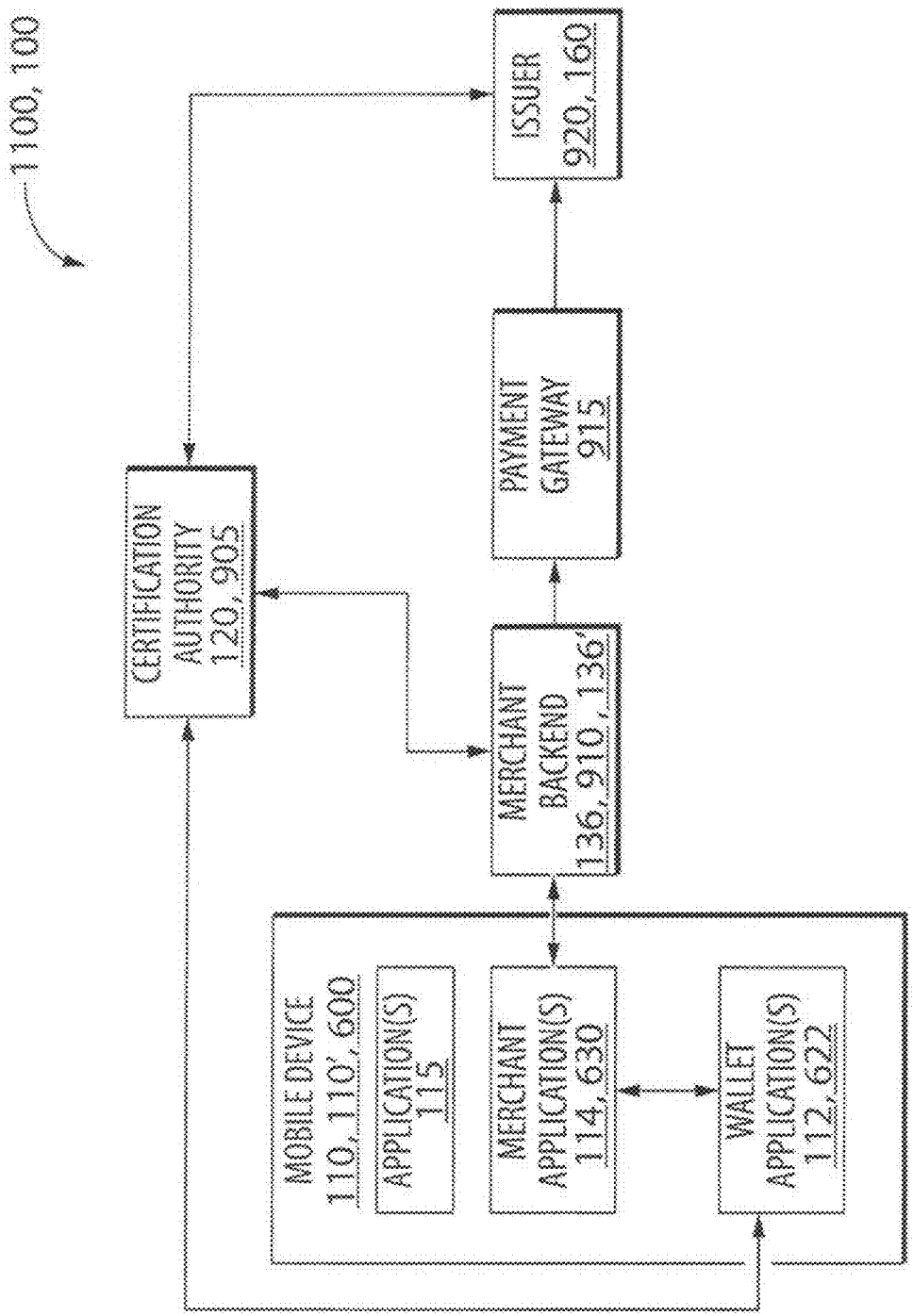

Referring now to FIG. 11, there is shown an example system 100, 1100 for processing mobile and other payments in accordance with embodiments of the invention. Similar to system 900 shown in FIG. 9, system 1100 may in various different embodiments include at least a mobile or other device 110, 110', 600, certification authority 120, 905, and merchant backend 136, 136', 910 as described herein. For convenience and ease of illustration, therefore, description of these elements may be somewhat abbreviated, except for certain differences that may be specifically highlighted.

As previously noted, in addition to credit and debit transactions, the invention enables the tokenization of a wide range of alternative payment methods. For example, an issuer 120, 160, 920 (such as a bank or other financial institution) may extend a line of credit or other valuable asset to a customer. Ordinarily it would not be possible for the customer to make payments with such asset(s). However, in accordance with the invention, the issuer 120, 160, 920 may provision a mobile or other device 100, 110', 600 with a token representing the customer's line of credit or other asset, or one or more values associated therewith. Such token(s) may, any be provided in desired numbers and/or varieties of forms, be stored in one or more wallet applications 112, 622 for later usage in mobile payments. The mobile device 110, 600 on which such payment tokens are stored may be a trusted device 110' in some cases.

Accordingly, when a transaction is initiated, the token pulled by merchant application 114, 630 may in some cases represent a line of credit with issuer 920. When the transaction is received from merchant backend 136, 136', 910, payment gateway 915 may then detect that the received token represents a line of credit or other asset, as a result of the trusted mobile device 110, 600 or merchant backend 136, 136' 910 encoding the payment message to be detected as such, and then route the transaction directly to issuer 920 associated with the token. Issuer 920 may then settle the transaction by deducting the appropriate amount from the customer's available credit.

Thus, among other improvements enabled by this disclosure, are mobile and other devices, each comprising one or more display screens, one or more user input devices, and one or more short-range and/or long-range network communication systems; one or more data processors; and one or more memory devices; the memory device(s) comprising persistent, stored data representing at least: (a) one or more secure payment tokens, each payment token comprising data associated with an authorized payment amount and a financial service provider by which the authorized payment amount was authorized. The memory devices further comprise memory comprising persistent, stored data representing one or more sets of machine-interpretable or otherwise executable instructions, and the data processor(s) are configured, upon execution of the one or more sets of stored machine-interpretable instructions, to initiate payment or other transactions from within one or more applications installed on the mobile communication device; to receive, from the at least one user input device, data representing a user selection of a payment option displayed on the display screen and, in response, access the persistent memory device and pull a selected payment token into the application; and to route the selected payment token from within the application to a transaction processing system, using the network communication system, for use in processing the initiated transaction.

The invention further provides such devices, wherein the payment option is displayed from within the applications, including for example applications provided by merchant transaction processing systems, and the applications are adapted to facilitate communications between the mobile communication device and the merchant processing system.

The invention further provides corresponding processes; persistently-stored, machine-executable instruction sets; and systems 100, 900, 1000 adapted for the use of such devices.

Figure 12:
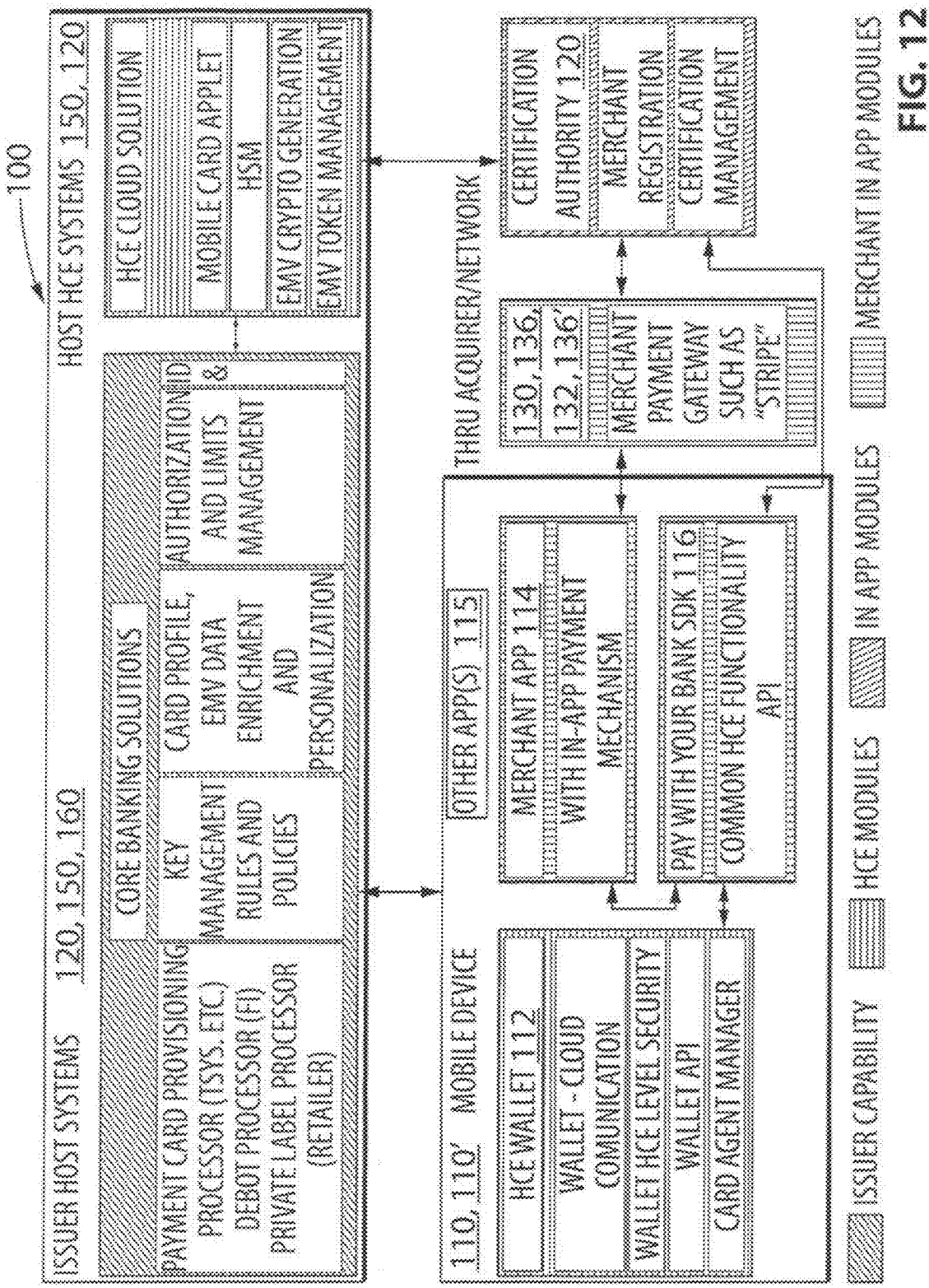

Referring now to FIG. 12, as noted above, HCE tokens and other payment or transaction credentials stored in a virtual wallet 112 of a device 110, 110' may be made accessible to other applications 114, 115 installed on otherwise accessible by the device, including application(s) 114 provided by or otherwise associated with one or more merchants, in various ways. For example, a merchant application 114 may be authorized or otherwise enabled to access information from within a wallet application 112 of a trusted device 110' through implementation of a pull architecture, which may be facilitated by providing on the trusted device 110' a system level application programming interface (API) 116 that is common to or otherwise accessible by both the wallet and merchant application. Such an API can, for example, be provided in the form of a separate payment options application API 116 ("Pay with your bank SDK"), as shown in FIG. 12; alternatively, such an API 116 may itself serve as a common, or universal wallet 112, by polling applications 112, 114, and servers 120, 160 etc. for payment resources available to a verified, authorized user 190 of a device 110, and presenting them in a suitably-configured GUI on an output device 610. Such features may offer significant advantages to users 190, merchants 130, and FIs/FSPs 120, 160, among others. For example, because tokens and/or other payment credentials already stored in such a mobile wallet 112 can, in such implementations, be pulled by a merchant application 114, the user may be relieved of any necessity to input any credit card or other sensitive information, such as confidential identifiers, directly into the merchant application. An example of implementation and use of such one embodiment is provided below, in connection with process 1300 of FIG. 13. It will be noted that, among other advantages, the use of distinct secure payment option API(s) 116 can provide user(s) of device(s) 110, 110' with greatly enhanced and extremely flexible control over a wide variety and combination of payment options and preferences.

As noted above, for example, polling of any or all of devices 110, including installed applications 112, 114; FIs/FSPs 120, 160; merchant devices and systems 132, 134, 136, 136'; and optionally other resources, and pulling of payment credentials, may be accomplished by configuring such devices to generate, store, and otherwise process data representing payment tokens, HCE credentials, and other transaction-related information in accordance with common standards, including for example common communications and data record generation and processing protocols. Generally speaking, the exact format of such protocols is of secondary importance: more importantly, relevant data such as payment and/or deposit account numbers (or other identifiers), authorized and/or requested transaction values, and identifiers related to account holders, authorized account users, account administrators, and payors and payees can be embedded within transaction data records in any suitable and agreed format.

Using such suitably-adapted token and/or credential formats, payment option or universal wallet APIs 112, 116 can be configured to talk to any, some, or all of, each other merchant systems and/or devices 130, 132, 134, 136, 136', and/or FI/FSP systems 120, 160.

In implementing such payment option or universal wallet APIs 116, trusted architectures such as those shown and described in connection with FIGS. 1-5, 9-12, and 15A-15B can be extremely beneficial. For example, the use of certification/registration processes as described herein with virtually any of the embodiments described herein can greatly facilitate acceptance, security, and efficiency of the adoption of common or universal protocols, as described herein.

Figure 13:
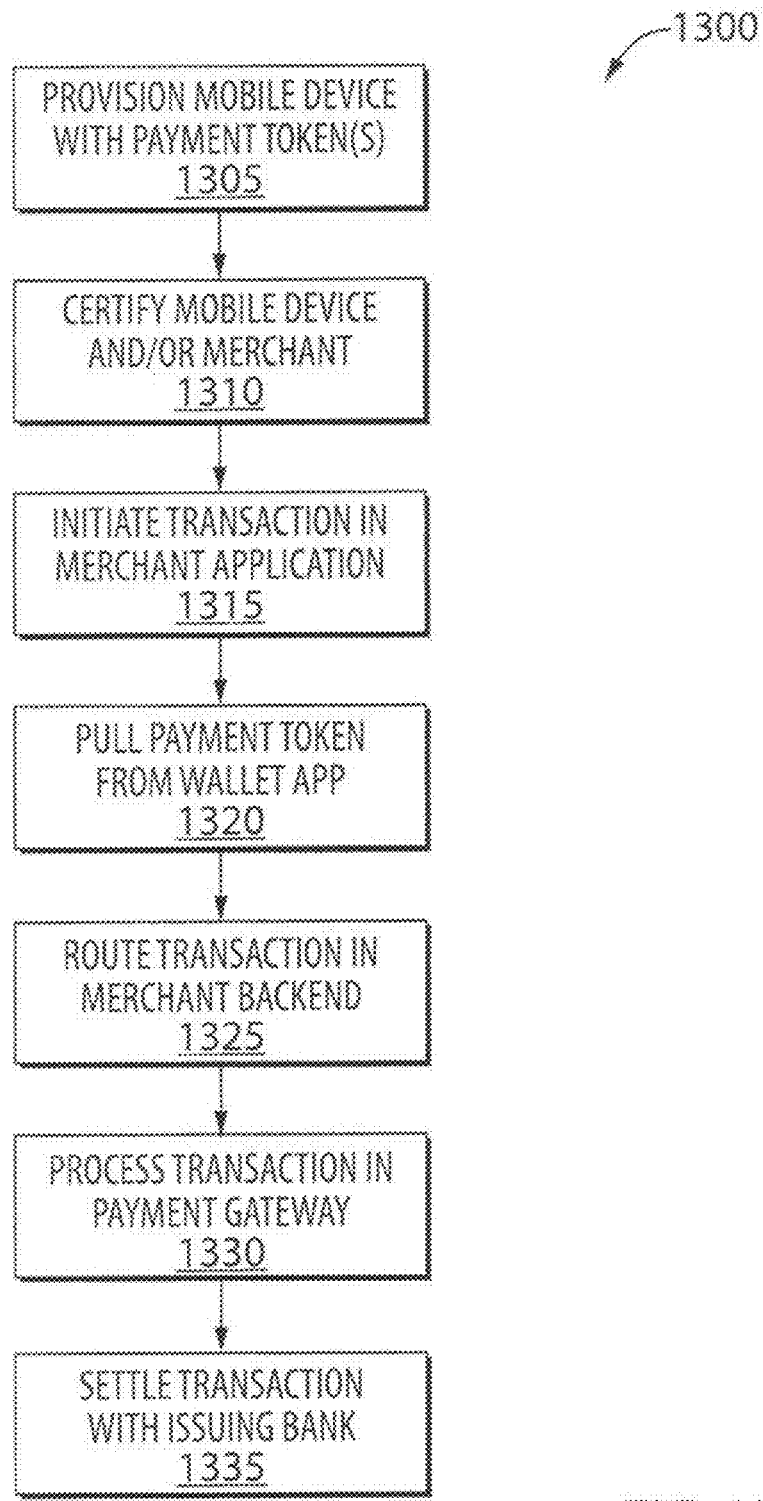
FIG. 13 shows a flow chart depicting a method of processing mobile payments in accordance with various aspects and embodiments of the invention.

Referring now to FIG. 13, there is illustrated a method 1300 of processing mobile payments, or other transactions, in accordance with various aspects and embodiments of the invention. Methods 1300 may be performed by or in association with any or all of systems 100 (FIGS. 1-5, 12), 900 (FIG. 9), 1000 (FIG. 10), and/or 1100 (FIG. 11), and may generally allow a user of a request communication device 110, 110' to initiate and complete payment transactions from within an application or program associated with a merchant which has been installed on the device 110. While, in the embodiment shown in FIG. 13, method 1300 of is depicted as a sequence of discrete events or actions, it will be appreciated by those skilled in the relevant arts that such representation is for clarity and convenience only, and that alternative embodiments may be possible as well. For example, in variant embodiments, it may be possible to re-arrange the order of actions depicted, include further actions, omit certain depicted actions, and/or combine one or more actions together, and so on. The particular sequence depicted is only an example of the possibilities.

Accordingly, in some cases, a method 1300 may begin with provisioning 1305 a mobile, desktop, or other user device 110, 110' with one or more HCE tokens or other payment credentials representing any one or more of a wide variety of authorized payment options for a user of the device 110, 110'. The HCE tokens or payment credentials may be provisioned by different entities 120, 160, including token service providers 160, 920 that may be bound to one or more specific payment methods or schemes, but in some cases also by a central certification authority 120, 905 that provisions standard token(s) across multiple different payments and/or schemes. In some further cases, payment tokens may be provisioned to a secure cloud accessible to a mobile or desktop device 110, 110' instead of to a user's device itself.

So that mobile and/or other transactions involving provisioned HCE tokens or other payment credentials may be authenticated, one or both of a merchant and a merchant application may be certified 1310 by, for example, a central certification authority or trusted platform 120, 905. For example, a merchant and/or one or more associated merchant systems 130, 910 may be certified 1310 by registering a merchant application or program 114, 630 with the certification authority 120, 905 as one in which mobile or other types of payments may be authorized. The certification authority or trusted platform 120, 905 as part of the process may provide an associated merchant system 130', 910 with a certificate for use in processing mobile payments through the merchant's application, in the form of a merchant certification data set comprising any suitable identifiers and/or security codes, etc.

Optionally, in some cases, a user may also certify 1310 a mobile or other device 110 with a certification authority or trusted platform 120, 905. For example, the certification authority 120, 905 may register some unique identifying information associated with the user device 110, 110', such as a serial number, network address, or random or otherwise arbitrary identifier. Then, all mobile transactions involving an HCE token or payment credential that has been provisioned to such a registered device 110' may also be processed as authentic if such transactions have originated from a device 110' matching or otherwise suitably associated with the registered identifying information.

In order to initiate a payment or other transaction, a user may launch a merchant application or program 114, 630. For example, a user of a mobile device 110, 110' can approach a merchant POS 132, 134 with one or more goods or services the user wishes to purchase, present the items for scanning by the merchant, and thereby automatically or semi-automatically cause initiation of a merchant application 114, 630 residing on the mobile device; or the user of a desktop device 110, 110' can use a general purpose network browser to navigate to a merchant web site, and select one or more items or services for placement in a virtual shopping cart, using known techniques, and when ready initiate a 'check out' procedure or other payment process. As part of a programmed payment or checkout sequence, the merchant application 114, 630 may request provision of the merchant's certificate from a networked location in an associated backend system 136, 910. Once received, the merchant application may use the received certificate to query a wallet application 112, 622 installed on the user's mobile or desktop device 110, 110'. When queried, the wallet application may verify the authenticity of the merchant's certificate using a private key or other cryptographic information and respond according to the outcome of the verification. Alternatively, the merchant application or program 114, 630 may query a user payment option application 116 or request a token directly from the wallet application 112, 622 for provision of the certificate information to the merchant system 630.

It will be immediately understood by those skilled in the relevant arts that methods or processes provided for implementation through the use of devices 110, 110' to access merchant applications 114, 630 and/or merchant systems 130, including for example the use of such systems and applications to identify user default choices as described herein, may comprise any of a very wide variety of suitable programming devices, mechanisms, or approaches. For example, a user of a mobile device 110, 110' may use a suitably-configured network browser on his/her mobile device to navigate to a merchant system 130, 132, etc., similar to the manner in which he/she might do so on a desktop device; and cookies and other automatic or semi-automatic devices may be employed for the designation of default options and selections, in the manner described. As a further particular example, a browser implemented on a mobile device 110, 110' may be configured, as for example through the use of a plug-in application or other suitably-configured code, to communicate with a mobile wallet 112, 622 through a merchant API 114, 630 in order to pull identifiers and/other payment data and credentials from the wallet for use by or with merchant systems 130, 132, 136, etc. Such implementations may be of particular advantage, in that, for example, not all merchants may elect to provide proprietary or other apps 114 for use on mobile devices, and the use of such general-purpose browsers, cookies, etc., may provide them with significant opportunities for effective and efficient implementation of such aspects of the invention.

All devices, mechanisms, approaches, procedures, and methods of accessing such applications and systems are considered to fall within the scope of corresponding aspects of the invention.

Conditioned upon verification of the merchant's certificate data, the user's wallet 112, 622 and/or payment options API 116 may allow the merchant application to pull 1320 a wallet interface from the wallet application 112, 622 into the merchant application 114, 630. As shown for example in FIG. 14A, the wallet interface 112, 116 may include a set of program instructions that, upon such verification (or at any other suitable point in the transaction process) wholly or partially causes the user device 110, 110' to generate and display a graphical user interface (GUI) or other visual display 1402 of the user's stored payment credentials allowing for the user to make a selection of which stored payment token and/or which of a plurality of payment options to use in processing the initiated transaction.

For example, selection by a user of a device 110' at a POS 132, 134 or within a web browser of a desktop system 110 of an interactive GUI device "check out" or "ready to pay" displayed on a device screen 610 can cause the device 110' to generate and display a GUI comprising items 1404, 1406 representing payment options available to the user of the device 110'. In the example shown in FIG. 14A, for example, the user has been presented with a GUI 1402 offering a choice of two payment options: a merchant-controlled "checkout" option 1404, and a wallet or trusted platform-controlled process "pay with your bank" option 1406.

Figure 14A:
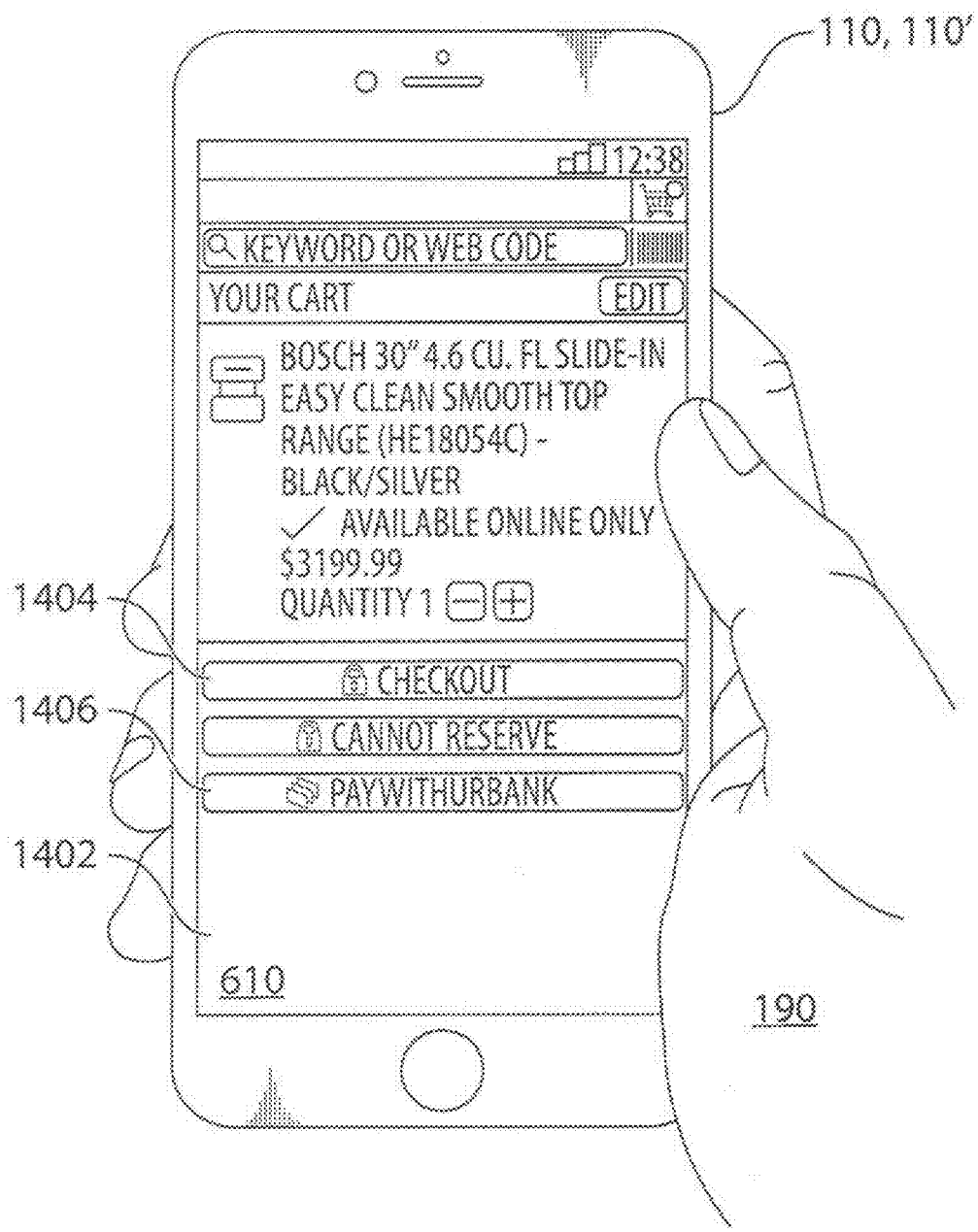
FIGS. 14A, 14B, 14C, 14D, 14E, and 14F show embodiments of graphical user interfaces adapted for use in implementing various aspects and embodiments of the invention.

Selection by the user of an interactive GUI "checkout" element 1404 of FIG. 14A can cause the device 110' to initiate a process controlled by the merchant application 114, 630 to enable the user to complete the transaction by using payment processes authorized or otherwise controlled by the merchant backend system 136, 910 to generate a transaction authorization request data set. Such processes can, for example, be enabled wholly or partially through the use of $4^{th}$-party payment processor(s) 150, as shown for example in FIG. 1. Such processes can, for example, proceed in accordance with known and widely commercialized electronic checkout procedures. Transaction authorization request data sets generated through the use of such processes can comprise any information required or otherwise desired by one or more FIs/FSPs 120, 160 whose approval is required in order for the transaction to be completed, including for example a total purchase amount, identifier(s) associated with account(s) to be used as payment resources, and/or merchant or other accounts designated for receipt of the payment(s), along with any routing, confirmation, and/or security data or devices, as generally described herein.

Selection by the user of a GUI element 1406 'pay with your bank' can cause the device wallet 112, 630 and/or payment options API 116 to continue or initiate a payment process controlled by any or all of the wallet 114, 630, API 116, and/or TP 120, 905. For example, selection of an item 1406 using a touchscreen device 610 can cause generation and display (e.g., using data provided by a payment options API 116) of a GUI 1407 showing one or more options 1408 available to the user 190 as resources for completing payment in accordance with data and/or instructions provided in the wallet 112, 622, and pulled by payment options API 116, as shown for example in FIG. 14B and FIG. 14E. In the example shown in FIG. 14B, a user 190 of a mobile device 110' has been provided with a GUI 1407 showing, at 1471, portions of a corresponding requested transaction data set, in the form of a list comprising information identifying at least one item to be purchased (a Bosch 30" smooth top range), along with a price associated with the item. The user has also been provided with an icon 1408 representing a first payment option, in the form of a transaction payment source identified as a credit account "RBC VISA AVION" administered by a trusted FI 120, 160. As described herein, payment option(s) 1408 can be generated by device(s) 110, 120, 160 using data identifying or otherwise associated any one or more accounts, or combinations of accounts, or funding sources, designated by preferences and/or criteria established by either or both of a user 190 and/or FI 120.

Figure 14B:
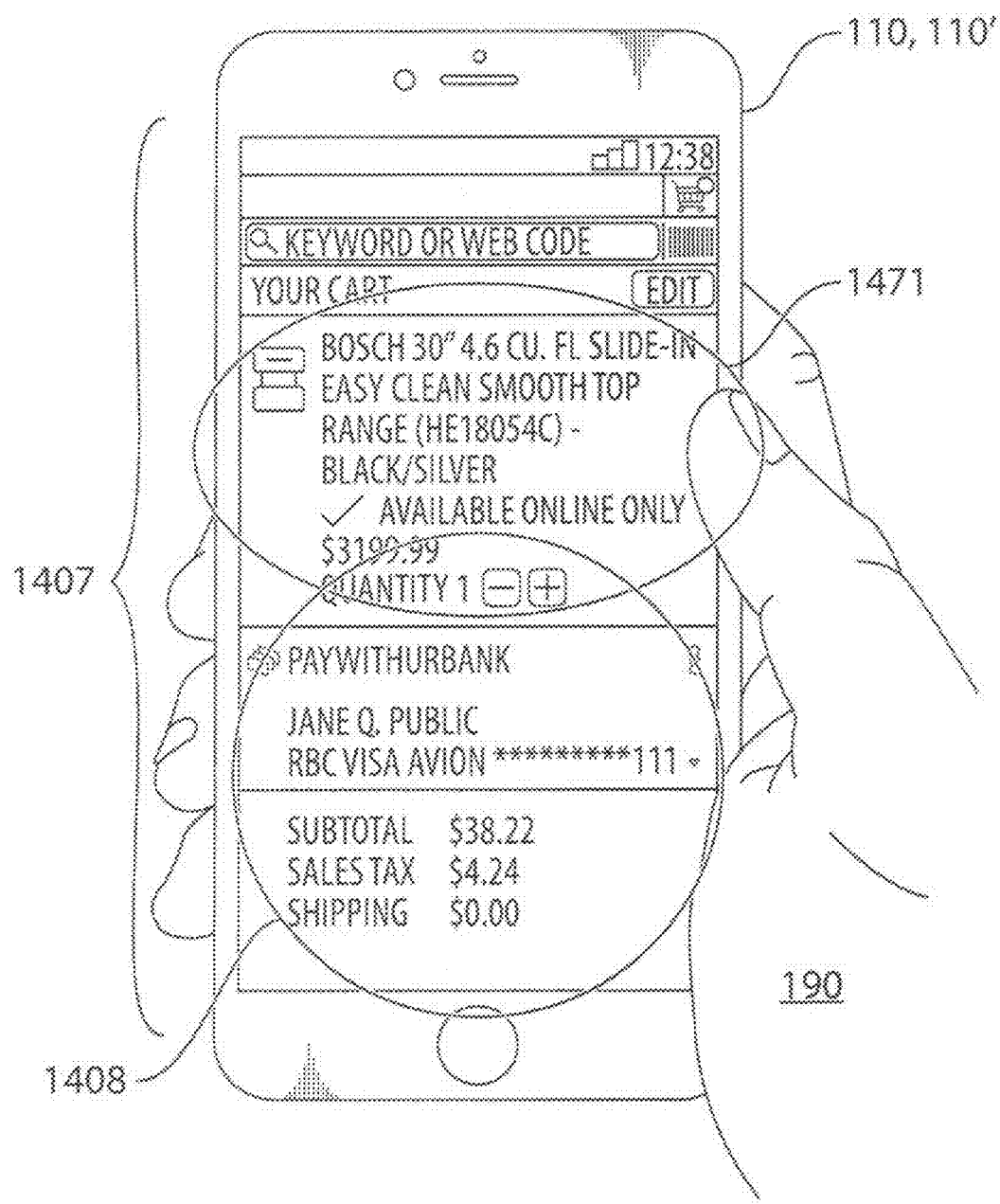
Figure 14C:
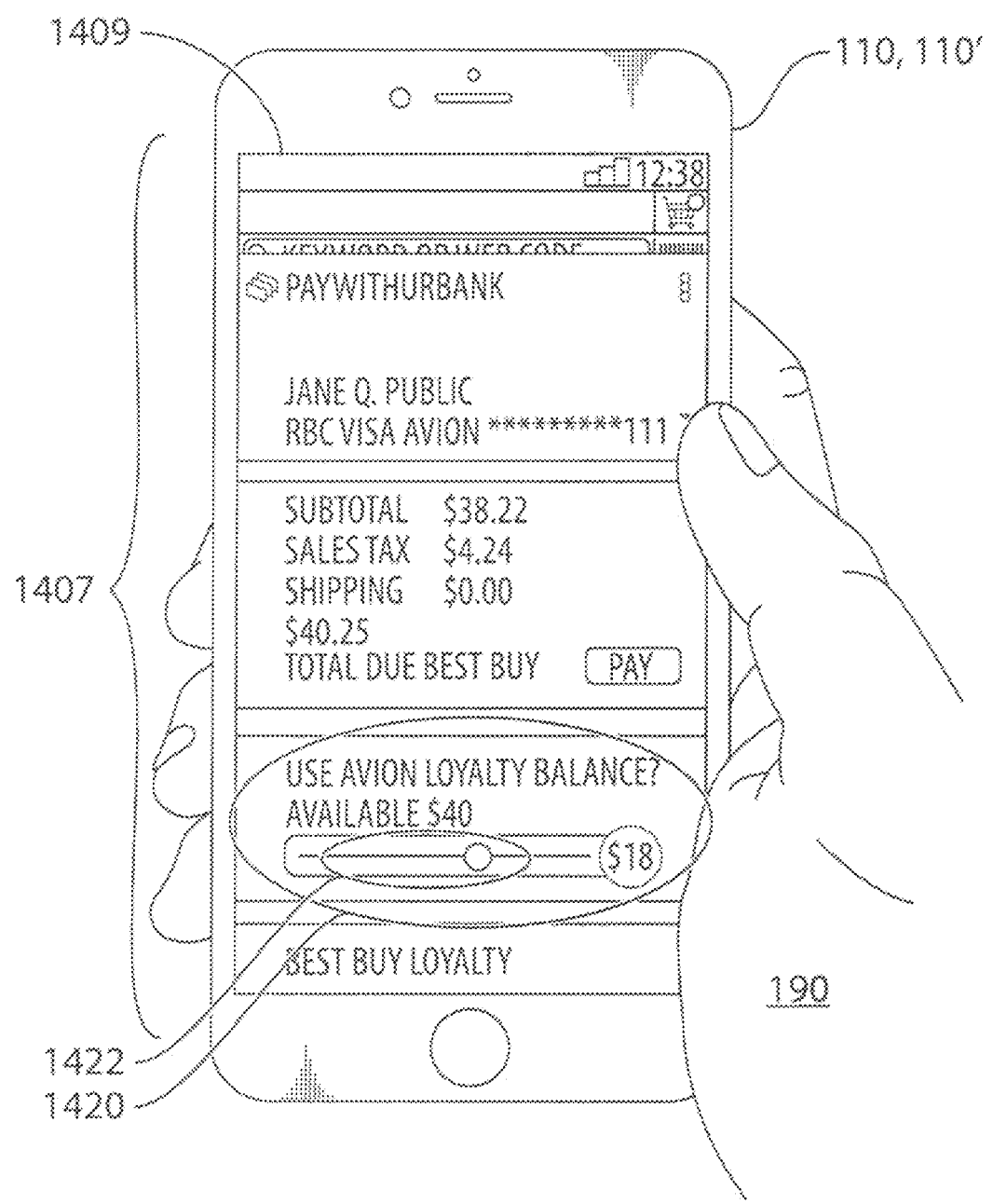
Figure 14D:
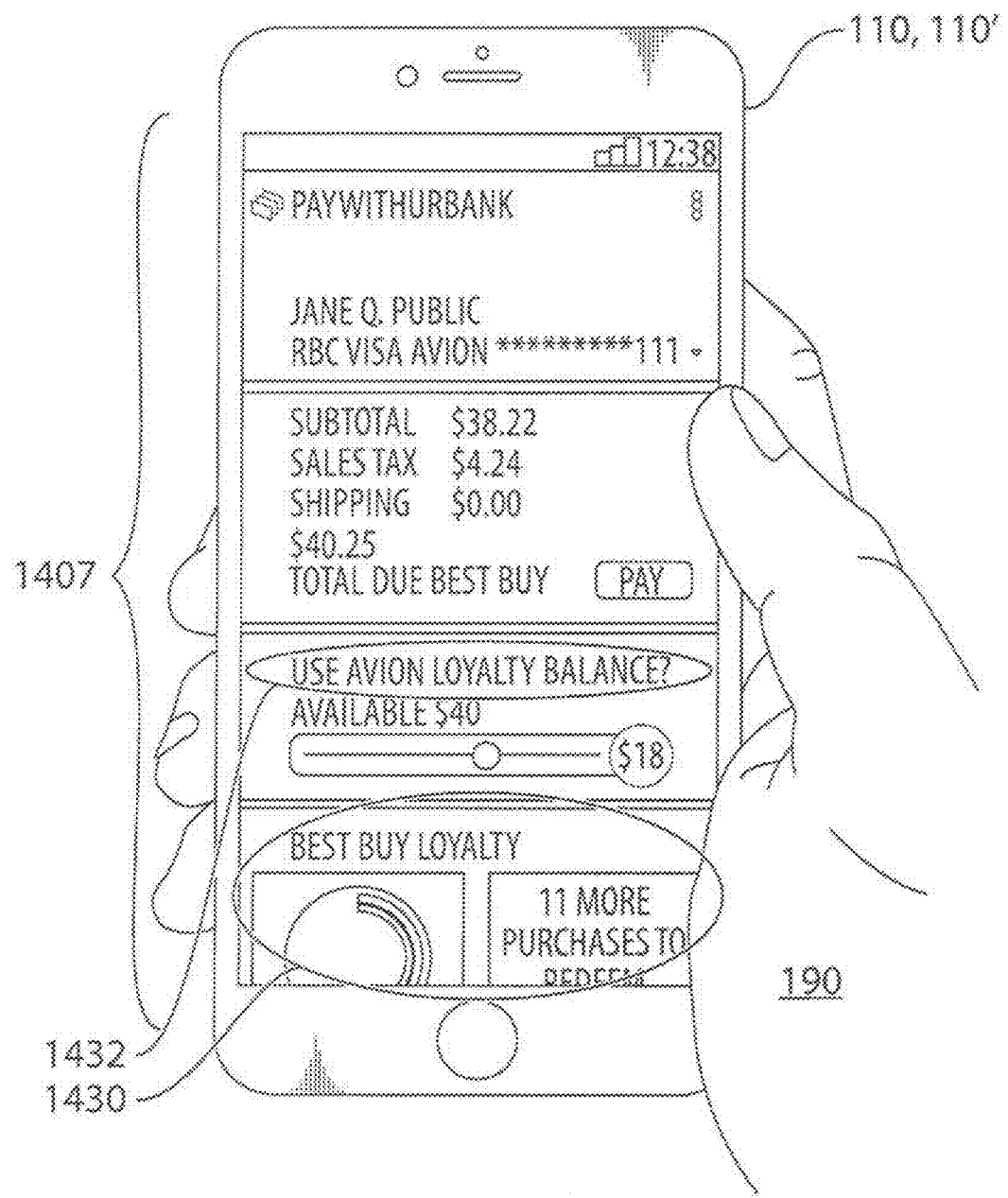

As shown in FIGS. 14C and 14D, the GUI 1407 provided in FIG. 14B can be provided in the form of an interactive "overlay" screen 1409, either by causing the display to generate a new GUI 1407 and overwrite the previous screen completely, or for example by using 'fade' or 'grey-out' imaging techniques to allow the user 190 to interact with the payment options 116 and/or wallet 114 without otherwise terminating or interrupting a checkout session or process being executed by the merchant system 130, including the merchant's default checkout processes governed by the GUI 1402 shown in FIG. 14A. This can, for example, enable the user to scroll the GUI 1407 so as to view further payment options available through the wallet 114, options application 116, and or an associated FI 120, 160; and optionally to control payment using a combination of accounts or fund sources.

For example, a universal wallet or payment options API 116 can poll the device 110, 110' for a full or partial list of all wallets 112, payment tokens, and/or other sets of payment credentials stored on the device, and present them via such a GUI for user viewing and selection. Such lists may wholly or partially populated by defaults, set by the user, merchant, or an FSP associated with the device 110, 110', or any payment token(s) and or transaction credential(s) associated with the device. For example, a list of all cards, accounts, or other value sources accessible by the device for application to the transaction may be displayed, along with full or partial information identifying information, including branded logos, for viewing and selection by the user. For example, a list of card or account details, with all, some, or most of the card number, account holder's name, and/or address omitted, may be presented, so that a user 190 is enabled to select a desired payment source without publicly disclosing sensitive information. As described herein below, options 1408 presented in such list(s) may be selected by any of device(s) 110, 120, 130, 160, or combination(s) thereof, according to criteria previously selected by user(s) 190 and/or any of such devices, including for example preferred form of debit, credit, or non-monetary value accounts; availability of funds, etc.

Among the many advantageous features provided by such aspects and embodiments of the invention are elegant, user-controllable mechanisms allowing the user to pay for a transaction using one or more of multiple payment accounts and or other value sources, and optionally to control what portion(s) of such combination(s) are to be used in doing so. For example, as shown in FIG. 14C, a user 190 has scrolled, through the use of a touchscreen, pointing device, and/or other I/O components 610, to view a portion of the GUI 1407 showing that a total purchase amount of $40.25 is due, and enabling the user to use an "Avion Loyalty Balance" item 1420 to pay a desired amount of the purchase using loyalty points or dollars; the remainder being paid using another account such as the "RBC VISA AVION" account. In the example shown, the user is presented with an interactive graphical device 1420 in the form of a touchscreen-enabled slider 1422 that may be used by the user to designate a portion of the total transaction price by increasing or decreasing the amount of the total $40.25 to be paid using the loyalty account. In the example shown, the user has adjusted the slider 1422 so that it will cause, if the item "pay" is selected, the total amount $40.25 to be paid using points valued at $18 from the Avion Loyalty Balance, and the balance ($22.25) to be applied against the RBC VISA AVION credit account or other designated funding source.

The invention enables a wide variety of variations in combined-payment-source transactions. For example, in-app processes controlled by merchant or other applications 114, 115 can provide a user 190 with an interface screen 1407 showing information concerning the amount(s) of cash, rewards, or other values the user may have available for a transaction, for example how many loyalty points the user has available to be applied toward a requested transaction, or how many dollars, pounds, francs, or other types of currency are available to the user for use in the transaction. The user 190 can, for example by using a visual slider 1422 or other interface 1420, designate the number of available points (or different currencies, payment accounts, etc.)] are to be redeemed or otherwise applied toward the proposed transaction. Optionally, once the user has completed the transaction through the application 114, 115, the application can charge another designated user account the full amount of the transaction, without applying any discounts for points used. The app 114, 115 can also notifies a designated wallet 112 associated with the transaction to redeem the selected number of points and apply a credit to the user's selected payment card for the dollar amount of the number of points redeemed.

Moreover, by polling a device 110, 110' and/or one or more FIs/FSPs 160 for all wallet, account, token, and/or HCE credential data authorized for use by a user 190, wallet applications 114, 116 in accordance with the invention can enable a user to select any debit, credit, currencies or points accounts the user may have available for use in transactions generally, and not simply, for example, loyalty programs associated with a particular merchant or forms of payment otherwise preferred by the merchant.

POS transactions can also be improved through application of payment processes enabled by the invention, including those which enable drawing on multiple user accounts, particularly when whole or partial payment using loyalty or rewards points is desired. A user 190 of a device 110, 110' wishing to pay in such fashion can load a wallet application associated with an FI/FSP 120, 160 associated with both a funds account and a loyalty or rewards account, select an HCE-compliant funds account to be used for payment, and a points slider 1422 or similar device be displayed automatically, if points are available and eligible for redemption in the transaction. Using the device 1420 the user 190 can select how many points to redeem, and/or which portion of the payment is to be satisfied through points redemption; and when the user taps the device on a POS terminal to pay or otherwise authorizes completion of the transaction, the wallet 112 can route to the merchant system 136, 136' a transaction payment data set comprising a "hidden" data item representing the number of points to be revealed, in such fashion that the merchant system is neither informed of nor burdened with the fact that points are being used to pay some or all of the transaction price, and optionally to provide access to additional information in a data field presented only to the user 190 regarding how many points to redeem. Such functionality, for example, can in some embodiments be included as a part of standard payment protocols, including the EMV standard. When the transaction data set is routed to the routed to the FI associated with the cash and points payment accounts in the normal course, the hidden field can parsed. If it contains instructions to redeem points, the FI can apply the points in accordance with its internal accounting principles, without requiring the merchant system 136, 136' to process the payment on anything other than a cash basis. Using the device 110, 110's communications systems, the FI 120, 160 can confirm the transaction for the user 190 directly.

As shown in FIG. 14D, scrolling further along the interface screen 1407 can cause a GUI device 1430 to be displayed, indicating further information about the loyalty account referenced at 1432; in this case indicating a further number of purchases required before some number of remaining points can be redeemed by the user for application to a transaction. As will be appreciated by those skilled in the relevant arts, the use of payment options APIs 116 provided across multiple FI platforms 120, 160 can enable a certification authority 120, 905 or other trusted platform to track multiple rewards programs, account balances associated with credit, debit, and other payment accounts, etc., that are available for use in completing a transaction, and provide such information to a user 190 in a combined and organized display 1407.

Figure 14E:
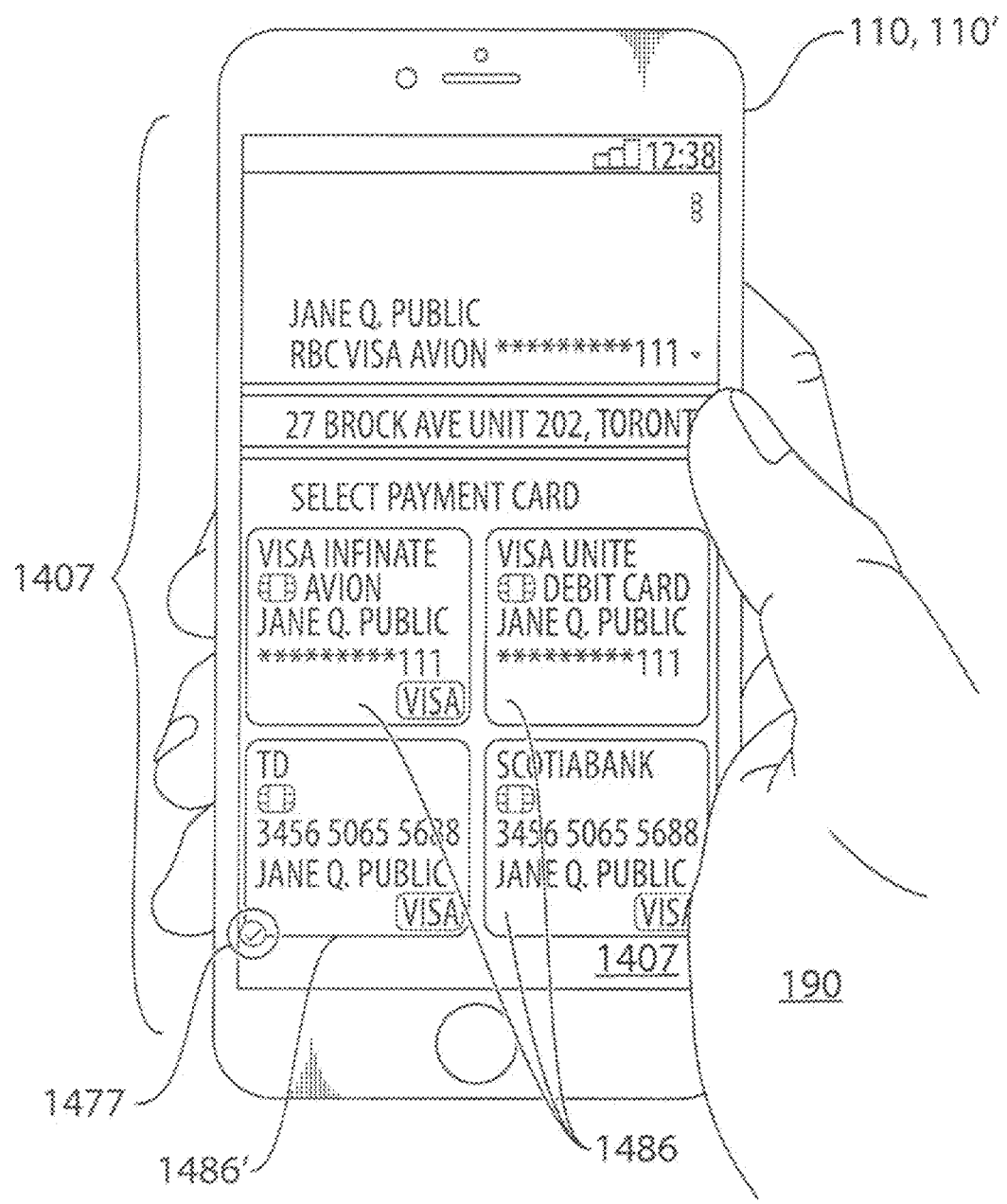
Figure 14F:
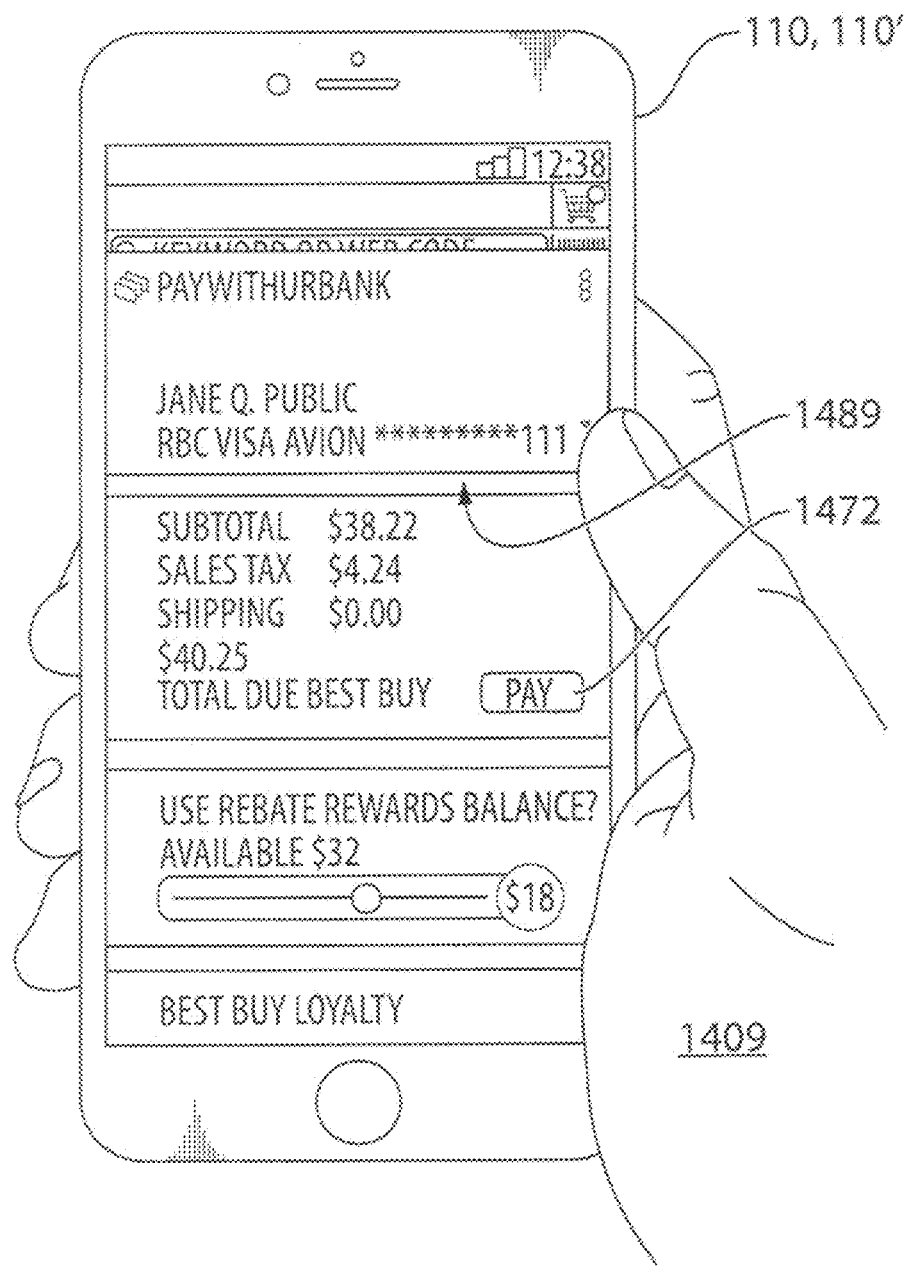

A further advantageous feature offered by the invention is the ability to allow a user 190 to select from an arbitrary number of accounts, and/or types of accounts, and/or combinations of accounts, regardless of whether such accounts are held or administered by a common entity, in designating which account(s) are to be used in completing a transaction. For example, a payment options API 116 or wallet 112 can be adapted to enable the user, by means such as a GUI 1407, to select among accounts controlled by the user but held or otherwise controlled by a variety of FIs 160. For example, as shown in FIGS. 12 and 14E, selection of a payment options item 1406 (FIG. 14A) can cause a payment options application 116 or first wallet 112 to poll one or more (second) wallet(s) 112 and/or certification authority(ies) 120 for information useful for identifying a plurality of payment options available to an authorized user 190, and cause a suitably-configured display 610 to present a GUI 1407 comprising one or more corresponding selectable GUI icon(s) 1486 on a GUI 1484. Selection of the item 1486', for example, can result in replacement of the option "RBC VISA AVION" shown in FIG. 14C by a payment option associated with a rebate account "TD REBATE REWARDS," as shown at 1489 in FIG. 14F. Further options for designating account(s) or combinations of account(s) are described below. As will be appreciated by those skilled in the relevant arts, once they have been made familiar with this disclosure and advantages offered by the invention(s) disclosed herein, graphical items 1486, etc., can be provided in the form of thumbnails or other images bearing unique branding images, or other identifiers, associated with the corresponding accounts.

In various embodiments in which payment options APIs 116 and/or wallets 112 enable a user 190 to select from among multiple accounts or funding sources for the completion of transactions, a user 190 may be enabled to select one or more defaults or default combinations to be presented upon selection of a payment options item 1406. For example, as shown and previously described in connection with FIGS. 14A and 14B, selection of such an item 1406 when a default has been previously designated by either or both of the user 190 and/or an authorized FI 120, 160, can result in display of one or more overridable payment options, such as a preferred debit, credit, loyalty, gift, and/or rewards account(s). In such embodiments, previously-indicated default preferences can be designated by, for example, use of items 1477, as shown in FIG. 14E, by virtue of relative placement on the screen use of associated identifiers, including text, colors, shading, or other graphic devices, etc. In the example shown in FIG. 14E, selection of a payment options icon 1406 in FIG. 14A could result in display of an option to pay with an account "TD REBATE REWARDS VISA", rather than "RBC VISA AVION," as shown in FIG. 14A.

In embodiments of the invention adapted to enable the designation of default account selections, defaults can be identified using any one or more desired or otherwise suitable mechanisms. For example, a user 190 of a device 110, 110' can designate one or more defaults at the time of setting up either or both of a merchant shopping application 114 and Common HCE payment options SDK/API 116, (sometimes called a universal wallet application) an API 112, 116, or at any later time; and/or an associated FI 120, 160 can offer or require various default settings. Alternatively, defaults may be designated automatically, or semi-automatically, based on user actions and/or trends in user actions, during transactions, using, for example cookies generated during or otherwise provided in association with completed transactions.

In further variations of such and other embodiments, the invention offers new and advantageous ways of using tokens and other payment credentials, which may for example be designated by and/or otherwise associated with one or more specific users or devices, for a variety of purposes, including for example the designation of default or preferred payment source(s) and other selections to be used in processing transactions. For example, using data previously entered by, or otherwise related to, and useful in identifying or otherwise authenticating a specific user, a merchant app 114 can provide the same or other identifiers to a wallet app 112 in order to designate one or more default options to be presented to a user 190 of a device 110' during the processing of a transaction. For example, at the time of a transaction, a merchant app 114 can provide data representing a telephone number associated with an authorized user 190, or other information, to a wallet app 114 associated with a device 110' being used by such authorized user. For example, a merchant POS 132 or a merchant system 130 can provide to the wallet 112 a telephone number previously provided by the user 190, or obtained from other, previously provided data, to the wallet 112, for use by the wallet 112 in identifying an account to be used as a preference or default in processing a transaction. In addition, in various embodiments such a user might be required to separately provide a username/password, PIN, and/or other identifier in order to complete the transaction.

A further variation of processes 1300, 1500, may be used with particular advantage in embodiments in which a user 190's wallet application 112 is associated with a plurality of FIs/FSPs 120, 160, but relies primarily on one of the wallet applications 112 for purchase transactions. For use in completing POS purchases and other purchases, the preferred wallet application 112 can be configured to cause generation and display of a selectable GUI item 1406 "pay with your bank" that will allow the user to launch any other wallet 112 on the device having similar functionality on the device. For example, the user 190 is in a checkout line in a brick-and-mortar store, and invokes the preferred wallet application 112 because it associated with a funding source the user initially wishes to use, but then decides instead to pay using HCE credentials representing an account held with a different FI/FSP 120, 160. The user is enabled, for example, simply to tap a "button" item 1406 from within the preferred wallet application 112, causing either or both of the preferred wallet application 112 and the SDK/API 116 to generate and display a GUI 1407 comprising a list of all of the FIs registered with a central authority 120. The user can select a GUI item 1486 associated with the desired FI, and provided a corresponding wallet application 112 is installed on the device 110, 110', that corresponding wallet application 112 is launched, the user can further select an individual account associated with that FI (e.g., choose between credit, deposit, and loyalty accounts), and tap the device 110', 100 to an NFC-enabled POS device 132, 134 POS to pay. A token or other suitable credentials data set stored in association with the selected wallet application 112 may be transmitted to the POS terminal directly, or it may be sent back (pulled) to the originally-preferred wallet application 112 through SDK/API 116 "Paywithurbank" communication standards, and the first FI wallet 112 can route a suitably-configured transaction payment data set to the POS terminal. A similar process can be applied in-app payments originated from a merchant or other application 114, 115, as well.

Figure 16:
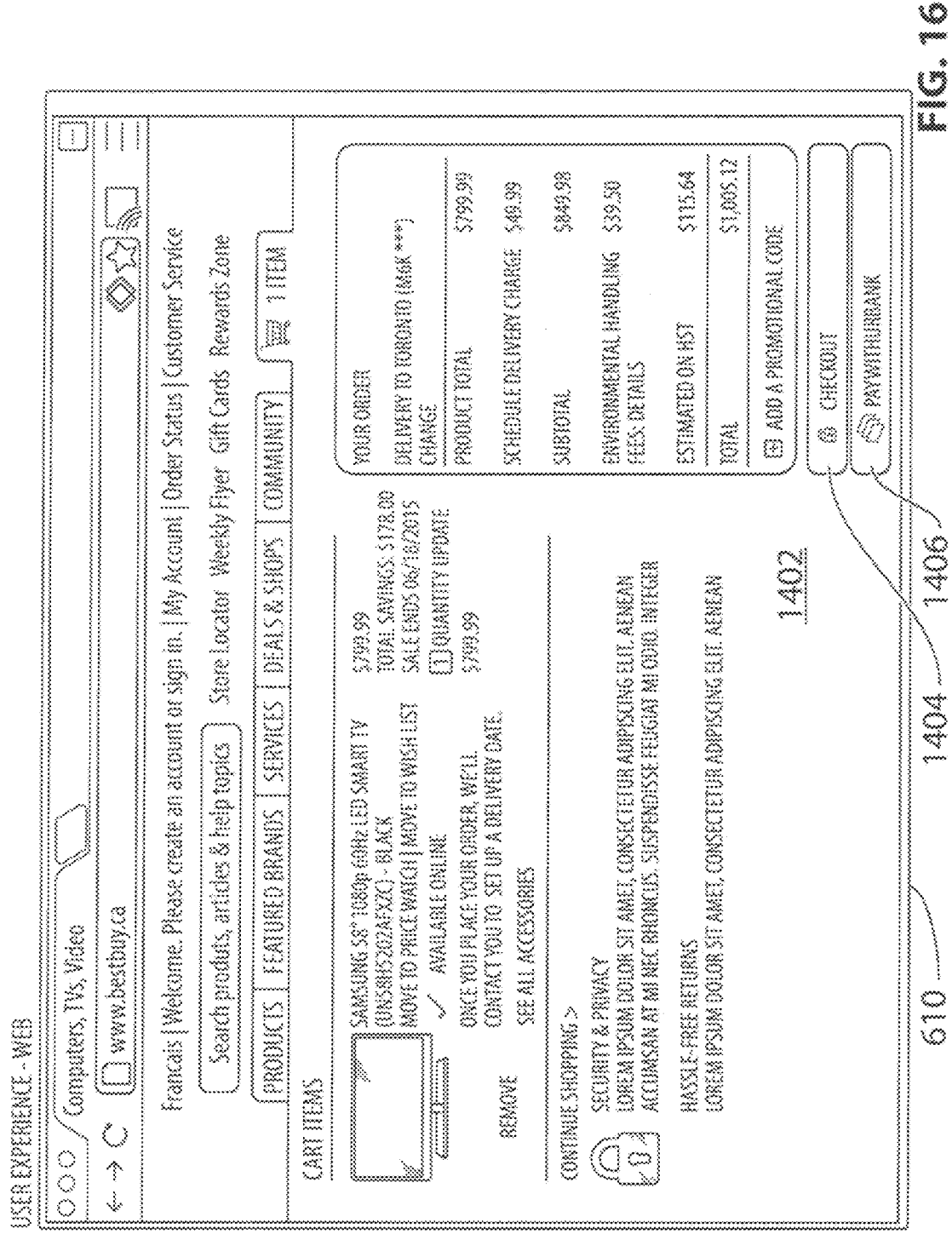
FIG. 16 is a schematic diagram of a further embodiment of a graphical user interfaces adapted for use in implementing various aspects and embodiments of the invention.

As previously noted, many aspects and embodiments of the invention can be implemented on desktop or other non-mobile or semi-mobile devices 110, as well as on smart phones, smart jewelry or other wearable devices, tablet computers, or other mobile devices 110. In such implementations web browsers can be used in conjunction with merchant systems 130, wallets 112, and payment options APIs 116, etc. to generate and display payment options GUIs 1407, 1402, as shown in FIG. 16. Such GUIs can be adapted to provide any or all of the functionalities described, for example, in connection with FIGS. 14A-F.

In other cases, such as where the wallet application 112 is only storing one payment credential or where a default payment method has been set, upon verification of the merchant certificate, the merchant application 114 may automatically pull 1320 such payment token from the wallet application. In some cases, however, the merchant's certificate may not be used to query a mobile wallet application as part of an authentication process to retrieve and/or obtain payment token(s), and the merchant or application may directly access a mobile wall application or other location where token(s) are stored.

Still referring to FIG. 13, following selection of one or more payment tokens and/or payment resource credentials designated by the user 190 for use in completing the mobile or other payment, the merchant application 114 may generate a transaction authorization request data set comprising, for example, a payment (secure) token reference in the form of data representing the designated token(s) (or a reference to an IP address at which the token may be located), and/or other payment source(s) (e.g., payment account identifiers), together with data identifying the merchant account designated for receipt of the payment, any routing or special instructions, etc; and at 1325 may the transaction authorization request data set through a merchant backend to a payment gateway along with other transaction specific information. The payment gateway may process 1330 the transaction differently according to the different factors, such as the payment method represented by the included token, and whether or not the user's device and/or the merchant has been authenticated by a trusted platform. For example, debit transactions may be routed directly to an issuer and settled 1335 with the user's bank. Alternatively, some credit card transactions may be routed first to an acquirer before ultimately being settled 1335 with an issuer. In some cases, credit card transactions may instead be routed directly to an issuer to be settled 1335, for example, where such authorization has been granted by a trusted platform. This may, for example, be accomplished by either the trusted device 110' or the merchant causing a payment message that represents a credit card payment to appear as a payment message representing an alternate form of payment, such as an Interac™ transaction, which is thereby routed directly to an issuer bank instead of to an intermediary or fourth party processor, such as an acquirer. Other options for processing and settlement of mobile or desktop transactions, including where a trusted merchant routes payments directly to an insurer bypassing a payment network altogether, are as described herein.

Figure 15A:
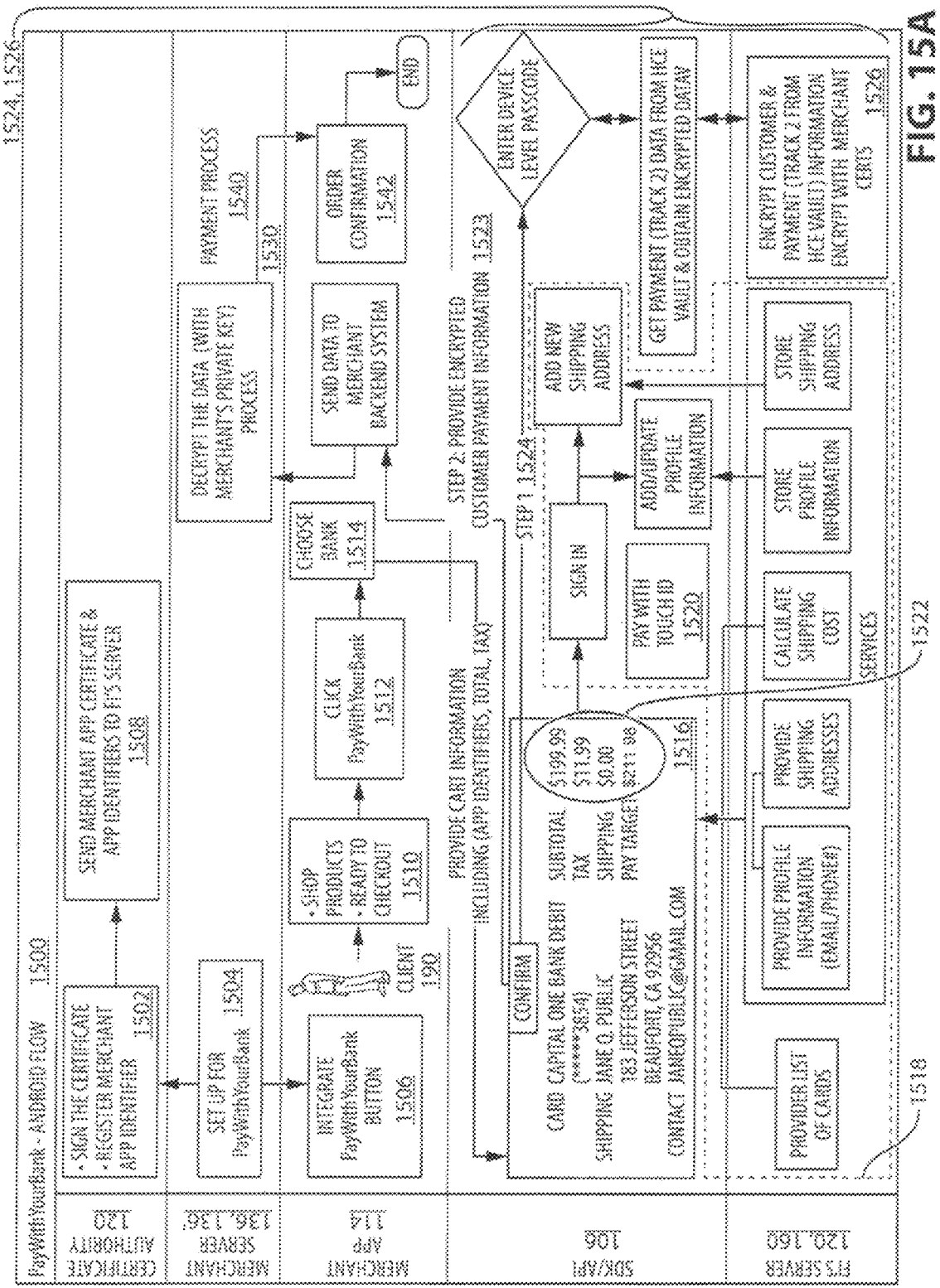
FIGS. 15A and 15B show schematic diagrams representing embodiments of systems and data flows within systems in accordance with the invention.

Another example of a payment process 1500 for enabling and otherwise implementing a payment transaction is shown in FIG. 15A. Like process 1300, process 1500 enables a purchaser 190 to select any one or more of a variety of payment options in completing a payment transaction.

Process 1500 can begin at 1502 with a merchant registering or certifying a merchant system 136 with one or more FSPs 160 and/or trusted platforms 120, to create a trusted merchant system 136', as described herein. Registration of the merchant system 136' can include provision, by the certifying FSP 160, to the merchant system 136 of a certification data set comprising any useful or otherwise suitable identifiers, public/private or other securities, etc., for use by the merchant system 136' in authenticating it status as a registered, or trusted, merchant.

Having registered (i.e., certified) the merchant system 136', at 1504 the merchant can create or otherwise acquire one or more suitably-configured merchant shopping applications 114 and/or common HCE payment options SDKs/APIs 116, configured to enable a user 190 of a device 110, 110' to be able to shop the merchant's website or brick and mortar premises and thereby generate transaction request authorization data sets as described herein. The merchant system 136' can further cause such merchant shopping application(s) 114 and/or common HCE functionality APIs 116 to be provisioned, at 1506 to one or more user request communication device(s) 110, 110' as described herein. In addition to enabling the user to shop the merchant's offerings and generate transaction authorization request data sets, the application 114 and/or SDK/API 116 can enable, among other things, a provisioned user device 110, 110' to generate and display an interactive 'paywithyourbank' graphical device 1406 in circumstances and conditions described herein. Merchant applications 114 are configured to operate in conjunction with universal wallet SDKs/APIs 116 and the merchant's POS, mPOS, and website systems 132, 134, 136, 136' to facilitate user shopping processes as described herein.

In many cases, processes 1502, 1504 will be completed in a manual or semiautomated fashion, by accessing a server 120, 160 associated with a bank or other FSP and entering suitable identifiers and data. In such cases a merchant system 136, 136' can be provided with public and/or private security keys to be used in generating and provisioning SDKs/APIs 116 to user devices 110, 110'.

As noted, at 1508, a registered/certified merchant system 136' can be provided by the certification/registration platform 120 with certification data sets comprising suitably-adapted certification/registration identifiers, for provisioning to the merchant and to FIs and/or FSPs associated with the merchant, users 190 of the device(s) 110, 110', and/or trusted platform 120.

At 1510, a user 190 of a mobile or non-mobile request communication device 110, 110', using the merchant application 114, can shop the merchant website and/or brick and mortar store, using the provisioned merchant app(s) 114 to assemble a transaction authorization request data set comprising data representing one or more items and/or services to be purchased, leased, etc. When ready to check out (i.e., complete a transaction), the user 190, can initiate a checkout process by making appropriate inputs to the merchant app 114, thus causing the user to be presented by his/her device 110, 110' with a checkout GUI 1402 such as that shown at FIG. 14A, which may for example include all or portions of information represented by the transaction authorization request data set, such as a list of item(s) to be purchased, price, tax, shipping/delivery information, etc., and one or more selectable or otherwise interactive items 1404, 1406.

At 1512, the user 190 can select a 'pay with your bank' item 1406, as described herein, and thereby invoke or initiate processing by the universal wallet API 116, in turn causing a default or otherwise selected designation as to one or more sources of payment funds or value to be applied toward payment ('payment resources'), as described herein. For each FI/FSP 120, 160 associated with a designated payment resource, the SDK/API 116 can cause at 1516 information pertaining to the proposed transaction, for example a purchase price, or portion thereof, to be satisfied from the designated payment resource(s) and optionally subtotal purchase prices, applicable taxes, shipping costs, and item identifiers, etc. (e.g., some or all of data included in the generated transaction request data set), to be forward to the corresponding FI or FSP 120, 160, as part of a transaction authorization data set. Alternatively, with respect to a transaction authorization request originating from a trusted request communication device 110', some or all data items used in generating a transaction authorization request data set may be provided by the FI or FSP 120, 160, using stored data associated with the user 190 and/or designated transaction fund account, as shown at 1518. As a further option, the user 190 and/or user device 110, 110' may be enabled to provide information to be stored in a user profile associated with the user for future use, and/or update specific data items. As shown at 1520, such automated data population and/or profile update processes can be protected by user login, using password/PIN entry, device tapping, biometric processes, etc., as described herein.

At 1512 also, the FI 120, 160 can share some or all of the 'shopping cart' (i.e., transaction or transaction authorization request data set) information received, generated, and/or updated at 1516 with the corresponding merchant, for verification processes, etc.

At 1524, the SDK/API 116 can cause the transaction or transaction authorization request data set, corresponding to the whole or partial purchase amount of the transaction price to be satisfied using the designated funds to be forwarded in a secure manner to the FI/FSP 120, 160 responsible for the payment resource account(s). Conditioned upon verification by the responsible FI/FSP 120, 160, that sufficient funds or credit, etc., are available in the designated payment account(s); the FI/FSP can generate a (secure) transaction authorization data (optionally in accordance with one or more preferences or criteria provided by an associated user 190 and applied by the FI/FSP 120, 160) set to be returned to the SDK/API 116. Such transaction authorization data set, which is preferably secure, can comprise any data acceptable to merchant 136, 136, and/or t the FI(s)/FSP(s) responsible for administration of the merchant's receipt accounts, for confirming that payment is authorized. Such information can, for example, include any or all of secure payment token(s), secure payment token reference(s), intra-FI payment confirmation(s) (for 'on us' transactions), or settlement confirmation as instructions.

Thus, at 1526 a verified transaction payment data set, including for example an authorized payment amount and optionally identifiers associated with the registered merchant 136, 136' can be generated, and at 1528, the verified transaction data set generated at 1524 can be returned to the device 110, 110', by means of the SDK/API 116, and forwarded by the SDK/API 116 to the merchant application 114, and thence, at 1530, to the merchant system 136, 136', for decryption and/or other processing at 1540, including application toward the transaction; and at 1542 the merchant system 136, 136' can return an order confirmation data set to the merchant app 114, for presentation to the user via an output display device 610, storage on the device, or other processing.

In some embodiments of processes 1500, at 1512-1514 the user 190 can be presented by the merchant app 114 with a variety of payment options, as shown in for example FIG. 14E and/or otherwise described herein.

In the same and other embodiments, as shown in FIGS. 14C and 14D, and described both above and below, the user 190 can be presented with interactive GUIs 1407 which enable the user to designate, select, and control payments using multiple payment sources.

Figure 15B:
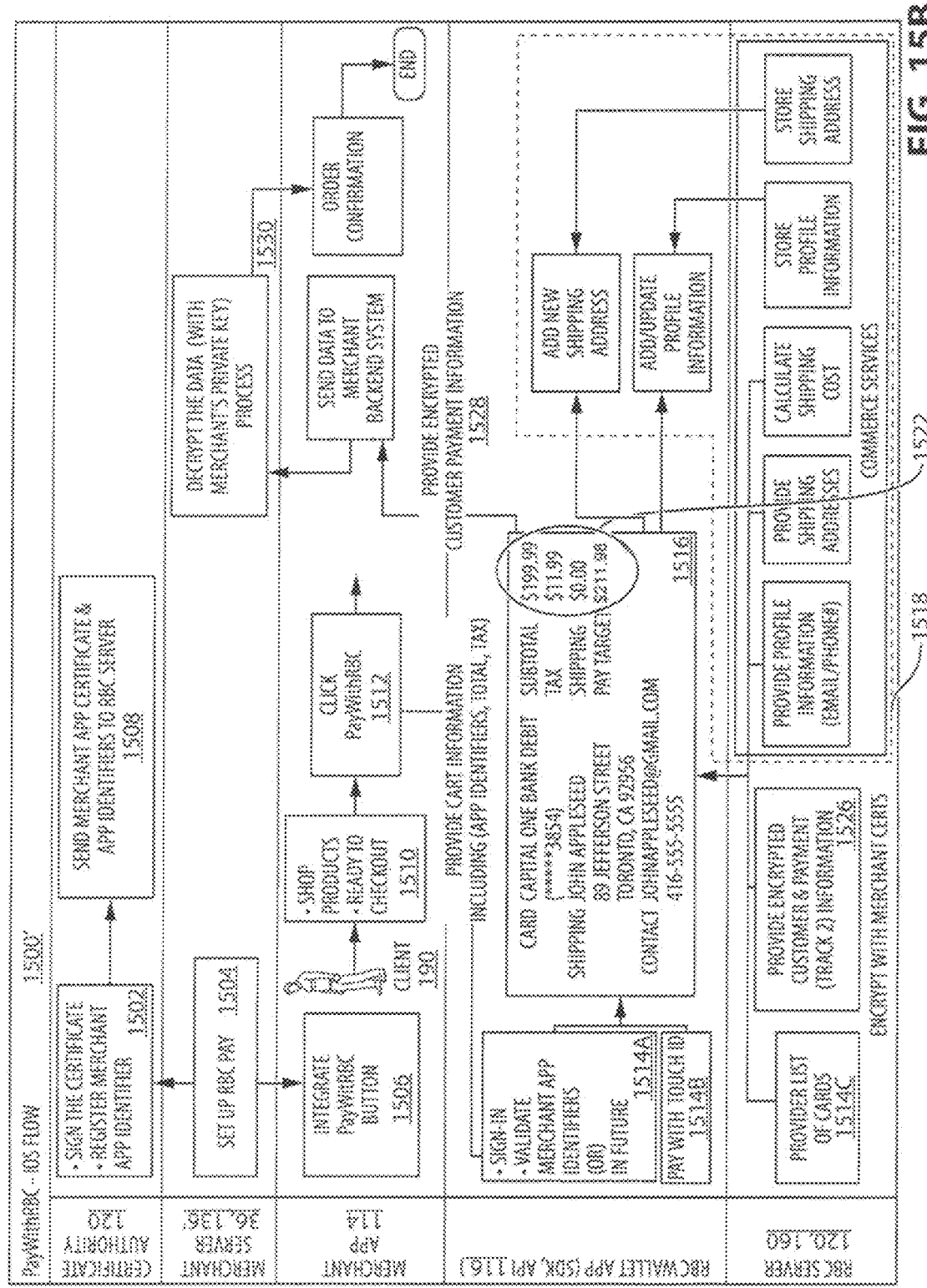

A variation 1500' of process 1500 shown in FIG. 15A is shown in FIG. 15B. In the embodiment shown in FIG. 15B, process 1500, 1500' proceeds in a fashion generally similar to that of FIG. 15A, except that the process 1514 comprising steps 1514A and 1514B of generating and displaying a GUI 1407 showing a plurality of payment options 1486 available to the user is executed by the SDK/API 116, rather than the merchant app 114. As further shown 1514C in FIG. 15A, data representing a plurality of available payment options can be stored securely by a trusted server 120, 160, and provided to the device 110, 110' via the SDK/API 116.

As previously noted, the invention enables a number of novel types or modes of processing of settlement payments, including modes in which a trusted transaction processor 120, 920 can associate one or more default or other user-designated accounts, such as a line of credit or other credit account, with transaction requests generated by a user device 110' and/or associated with specific transaction requests type(s), based on a variety of criteria, including for example user identity, merchant identity, account characteristics (including the identity of any FIs associated with the account(s)), and/or user preference(s).

For example, as previously noted, an issuer 160, 960 (such as a bank or other financial institution) may extend a line of credit to a customer 190, or if one or more conditions are satisfied increase a limit associated with an existing line of credit, and by agreement with the user use the line of credit as a source of funds for settlement of a transaction, as between one or more merchants and the user, and thereafter apply funds from another account associated with the user to repay the issuer 160, 960. The use of such credit-based transaction payment funding sources is some times referred to as the application of "real-time credit" processes.

As further noted above, the invention also offers the ability for users 190 to draw on multiple sources of transaction funds and/or other payment sources, which sources can be held, administered and/or otherwise controlled by single or multiple financial intuitions and/or other financial services providers, and used jointly by purchasers 190 to satisfy transaction payments. Such use of multiple transaction payment funding sources is sometimes referred to as the use of "split pay" processes.

Examples of the use of systems in accordance with the invention to implement both real-time and split-pay processes are described in connection with FIGS. 17-22.

Figure 17:
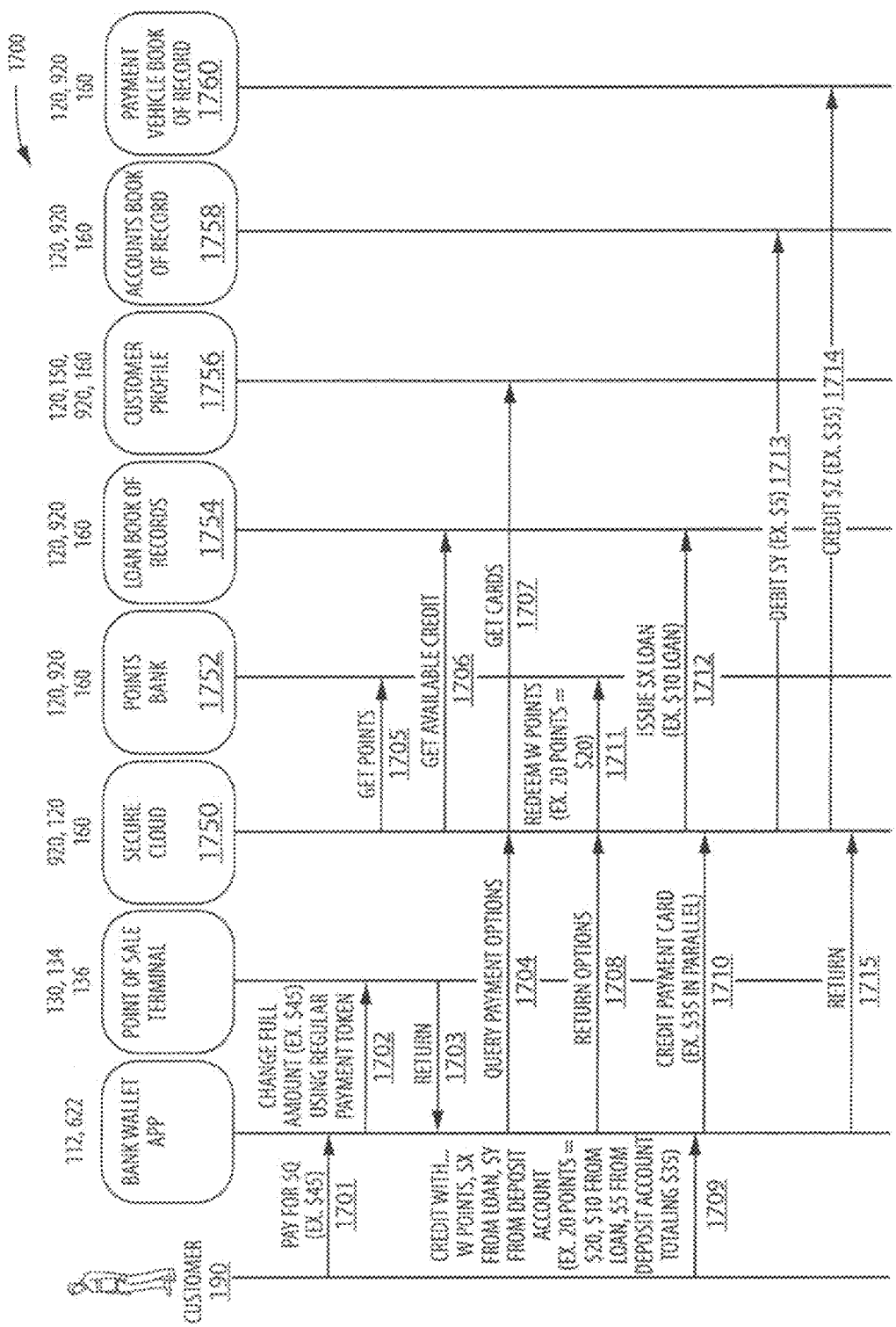
FIG. 17 is a schematic diagram showing representative signal exchanges between components of systems for secure processing of electronic payments in accordance with the invention.

FIG. 17 shows a representative set of signal exchanges between components 110, 110', 120, 130, 150, 160 of systems 100, 900 adapted for implementation of a split pay, real-time credit process 1700 in accordance with the invention. Process 1700 is described with further particular reference to FIG. 18A, which depicts further specific suitable example of a system 100, 900 consistent with the other such systems shown and described herein.

In the embodiment shown, process 1700 enables payment by a user 190 of a device 110, 110' for a transaction using one or more interim funding sources (sometimes referred to as "payment vehicle(s)"), and ultimate settlement using one or more of the same or other funding sources, through the use of his/her virtual wallet application 112, 622. The interim funding can be used, for example, to satisfy a merchant or vendor in real time at the time of sale, while settlement funding between the purchaser and his or her bank(s) or other FI(s) can occur at the same time or at any desired subsequent time. For example, interim payment can be charged to a one-time or persistent charge account, with settlement being made later out of one or more debit, credit, and/or points accounts, etc.

Process 1700 of FIG. 17 can be considered to begin at 1701 when a user 190, who has for example been shopping in a brick-and-mortar store, approaches a merchant POS terminal 130, 134 with a mobile network transaction communication device 110, 110' and one or more items the user wishes to purchase. The user 190 can, for example, access a virtual wallet application 112, 622 installed on or otherwise accessible by the device 110, 110' as described above, and, as described above, use input/output devices 610 and GUIs 1407 of the device 110, 110' to negotiate a purchase with the merchant POS system 134 and/or merchant system 130, the negotiation culminating in the identification of one or more items and price(s) to be paid, and a total transaction purchase price. When the user 190 is satisfied and ready to pay, the user can select an interactive GUI device "check out" or "ready to pay" displayed on a device screen 610 (see for example FIG. 14A) and thereby cause the device 110' to generate and route to the virtual wallet application 112, 622 a transaction execution command authorizing payment to the merchant system 130, via the wallet application, of funds sufficient to satisfy a transaction amount payable to the merchant. In the example shown, the user 190 has authorized payment of $45 for goods and/or services provided by a merchant via POS device 136, 136.

At 1702, the wallet application 112, 622 can generate and route to the POS terminal 134, 136 a merchant transaction payment authorization data set, or other transaction payment command comprising a prepaid payment token or instructions to charge the amount to an interim payment funding source (or "payment vehicle") usable by the merchant system 130 for presentation to an FI 120, 160 for payment in full satisfaction of the transaction. Such token can represent authorization to charge the amount against one or more credit, debit, credit, points, or other funds sources, as described herein. At this point the merchant system 134, 136, 130 can, at 1703, generate and route to the user's transaction communication device 110, 110' a transaction confirmation data set, issue a paper receipt, or provide other acknowledgement of completion of the transaction, and release the user 190 to leave the premises with the goods/services, etc.

At 1704, the user's wallet application 112, 622 can begin a process 1704-1708 of polling all payment options associated with the user 190, transaction communication device 110, 110', etc., and available for application to satisfy payment for the transaction, and returning to the user's device 110, 110' a payment options data set listing or otherwise representing the available options. As described above, for example, such a listing can comprise identifiers associated with available accounts and the value of funds or fund equivalents (eg. rewards points value) available for application to the purchase. Optionally, such list can be generated by application 112, 622 and/or FI 120, 920, 160 in accordance with preferences and/or other criteria specified by user(s) 190 authorized to control use of funds associated with various accounts or funding sources, as described herein.

For example, at 1704 the user's wallet application 112, 622 can generate a transaction payment funding source query data set, comprising signals representing instructions to an issuing bank or other FI or FSP 1750, 120, 920, 160, associated with the user's wallet 112, 622 to poll all FIs associated with accounts available to the user 190 and/or device 110, 110', as described above, and can route the query to the transaction processing system 1750 associated with such FI or FSP. In the example shown, the associated FI or FSP's transaction processing system 1750 is labelled "Secure Cloud."

At 1705, the FI 1750 associated with the user's wallet application 112, 622 can access a device or user profile data set associated with the inquiring user 190 and/or device 110, 110', to identify all potential funding sources available for application in satisfying settlement of the transaction executed at process 1701-1703; and can apply any previously-designated user preferences, or other criteria to identify one or more preferred funding source accounts, or combinations thereof. For example, as shown in FIG. 17, at 1705 the associated transaction processing system 1750 can route available points query data set(s) comprising signals interpretable by transaction processing system(s) 120, 160, 1752 "Points Bank"(s) as executable instructions to check to one or more transaction administering one or more customer loyalty, gift, or other cash-equivalent points accounts associated with the user 190 and/or device 110, 110'; and can receive from such system(s) 1752 points available data set(s) comprising data representing a number of points and/or cash value available through such points system(s) for application to the executed transaction.

Similarly, at 1706 the associated transaction processing system 1750 can route to one or more transaction processing systems 1754, 120, 920 "Loan Book(s) of Record," which administer loan, line of credit, or other credit facilities or accounts associated with the user 190 and/or device 110, 110', available credit queries comprising signals interpretable by the system(s) 1754 as executable instructions to check available credit balances; and can receive from such system(s) 1754 credit available data set(s) comprising data representing amount(s) of funds available through such credit facilities or accounts.

Similarly, at 1707 the associated transaction processing system 1750 can route to one or more transaction processing systems 1756, 120, 920 "Customer Profile(s)," which administer customer profile or other data sets comprising data representing identifiers associated with debit or on-demand cash accounts associated with the user 190 and/or device 110, 110' and available for application as payment funding sources against the transaction 1701-1703 and interpretable by the system(s) 1756 as executable instructions to check value(s) of funds available for such purposes; and can receive from such system(s) 1756 funds available data set(s) comprising data representing amount(s) of funds available through such accounts. Such customer profiles 1756 can be stored on, or accessed by, any user device(s) 110, 110', and/or other transaction processor(s) 120, 160, 920, 150, 130, etc., suitable for use in accomplishing the desired level(s) of availability and/or security.

Having polled all available potential funding sources and optionally applied any user- or FI-specified preferences or criteria, at 1708 the associated transaction processing system 1750 can use the received points available data set(s), credit available data set(s), and funds available data set(s) received at 1705, 1706, 1707, to generate a transaction payment funding source option data set, and return it to the requesting wallet application 112, 622.

Figure 18A:
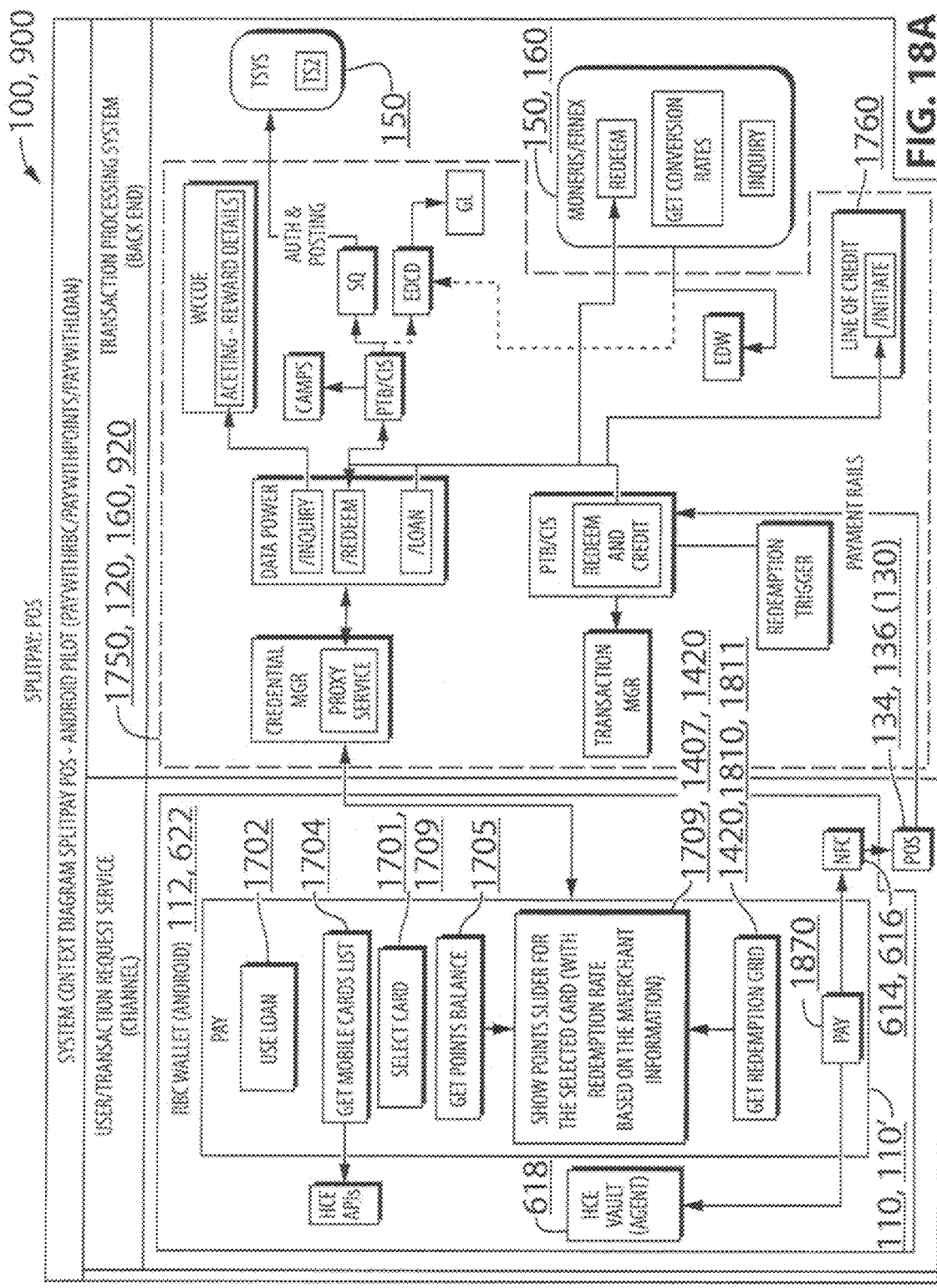
FIG. 18A is a schematic representation of an example system and process flow suitable for use in processing data in accordance with aspects of the disclosure.
Figure 18B:
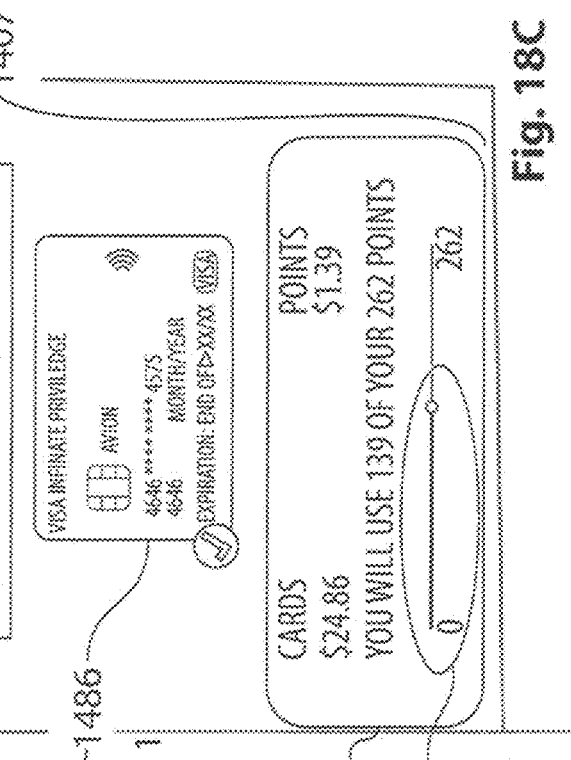
FIGS. 18B and 18C show embodiments of graphical user interfaces adapted for use in implementing various aspects and embodiments of the invention.
Figure 18C:
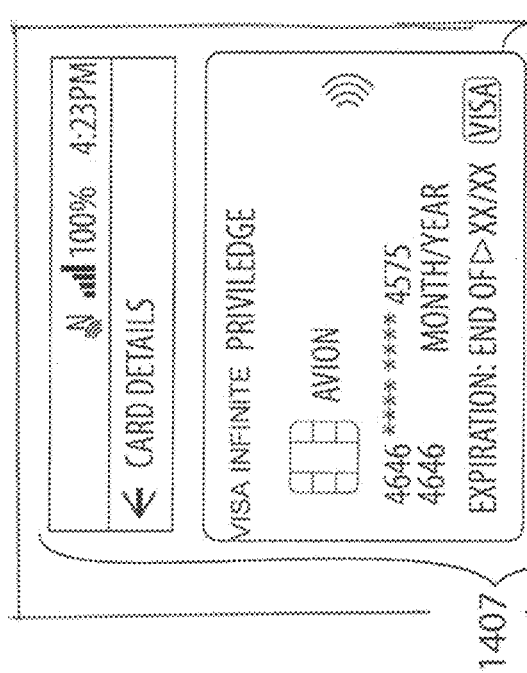

Upon receipt, the requesting wallet application 112, 622 can cause the device 110, 110' to generate and display for the user 190 a GUI comprising items 1404, 1406 representing payment options available to the user of the device 110', as shown for example, in FIG. 14B, FIG. 14E, and FIGS. 18B and 18C. In FIG. 18B, for example, UI items 1486 and 1810 are shown, indicating that an "AVION®" Visa® card account and a rewards account having a value of 262 points and $104.83 are available for application to the purchase. UI items 1811 and 1812 are also provided in the embodiment shown in FIG. 18B; item 1811 allows the user 190 to refresh the points information in case additional points have recently been made available for the transaction; and item 1812 can be used to access further information about the rewards account and points.

At 1709, the user 190 can use items 1404, 1406, 1486, 1810, etc. of the GUI 1407 to confirm or otherwise designate one or more accounts or other transaction payment funding sources to use in settling with the transaction processor(s) 1750, 120, 160 that settled the transaction at 1701-1703, and thereby cause the wallet app 112, 622 to generate a transaction settlement data set or transaction authorization request data set comprising data representing at least a transaction amount payable in satisfaction of the transaction, the one or more desired transaction payment funding sources, and a portion of the transaction amount payable to the merchant to be funded using each of the plurality of transaction payment funding sources. For example, in the example shown in FIG. 17, the user uses input/output devices 610 to generate instructions indicating\that the user wishes to apply $10 from a loan account (such as the Visa account shown at 1486 in FIG. 18B), $5 from a deposit account, and $20 in rewards points. The user can do so by, for example, using an interactive slider graphical device 1422 to determine how much of the funding is to be drawn from the debit or credit "card" account and how much from the rewards point balance.

At 1710, the user can select a "pay" item 1472 (FIG. 14F), 1870 to cause the wallet app 112, 622 to route the transaction settlement data set or transaction authorization request data set to the transaction processing system 1750 associated with the wallet app 112, and thereby cause the system 1750 to accumulate funds from the source(s) identified in the transaction settlement data set, in the amounts indicated by the user 190, and apply them against the interim payment transferred at 1702-1703.

At 1711-1713, for example, the transaction processor 1750 can generate and route instructions for redemption of points (1711), issuance of a loan/credit charge (1712), and transfer of funds (1713), and at 1714 apply the accumulated funds against the charge of 1702-1703 by crediting the account 1760 from which the interim payment was drawn, thereby and thereby cause the payment funded using the interim payment funding source to be satisfied using the plurality of payment funding sources.

At 1715, the transaction processor 1715 can generate and route to the wallet app 112, 622 a transaction settlement confirmation data set, comprising any useful or otherwise desirable data concerning transaction and payment details.

As previously noted, and as will be appreciated by those skilled in the relevant arts, once they have been made familiar with this disclosure, in any of the embodiments disclosed herein, above and below, any or all of secure cloud system 1750, points bank system 1752, loan book of record system 1754, customer profile 1756, accounts book of record 1758, and payment vehicle book of record 1760 can be operated or administered by a single transaction processor or FI 120, 160, 920, or by multiple processors 120, 160, 920.

Thus, in various aspects and embodiments the invention provides network transaction communication devices 110, 110', each such device comprising at least one user input device 610; at least one near-field or other short-range communication system 614, 616; at least one network or long-range communication system 612; at least one data processor 602; and at least one persistent memory device 604, 608, 618, the at least one persistent memory device comprising stored, machine-interpretable instructions adapted to cause the at least one data processor to: use signals generated by the at least one user input device and signals received from a merchant transaction system 130, 134, etc. via the at least one near-field communication system 614, 616 to generate a requested transaction data set, the requested transaction data set comprising at least an identifier associated with a merchant and a transaction amount payable to the merchant; in response to further signals generated by the at least one user input device 610, generate a transaction authorization request data set comprising data representing at least the merchant, the transaction amount payable to the merchant, at least two transaction payment funding sources, and a portion of the transaction amount payable to the merchant to be funded using each of the plurality of transaction payment funding sources; and using at least one of the at least one network communication system 612 and the near field communication system 614, 616, route the transaction authorization request data set to a transaction processing system 120, 120'.

Further, in various aspects and embodiments the invention provides transaction processing systems 120, 160, 920, 1750, etc., each such system comprising: at least one network communication system, at least one data processor; and at least one persistent memory device, the at least one persistent memory device comprising stored, machine-interpretable instructions adapted to cause the at least one data processor to: using the at least one network communication system, receive from a network transaction communication device a transaction authorization request data set, the transaction authorization data set comprising data representing at least an identifier associated with a merchant, a transaction amount payable to the merchant, identifiers associated with a plurality of transaction payment funding sources, and a portion of the transaction amount payable to the merchant to be funded using each of the plurality of transaction payment funding sources; using the data representing identifiers associated with the plurality of transaction payment funding sources and the portion of the transaction amount payable to the merchant to be funded using each of the plurality of transaction payment funding sources, verify the availability of funds associated with each said source sufficient to cover each corresponding portion; and using the same or another network communication system, route to at least one of the network transaction device and a merchant transaction system associated with the merchant at least one transaction payment authorization data set, the transaction payment authorization data set comprising data representing authorization for payment of the transaction amount payable to the merchant.

Figure 19:
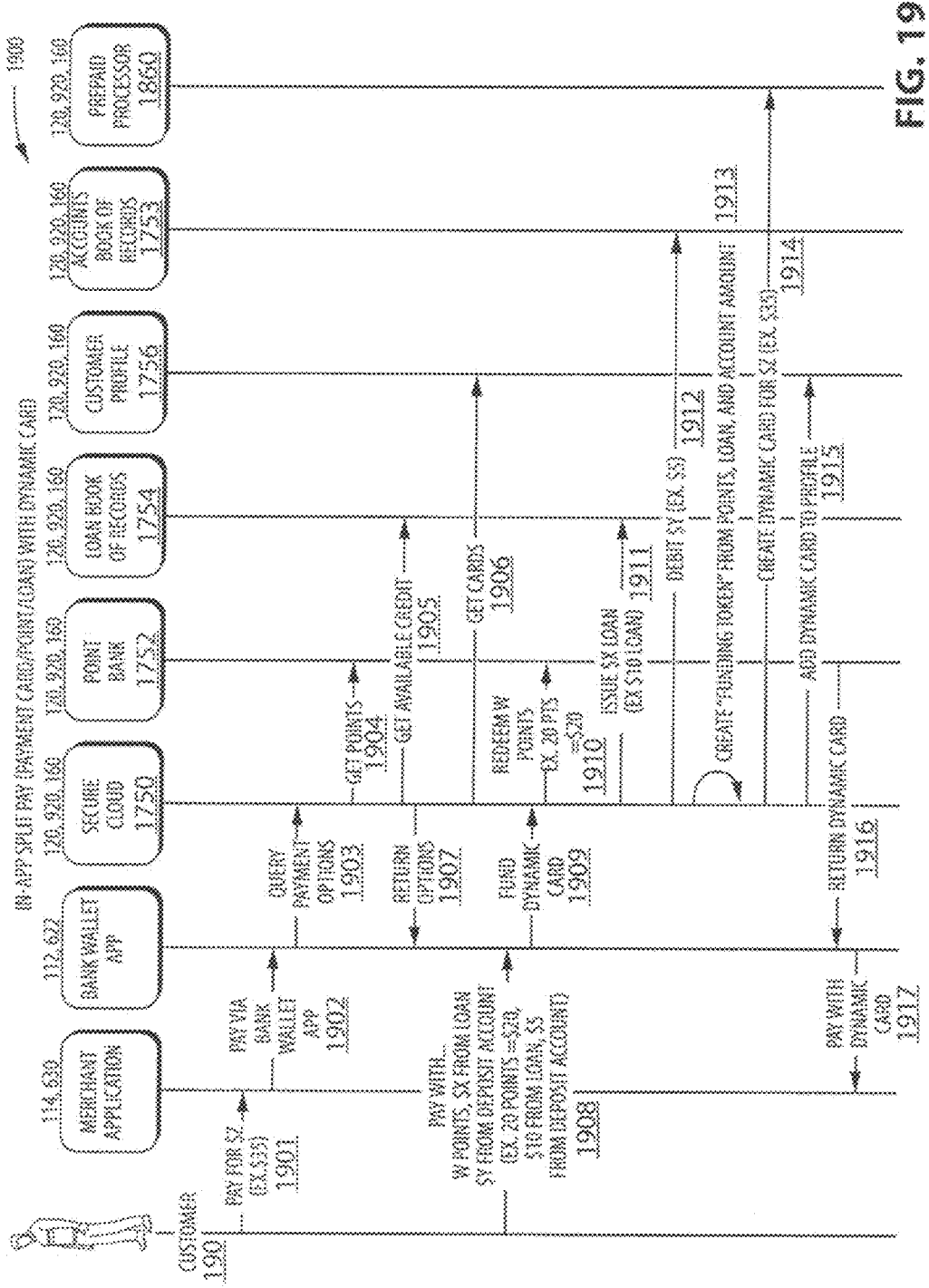
FIG. 19 is a schematic diagram showing representative signal exchanges between components of systems for secure processing of electronic payments in accordance with the invention.
Figure 20:
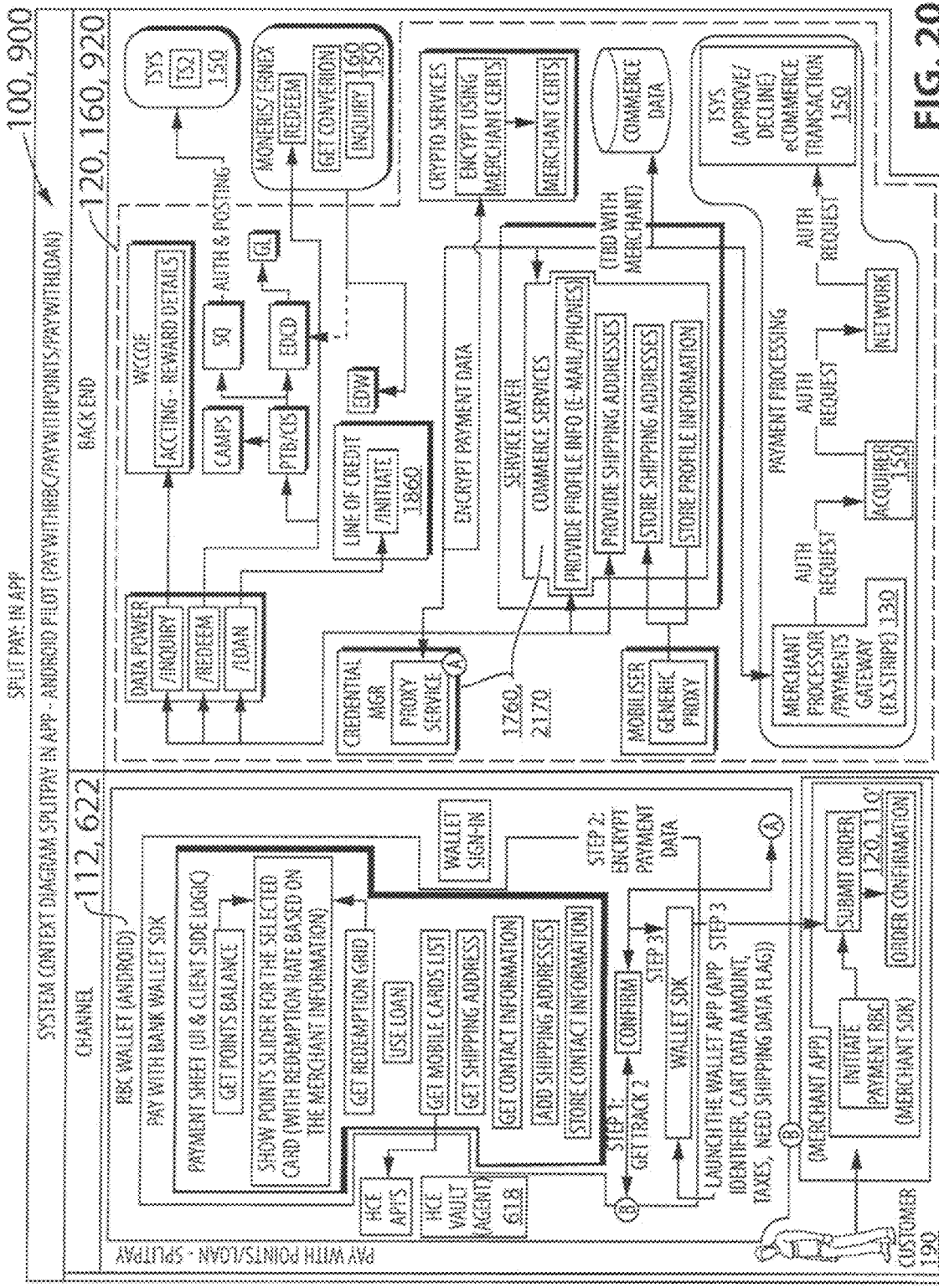
FIG. 20 is a schematic representation of an example system and process flow suitable for use in processing data in accordance with aspects of the disclosure.

FIG. 19 shows a representative set of signal exchanges between components 110, 110', 120, 130, 150, 160 of systems 100, 900 adapted for implementation of a split pay, real-time credit process 1900 in accordance with the invention. Process 1900 is described with further particular reference to FIG. 20. FIG. 20 is a further specific suitable example of a system 100, 900 consistent with the other such systems shown and described herein.

In the embodiment shown, process 1900 enables payment by a user 190 of a device 110, 110' for a transaction using one or more "funding tokens" generated dynamically (in real time) to settle payment for a transaction, using multiple debit, credit, points, and/or other funding sources through the use of dynamic card emulators (e.g., dynamic HCEs). Such processes can be used, for example, to enable a purchaser 190 to pay a merchant system 130 for a transaction using one or more funding sources—including, for example, rewards points—that the merchant system 130 is not configured to recognize or accept. Such processes can be thought of, for example, as using one type of funding as a proxy for another.

Process 1900 of FIG. 19 can be considered to begin at 1901 when a user 190, who has for example been shopping online using a transaction communication session established between a merchant application 114, 630 installed on a mobile and/or desktop device 110, 110' and a merchant online shopping system 130, completes a process of identifying one or more items to be purchased, and price(s) to be paid, and a total transaction purchase price to be paid to the corresponding merchant system 130, 136. When the user 190 is satisfied and ready to pay, the user can select an interactive GUI device "check out" or "ready to pay" displayed on a device screen 610 (see for example FIG. 14A) and thereby cause the device 110, 110' to generate and route to the merchant application 114, 116 a transaction execution command authorizing payment to the merchant system 130, via the wallet application, of funds sufficient to satisfy the transaction payment amount payable to the merchant. In the example shown, the user 190 has authorized payment of $35 for goods and/or services provided through the merchant application 114, 630.

At 1902, the merchant application 114, 630 can forward the transaction execution command authorizing payment to the bank wallet application 112, 622, for the addition of any further required information and/or processing useful for interpretation of the command by a transaction processor 1750 associated with the bank wallet application and thereafter for use in executing the requested transaction. As previously explained, execution commands suitable for use in implementing payment processes disclosed herein typically comprise data representing one or more identifiers associated with the merchant system 139 with whom the transaction is being conducted, the user 190 and/or device 110, 110' originating the transaction, the transaction payment purchase price to be paid, and optionally the individual transaction being conducted. In addition, such commands can and typically do identify one or more accounts or other sources of funds to be used in satisfaction of the transaction, which may be identified by default or by selection of the user 190 at the time of the transaction.

At 1903, the user's wallet application 112, 622 can begin a process 1903-1907 of causing a transaction processor system 1750 associated with the wallet application 112, 62 to poll all payment options associated with the user 190, transaction communication device 110, 110', etc., and available for application to satisfy payment for the transaction, and returning to the user's device 110, 110' a payment options data set listing or otherwise representing the available options. As described above, for example, such a listing can comprise identifiers associated with available accounts and the value of funds or fund equivalents (eg. rewards points value) available for application to the purchase.

For example, at 1903 the user's wallet application 112, 622 can generate a transaction payment funding source query data set, comprising signals representing instructions to an issuing bank or other FI or FSP 1750, 120, 920, 160, associated with the user's wallet 112, 622 to poll all FIs associated with accounts available to the user 190 and/or device 110, 110', as described above; and can route the query to the transaction processing system 1750 associated with such FI or FSP. In the example shown, the associated FI or FSP's transaction processing system 1750 is labelled "Secure Cloud."

At 1904, the FI 1750 associated with the user's wallet application 112, 622 can access a device or user profile data set associated with the inquiring user 190 and/or device 110, 110', to identify all potential funding sources available for application in satisfying settlement of the transaction executed at process 1901-1902. For example, as shown in FIG. 19, at 1904 the associated transaction processing system 1750 can route available points query data set(s) comprising signals interpretable by transaction processing system(s) 120, 160, 1752 "Points Bank"(s) as executable instructions to check to one or more transaction administering one or more customer loyalty, gift, or other cash-equivalent points accounts associated with the user 190 and/or device 110, 110'; and can receive from such system(s) 1752 points available data set(s) comprising data representing a number of points and/or cash value available through such points system(s) for application to the executed transaction.

Similarly, at 1905 the associated transaction processing system 1750 can route to one or more transaction processing systems 1754, 120, 920 "Loan Book(s) of Record," which administer loan, credit card, line of credit, or other credit facilities or accounts associated with the user 190 and/or device 110, 110', available credit queries comprising signals interpretable by the system(s) 1754 as executable instructions to check available credit balances; and can receive from such system(s) 1754 credit available data set(s) comprising data representing amount(s) of funds available through such credit facilities or accounts.

Similarly, at 1906 the associated transaction processing system 1750 can route to one or more transaction processing systems 1756, 120, 920 "Customer Profile(s)," which administer customer profile or other data sets comprising data representing identifiers associated with debit or on-demand cash accounts associated with the user 190 and/or device 110, 110' and available for application as payment funding sources against the transaction 1901-1902 and interpretable by the system(s) 1756 as executable instructions to check value(s) of funds available for such purposes; and can receive from such system(s) 1756 funds available data set(s) comprising data representing amount(s) of funds available through such accounts.

Having polled all available potential funding sources, at 1907 the associated transaction processing system 1750 can use the received points available data set(s), credit available data set(s), and funds available data set(s) received at 1904, 1905, 1906 and optionally apply any user and/or FI-specified preferences or other criteria to generate a transaction payment funding source option data set, and return it to the requesting wallet application 112, 622.

Upon receipt, the requesting wallet application 112, 622 can cause the device 110, 110' to generate and display for the user 190 a GUI comprising items 1404, 1406 representing payment options available to the user of the device 110', as shown for example, in FIG. 14B, FIG. 14E, and FIGS. 18B and 18C. In FIG. 18B, for example, UI items 1486 and 1810 are shown, indicating that an "AVION®" Visa® card account and a rewards account having a value of 262 points and $104.83 are available for application to the purchase. UI items 1811 and 1812 are also provided in the embodiment shown in FIG. 18B; item 1811 allows the user 190 to refresh the points information in case additional points have recently been made available for the transaction; and item 1812 can be used to access further information about the rewards account and points.

At 1908, the user 190 can use items 1404, 1406, 1486, 1810, etc. of the GUI 1407 to designate one or more accounts or other transaction payment funding sources to use in settling with the transaction processor(s) 1750, 120, 160 that settled the transaction at 1701-1703, and thereby cause the wallet app 112, 622 to generate a transaction settlement data set or transaction authorization request data set comprising data representing at least a transaction amount payable in satisfaction of the transaction, the one or more desired transaction payment funding sources, and a portion of the transaction amount payable to the merchant to be funded using each of the plurality of transaction payment funding sources. For example, in the example shown in FIG. 19, the user uses input/output devices 610 to generate instructions indicating\ that the user wishes to apply $10 from a loan account (such as the Visa account shown at 1486 in FIG. 18B), $5 from a deposit account, and $20 in rewards points. The user can do so by, for example, using an interactive slider graphical device 1422 to determine how much of the funding is to be drawn from the debit or credit "card" account and how much from the rewards point balance.

At 1909 the user can select a "pay" item 1472 (FIG. 14F), 1870 to cause the wallet app 112, 622 to route the transaction settlement data set or transaction authorization request data set to the transaction processing system 1750 associated with the wallet app 112, and thereby cause the system 1750 to accumulate or otherwise confirm that funds from the source(s) identified in the transaction settlement data set are available for use in satisfying the requested transaction, in the amounts indicated by the user 190, and generate a funding token for use by the device 110, 110' in making payment to the merchant system 130.

At 1910-1912, for example, the transaction processor 1750 can generate and route instructions for redemption of points (1910), issuance of a loan/credit charge (1911), and transfer of funds (1912) in the amount specified by the user at 1908, and at 1913 use the funds to generate a funding token for payment of the merchant in satisfaction of the requested transaction. Such a token can comprise data representing a token value, for example a value corresponding to the transaction amount payable to the merchant, and one or more identifiers associated with one or more sources of the funds to be used to pay the merchant. Such fund source identifiers may be of any desired type(s), including for example any one or more codes associated with any debit, credit, and/or rewards accounts and/or protocol(s) acceptable to the merchant system 130, such as one or more accounts accessible in accordance with Visa, MasterCard, Interac, or other payment protocols. A particular advantage offered by this aspect of the invention is that the payment token can be coded in accordance with any payment protocol acceptable to the merchant system 130, regardless of the source(s) of the transaction payment funds. For example, a payment funded by one or more Visa, Interac, and Avion points accounts associated with a user 190 can be formatted as a MasterCard payment acceptable to the merchant system 130, with a suitably-formatted and entirely separate account number associated with a payment account administered by the system 1750 associated with the bank wallet application 112, 622.

A further advantageous feature of this aspect of the invention is that such an account number may be a single-use or single-user or "dynamic card" account number associated with a single transaction. This can, for example, aid in authorizing and tracking transaction, and in subsequent accounting; and provides an additional layer of security, in that such numbers are not associated with permanent or otherwise persistent account numbers. This feature also allows real-time credit account numbers to be "recycled," so that very large or infinite numbers of transactions may be processed in such fashion.

At 1914, signals representing suitable instructions for generation of a dynamic card representing the funding token generated at 1913 can be forwarded to a prepaid token processor 1860 for assignment of a dynamic credit account number and generation and return of the dynamic card (real-time credit) token to be routed to the merchant system 130 to satisfy payment on the transaction.

At 1915, a dynamic card number associated with the user 190, and/or any one or more accounts or devices associated with the user, may be added to the user's profile(s) data sets administered by the transaction processor 1750 and/or any other desired processors, so that the number may be used in future transactions, and readily associated with the user, device, etc.

At 1916 the dynamic card payment set can be routed to the user's bank wallet application and optionally reformatted as a transaction settlement data set or transaction authorization data set comprising any suitable authorization codes, the dynamic card (real-time credit) account numbers, etc., so that it is in a form suitable for acceptance by merchant application 114, 630 and use by merchant system 130 is processing the transaction payment.

At 1917, a transaction authorization data set comprising data representing suitable account identifiers, including for example any dynamic card account numbers, transaction payment amounts, etc., may be routed to the merchant application 114, 603 and/or merchant back-end systems 130, 136 for payment of the transaction, along with any other useful or otherwise desirable data concerning transaction and payment details, such as unique transaction identifiers, etc.

It will be noted in the description of process 1900 that real-time credit processes may be conducted with split-pay processes, as disclosed herein, or with transaction payment processes funded by single accounts or funding sources, as well as accounts identified as preferred on a dynamic basis, using preferences or other criteria identified by account or device users 190 and/or FI(s) 120, 160, associated with various accounts or combinations of accounts. Thus, in various aspects and embodiments the invention provides transaction processing systems 120, 160, 920, 1750, etc, adapted to receive from network transaction communication devices 110, 110' transaction authorization request data sets, the transaction authorization request data sets each comprising data representing at least an identifier associated with a merchant, a transaction amount payable to the merchant, and one or more purchase transaction funding sources; to use the identifier(s) associated with the merchant and the transaction amount payable to the merchant to cause to be routed to at least one of the merchant and the network transaction communication device a merchant transaction payment authorization data set, the merchant transaction authorization payment data set comprising data representing an identifier associated with an interim payment funding source for the transaction amount payable to the merchant; and to generate a transaction settlement data set comprising data representing an authorization to transfer to an account associated with the interim payment funding source, from an account associated with the purchase transaction funding source, compensation for a plurality of transaction payment funding sources and the portion of the transaction amount payable to the merchant to be funded using each of the plurality of transaction payment funding sources, and thereby cause a payment funded using the interim payment funding source to be satisfied using the plurality of payment funding sources.

As previously noted, a significant advantage offered by various aspects and embodiments of the invention is that users 190 can be enabled to use split-pay processes in order to access multiple payment accounts (funding sources) in order to fund purchases and other transactions. In addition, in various aspects and embodiments the invention offers the advantage of enabling the use of split-pay processes according to existing (e.g., conventional) payment processes, which are sometimes referred to as "on the payment rails" processes (see for example FIG. 4 and accompanying text.

In various embodiments, the invention enables at least two types of con the rails' split pay processes: the use of temporary accounts, including for example temporary, real-time credit accounts and processes, and the use of specially-adapted data sets in discretionary fields provided in payment transaction data sets according to conventional payment protocols.

Figure 21:
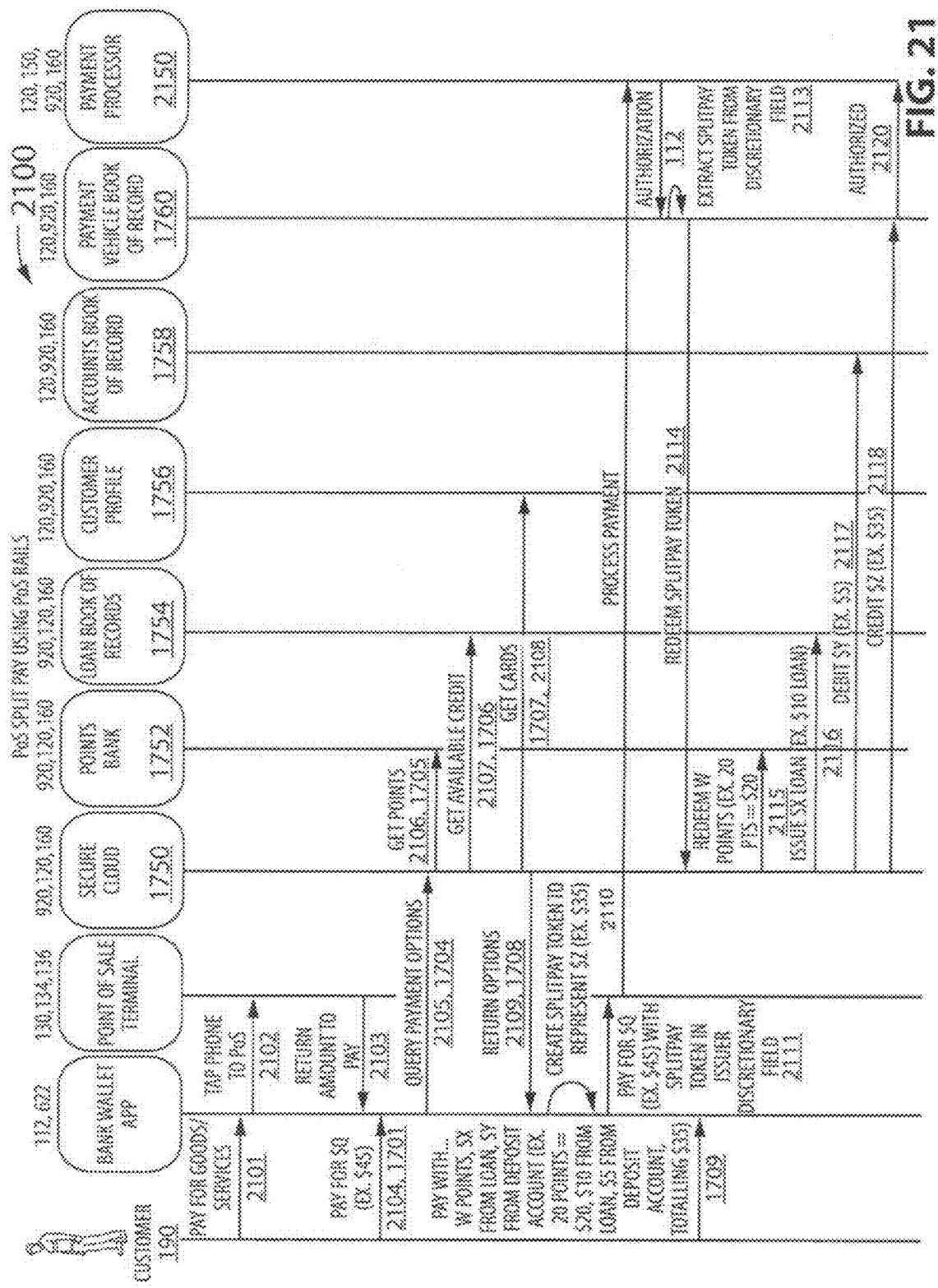
FIGS. 21 and 22 are schematic diagrams showing representative signal exchanges between components of systems for secure processing of electronic payments in accordance with the invention.

FIG. 21, for example, shows a representative set of signal exchanges between components 110, 110', 120, 130, 150, 160 of systems 100, 900 adapted for implementation of a split payment process 2100 in accordance with the invention. Process 2100 is described with further particular reference to FIG. 18.

In the embodiment shown, process 2100 enables payment by a user 190 of a device 110, 110' for a transaction using multiple funding sources by using his/her virtual wallet application 112, 622 to generate a transaction authorization request data set that comprises a single transaction payment funding source identifier, so that the payment may be processed by any merchant and/or FI transaction processing systems 130, 120, 160, 920, etc., in the same fashion as any conventional prior art single-funding-source payment, and sorted out for settlement by the user's bank or other FI. For example, a transaction payment based on a plurality of credit, debit, and or points funding sources may be presented with a single payment source identifier representing a credit card or other credit account, and processed accordingly for payment by a merchant system 130, with a single payment to the merchant system 130 being funded by multiple accounts without any awareness by the merchant.

In the embodiment shown, process 2100 can be considered to begin at 2101 when a user 190, who has for example been shopping in a brick-and-mortar store, approaches a merchant POS terminal 130, 134 with a mobile network transaction communication device 110, 110' and one or more items the user wishes to purchase. The user 190 can, for example, access a virtual wallet application 112, 622 installed on or otherwise accessible by the device 110, 110' as described above, and, as described above, at 2012 "tap" his device 110, 110' on an NFC terminal of a POS device 134, or otherwise cause virtual wallet 112, 622 to establish a transaction communication session and at 2103 receive from the POS a proposed transaction data set comprising data identifying, for example, one or more items and price(s) to be paid, the merchant system 134, 130, and a total transaction purchase price. The wallet application 112, 622 can thereafter generate and display on the device 110, 110' a user interface 1407 showing details of the proposed transaction, as described above.

When the user 190 is satisfied and ready to pay, at 2104 the user can select an interactive GUI device "check out" or "ready to pay" displayed on a device screen 610 (see for example FIG. 14A) and thereby cause the virtual wallet application 112, 622 at 2105, 1704 to begin a process 1704-1708 of polling all payment options associated with the user 190, transaction communication device 110, 110', etc., and available for application to satisfy payment for the transaction, and returning to the user's device 110, 110' a payment options data set listing or otherwise representing the available options. As described above, for example, such a listing can comprise identifiers associated with available accounts and the value of funds or fund equivalents (eg. rewards points value) available for application to the purchase.

Having polled all available potential funding sources, at 1708 the associated transaction processing system 1750 can for example use the received points available data set(s), credit available data set(s), and funds available data set(s) received at 1705, 1706, 1707 in conjunction with other criteria, including previously-designated user and/or FI preferences, to generate a transaction payment funding source option data set, and return it to the requesting wallet application 112, 622.

Upon receipt, the requesting wallet application 112, 622 can cause the device 110, 110' to generate and display for the user 190 a GUI comprising items 1404, 1406 representing payment options available to the user of the device 110', as shown for example, in FIG. 14B, FIG. 14E, and FIGS. 18B and 18C. In FIG. 18B, for example, UI items 1486 and 1810 are shown, indicating that an "AVION®" Visa® card account and a rewards account having a value of 262 points and $104.83 are available for application to the purchase. UI items 1811 and 1812 are also provided in the embodiment shown in FIG. 18B; item 1811 allows the user 190 to refresh the points information in case additional points have recently been made available for the transaction; and item 1812 can be used to access further information about the rewards account and points.

At 1709, 2110 the user 190 can use items 1404, 1406, 1486, 1810, etc. of the GUI 1407 to designate a plurality of accounts or other transaction payment funding sources to use in completing payment for the proposed transaction, and thereby cause the wallet app 112, 622 to generate a transaction authorization request data set comprising data representing at least a transaction amount payable in satisfaction of the transaction, identifiers associated with the plurality of desired transaction payment funding sources, and a portion of the transaction amount payable to the merchant to be funded using each of the plurality of transaction payment funding sources. For example, in the example shown in FIG. 21, the user uses input/output devices 610 to generate instructions indicating\ that the user wishes to apply $10 from a loan account (such as the Visa account shown at 1486 in FIG. 18B), $5 from a deposit account, and $20 in rewards points. The user can do so by, for example, using one or more interactive slider graphical devices 1422 to determine how much of the funding is to be drawn from the debit or credit "card" account and how much from the rewards point balance and/or other accounts.

At 2110, the user can select a "pay" item 1472 (FIG. 14F), 1870 to generate an instruction set configured to cause the wallet app 112, 622 to generate a payment token, in this type of case sometimes called a split-pay token, comprising at least a total proposed transaction payment, and a code interpretable by one or more transaction payment processor(s) 120, 920, 2150, 1750 etc as identifying the plurality of desired transaction funding sources and the amounts and/or proportions of the transaction total to be paid using each source. Depending upon the desired processing of the transaction payment by transaction processor(s) 1750, 120, etc., such split-pay token may further comprise any or all of identifiers associated with a merchant transaction system 130, payment type information, routing instructions, specific transaction identifier(s), time/date range(s) in which the token is valid, etc.

In some embodiments of processes 2100, "split-pay" tokens comprising codes interpretable by one or more transaction payment processor(s) 120, 920, 2150, 1750 etc as identifying the plurality of desired transaction funding sources and the amounts and/or proportions of the transaction total to be paid using each source are generated through the use of "discretionary fields" in payment token data sets formatted in accordance with existing payment protocols. For example, according to a number of existing payment protocols, payment token data set can comprise a number of fields, each field corresponding to a discrete data item of a specified bit length and having a specified type, function, or meaning. For example, a payment token can comprise fields of the following types:

<token type><issuing FI><currency><value><time stamp>
<issuer ref><discretionary data>

Where:
<token type> = credit token, debit token, etc.
<issuing FI> = unique code associated with the FI 120, 920, 2150 that issued the token and will deliver value upon demand
<currency> = US dollars, Canadian dollars, Yen, etc.
<value> = amount of currency of specified type payable by the issing FI on presentation of the token
<time stamp> = date/time of token creation; optionally useful also for determining expiration nof token after given length of time, etc.
<issuer ref> = token reference number generated by the issuing FI, can be tied, for example, to a specific transaction and/or user account. Etc.
<discretionary data> = any discretionary data interpretable by the issuing FI that the generator of the token wishes to add In such a protocol the discretionary data field can be used to generate a split-pay payment token by populating the discretionary data field with any code interpretable by a desired transaction processor 120, 160, 920, 1750, 2150, etc., as identifying a number of funding sources to be used to fund a transaction, identifying the funding sources to be used, and identifying the proportion of the value of the token to be funded from each of the funding sources. For example, a code suitable for insertion in such a field can comprise the following bits:

<SN/S1/P1/S2/P2/SX/PX>

Where:
SN=number of funding sources represented
S1=first funding source identifier
P1=percentage or amount of value to be funded by source 1
S2=second funding source identifier
P2=percentage or amount of value to be funded by source 2
SX=X$^{th}$ funding source identifier
PX=percentage or amount of value to be funded by source X For example, in the example above, in which the user wishes to fund a transaction valued at $35 with $10 from a loan account, $5 from a deposit account, and $20 in rewards points, a split-pay token formatted in accordance with the foregoing example could be generated in the following form:

As will be understood by those skilled in the relevant arts, once they have been made familiar with this disclosure, the example above is simple one relatively simple example of the manner in which a discretionary field provided in a payment protocol can be used to implement split pay tokens funded from multiple sources. A wide variety of other formats are possible.

With the split-pay token generated at 2110, at 2111 the token can be routed by the wallet application 112, 62 to a merchant system 130, 134, etc., as consideration for completion of the transaction negotiated at 2101-2103, and the merchant system 130, 134 etc. can route it to a payment processor 2150, such as a transaction processor 120 associated with the merchant's bank'.

At 2112, the merchant's bank or other transaction processor 2150 can forward the token, together with any other desired information, to a payment processor 120, 920, 1760 etc., associated with the token, for payment. In the example above, for example, the token can be routed to a transaction processor associated with the identifier XYZ1234, which might for example be the user 190's bank.

At 2113, the transaction processor 120, 1760 can parse the token to extract split pay instructions such as those described above, and at 2114-2117 can initiate a process of collecting points, extending credit, and debiting demand accounts in amounts specified by the token in order to satisfy the indicated value. Conditioned upon the availability of sufficient funds, points, etc. at 2118 the transaction processor 1750 can authorized payment of the token by, for example, <credit><XYZ1234><US><35.00><DDMMYYYHRMN>
<123456><03011002050320>
So that a transaction processor 120, 1750, 2150 can parse the token as:
<token type> = credit token, i.e., money to be paid to (as opposed to being collected from) the presenter
<issuing FI> = bank or FI associated with code number XYZ1234
<currency> = US dollars.
<value> = $35 to be paid to presenter
<time stamp> = day, month, year, hour, and minute the token was generated
<issuer ref> = merchant purchase transaction ser. no. 123456
<split pay>:
03 => three funding sources are to be used to fund this token (note, this can set the expected bit length of the discretionary field)
   01 => the first account indentified in the user profile associated with the generating user, in this case a credit account
      10 => $10USD to be drawn from user's credit account
   02 => second account indentified in the user profile associated with the generating user, in this case a debit account
      05 = > $5USD to be drawn from user's debit account
   03 => third account indentified in the user profile associated with the generating user, in this case a rewards point account
      20 = > $20USD worth of points to be redeemed from user's rewards account crediting a single-use real-time credit account as described above, or otherwise confirming that the token is payable upon presentation; and at 2120 the user's FI 1760 or other transaction processor 120 can authorize payment of the transaction.

Thereafter, as described above, suitable notifications and confirmations can be generated by the authorizing FI's 1760, 2150, and merchant system(s) 130, etc, for forwarding to the merchant system 130 and/or user device 110, 110', etc., as well as any other desired recipients.

As previously noted, and as will be appreciated by those skilled in the relevant arts, once they have been made familiar with this disclosure, any or all of secure cloud system 1750, points bank system 1752, loan book of record system 1754, customer profile 1756, accounts book of record 1758, payment vehicle book of record 1760, and payment processor 2150 can be operated or administered by a single transaction processor 120, 160, 920, or by multiple second- and third party processors 120, 160, 920.

In parsing a split-pay instruction in a discretionary field, a transaction processor 120, 1760 can use any suitable methods or protocols. For example, in the example described above, the processor 1760 can access one or more user or device profiles 2170, 1756 as shown for example in FIG. 20. For example, as described above a user 190 can, in advance of using a split-pay transaction payment process, access a user profile 1756 through the use of a virtual wallet application 112, 622 to designate a plurality of default and/or otherwise preferred accounts to be used. Such pre-arrangement by the user 190 and her/his trusted platform 120 can significantly improve the effectiveness and functionality of the use of split pay codes in discretionary fields.

The establishment and application of preferences to be fully or semi-automatically applied in designating accounts to be used as sources of funding for the satisfaction of transactions is among the powerful features offered by the invention, and can be used in conjunction with all compatible features described above, including for example dynamic card, split-pay, and real-time credit processes; and can be accomplished in many ways, both through the use of discretionary fields in transaction data sets and otherwise.

For example, in various aspects the invention enables users to create ranked preferences to be applied to the selection of transaction funding sources, or types of payment methods, for satisfaction of transactions negotiated through merchant apps, FI-supplied online banking apps, virtual wallets, etc. The preferences can be either identified or applied at the time of a transaction, or well in advance; or any combination thereof. For example a ranking or other set of preferences, drawn from a plurality of accounts associated with a user, can be identified in advance, and stored in memory controlled by either or both of a user's transaction controller 110, 110', or one or more FI systems 120, 160 associated with some or all of the user's accounts at the time a transaction is to be requested. In other embodiments, a plurality of accounts associated with the user can be polled at the time of a transaction, and preferences applied at that point, on the basis of preference criteria designated by the user then, or in further in advance. As will be understood by those skilled in the relevant arts, once they have been made familiar with this disclosure, a very wide variety of combinations and permutations of such processes are enabled by the invention disclosed herein, both above and below.

The rankings can for example be associated with unique, or "dynamic," identifiers such as pseudo- or proxy card numbers that are specific to the ranking. Such dynamic or pseudo card number identifiers can, for example, be provided in the form of established payment protocols, such as Interac, Visa, Mastercard, etc. When such a pseudo-card number is used in a mobile wallet (POS), in-app, or e-commerce payment, the payment can be routed and otherwise processed in accordance with the corresponding protocol. For example, the Interac system can route the transaction to an issuer associated with the purchaser, as normal, but when interpreted by the bank system 120, 160 can cause the FI 120, 160 to process the payment in accordance with a ranked payment preference associated with the number.

Similarly, pre-authorized payment tokens configured to draw on various combinations of pluralities of accounts can be stored in secure memory, and applied to transactions at any time, using specific account combinations specified in advance, or determined at the time of a transaction based on polling of funds or other resources currently available in the accounts.

For example, if one preferred payment option is unavailable for any reason, an FI 120, 160 associated with a preference identifier can assess a second preference, or a list or ranked preferences, for availability for satisfying the payment. The user's preferences may be set ahead of time, or may be communicated in or overridden by an identifier provided in a protocol-specified discretionary field, such as am Interac payload (in the case of POS), at the time of a transaction. From a merchant's perspective, a transaction request data set comprising such a preference identifier can look exactly like any other transaction data set according to the selected protocol, including data corresponding to any payment types or protocols preferred by the merchant. In the case of transactions conducted in accordance with protocols that are not available in specific regions, e.g., internationally, numbers or other identifiers can be used to emulate locally-accepted payment types or protocols, such as for example the PLUS interbank network in regions where it is accepted.

Preferences established for the selection of transaction payment funding source(s) in accordance with the invention can be of any type suitable for implementing the purposes disclosed herein. For example, a preference can comprise a simple ordering or ranking of accounts to which a specific user (human or juristic) has authorized access, to be applied inflexibly, optionally conditioned upon the availability of adequate funds, etc., and/or can comprise more complex logic such as if/then statements to apply specific payment methods with specific vendors (merchants), or it can be conditioned on the availability or maintenance of specific thresholder minimum amounts in particular accounts, and/or maximum balances not to exceed on credit account(s). The FI 120, 160 interpreting the preference listing in order to fund a transaction can thereby be enabled to step through corresponding logic until sufficient funds are identified to pay for the transaction. Such criteria can be set by either or both of the user 190 and the FI 120, 160.

An authorized account user can also be enabled to allow the FI 120, 160 that administers one or more of its accounts to select method(s) of payment already registered with, or otherwise associated with, such authorized account user that the FI believes is most optimal or otherwise advantageous for its client for a given transaction. Automation of such decisions can be based on factors such as pre-paid, debit, and/or credit account balances; interest rates, rewards, availability of discounts, and availability of points or other non-cash awards. Preferences can also be specified to enable automatic or semi-automatic splitting of transaction payment across multiple payment methods. For example, a financial account administrator 120, 160 can parse a transaction request data set to determine an amount due and a funding preference to be suggested for confirmation by the user, or automatically applied in satisfaction of the request, and access multiple accounts associated with a purchaser to determine the best, or otherwise preferred split funding arrangement to be applied.

Importantly, through the establishment and use of trusted relationships, tokenization techniques, and/or other improvements described herein, the invention enables the application of split-pay techniques to accounts administered by multiple financial institutions, including for example including splitting payments across payments from multiple FIs in the same transactions. Such multi-FI split pay schemes can be conditioned upon concurrent or previous authorization by the requesting purchaser. For example, pre-authorization request signal sets may be shared between FIs 120, 160 associated with a purchaser, to determine whether a specific transaction can be satisfied, or partially forwarded to one or more FI servers 120, 160 by a first FI server 120, 160 to receive a funding inquiry or preference identification. An account administrator system 120, 160 receiving such a request can then route partial payment request signal sets to the other account administrators 120, 160 on the requesting purchaser's behalf. In such a way, a purchaser can be relieved of the obligation of acquiring and/or maintaining separate payment tokens for each FI in a mobile wallet, or remembering multiple PINs, etc. Accounts to be used in processing such split-pay transactions can be determined at the time of purchase, using pre-set or algorithmically-determined rankings or preferences, as described herein.

Thus, in various embodiments a certification authority 120, 905 or other FI system 160 can be enabled to serve as an aggregator of access authorizations for multiple accounts available to individual purchasers through single or multiple financial account administration system(s) 120, 160. Such an aggregator authority can interface with multiple account administrators 120, 160 in such ways as to more efficiently query the status of the user's accounts with other FIs in realtime to process any automated payment splitting more efficiently.

As previously noted, types of payment methods/accounts that may be used to fund payments according to such processes can include debit, credit, pre-paid, chequing, line of credit, loyalty points, or any other type of account(s) administrated by one or more FI systems 120, 160 on behalf of a user 190. For example, loyalty points can be automatically redeemed when an authorized user instructs an FI 120, 160 associated with one or more payment funding source accounts to choose a best method of payment, so the user is relieved even of the necessity of interacting with devices such as a points slider 1422 in a mobile wallet 112, etc.

Figure 24A:
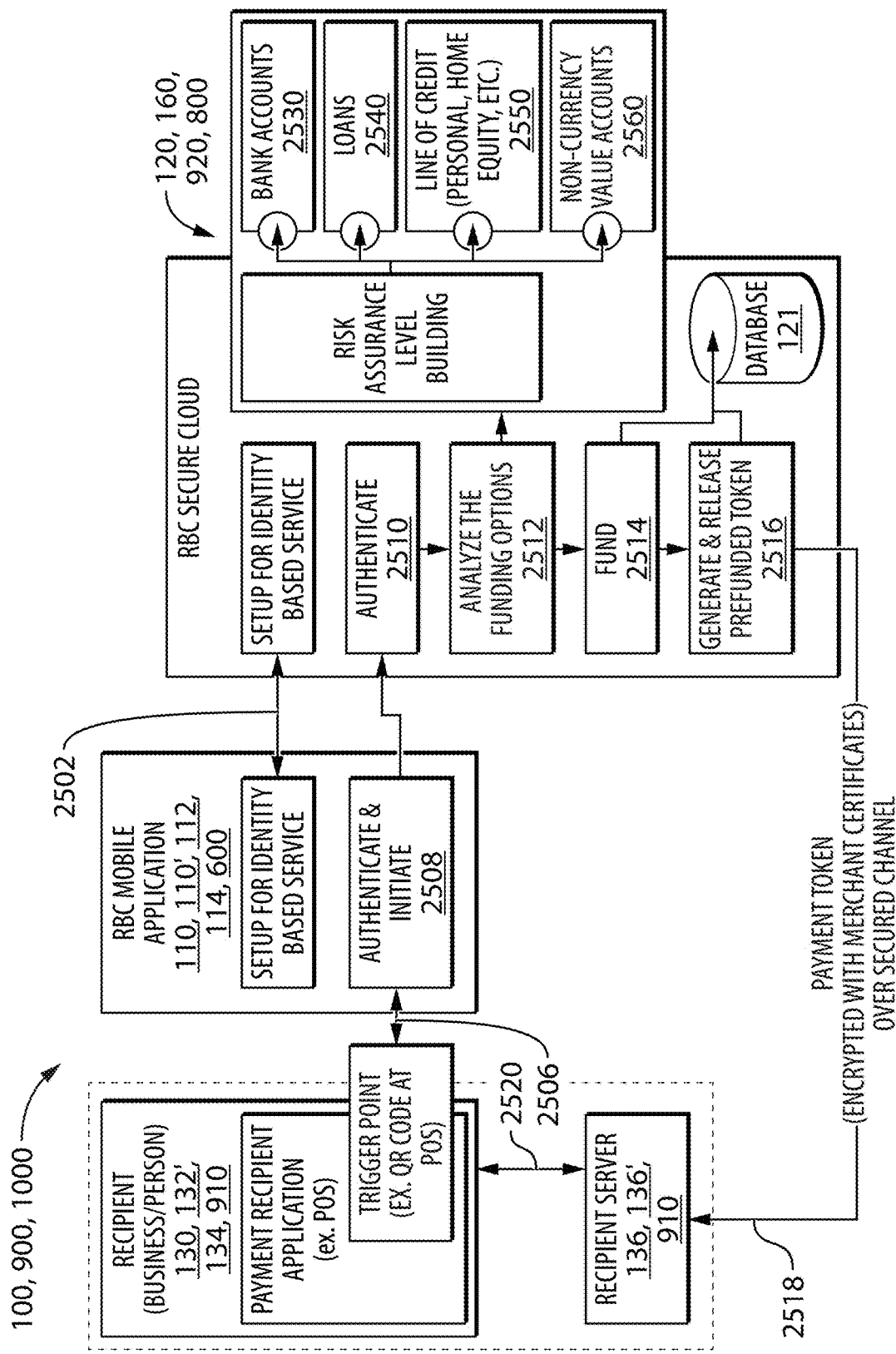
Figure 25:
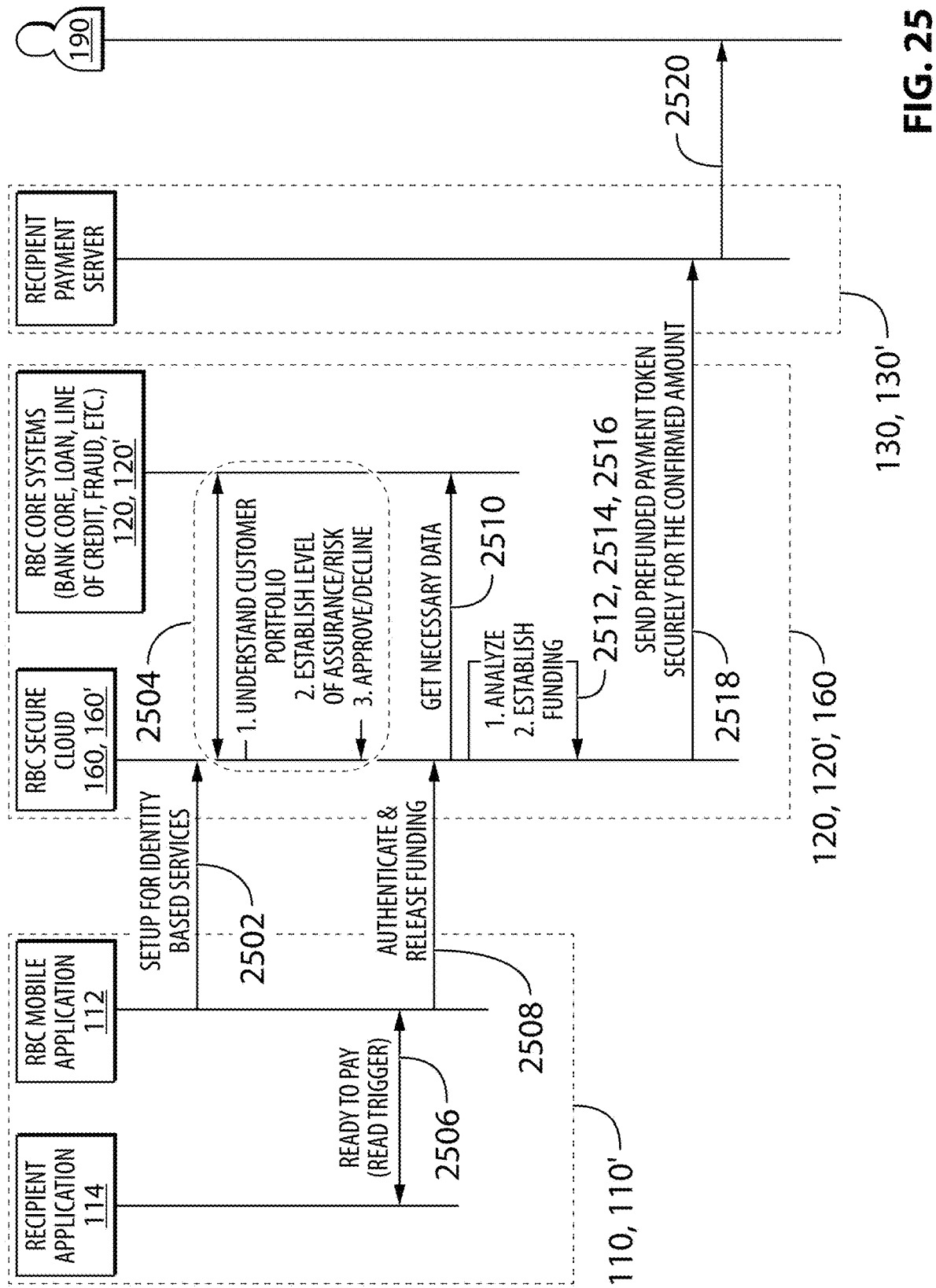
FIG. 25 is a schematic diagram showing representative signal exchanges between components of systems for secure processing of electronic payments in accordance with the invention.

Examples of and options for the establishment and application of payment preferences such as those described above can be illustrated through consideration of the embodiments shown in FIGS. 24-26.

Among other advantages, it is to be noted that in the embodiments described in FIGS. 24-26 the invention enables payment transactions to be accomplished between vendors or merchants 130, purchasers 110, and account administrators 160 without the need for intermediary payment processor(s) 150.

At 2502 in FIG. 25, for example, an authorized user 190, 190' of a transaction request device (also referred to as a transaction request processor or transaction controller) 110, 110', 600 can invoke a virtual wallet application 112 stored on the device and thereby establish a data communications session with an FI 120, 160 which controls or maintains access by the user to one or more accounts the user is authorized to use in satisfaction of payment transactions, or financial account administrator system 120, 160. Such a communications session can, for example, be initiated at any time, including well in advance of or at the time of any desired transactions.

Through the use of suitably-configured GUIs, the authorized user 190, 190' can be enabled to identify a plurality of accounts the user is authorized to rely upon for funds to be used in satisfaction of transactions, and can specify any desired preferences for funding of transaction payments using the accounts. As previously noted, such preferences can be of any type(s) suitable for implementing the purposes disclosed herein, including for example simple orderings or rankings of accounts to which the user has authorized access, to be applied inflexibly. Alternatively, the user can specify that the use of the preference ranking is to be conditioned upon criteria such as the availability of funds sufficient to satisfy a purchase price, etc., and/or can comprise more complex if/then or other logic to apply specific payment methods with specific vendors (merchants); and/or it can be conditioned on the availability or maintenance of specific thresholder minimum amounts in particular accounts, and/or maximum balances not to exceed on credit account(s). Alternatively, or in addition, the authorized account user can specify that the FI 120, 160 is authorized to select one or more accounts or funding sources associated with the user that the FI believes is most optimal or otherwise advantageous for its client for a given transaction, in view of the availability of advantageous interest rates, discounts, rewards, and points availability, etc. When the user 190 has identified any/all desired preferences and/or criteria, at 2502 the user's application(s) 112, 114, etc., can generate a preference request data set and cause it to be routed to the financial account administrator system 120, 160. Such a preference request data set can for example comprise data such as:

<UID/S1/ . . . /SN/LC1/ . . . LCN/>

Where:
UID=one or more identifiers associated with the user 190 authorized to access funds associated with any accounts identified in the request;
S1 . . . SN=identifiers associated with up to N funding source accounts, optionally in ascending or descending order of preference
LC1 . . . LCN=identifiers associated with up to N logical criteria to be applied by the financial account administrator system in identifying preferred funding source (s) to be applied toward satisfaction of transactions
LC1 . . . LCN can, for example, comprise identifiers associated with addresses or other references to information accessible by the financial account administration system 120. 160 and identifying or otherwise associated with any desired criteria, such as absolute or relative rankings, account balances, if/then statements, etc.

At 2504, the financial account administrator 120, 160 can invoke a process of confirming that the preference request data set received at 2502 is associated with one or more authorized account users 190, 190'; that the request complies with applicable laws and/or regulations; that the identified funding sources exist and are in good standing and adequately funded; can assess any risks to the requesting user, merchants, the FI 120, 160, etc.; and can approve or decline the request. Assuming the request is approved, a suitable payment account preference data set can be generated, stored in memory associated with the FI 120, 160, and/or routed back to one or more devices 110, 110' associated with the requesting user and/or accounts identified in the request for storage in, for example, secure memory 606, 618 associated with any suitably-configured applications 112, 114. As noted above, the payment account preference data set can be associated with a payment account preference identifier, which can for example be in the form of an EMV card number, or any other number or code suitable for use with one or more payment protocols, which identifier can be stored securely and/or routed back to the requesting device(s) 110, 110', etc., for use in immediate or future transaction processing as described herein. Such payment account preference identifiers can be used in transaction requests as dynamic card identifiers, or any other desired payment card identifier or token.

At 2506, an authorized user 190, 190' of a device 110, 110', 600 can initiate a payment transaction by means of negotiations such as those described above using, for example, a virtual wallet application 112 and/or merchant application 114. Such negotiation(s) can, for example, involve interacting with a merchant system 130 to negotiate the identification of one or more items or services to purchase, prices, etc.

When, for example, agreement has been reached and the user is ready to complete the transaction, at 2508 the user 190, 190' can use the application 112, 114 to generate a transaction request data set comprising a transaction identifier identifying a transaction to be satisfied by payment from one or more payment accounts according to a preference, including optionally an identity of a merchant or merchant system 130, 136 associated with the transaction; a transaction amount to be applied in satisfying the purchase; and payment account preference data such as a payment account preference identifier of the type described above; and can cause the transaction request data set to be routed to a financial account administrator system 120, 160, 920 such as a bank or other FI associated with one or more of the user's accounts, or otherwise enabled to parse the transaction request and interpret the preference identifier.

At 2510 the designated financial account administration system 120, 160, 920 can receive the transaction request data set generated by the transaction request device at 2508 and parse the data records contained therein to, for example, confirm the authenticity of the request and the authority of the requesting user 190, 190' to access any or all identified accounts by, for example, checking associated identifiers such as user names, passwords, biometric parameters, etc. against accounts administered by the FI 120, 160, 920.

At 2512 the designated financial account administrator system 120, 160, 920 can parse or analyze the preference data set received at 2510 to identify from a plurality of payment accounts or other funding sources associated with the payment account preference data one or more preferred transaction payment funding source accounts associated with funds to be applied toward satisfaction of the transaction amount. For example, the FI system 120, 160, 190 can poll one or more accounts associated with the requesting user 190, 190' to determine whether they contain sufficient funds to comply with a preference scheme generated at 2502. Such accounts can comprise demand currency accounts 2530, such as debit accounts; loan accounts 2540 such as credit cards or other sources of loaned funds; line of credit accounts 2550 such as personal LOCs, home equity facilities, microloan facilities, etc.; and/or non-currency value accounts 2560 such as loyalty or rewards accounts that can be converted to currencies and used to satisfy the requested transaction in accordance with preferences associated with the preference data set.

Such polling can include communicating with one or more other financial account administrator systems 120, 160 to make such determinations where, for example, accounts on multiple banks/rewards processors are to be applied.

At 2514, using information gathered or confirmed at 2512, the FI 120, 160, 920 can fund the transaction in accordance with the preference data set by applying any preferences or other criteria LC1 . . . LCN and generating one or more transaction payment data sets, each transaction data payment set comprising data representing a negotiable payment token comprising data useable for identifying at least the same or another identifier associated with the transaction; at least one identified preferred transaction payment funding source account 2530, 2540, 2550, 2560, etc., and a payment amount to be applied from each identified preferred transaction payment account; the transaction payment data set being formatted according to the EMV or any other desired payment protocol, and routing the at least one transaction payment data set to at least one transaction payment processor 136, 136', 910 via the data communications network. Where, for example, accounts 2530, 2540, 2550, 2560, etc. are administered or otherwise controlled by more than one FI 120, 160, 190, the responding FI 120, 160, 920 can, as described above, coordinate contributions from multiple funding sources using processes described above.

Optionally, when a funding level has been determined, at 2516 a previously-generated payment token can be retrieved from a secure data base 121 and added to a transaction payment data set to be routed to a merchant or other payment recipient system 136, 136', 910, etc. Alternatively, at 2516 a new payment token associated specifically with the requested transaction can be generated, and routed to the payment processor 136, 136', 910.

At 2518, the transaction payment data set can be received by the merchant or vendor system 130, 130', 136, 136' and applied to satisfy the transaction.

At 2520, the purchased goods or services can be delivered to the purchaser 190, 190'.

Thus, as described, transaction request data sets in accordance with this aspect of the invention can be formatted in accordance with desired payment protocol(s), and payment account preference identifier(s) can be formatted as payment account identifier(s) in accordance with the payment protocol(s). Such protocols can include, for example, Interac, Visa, Eurocard, Masterpay, PLUS, FIX, and others.

A particular advantage offered by such embodiments is that preference account data sets as described above can be used either for use in setting preferences or preference logic in advance, or for processing as payment tokens at the time of a transaction, to be applied and determined in real time by the account administrator 120. 160. In the latter case, they can be transmitted dynamic card identifiers and or as parts of transaction request data sets in discretionary or auxiliary fields such as those used in the EMV protocol, as discussed above. Alternatively, they can be transmitted in the place of individual, specific account numbers or identifiers, as proxies for specific card or account numbers.

As previously noted, the use of payment account preference data to be used in identifying funding sources for transactions can be applied with particular advantage in the context of trusted relationships between any or all of users 190, devices 110, FI systems 120, 160, and merchant systems 130, 136. For example, such processes can reduce or eliminate the need for fourth-party transaction processors 150, as shown in FIG. 24.

Advantageously, in the event that a user 190 or other purchaser is not satisfied with the manner in which funding for a purchase was allocated with respect to a particular transaction, as a result of automated or semi-automated application of preference criteria as described herein, the user or purchaser can be enabled to review the funding allocation that resulted from application of the preference criteria, as for example by reviewing a set of completed transactions in a mobile wallet application 112 or merchant application 114, and change it. Such changes can be retroactive, or effected prior to closing of a transaction, for example at the end of an accounting period such as a day, week, or month, or within some other window of time. For example, such changes can be made prior to the start of a daily account reconciliation process, with the for example an avoidance of a requirement for application of interest to a non-preferred account.

The invention also enables the use of a mobile wallet, banking app, online banking, or merchant application 112, 114 to notify a user 190, 190' of savings, discounts, rewards or other benefits offered to the user by merchant system(s) 130 and/or FIs 120. 160, and to enable the user 190 to select whether to accept such offers by selection of particular preferences in the process of establishing preferred funding sources, either in advance of or at the time of a particular transaction. Such benefits can, for example, include reduced interest rate, increased points, etc.). Similarly, there may be an option to create on-demand micro-loans for individual purchases, or to recommend that a micro-loan be created after the purchase has been made, through the app. If, for example, the offer of a micro-loan is accepted, it can be used immediately to pay off funding sources used to pay for a transaction, and optionally could be configured to be automatically paid down on a monthly or other period or occasional basis. If, for example, such a process is completed prior to the end of day reconciliation of the transaction, then it can be possible to avoid accrual of interest one or more initial payment methods used.

An example of such processes is with reference to FIGS. 26A-26C. In FIG. 26A, as a result of a negotiation process 1315, 1510, 1901, 2101, 2201, etc., a user 190 of a transaction controller 110 is presented by a touchscreen 610 with a display a GUI 1402 comprising a notification 2602 confirming payment to be made in satisfaction of a transaction with "MOOG Audio" in the amount $2195.72. The touchscreen 610 further comprises two interactive touchscreen input items 2604, 2606, 1408, 1486, etc. offering options of paying with one or more credit cards, and/or paying by installments.

Selection of "Pay via Installments" icon 2606 can result in generation and display of a GUI 1402 such as that shown in FIG. 26B, showing pre-approved micro-loan terms 2603, proposing a total 24 month term, an interest rate, and total cost of the loan. A default payment choice "Checking (1224)" is presented at 2605; further payment alternatives can be selected by using 'forward' and 'backward' scrolling devices 2609, 2607 respectively, based on a set of funding sources identified by a poll conducted by the corresponding FI system 120, 120', 160.

In the embodiment shown, at 2608 the GUI provides a command input item "Next Step" which (a) confirms selection of the default payment choice shown at 2605 and (b) further suggests and enables the use of non-cash rewards points to pay some or all of one or more of the installments, as shown at 2612 in FIG. 26C, or application of discounts or other offers directed specifically at the user 190 who identified as controlling the transaction session. Optionally, depending upon a number or value of rewards points available, a number of options may be presented by a plurality of icons 2614, 2616 which may be shown in different sizes, colors, shapes, etc., to depict an available number of installments that may be so paid. For example, in the embodiment shown, an option 2614 "1x" may be shown in a first color to indicate that the option is available, depending upon a number of points required to complete an installment and a number of installments to be completed. Further numbers can be provided in greyed-out form or other color, to show they are not available. Alternatively, a selection made by a user 190 can be shown in a first form, 2614, while available but non-selected options 2626 are shown in one or more second forms. A user who does not wish to use non-cash accounts to satisfy some or all of the payment may so designate by selecting command item 2627, which can cause the processor 110, 110' to move to the next step in completing the payment transaction.

Thus, as described above, in various embodiments such aspects of the invention provide the ability to receive, from one or more transaction request processors 110, 110' associated with an authorized user 190, 190' at least one identified preferred transaction payment funding source, a funding modification request data set, the funding modification request data set comprising data representing at least an identifier associated with the transaction request data set; and an identifier associated with at least one alternative transaction payment funding source account to be used in place at least one of the one or more identified preferred transaction payment funding source accounts selected by the user 190 in satisfying the transaction. Upon receipt of such funding modification data sets, the receiving FI system 120, 160 can cause payments to be allocated to the alternative funding sources rather than any initially-identified sources.

Likewise, in various embodiments such aspects of the invention enable routing to a transaction request processor 110, 110' a preference suggestion data set comprising data representing a notification 2603, 2612, 2614 of at least one benefit associated with association of at least one transaction payment funding source account with the payment account preference data, where for example the at least one benefit comprises at least one of a discount, an interest rate, opening or extension of a line of credit or other credit facility, or a non-currency value.

It may further be seen that in various embodiments the invention provides user communication devices, or transaction controllers, 110, 110', comprising processors 602, input/output devices 610, including for example touchscreens and/or other display screens, data communication systems 612, 614, and stored, machine-readable data representing instructions configured to cause the processors, in response to signals generated by the input and output devices, display on the at least one display screen graphical user interfaces adapted to receive from the one or more input and output devices input representing one or more payment account preference criteria, use the payment account preference criteria to generate payment account preference data sets, the payment account preference criteria data sets comprising data configured for use by one or more financial account administrator system processors 120, 160 in identifying one or more of a plurality of accounts 2530, 2540, 2550, 2560 associated with at least one authorized user 190, 190' of the controller as preferred transaction fund source accounts to be applied in satisfaction of one or more future payment transactions; and use the data communication system to route the payment account preference criteria data set to at least one of the same or another financial account administrator system.

A particularly advantageous improvement offered by the invention is the use of network or other data communications systems 612, 614 to allow users 190, 190' and financial institutions 120, 160 to negotiate preferences to be used in the selection of funding preferences. For example, "chat" or other interactive communications functions, such as those shown at 2626 in FIGS. 26B and 26C, enabling text-based conversations between users 190, 190' and automated or human administrators associated with FI's 120, 160, can be provided through the establishment of suitably-configured communication sessions. Such automated or human administrators can offer special discounts or points-type rewards to be offered to user(s) 190 at the time of purchase, for example, based on criterial provided by merchants 130, or any FI system(s) 120, 160, 150, etc.

Thus, for example, the invention provides transaction controllers 110, 110' comprising stored, machine-readable data representing instructions configured to cause the device to display one or more graphical user interfaces adapted to receive from the one or more input and output devices 610 input representing one or more payment account preference criteria by means of chat-style processes.

Thus in various embodiments the invention provides methods of processing data representing a transaction payment requests, the methods performed processor(s) of financial account administrator systems 120, 125, 160, 150 of coupled to data communications networks 200. Such methods can comprise for example at 2508 in FIG. 25 receiving, from one or more transaction request processors or controllers 110, via data communications network(s) 200, transaction request data sets, such a transaction request data set comprising data representing at least a transaction identifier identifying a transaction to be satisfied by payment from one or more payment accounts according to a preference; a transaction amount; and payment account preference data; at 2510-2516 of FIG. 25, using the payment account preference data, identifying from a plurality of payment accounts associated with the payment account preference data, one or more preferred transaction payment funding source accounts associated with funds to be applied toward satisfaction of the transaction amount; and generating at least one authorized transaction payment data set, each transaction data payment set comprising data representing at least: the same or another identifier associated with the transaction, at least one identified preferred transaction payment funding source reference, which can for example be an account number or a proxy therefor, and a payment amount to be applied toward the transaction from one or more accounts associated with the at least one transaction payment funding source reference; and at 2518 in FIG. 25 routing the at least one transaction payment data set to at least one transaction payment processor via the same or another data communications network 200.

In various embodiments, transaction request data sets generated in accordance with such methods are formatted in accordance with EMV or other standard payment protocols, and the preferred transaction payment funding source references are formatted as a payment account in accordance with the payment protocol, so that, for example, they may be embedded in authorized transaction data sets and processed by merchant and third-party processor systems 130, 150, 120, 160, etc., in the same manner as negotiable payment tokens.

In the same or other embodiments of such methods, such transaction request data sets can be formatted in accordance with at least one payment protocol, and data representing the preferred transaction payment funding source reference is stored in a field designated by the protocol as a discretionary field.

In the same and other embodiments, the at least one preferred transaction payment funding source reference can be associated with at least one of a currency-based debit account, a currency-based credit account, and a non-currency value account. In such embodiments currency-based debit and/or credit accounts can include gift accounts; and non-currency value accounts can comprises any or all of loyalty points accounts, rewards points accounts, and gift accounts.

As previously noted, advantageous features of the invention include the enablement, in such embodiments, of automatic extension at 2512, 2514, 2516 of loans sufficient to satisfy transactions using transaction funding accounts that otherwise would be insufficiently funded. For example, either a line of credit or credit card account, can, in response to merchant requests, suitable FI account rules, etc., be configured to implement logical rules that cause transaction requests referring to such accounts as preferred payment sources to be approved by automatically increasing a credit limit of such an account, or over-riding otherwise unauthorized access to credit.

Figure 26D:
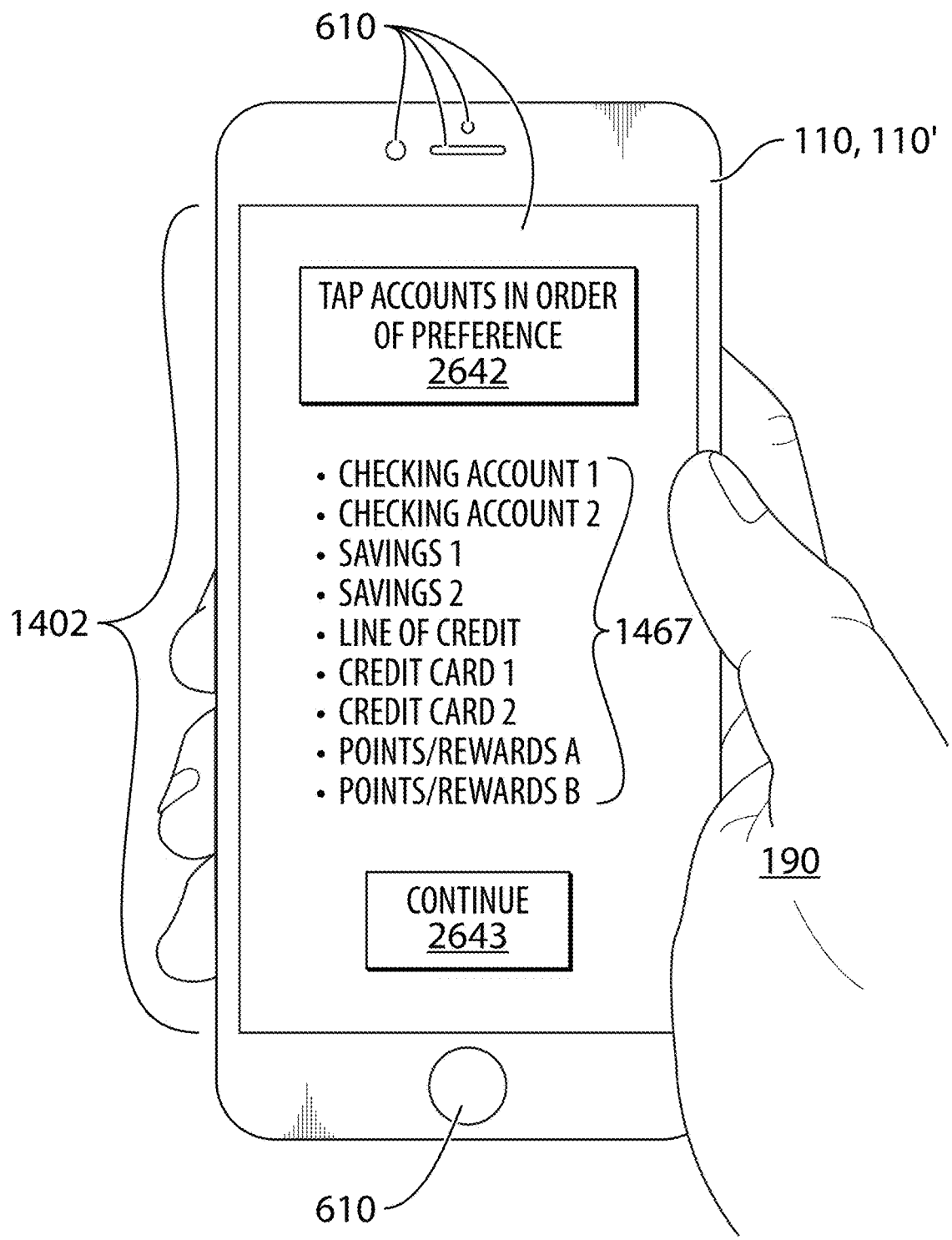
Figure 26E:
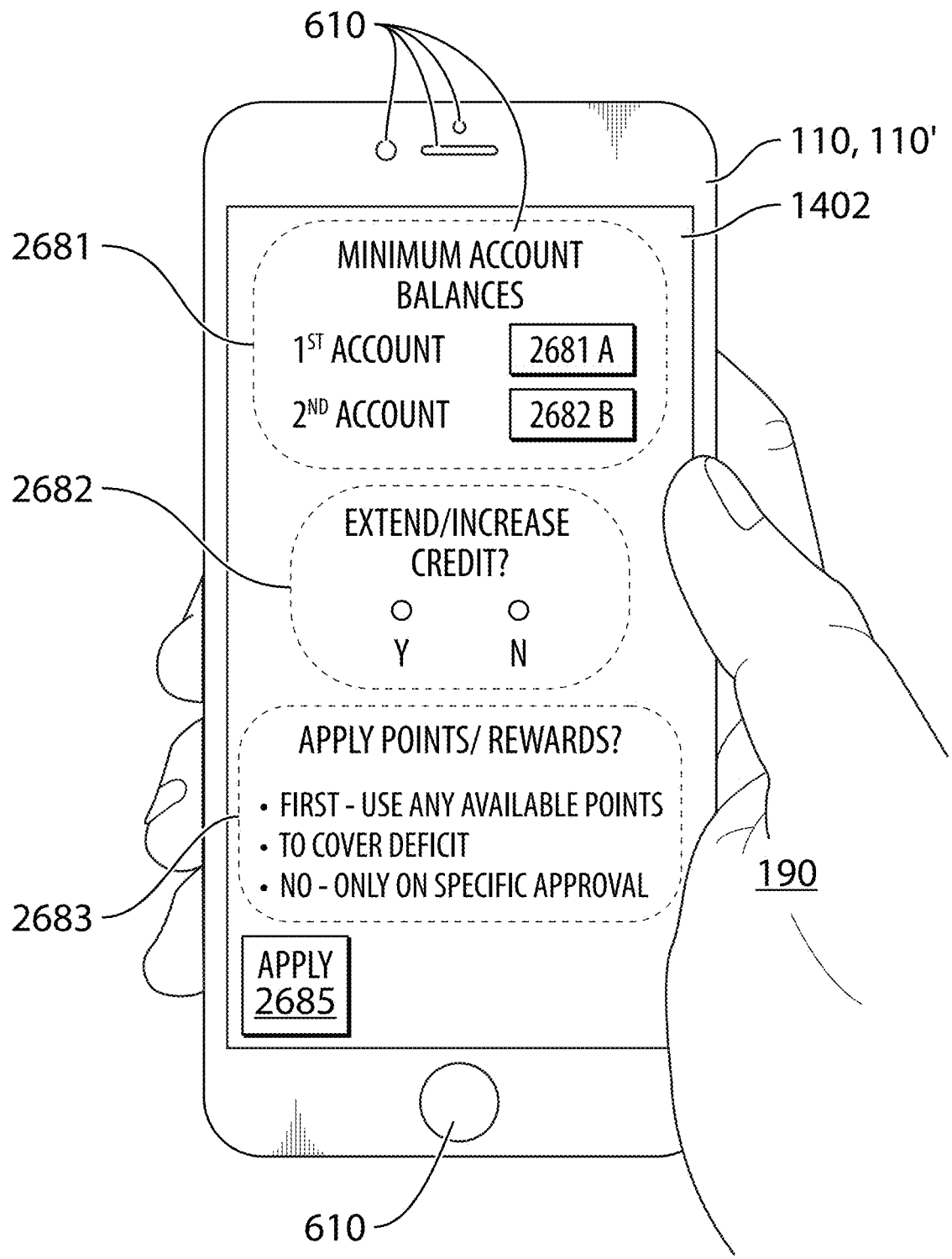

It may further be seen that, in further aspects and embodiments, the invention provides user devices 110 used as transaction controllers, comprising: one or more processors 602, input and output device(s) 610 comprising one or more touchscreens or other display screens; data communication system(s) 612, 612; and stored, machine-readable data representing instructions configured, as shown for example in FIGS. 26D, 26E to cause the at least one processor 602, in response to one or more signals generated by the one or more input devices 610 through use, for example, of interactive screen devices like that shown at for example 2502 and/or 2508 in FIG. 25, to display on the at least one display screen 610 a graphical user interface 1402 adapted to facilitate generation by at least one authorized user 190 of the controller of input representing one or more payment account preference criteria. In the example shown in FIG. 26D, the user is enable, in accordance with an instruction presented at 2642, to generate an account preference, or ranking, list by tapping preferred accounts in order of the user's preference. For example, tapping 'Checking Account1', 'credit card', and 'points 2' in that order can cause the controller 110, 110' to receive from the one or more input devices 610 signals representing one or more payment account preference criteria representing a preference to use the named accounts in that order, and use the payment account preference criteria to generate a payment account preference criteria data set, the payment account preference criteria data set comprising data configured for use by one or more financial account administrator system processors 120, 160 in identifying one or more of a plurality of accounts associated with the same or another authorized user 190 of the controller 110 as preferred transaction fund source accounts to be applied in satisfaction of one or more future payment transactions. By using the interactive device 2643, the user 190 can cause the account preference data set to be finalized and, using the data communication system(s) 612, 614, route the payment account preference criteria data set to at least the same or another financial account administrator system 120, 160.

In the embodiment shown in FIG. 26E, an interactive display 1402 is adapted to elicit from a user 190 logical criteria to be applied in setting preferences for funding sources. At 2681, the user is enabled to use input device(s) 610 to designate minimum account balances to be enforced in generating a current preference list, either to be applied to a pending transaction or to be stored in association with any of applications 110, 112, 114, etc., for default use in processing future transaction requests. For example, by tapping one of the input fields 2681A, 2681B, the user can cause the display 1402 to generate an interactive virtual keyboard that enables the user 190 to enter minimum account balances to be used in selecting preferred funding source rankings at the time of a purchase transaction. In that way, current account states can be used to generate or update account preferences in accordance with currently-available funds. At 2682, the user can authorize creation of new credit facilities (e.g., LOCs or credit card accounts) or extension of additional credit (i.e. raising a credit limit) through existing facilities (i.e., authorizing existing credit limits to be temporarily or persistently raised, for one or more transactions; and at 2683 the user is enabled to set preferences for application of rewards, points, or discount programs, etc.

When the user 190 has finished designating logical criteria to be applied to account preference rankings, or other account preference settings, at the time of a proposed transaction, the user can select an interactive command icon 2685 "APPLY" and thereby cause the device 110/application 112, 114 to read the various input fields 2681, 2682, 2683 and generate an account preference instruction data set, comprising data representing the minimum account balances, credit extension/increase instructions, rewards application instructions, etc., and/or other logical criteria to be applied by an FI system 120, 160, and to route the account preference instruction data set to be routed to the appropriate FI system 120, 160. The FI system 120, 140 can parse the account preference instruction set, access instructions referenced or otherwise represented by the logical criteria data, and, using the data entered at 2681, 2682, 2683 to generate a payment token representing the desired account preference settings accordingly.

As previously described, accounts shown in list 2467 and in FIG. 24A, 24B can be administered by one or more FI systems 120, 160 and can correspond to one or more of each of any or all of funding sources 2530, 1753, 2540, 1754, 2550, 2560, 1860, etc.; and the displays and lists 1402, 2467 can be generated through execution of stored, machine-readable data representing instructions associated with any virtual wallet application 110, 112, 114, etc.

If may further be seen that in various aspects and embodiments the invention provides transaction controllers 110, and methods and stored machine-readable instruction sets for enabling real-time interactive communications between users 190 of such controllers and FI and/or merchant systems 120, 130, 150, 160, as shown for example at 2626 in FIGS. 26B, 26C. Such interactive communications can be implemented through the setting up and use of direct text, audio, and or visual communications sessions, such as 'chat box' functionality commonly used in network communications, optionally with enhanced security features such as are appropriate to digital communications pertaining to financial transactions. For example, one or more merchants 130 can arrange with one or more FI's 120, 160 to authorize discounts or special loyalty rewards to be offered to specified users, or classes of users, and such offers can be communicated and optionally accepted or declined, in whole or part, through the use of such real time interactive communication sessions.

Alternatively, or in addition, features and techniques can be extended to include, for example, automatically generation/offering/application of 'coupon'-type discounts. Coupon-type authorizations can be pre-authorized and registered with the governing/primary FI, which can associate them with user payment accounts, and apply them either before or after primary payment. If after, when insufficient funds are available except with the discount applied, then optionally one or more credit limits can be temporarily (or permanently) raised, to allow the transaction, conditioned on availability of the coupon.

Using the systems, devices, and methods described above, a user 190 user of a mobile device or other transaction controller 110, 110' is enabled generate a 'dynamic card' token for use in satisfying a payment transaction by, for example, selecting an interactive item 2604 associated a request to generate a preferred funding source account list, which request can be routed to an FI 120 associated with one or more accounts the user is authorized to access; and in response to which the FI 120 can generate a list using methods described above, and return it to the requesting user's controller 110; using for example interfaces 1402 shown in FIGS. 36D and 26E the user can select which account(s) to use (including a split pay option). Such list(s) and selection(s) can for example be returned for review and/or payment processing using for example an EMV-type discretionary field.

Once criteria for identifying preferred funding source(s) to be applied toward satisfaction of transactions have been established, as for example through use of interfaces shown in FIG. 26, tokens representing such preferential rankings or other criteria, including network address references or other identifiers associated with algorithms for generating such algorithms, can be stored locally in memory(ies) 608, 618. Such tokens can be used to identify preferences or other options to be applied in case, at the time of a transaction, any designated account(s) comprise insufficient funds. For example, use of temporarily-raised credit limits in prescribed cases, such as the 'coupon' implementation described below. At the time of a transaction, such tokens can be forwarded in transaction payment data sets, and processed like other payment data, without the knowledge or cooperation of any merchants or third-party FI systems 120, 130. 150. 160

Either of the foregoing options can be configured for use of accounts administered by multiple FI(s); for example by clearing payments immediately on the primary/governing FI, then settling later with 2nd-tier FIs, or by means of real-time checking of accounts and re-distribution of payment allocations according to previously set criteria.

As a specific example of the use of pre-stored tokens representing preferences for identifying accounts to be applied toward satisfaction of purchases and other transactions, or criteria for establishing and applying such preferences at the time of a transaction, a user 190 can use a transaction controller 110 to establish a set of preferences and/or logical criteria in accordance with the foregoing, and communicate it to one or more systems 120, 140 associated with one or more administrators of funding sources associated with the user. The user's device 110 can receive from one or more of the systems 120, 140, a payment token comprising, in the form of a payment card number (i.e., a dynamic card token), coded information representing the preference and/or logical criteria, and can store the dynamic card token in secure memory accessible by the device 110. At the time of a requested purchase, the user's device can access the dynamic card token and forward it to a merchant system 130, 132, 134 as a transaction payment data set (or a portion thereof), in a data field reserved for a payment card or other funding source identifier, just as if it were data representing a specific payment account, and the merchant system 130, 132, 134 can process it accordingly by, for example, routing it to the merchant's FI 120, 160, which can further forward it to the user's FI system 120, 160 if/as needed. The user's FI system 120. 160 can process the dynamic card token by analyzing it and applying the preferences indicated therein, or applying the logical criteria referenced or otherwise identified there, to identify one or more funding sources to be applied toward the purchase using, for example, split pay and/or real-time credit features described above. The user's FI system can then access the user's accounts, directly or through further FI systems 120. 150, 160, debit/credit them as appropriate, and route or otherwise arrange payment to the merchant system 130, 132, 134 in any desired manner, including those described above.

It will be appreciated that the use of discretionary fields in existing payment protocol data fields allows split-pay tokens to be used in conjunction with processes for designated preferred funding sources as described above, in addition to a very wide variety of other payment transaction processes, some of which are already in wide commercial use. In other words, such tokens enable the use of split-pay processes on existing POS payment 'rails' (e.g., ref. 150, FIG. 4). For example, with reference back to FIG. 22, a representative set of signal exchanges between components 110, 110', 120, 130, 150, 160 of systems 100, 900 adapted for implementation of a split pay, real-time credit process 1700 in accordance with the invention is shown, in another process adapted for use on the payment 'rails.' Process 2200 is described with further particular reference to FIG. 18.

In the embodiment shown, process 2200 enables payment by a user 190 of a device 110, 110' for a transaction using one or more interim funding sources (sometimes referred to as "dynamic card(s)"), through the use of trusted and non-trusted wallet applications 112', 112. Such processes can be advantageously employed where, for example, a user 190 has multiple virtual wallet applications stored on her/his mobile or desktop transaction communication device 110, 110'.

Figure 22:
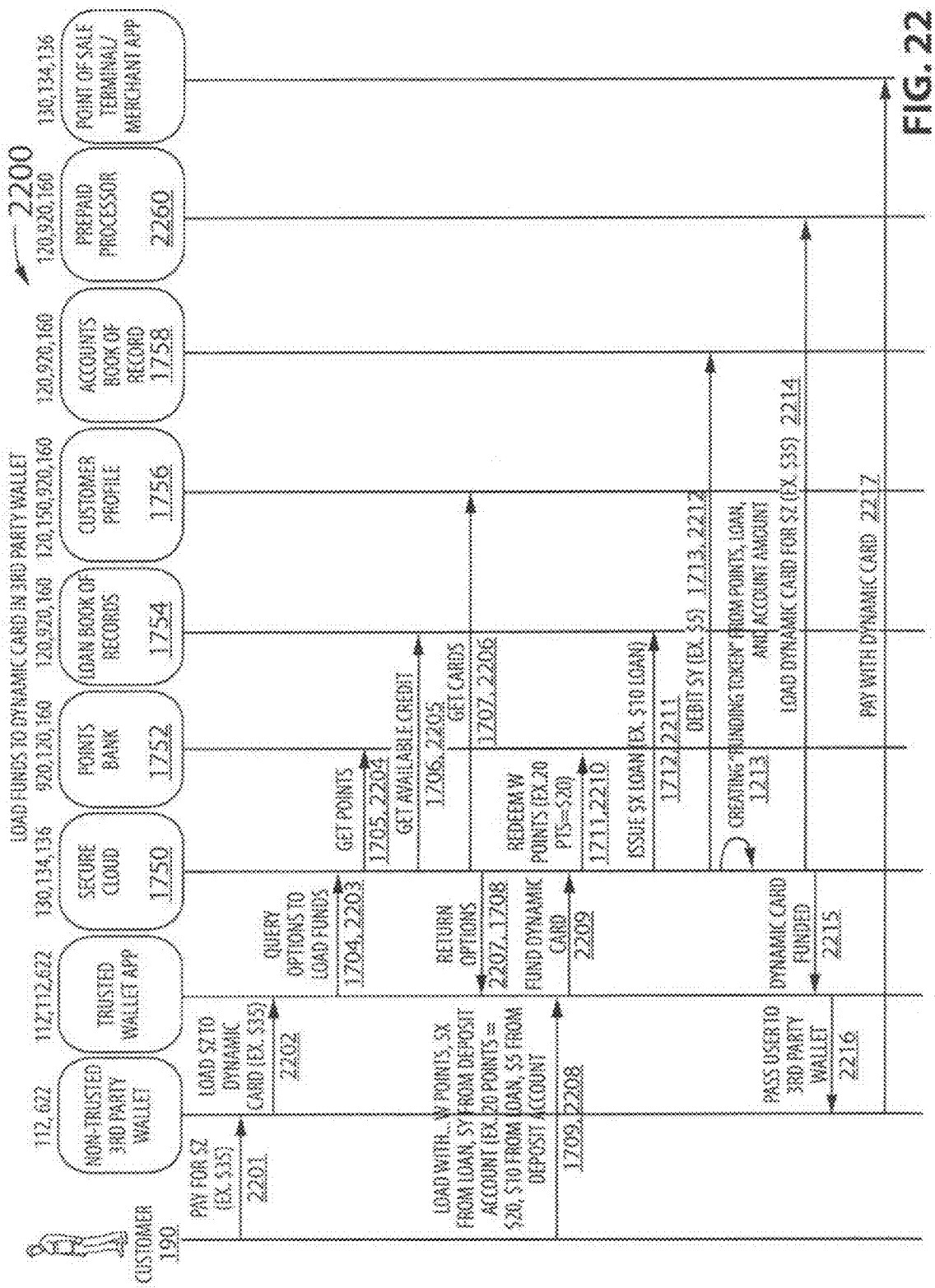

Process 2200 of FIG. 22 can be considered to begin at 2201 when a user 190, who has for example been shopping online or in a brick-and-mortar store, has completed a process of identifying one or more items the user wishes to purchase, and placed them in a virtual shopping cart. If, when the user 190 is satisfied with the items he/she has selected and is ready to pay, the user accesses a wallet application 112 he/she can generate a transaction authorization request data set comprising data representing an identifier associated with a merchant system 130 and a transaction payment amount, and optionally other data as disclosed herein.

In for example situations in which the user wishes to complete the transaction with payment drawn from sources not consistent with the merchant's payment system 130, the user 190 can elect to forward a substitute or proxy payment using methods disclosed herein. For example, by selecting a "PaywithURBank" command item 1406 (FIG. 14A), the user can invoke a second, trusted wallet application 112', and complete a generate a payment instruction data set with which is consistent with the merchant's requirements but draws funds from one or more of the user's desired accounts.

For example, at 2202 the user can use the trusted wallet application 112' to generate a 'dynamic card' payment token using a transaction funding source identifier associated with a single-use or other real-time line-of-credit payment account, as described above. Such dynamic card token can, for example, comprise data representing credit and/or debit account identifiers formatted in accordance with EMV and/or other commonly-accepted payment protocols. In order to ensure that payment is available and authorized however, before forwarding the dynamic card payment token to the merchant system 130, the trusted wallet application 112' can initiate a process 2203-2215 of funding the dynamic card token in advance.

At 2203-2207 the process of funding the dynamic card token can begin with a process of polling available payment options and presenting them to the user 190 for determination of a desired split-pay payment scheme.

At 2203, 1704, for example, the user's wallet application 112', 622 can generate a transaction payment funding source query data set, comprising signals representing instructions to an issuing bank or other FI or FSP 1750, 120, 920, 160, associated with the user's wallet 112', 622 to poll all FIs associated with accounts available to the user 190 and/or device 110, 110', as described above; and can route the query to the transaction processing system 1750 associated with such FI or FSP. In the example shown, the associated FI or FSP's transaction processing system 1750 is labelled "Secure Cloud."

At 2204, 1705, the associated transaction processing system 1750 can route available points query data set(s) comprising signals interpretable by transaction processing system(s) 120, 160, 1752 "Points Bank"(s) as executable instructions to check to one or more transaction administering one or more customer loyalty, gift, or other cash-equivalent points accounts associated with the user 190 and/or device 110, 110'; and can receive from such system(s) 1752 points available data set(s) comprising data representing a number of points and/or cash value available through such points system(s) for application to the executed transaction.

Similarly, at 2205, 1706 the associated transaction processing system 1750 can route to one or more transaction processing systems 1754, 120, 920 "Loan Book(s) of Record," which administer loan, line of credit, or other credit facilities or accounts associated with the user 190 and/or device 110, 110', available credit queries comprising signals interpretable by the system(s) 1754 as executable instructions to check available credit balances; and can receive from such system(s) 1754 credit available data set(s) comprising data representing amount(s) of funds available through such credit facilities or accounts.

Similarly, at 2206, 1707 the associated transaction processing system 1750 can route to one or more transaction processing systems 1756, 120, 920 "Customer Profile(s)," which administer customer profile or other data sets comprising data representing identifiers associated with debit or on-demand cash accounts associated with the user 190 and/or device 110, 110' and available for application as payment funding sources against the transaction 1701-1703 and interpretable by the system(s) 1756 as executable instructions to check value(s) of funds available for such purposes; and can receive from such system(s) 1756 funds available data set(s) comprising data representing amount(s) of funds available through such accounts. Such customer profiles 1756 can be stored on, or accessed by, any user device(s) 110, 110', and/or other transaction processor(s)

120, 160, 920, 150, 130, etc., suitable for use in accomplishing the desired level(s) of availability and/or security.

Having polled all available potential funding sources, at 2207, 1708 the associated transaction processing system 1750 can use the received points available data set(s), credit available data set(s), and funds available data set(s) received at 1705, 1706, 1707, to generate a transaction payment funding source option data set, and return it to the requesting wallet application 112, 622.

Upon receipt, the requesting wallet application 112, 622 can cause the device 110, 110' to generate and display for the user 190 a GUI comprising items 1404, 1406 representing payment options available to the user of the device 110', as shown for example, in FIG. 14B, FIG. 14E, and FIGS. 18B and 18C. In FIG. 18B, for example, UI items 1486 and 1810 are shown, indicating that an "AVION®" Visa® card account and a rewards account having a value of 262 points and $104.83 are available for application to the purchase. UI items 1811 and 1812 are also provided in the embodiment shown in FIG. 18B; item 1811 allows the user 190 to refresh the points information in case additional points have recently been made available for the transaction; and item 1812 can be used to access further information about the rewards account and points.

At 2208, 1709, the user 190 can use items 1404, 1406, 1486, 1810, etc. of the GUI 1407 to designate one or more accounts or other transaction payment funding sources to use in settling with the transaction processor(s) 1750, 120, 160 that settled the transaction at 1701-1703, and thereby cause the wallet app 112', 622 to generate a transaction settlement data set or transaction authorization request data set as described above.

At 2209, the user 190 can select a "pay" item 1472 (FIG. 14F), 1870 to cause the wallet app 112', 622 to route the transaction settlement data set or transaction authorization request data set to the transaction processing system 1750 associated with the wallet app 112', and thereby cause the system 1750 to initiate a process 1711-1713 of accumulating funds from the source(s) identified in the transaction settlement data set, in the amounts indicated by the user 190, for application in funding the dynamic card request generated at 2202.

At 2210-2212 accumulated funds for example, the transaction processor 1750 can generate and route instructions for redemption of points (2210, 1711), issuance of a loan/credit charge (2211, 1712), and transfer of funds (2212, 1713), and at 2213 apply the funds to a real-time credit account for generation of the dynamic card token requested at 2202.

At 2215, the transaction processor 1750 can generate and route to the wallet app 112, 622 a transaction payment authorization verification or confirmation data set, comprising any useful or otherwise desirable data concerning transaction and payment details and authorizing generation and/or release of the dynamic card token for payment to the merchant 130.

At 2216, the trusted wallet application 112', 620 can return control of the payment process and/or of the funded dynamic card token to the wallet application 112 accessed by the user to complete the transaction, and at 2217, optionally upon confirmation by the user 190, the third-party wallet 112 can route the dynamic card token to the merchant system 134, 136, 130, etc, to complete the requested transaction.

Thus, in various aspects and embodiments the invention provides transaction processing system(s) 120, 160 1750, 2260, etc., wherein use of data representing identifiers associated with the plurality of transaction payment funding sources and the portion of the transaction amount payable to the merchant to be funded using each of the plurality of transaction payment funding sources to verify the availability of funds associated with each said source sufficient to cover each corresponding portion comprises: routing, to at least one third-party financial services provider system 1750, 1754, 1756, 1758, 2260, etc., associated with at least one payment funding source associated with at least one identifier comprised by the transaction authorization data set, a payment authorization request data set, the payment authorization request data set comprising data representing a value associated with a portion of the amount payable to the merchant to be satisfied using funds from the corresponding funding source; and receiving from said at least one third-party financial services provider system 1750, 1754, 1756, 1758, 2260, associated with at least one payment funding source associated with at least one identifier comprised by the transaction authorization data set a payment authorization verification data set.

Thus, in various aspects and embodiments, the invention provides means by which a merchant may be assured of payment, regardless of the type(s) or source(s) of funds selected by the user 190 to pay for the transaction, the protocol(s) used by the purchaser 190 for settlement with her/his bank 120, 160, 920, 960 etc. The merchant need not even be made aware of the types of payment (cash, credit, points, etc.) ultimately used by the user 190 for settlement.

Among the many benefits and/or advantages that may be conferred by methods 1300, as described herein, is that a user of a mobile device may initiate transactions directly from within a merchant application without having to enter or re-enter sensitive personal information for each transaction initiated. Rather the merchant application may through the use of certificates and program interfaces pull payment credentials from a wallet application. Moreover, because the merchant application pulls HCE tokens provisioned to the mobile wallet instead of actual account numbers or other sensitive information, the mobile transaction may be processed without sharing such sensitive information with either the merchant or other potentially insecure entities within a payment network. Other approaches to mobile payments may not share these and other features of the described embodiments.

Figures 23A, 23B, 23C:
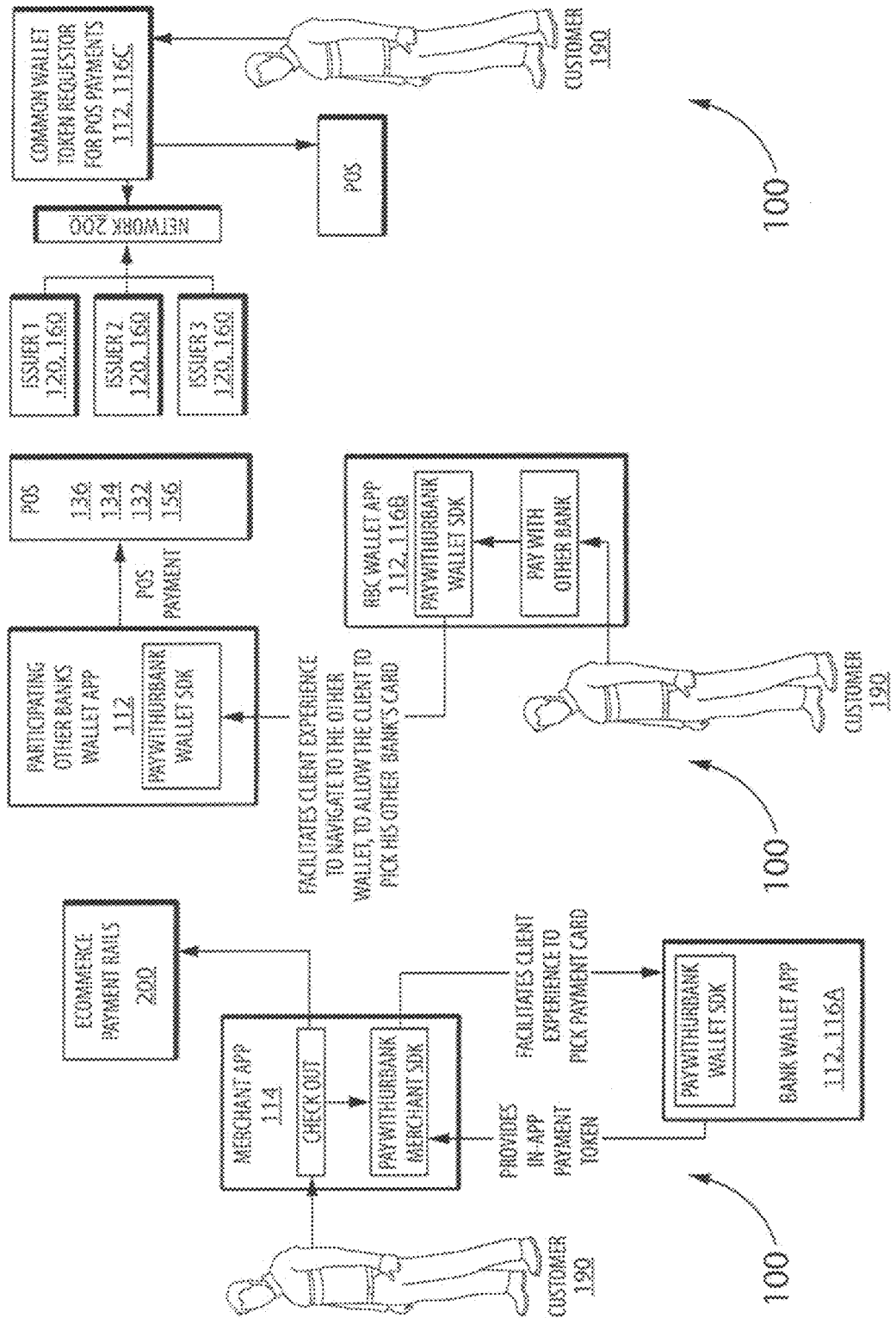
FIGS. 23A, 23B and 23C show schematic diagrams illustrating further aspects of systems in accordance with the invention.

Thus, as shown for example in FIGS. 23A-23C in various aspects and embodiments the invention provides systems 100 configured to process HCE compliant payment tokens and credentials.

In the embodiment shown FIG. 23A, processes implemented by a payment options application 116A, configured to cooperate with a merchant application 114 on a user device (i.e., a transaction request communication device) 110, 110', are shown. The device 110, 110' comprises at least one output display device 610; at least one user input device 610; at least one network communication system 612, 614, 616; at least one data processor 602; and at least one persistent memory device 604, 608, 618. The at least one persistent memory device 604, 608, 618 comprises stored data representing at least: at least one secure payment token, the at least one secure payment token comprising data associated with an authorized payment amount and a financial service provider 120, 160 by which the authorized payment amount was authorized; and one or more sets of machine-interpretable instructions. The at least one data processor 602 is adapted, by execution of the one or more stored sets of machine-interpretable instructions, to, in response to a first set of signals generated by the at least one user input device 610, initiate processing by (i.e., to invoke) a merchant transaction application 114 associated with a merchant 136, 136' and comprising one or more sets of machine-interpretable instructions stored in the at least one persistent memory device 604, 608, 618 of the transaction request communication device 110, 110'; in accordance with said machine interpretable instructions comprised by said merchant transaction application 114 and at least a second set of signals generated by the at least one user input device 610, generate a requested transaction data set, the requested transaction data set comprising at least an identifier associated with the merchant 136 and a transaction amount payable to the merchant; and cause the at least one output display screen 610 to display a human-interpretable user interface 1407 adapted to solicit a user selection of a merchant checkout process and a virtual wallet application application payment process; the virtual wallet application process associated with a virtual wallet application 112, the virtual wallet application comprising one or more sets of machine-interpretable instructions and the at least one secure payment token; in response to a third signal set received from the at least one user input device 610, the second signal set representing a user selection of the virtual wallet application payment process, cause the merchant transaction application 114 to poll the corresponding virtual wallet application and acquire payment credentials associated with the at least one secure payment token and generate a transaction authorization request data set, the transaction authorization request data set comprising at least the payment credentials, the identifier associated with the merchant, and the transaction amount payable to the merchant; and, using the at least one network communication system 612, 614, 616 route the transaction authorization request data set to a server 120, 160 associated with a source of payment resources associated with the payment credentials.

In the embodiment shown FIG. 23B, processes implemented by a virtual wallet 112, 116B associated with a first FI/FSP 120, 160, configured to cooperate with a virtual wallet application 112 associated with a second FI/FSP 120, 160, not commonly controlled or otherwise by, or associated with, a second FI/FSP 120 on a user device (i.e., a transaction request communication device) 110, 110', are shown. The device 110, 110' comprises at least one user input and/or output device 610; at least one network communication system 612, 614, 616; at least one data processor 602; and at least one persistent memory device 604, 608, 618. The at least one persistent memory device 604, 608, 618 comprises stored data representing at least: a plurality of secure payment token references, each secure payment token reference comprising data representing an identifier associated with one of a plurality of sources of transaction payment resources; and one or more sets of machine-interpretable instructions. The at least one data processor 602 is adapted, by execution of the one or more stored sets of machine-interpretable instructions, to: initiate execution of operations by (i.e., 'invoke'), in response to a first set of signals generated by the at least one user input device 610, a payment transaction process, the payment transaction process generating a requested transaction data set, the requested transaction data set comprising at least an identifier associated with a merchant and a transaction amount payable to the merchant; in response to a second set of signals generated by the at least one user input device 610, initiate a first wallet application 112, 116B, the first wallet application 112, 116B comprising at least a first one of the plurality of secure payment token references and stored machine-interpretable instructions configured to: cause the at least one output display screen 610 to display a human-interpretable user interface 1407 adapted to solicit a user selection of one a plurality of sources of payment resources to be applied toward satisfaction of a requested transaction, at least one of the sources of payment resources associated with the source of payment resources identified by the first one of the plurality of secure payment tokens, and at least a second of the sources of payment resources not associated with the source of payment resources identified by the first one of the plurality of secure payment tokens; receive from the at least one user input device 610 signals representing a user selection of one of the plurality of sources of payment resources to be applied toward satisfaction of a related transaction; and if the user selection of one of the plurality of sources of payment resources corresponds to the source of payment resources identified by the first one of the plurality of secure payment tokens, generate a transaction authorization request data set comprising at least the first one of the plurality of secure payment token references, and, using the at least one network communication system, route the transaction authorization request data set to a server 120, 160 associated with the source of payment resources identified by the first one of the plurality of secure payment tokens. The networked request communication device 110, 110' may further be configured, if the user selection of one of the plurality of sources of payment resources does not correspond to the source of payment resources identified by the first one of the plurality of secure payment tokens, to initiate a second wallet application 112, the second wallet application 112 comprising at least a second one of the plurality of secure payment token references and stored machine-interpretable instructions configured to cause the same or another data processor 602 to generate a transaction authorization request data set comprising at least the second one of the plurality of secure payment token references, and, using the least one network communication system, route a transaction authorization request data set generated by either first or the second wallet application to a transaction processing system associated with the merchant.

In the embodiment shown FIG. 23C, processes implemented by a universal (or "common") virtual wallet 112, 116C of a networked request communication device 110, 110' configured to cooperate with virtual wallet applications 112 and/or FI/FSP server(s) 120, 160 associated with plurality of un-a FIs/FSPs 120, 160, are shown. The device 110, 110' comprises at least one user input and/or output device 610; at least one network communication system 612, 614, 616; at least one data processor 602; and at least one persistent memory device 604, 608, 618. The at least one persistent memory device 604, 608, 618 comprises stored data representing at least: a plurality of secure payment token references, each secure payment token reference comprising data representing an identifier associated with one of a plurality of sources 120, 160 of transaction payment resources and a security key uniquely associated with said source of transaction payment resources; and one or more sets of machine-interpretable instructions. The at least one data processor 602 is adapted, by execution of the one or more stored sets of machine-interpretable instructions, to: initiate execution by, or "invoke", in response to a first set of signals generated by the at least one user input device 610, a payment transaction process, the payment transaction process generating a requested transaction data set, the requested transaction data set comprising at least an identifier associated with a merchant 136, 136' and a transaction amount payable to the merchant; in response to a second set of signals generated by the at least one user input device 610, initiate a universal (or "common") wallet application 112, 116C, the universal wallet application 116C comprising stored machine-interpretable instructions configured to generate transaction authorization request data sets, each transaction authorization request data set comprising at least a secure payment token reference, and at least one transaction payment amount; and in response to a third set of signals generated by the at least one user input device 610, the third set of signals representing at least a user selection identifying one of the plurality of sources of transaction payment resources, generate a transaction authorization request data set, the generated transaction authorization request data set comprising at least a secure payment token reference associated with the selected source of transaction payment resources and the transaction amount payable to the merchant 136; and using the at least one network communication system 610, 612, 614, 616, route the generated transaction authorization data set to a server associated 120, 160 with the identified source of payment resources.

Referring back to FIG. 17C, in some embodiments such as that shown, generation and routing of the transaction authorization request data set is conditioned upon receipt by the at least one data processor of a fourth set of signals generated by the at least one user input device, the fourth set of signals comprising at least a secure identifier associated with an authorized user of the device.

In some embodiments in accordance with FIG. 17C, the data processor 602 is adapted, by execution of the same or other stored sets of machine-interpretable instructions, to: using the same or another network communication system 610, 612, 614, 616, receive, from the same or another server 120 associated with the identified source of payment resources, a secure transaction authorization data set; and using the same or another of the at least one communication system 610, 612, 614, 616, route the secure transaction authorization data set to a transaction processing system 136, 136' associated with the merchant.

Further advantages offered by such aspects and embodiments of the invention include the ability of issuing FIs/FSPs, merchants, etc., to offer users 190 simplified access to payment options, and unified 'customer experiences' across a variety of platforms, including mobile and desktop devices, etc., and during purchase and other transactions across a broad range of contexts, as defined by merchants, FIs, FSPs, etc. In some embodiments, the user 190 of a device 110, 110' may customize all or part of the experience in accordance with her/his preferences. As previously noted, customer experiences can be extended across traditional boundaries such as payment method(s) preferred by merchants, FIs, FSPs, and others.

A system for a loyalty platform provides one or more interfaces for processing transactions for one or more loyalty programs. In some embodiments, the loyalty platform is configured for managing loyalty point earning and redemption parameters, loyalty points bank capabilities, and settlement/clearing services. In some embodiments, the loyalty platform allows for points redemptions for payment/goods (for example, at a retail location), points-to-cash-redemption, and the like.

In some embodiments, aspects of the loyalty program are similar to, are based on, and/or utilize aspects of the electronic payment processes described herein or otherwise.

Figure 27:
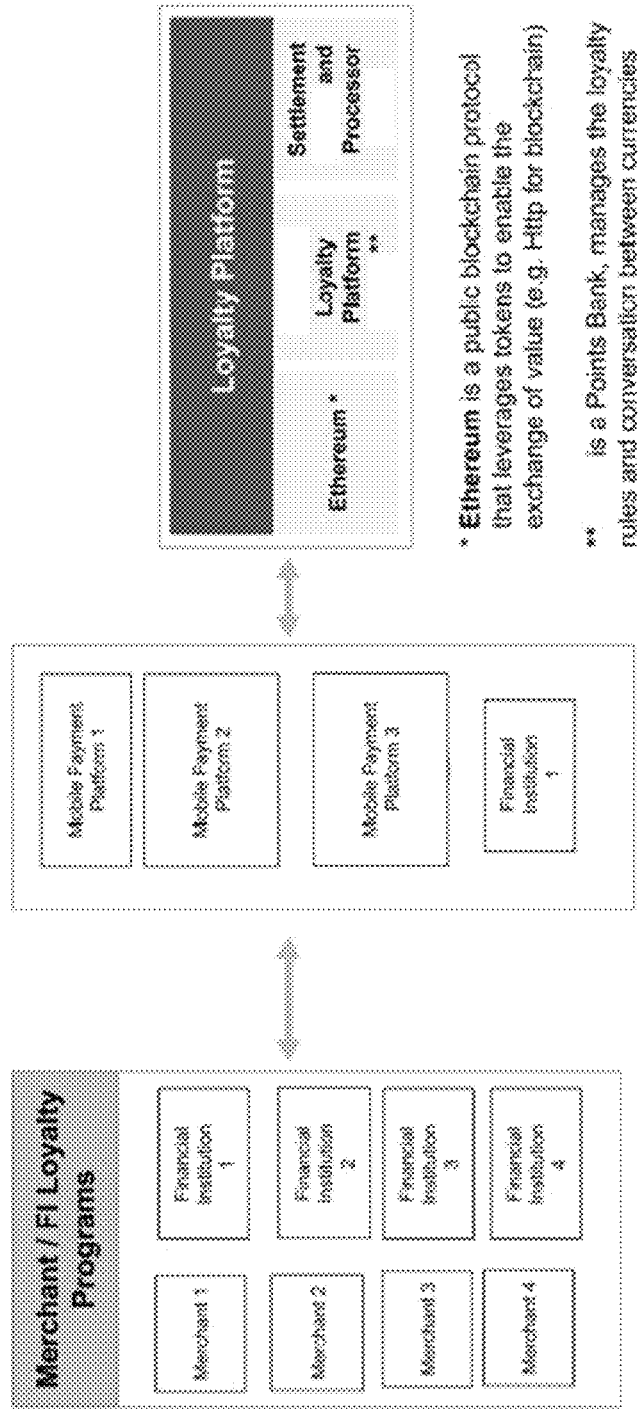
FIG. 27 is a diagram illustrating aspects of an example loyalty platform.

FIG. 27 is an illustration of a sample loyalty platform, at a high level.

As provided in the processes of FIG. 28, in some embodiments, the loyalty platform is configured to interact with mobile payment systems such as Apple Pay™ Samsung Pay™, Android Pay™, RBC mobile Wallet™, or any other mobile device payment or loyalty platform and/or application.

In some embodiments, the loyalty platform is agnostic and can interact with any payment and/or loyalty application/platform.

In some embodiments, partner platforms are provided with a standardized protocol, Points bank capabilities and settlement/clearing services. In addition, points-to-cash redemption would be available using a "ghost dynamic card" in the device OEMs wallet.

The loyalty platform is a flexible merchant platform that is configured for tracking, using, and maintaining one or more "ghost cards" in a wallet, which may, in some embodiments, be dynamically maintained data structures storing one or more associations between customer accounts, merchant rewards programs, and the loyalty platform. For example, the "ghost card" may be configured to store in the data structure (e.g., a relational database, a linked list) one or more registrations that synchronize loyalty or other rewards products/accounts for a particular customer.

"Ghost cards" include identifiers that are indicative of associated routing paths, registering linkages between loyalty accounts, merchant systems, and financial accounts. These routing paths may be uni-directional, or, in some embodiments, encrypted or otherwise encoded. Routing paths may be memory locations, access credentials, API function calls, among others.

The data structures underlying the "ghost cards" may be dynamically maintained due to underlying technological requirements, such as interoperation with one or more cryptographic data structures residing on one or more distributed ledgers.

The associations on the "ghost cards" provide useful information to merchant systems that enable the systems to interact and conduct transactions in relation to various rewards systems and on a rewards platform, in some cases, without revealing the actual identity of a user, the nature of a transaction, or information on the "ghost card" relating to other merchants.

As described herein, a virtual wallet application may represent different types or sources of payment. Similarly, a dynamic or "ghost" card may represent a token or other identifier associated with different loyalty accounts. In some embodiments, the token is dynamically generated based on a location associated with the user.

When a payment with a merchant is initiated, the user's device may cause the token, a reference to such a dynamic token, and/or other encrypted data stored in a mobile wallet application or elsewhere on the mobile device, or in a secure cloud, to be transmitted to the merchant system, along with any other data fields typically utilized during a payment transaction.

In some embodiments, prior to initiation of a loyalty payment or to any other association of a loyalty account to a transaction (e.g. to earn points for the transaction), a user may provision mobile device 110, 600 with one or more loyalty credentials or sets of loyalty credentials, which may be stored in a secure element 618 and/or elsewhere in mobile device 110, 600. For example, in some cases, a user may directly enter loyalty credentials into a wallet application 112, 622 for storage in secure element 618. When stored in secure element 618, it may be possible for such loyalty credentials to be entered and stored directly without tokenization. Any example embodiments referencing payment credentials or payment tokens, described herein or otherwise, can be similarly applied to loyalty payments/transaction/credentials/tokens.

Alternatively, mobile device 110, 600 may be provisioned by a merchant or other entity, such as via a loyalty platform, with tokenized loyalty credentials corresponding to a loyalty account. For example, a wallet application 112, 622 or some other program or application, including those not located on mobile device 110, 600 may be used to request loyalty tokens from the loyalty platform. In some embodiments, loyalty or merchant applications on the mobile device may provide the loyalty token to the wallet application.

Figure 29:
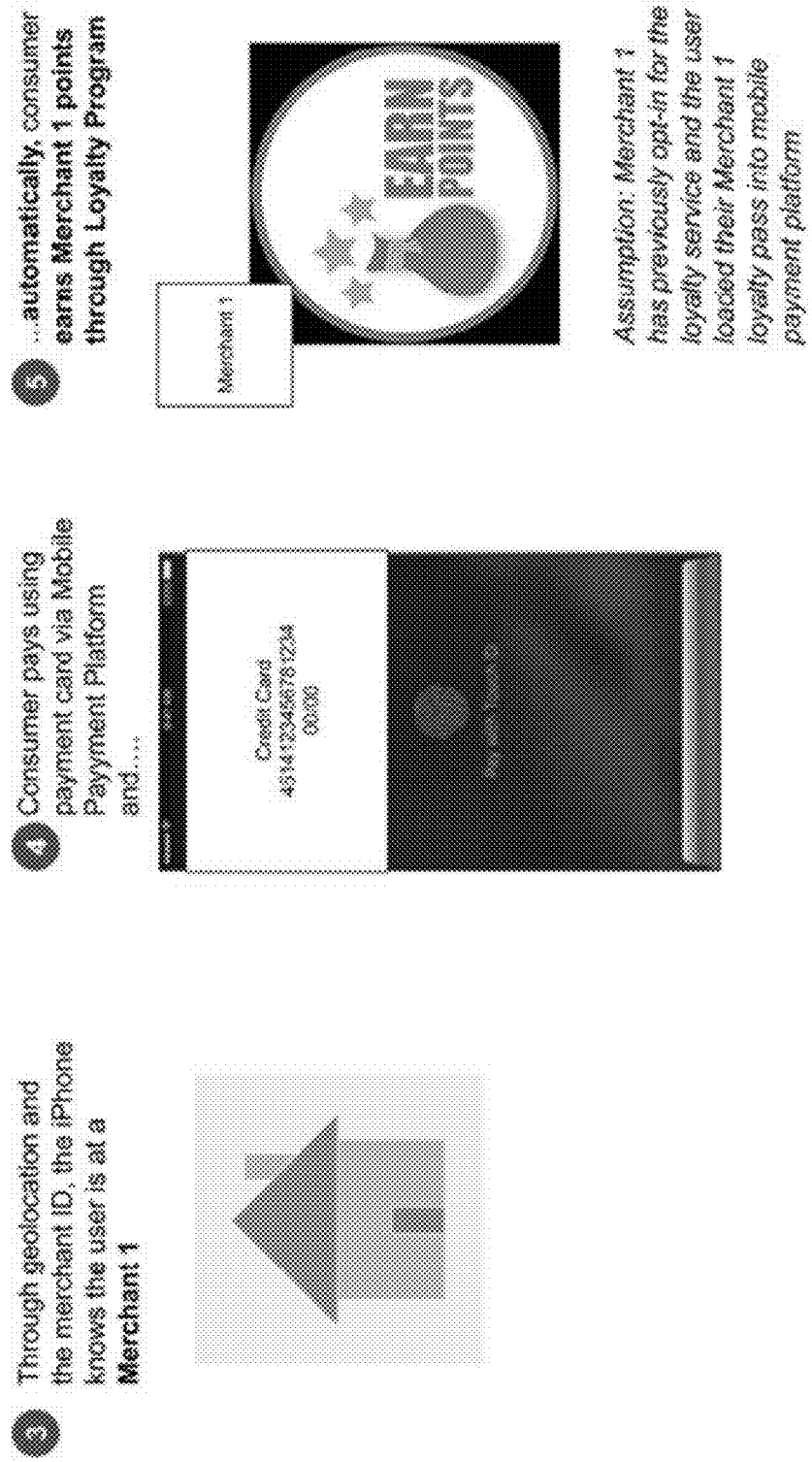
Figure 30:
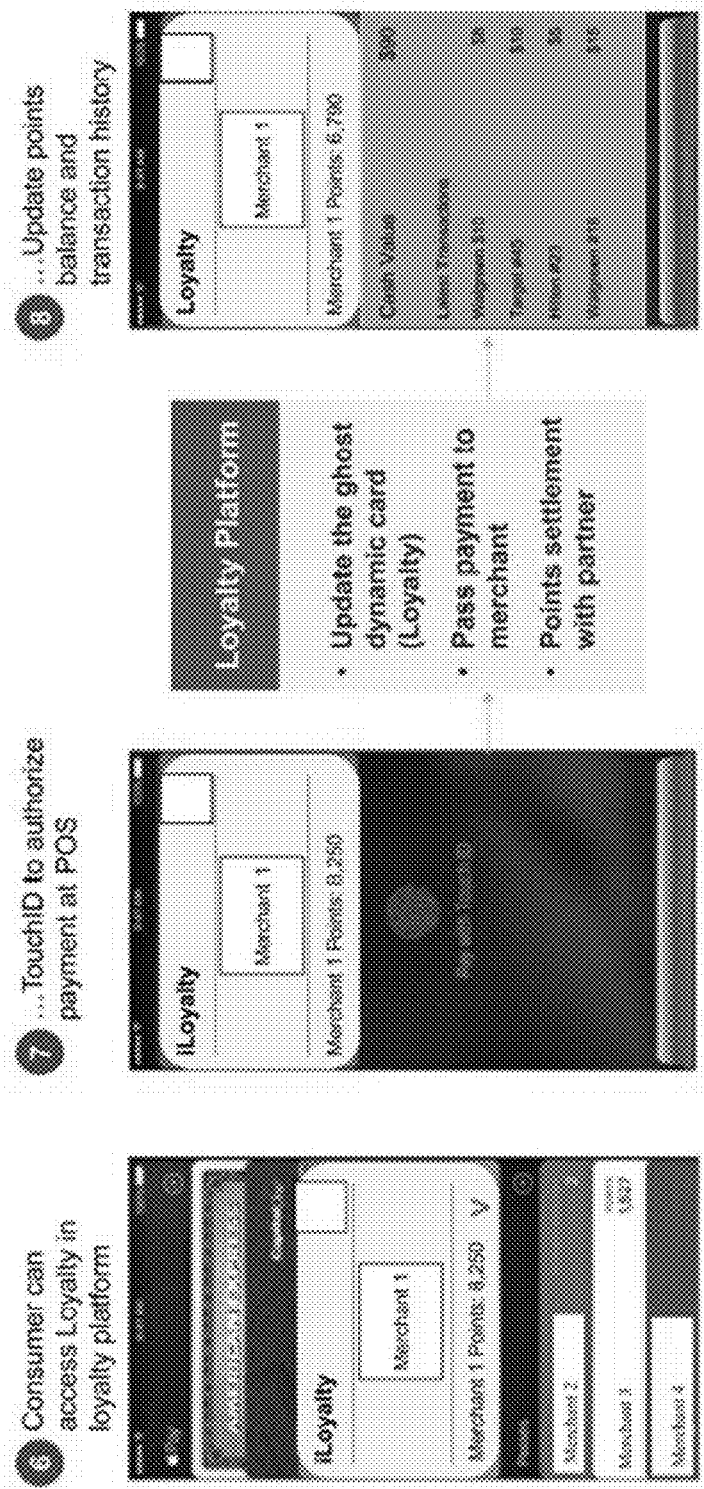

At FIGS. 29-30, a method flow is provided illustrating that geolocation and payment processes may be utilized together to provide one or more merchant identifiers adapted for loyalty service provisioning at points of sale and other terminals. Where electronic payment formats are utilized, the provisioning of points or other rewards may be conducted automatically. For example, through an opt in, the user may wish to be rewarded points for engaging in transactions with one or more participating merchants. When a point of sale system conducts a transaction, the point of sale system may identify the transaction including either the rewarding or redemption of points/rewards, and may trigger corresponding workflows and methods to occur, without the need for the user to carry other identifiers relating to the points/rewards, or to login through an interface.

Redemption and rewards may be automatically tracked and provisioned with minimal input from the user or the merchant, and various offers/coupons and other mechanisms may be utilized to modify interactions with underlying points/rewards systems (e.g., earn 5× for a limited period of time). Available rewards may be automatically identified as the transaction is being processed.

The "ghost card" mechanism provides a convenient solution for onboarding a multitude of different merchant systems, having a variety of protocols and security requirements. Automatic code/rule-based implementations are also possible, allowing for automated conversions, logical modifications (e.g., incentive programs) to be implemented in a consistent yet flexible manner across different merchants and/or underlying rewards types. The data structures underlying the "ghost cards" may be dynamically maintained.

Figure 39:
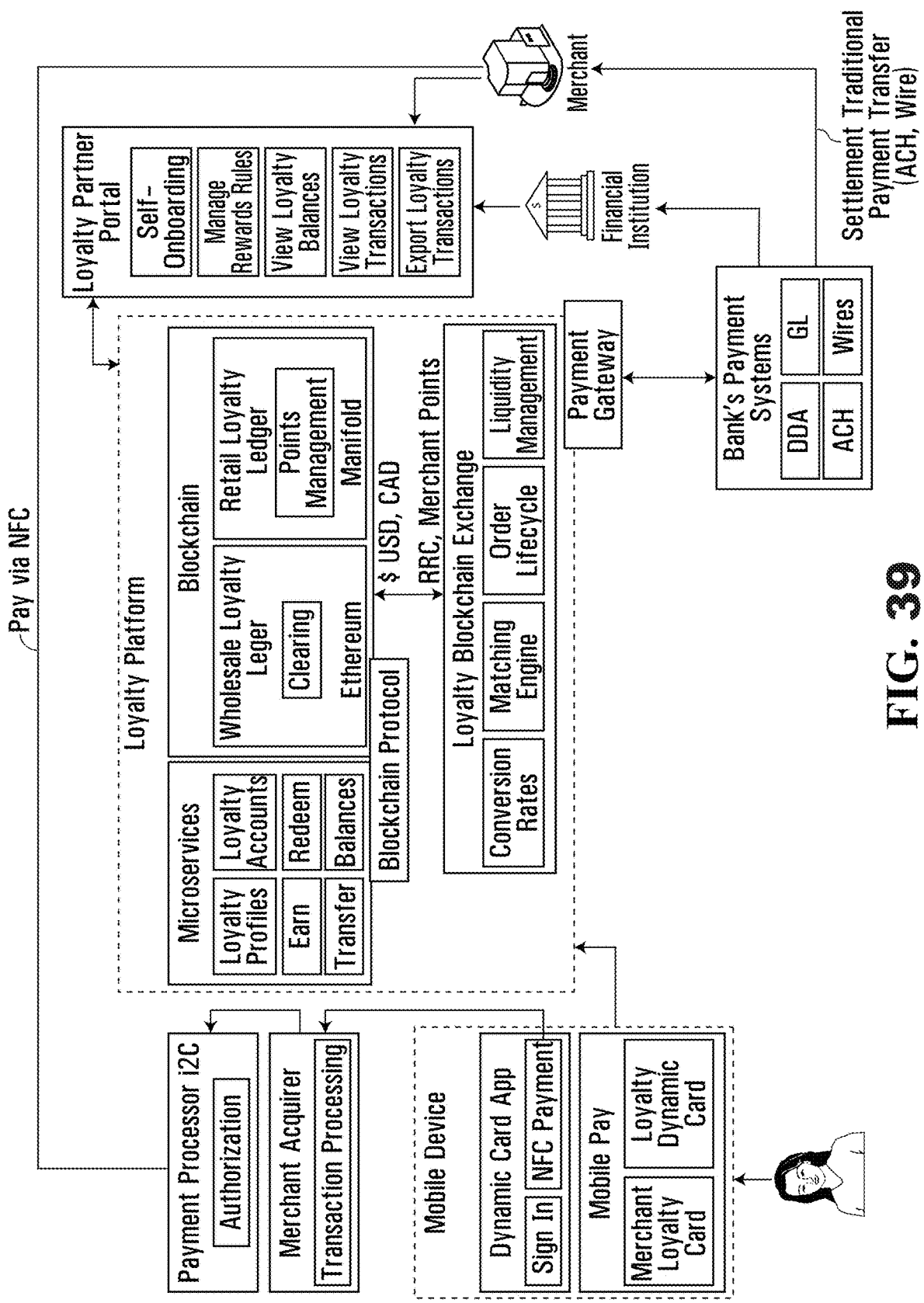
FIG. 39 is an example system infrastructure diagram, according to some embodiments.

FIG. 39 is an example system infrastructure diagram, according to some embodiments. The loyalty platform is configured to interact with an external payment processor, the user's mobile device, and loyalty partner systems (e.g., as registered on a loyalty partner portal). The loyalty platform is includes one or more micro-services such as: wilted profiles, loyalty accounts, earning mechanisms, redeeming mechanisms, transferring mechanisms, balance checking mechanisms, among others. The loyalty platform may be implemented using one or more processors, working in conjunction with one or more computer readable memories, configured to interaction via one or more user interfaces or application programming interfaces.

The nodes of the public or the private ledger may, for example, be implemented using processors, computing devices, and computer readable memories, each of the computer readable memories storing a distributed copy of the ledgers and configured for receiving new transactions, which are propagated across the distributed ledgers stored on each node through one or more consensus mechanisms (e.g., only transactions with authorized private keys may be added at the end of the blocks, and where there are conflicting transactions, a transaction with an earlier time-stamp may prevail over a transaction with a later time-stamp).

A "ghost card" data structure may then register with one or more external data structures resident in or in communication with the loyalty platform configured for tracking, maintaining, rewarding, or otherwise redeeming or interacting with one or more loyalty programs.

In a preferred embodiment, the registration synchronizes loyalty points with both a public blockchain stored on a first distributed ledger, and a private blockchain stored on a second distributed ledger. Variations are possible, and none, or only one of the public or private data structures may be blockchains that reside on distributed ledgers.

Each "ghost card" is a maintained set of virtual associations that may, for example, include memory locations, blockchain locations, customer/account identifiers, among others. The stored data may be stored in various compressed/modified forms, for example, as hash values computed from underlying plaintext data (e.g., to provide an additional layer of protection), and in some embodiments, public/private key encryption may be utilized such that while ghost card data may be read by one or more merchant systems, the merchant systems are only able to access or conduct transactions on the ghost card data structures/data fields from which they are able to authenticate or otherwise decrypt the information.

In some embodiments, the system, for each "ghost card", may be configured for receiving one or more different types of instructions, a first type of instruction set that allows for queries to be conducted on information either stored on or obtained through traversing the associations stored on the "ghost card". For example, a merchant system or a user may wish to invoke a function call through an API, which when provided with a validated authorization key, causes the querying of current balances stored on either a public rewards data structure or a private rewards data structure.

The loyalty platform includes one or more "ghost card" data structures, stored on distributed ledgers adapted to manage and track the associations under other transactional information. These associations interoperate with the public rewards data structure or a private rewards data structures, which for example, may be stored on two separate ledgers, a first ledger including a "wholesale" loyalty ledger, and the second ledger including a "retail" loyalty ledger loyalty larger and these can be used for different functionality.

There may be distinctions between the different ledgers from a technical perspective, such as the ability to settle large amounts of transactional data parallel processing of transactions, among others. Accordingly, a controller or adaptor may be utilized to route different control signals or instructions, etc., such that each of the ledgers is used for different allocations of tasks (e.g., transaction recordal, clearing, transfer, settlement, interaction with or by third party systems), etc. The different ledgers may have different propagation/consensus rules, confirmation rules, data structures (e.g., different configured blockchains, block sizes), etc., as the different ledgers may have differing levels of trust, availability of nodes, number of nodes, node connection types, etc.

In an embodiment, the wholesale loyalty larger which, for example, is a public block chain used for clearing transactions. The retail loyalty ledger, for example, may be a private rewards data structure that is utilized for points management. The private rewards data structure may be implemented, for example, on a private network of nodes, each of which are trustworthy, maintain a high standard of cybersecurity, physically protected, virtually protected (e.g., by firewalls, NAT filtering, air gaps, controlled access, logged access), among others.

Utilizing a combination of public and private rewards data structures may be advantageous, as there may be differing technical characteristics that are useful for some functionality but not useful for others. The examples provided below are in relation to blockchain technology, but other technology may be utilized. For example, a public rewards data structure may be readily accessible by unrelated third parties (e.g., improving ease of conducting queries where, for example, a third party with the correct listing of addresses on a blockchain to query), and these unrelated third parties would not have to undertake the expense or effort to obtain access through to the loyalty platform itself. Accordingly, the loyalty platform's security infrastructure would not need to validate such use, and thus can avoid unnecessarily providing secured access. Transactions may, for example, be cleared and posted on the public rewards data structure.

However, a public data structure may be difficult to control (e.g., information, once posted, may become immutable), and transaction processing time/speed may be variable or suboptimal. The public rewards data structure, if, for example, using a technology such as Ethereum™ virtual machine, may become costly and resource intensive for transaction posting (e.g., depending on the price required to post new blocks, such as "gas"), and accordingly, various embodiments described utilized a combination of public and private data structures for transaction processing.

There may be other features of the public rewards data structure that are necessary due to the inclusion of potentially untrustworthy nodes, such as strict consensus propagation rules, etc., which may slow down or may simply be unnecessary for some functions. Transactions that need an additional level of privacy, simplicity, speed, control, or simply have high transaction processing costs on the public rewards data structure may be conducted instead on a private rewards data structure. The private rewards data structure may be provisioned having, for example, a simplified or streamlined set of processing flows, simpler consensus mechanisms, and a limited number of secured nodes. The private rewards data structure may be configured to perform differing tasks than the public data structure, such that the system is able to obtain benefit from having a diversity of both public and private rewards data structures.

A settlement adaptor may be provided that aids in coordinating activities between the different rewards data structures, in relation to the loyalty platform and transactions. For example, there may be transactions that require corresponding updates, staggered updates, etc., and the timing, content, and encapsulation of data messages may be performed by the settlement adaptor.

Figure 40A:
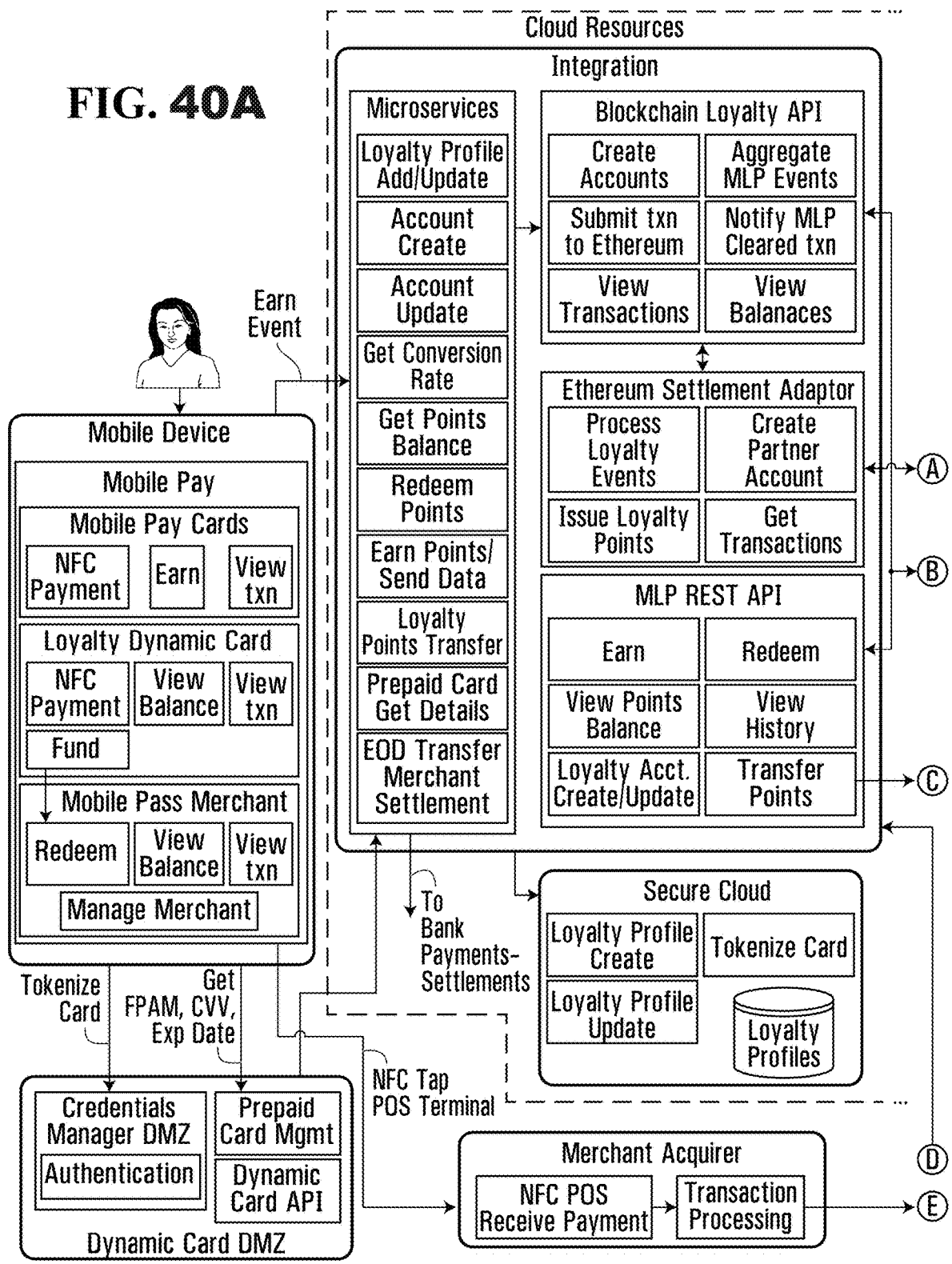
FIG. 40A and FIG. 40B are a high-level architecture diagram of an example implementation is provided, according to some embodiments.
Figure 40B:
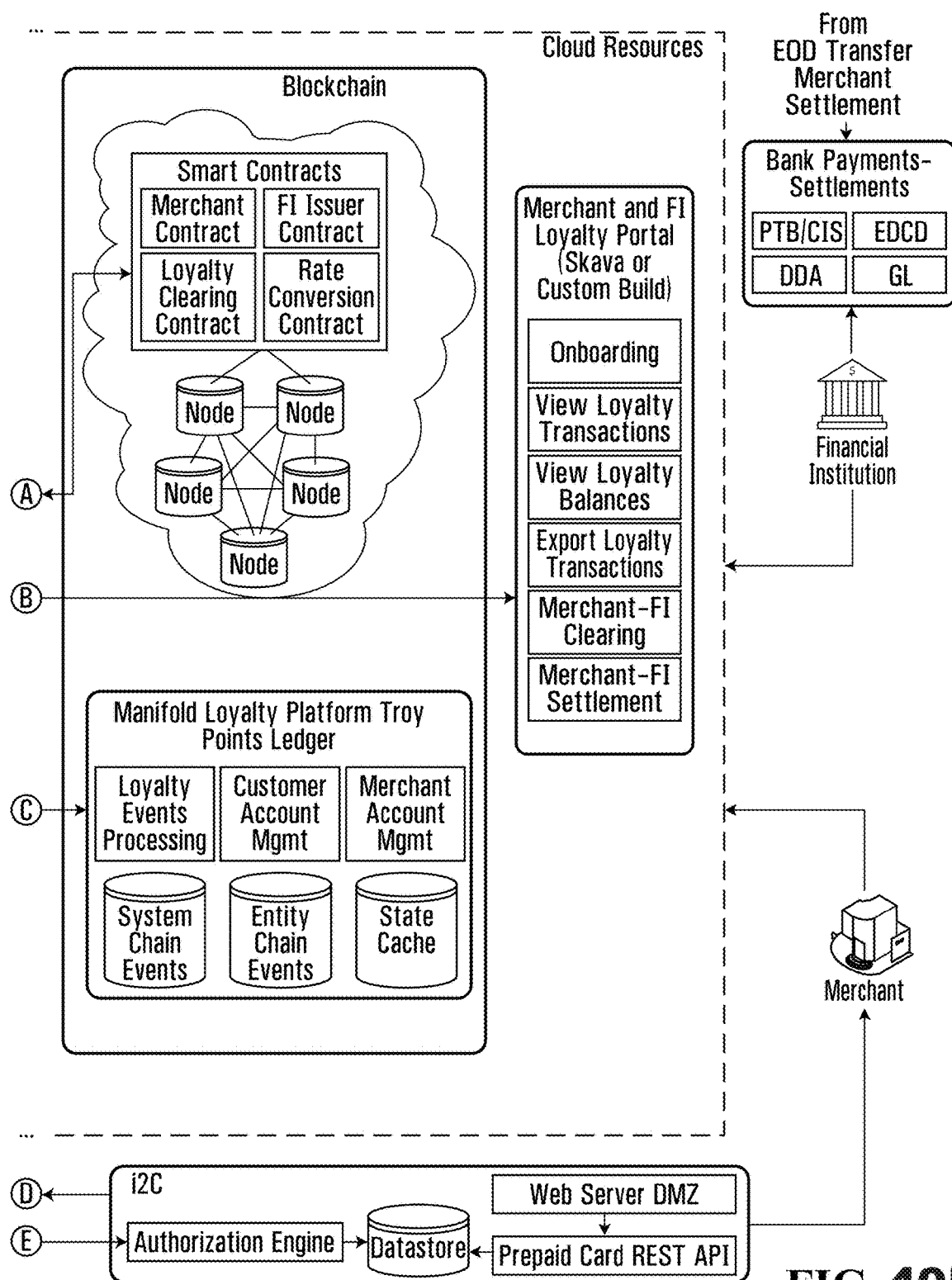

In FIG. 40A and FIG. 40B, a high-level architecture diagram of an example implementation is provided, according to some embodiments. In FIGS. 40A and 40B functionality provided by the loyalty platform is listed.

Figure 41A:
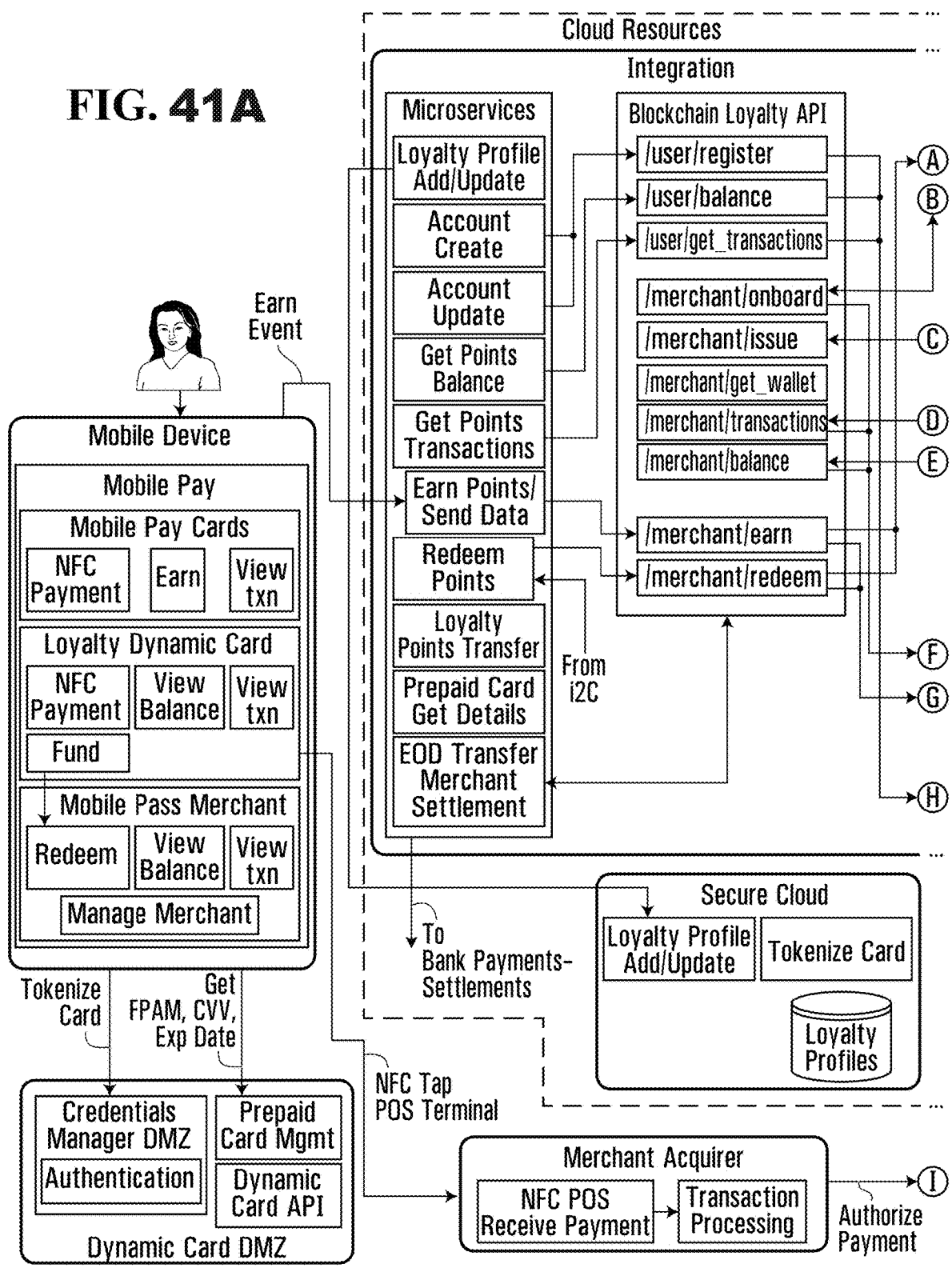
FIGS. 41A, 41B, and 41C, are a high-level architecture diagram of an example implementation is provided, according to some embodiments.
Figure 41B:
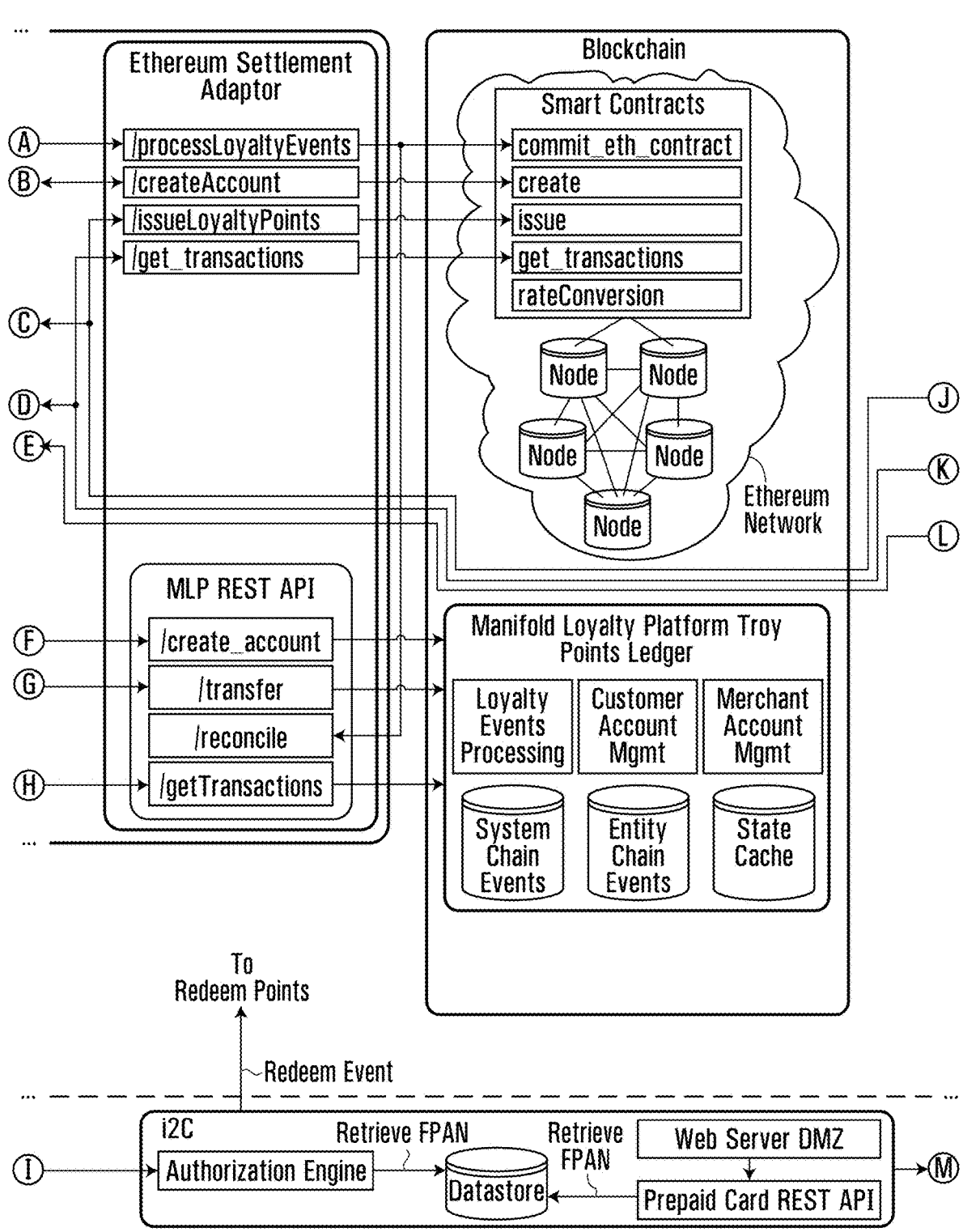
Figure 41C:
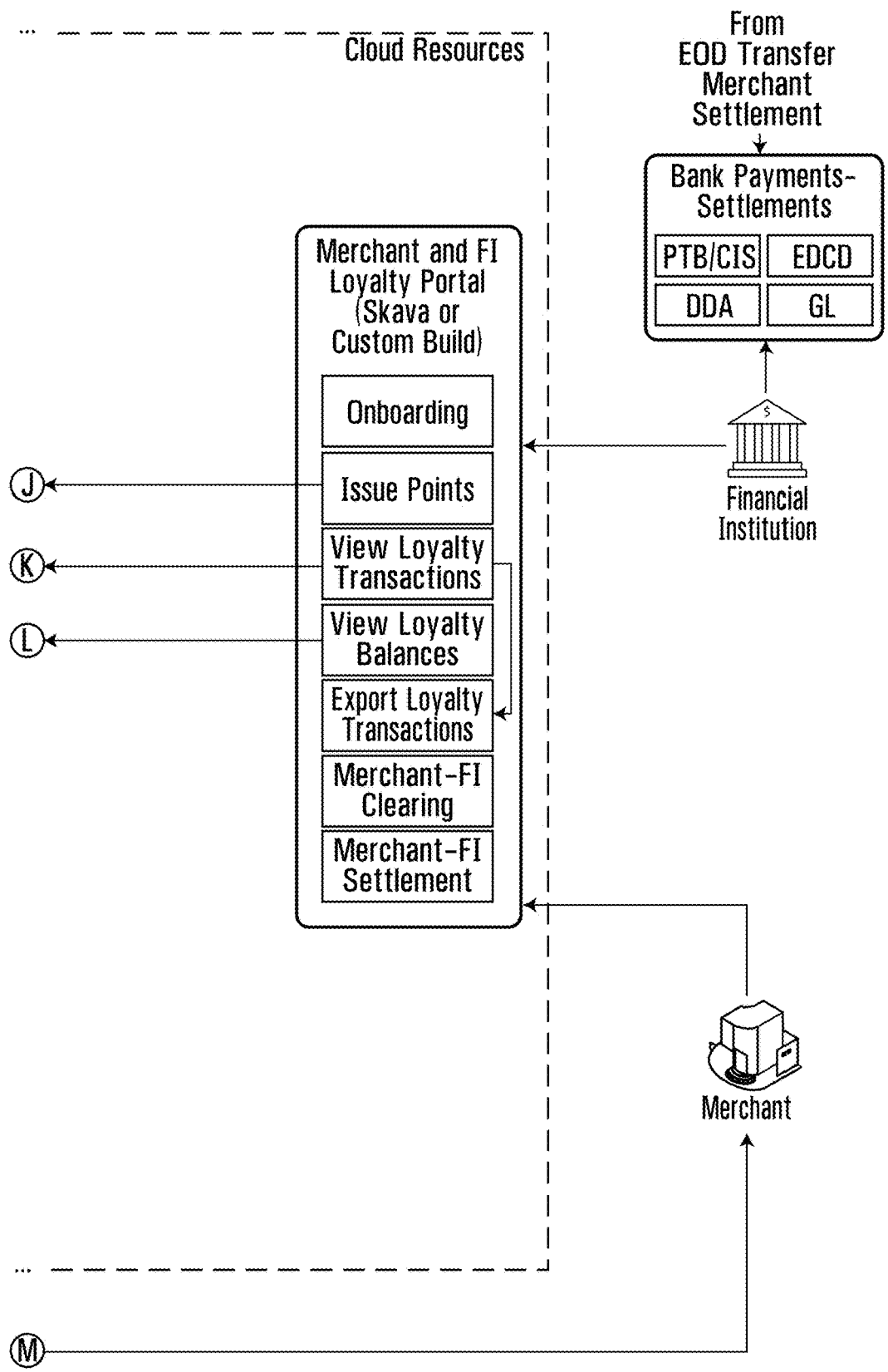

In FIGS. 41A, 41B, and 41C, a high-level architecture diagram of an example implementation is provided, according to some embodiments. In FIGS. 41A, 41B, and 41C, application programming interface (API) commands and functionality are listed.

Figure 42:
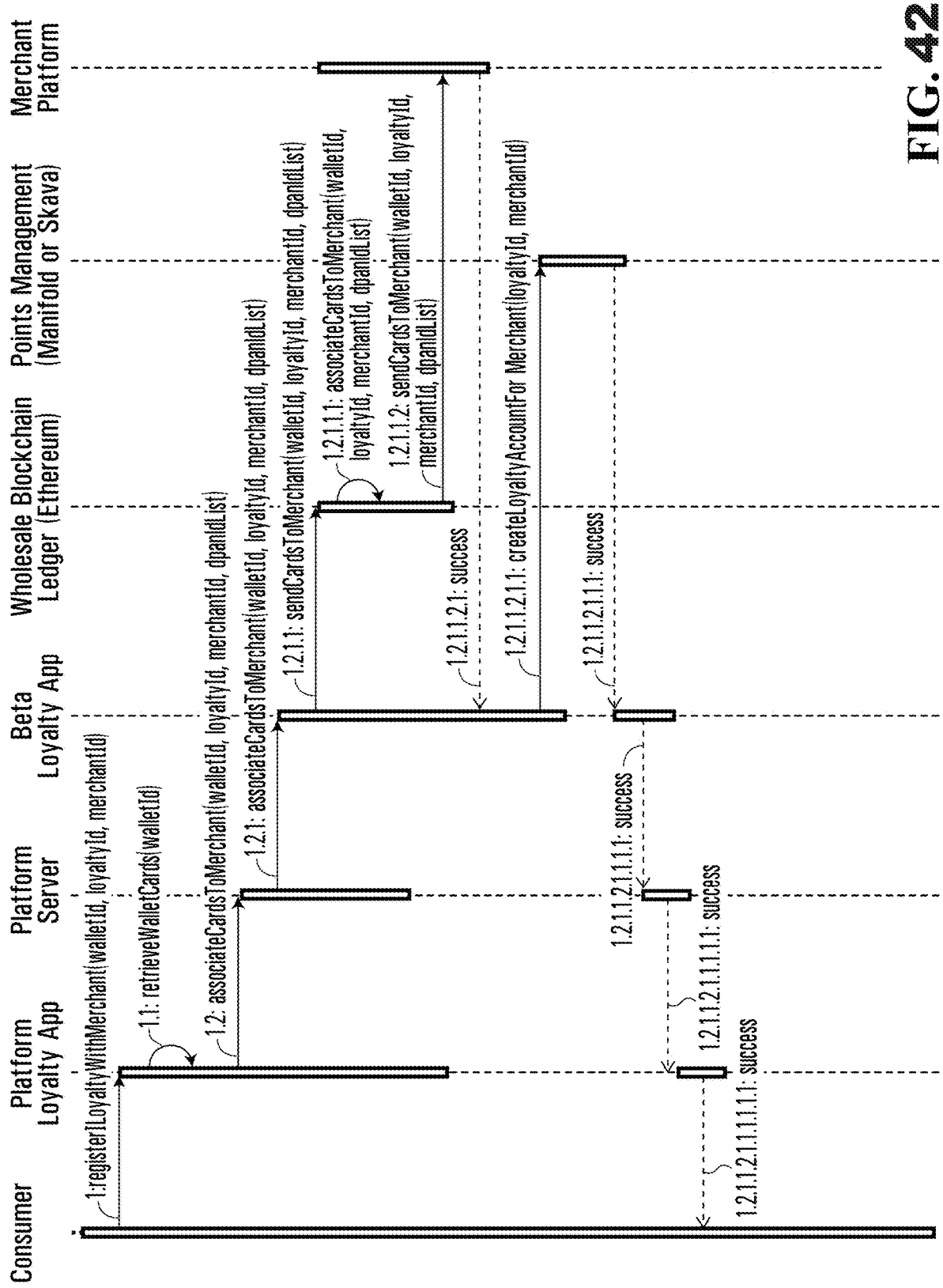
FIG. 42 is a method diagram relating to a user registration, according to some embodiments.

FIG. 42 is a method diagram relating to a user registration, according to some embodiments. At step 1 the customer utilizes the customer's mobile application to initiate a registration with the loyalty merchant and the customer's mobile device personal information. At step 1.1, wallet cards are retrieved, and at step 1.2, a "ghost card" is provisioned to associate cards with a merchant. At steps 1.1.1.1-1.2.1.2, the registration process continues whereby and the "ghost card" associations are generated. Steps 1.2.1.1.1.2.1-1.2.1.1.2.1.1.1.1.1 are illustrative of successive acknowledgements sent to various components.

Figure 43A:
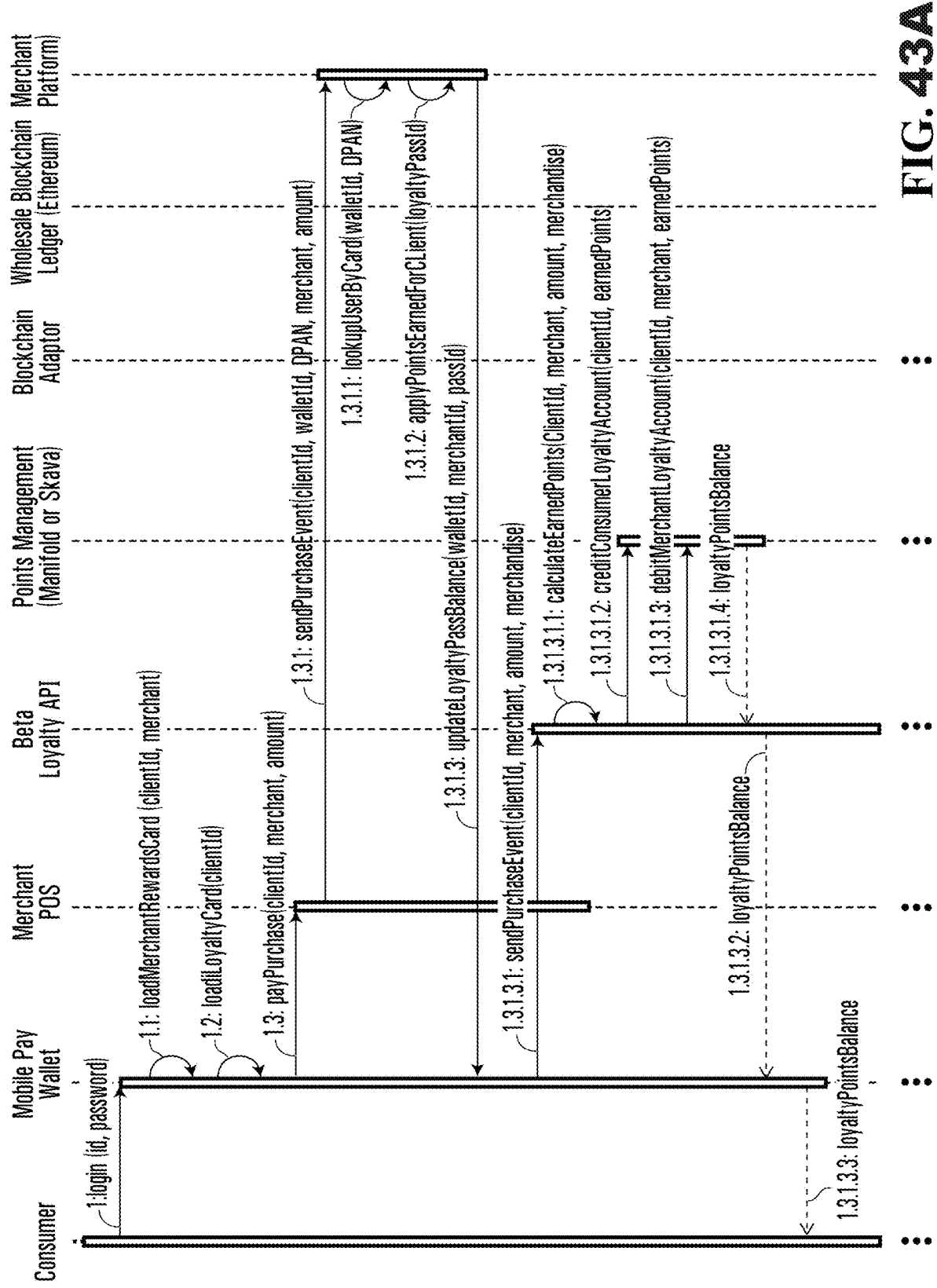
FIGS. 43A and 43B illustrate a method diagram relating to the earning of points, according to some embodiments.
Figure 43B:
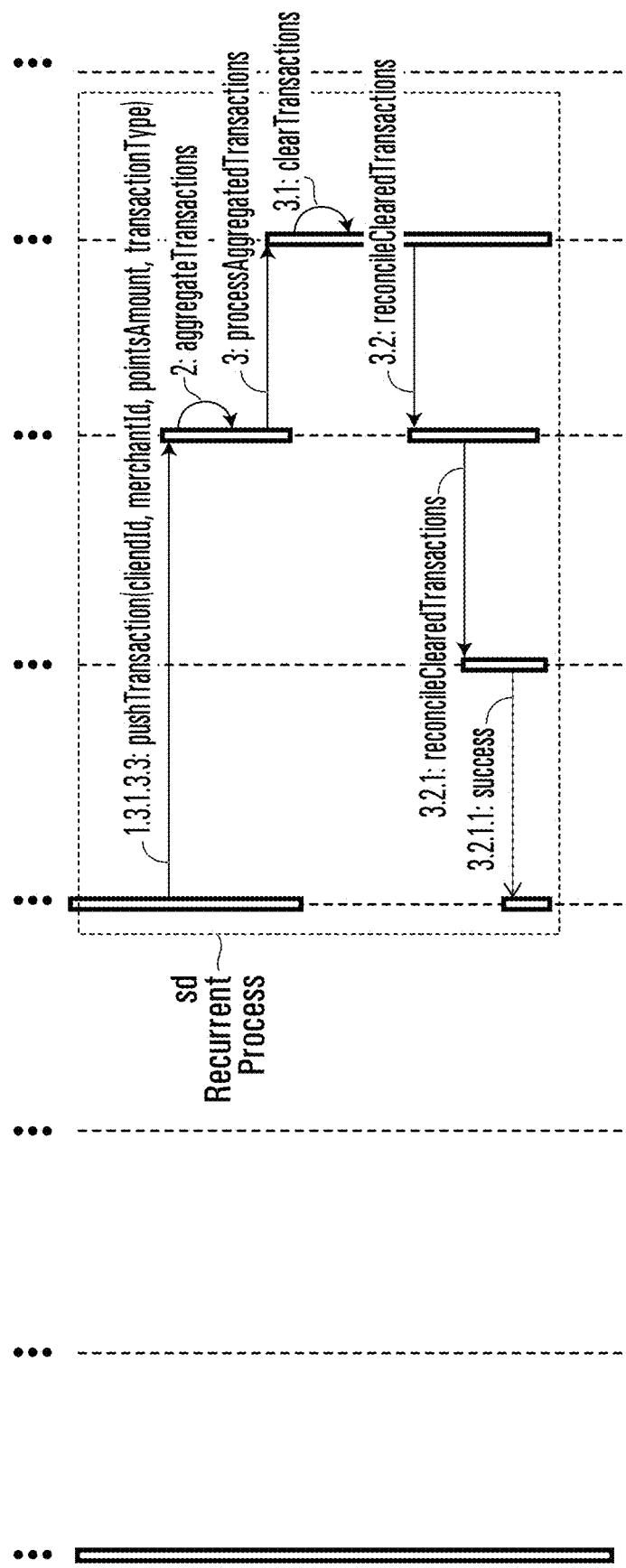

FIGS. 43A and 43B illustrate a method diagram relating to the earning of points, according to some embodiments. A customer, using a mobile pay wallet, interacts with a merchant point of sale device at steps 1-1.3, the merchant point of sale conducting transactions at 1.3-1.3.1.3. The mobile pay wallet then interoperates with the loyalty platform, at steps 1.3.13.1-1.3 . . . 1.3.2 to determine earned points, and update loyalty accounts accordingly, with the points balance being successively provided back to the customer via steps 1.3.3.1.4-1.3.1.3.3.

Figure 44B:
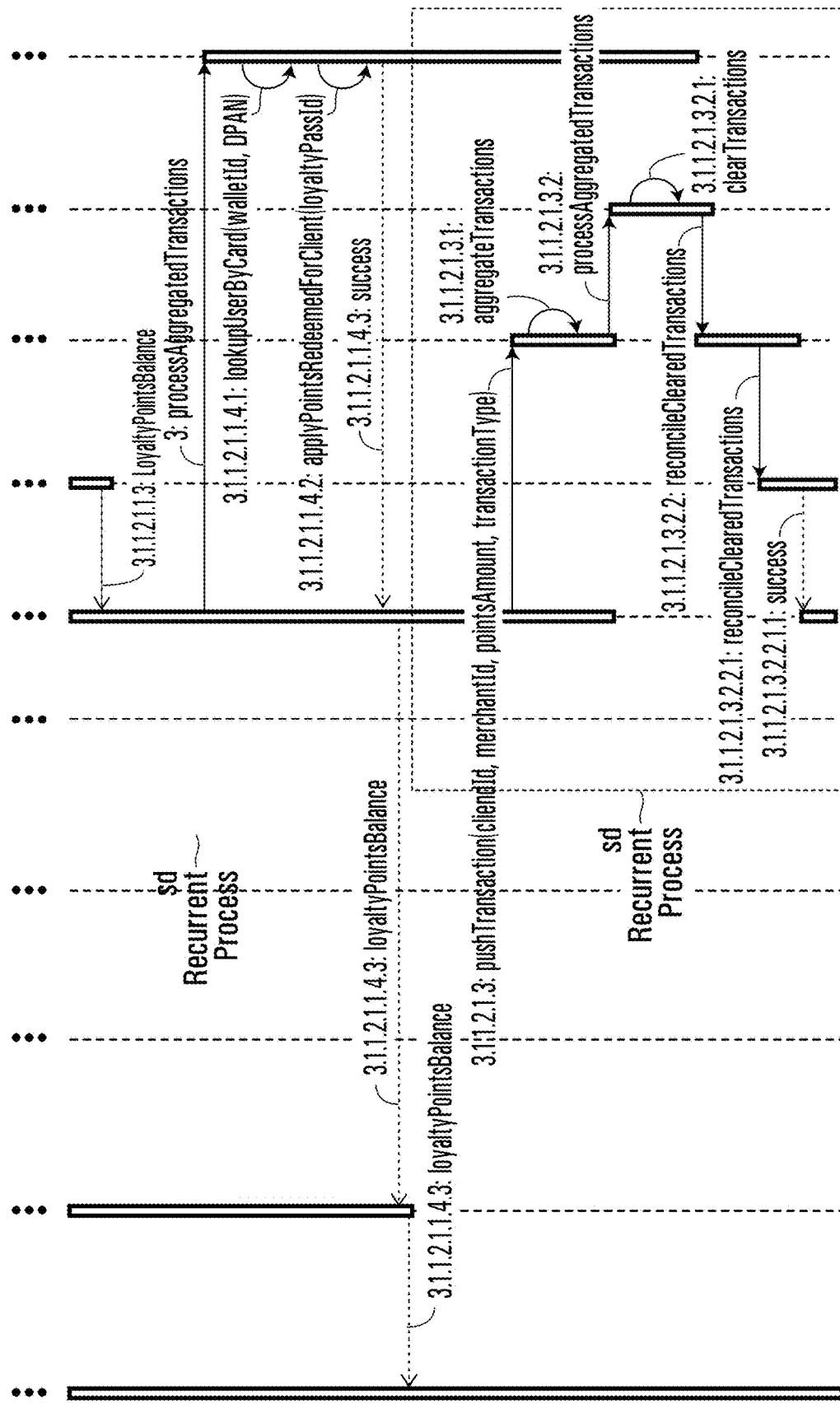

FIGS. 44A and 44B illustrate a method diagram relating to the redemption of points, according to some embodiments. A customer, using a mobile pay wallet, is able to login and select points for redemption between steps 1-2.1, and conduct a purchase through a payment processor/point of sale device between steps 3-3.1.1.2.1. Transaction information, in the form of a payment event, are transmitted between steps 3.1.1.2.1.1-3.1.1.2.1.

Payment event information is then provided to the system at 3.1.1.2.1.1, where between steps 3.1.1.2.3.2.2.1.1, a recurrent process is utilized to process transactions and update accounts stored on the various rewards data structures.

Figure 45:
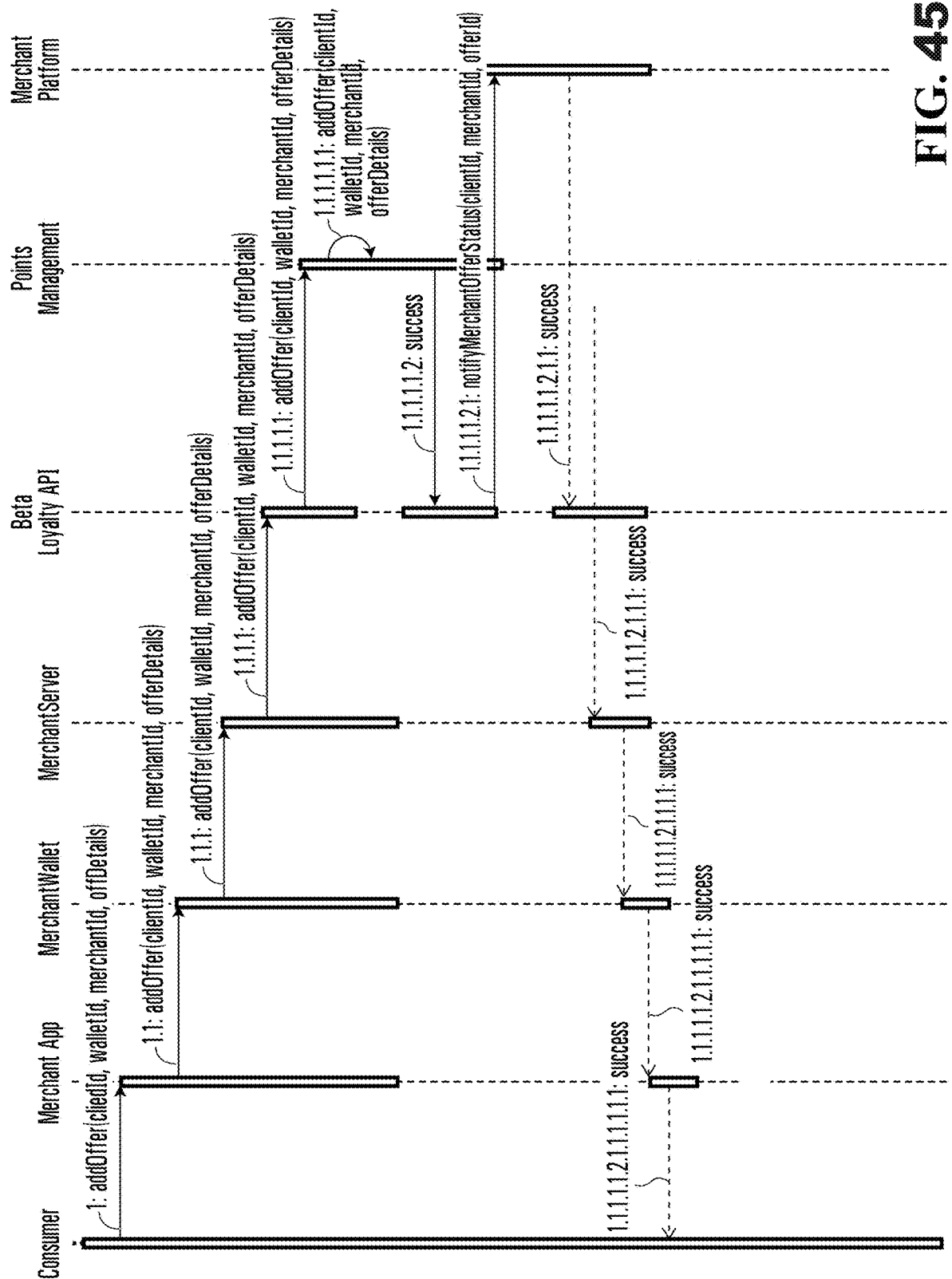
FIG. 45 illustrates a method diagram relating to the addition of an offer, according to some embodiments.

FIG. 45 illustrates a method diagram relating to the addition of an offer, according to some embodiments. At steps 1-1.1.1.1, an offer is added to a merchant application by way of a wallet and a mobile platform server. At steps 1.1.1.1.1-1.1.1.1.1.1.2.1.1, offer status are provided to the merchant platform by way of a points management mechanism that may be managed on the private rewards data structure.

Figure 46:
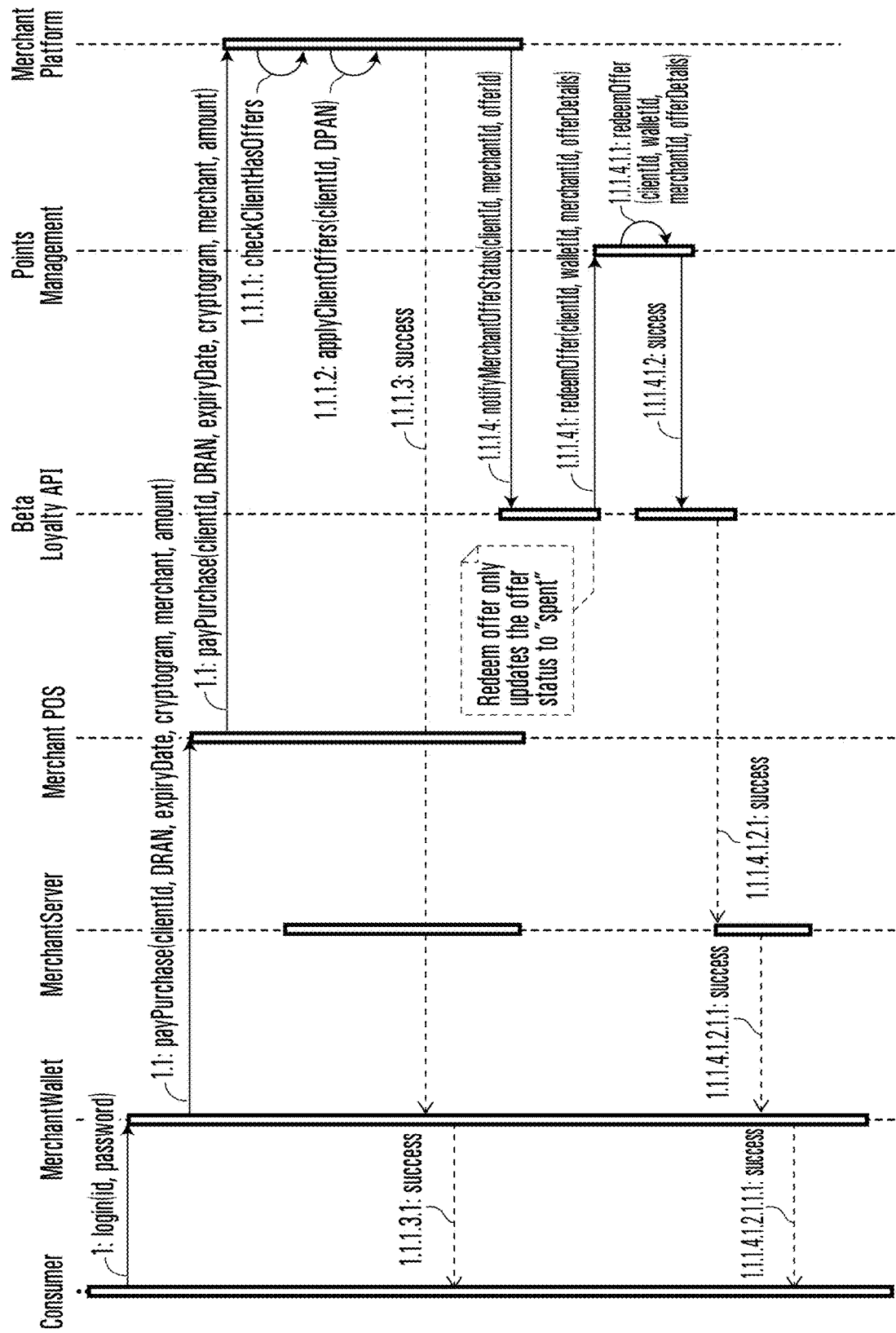
FIG. 46 illustrates a method diagram relating to the redemption of an offer, according to some embodiments.

FIG. 46 illustrates a method diagram relating to the redemption of an offer, according to some embodiments. At steps 1-1.1.1.3, an offer is redeemed through corresponding actions of the merchant point of sale device, a mobile wallet, and a merchant platform. The merchant platform invokes a function call at step 1.1.1.4, causing the loyalty rewards system to redeem an offer by updating a points management mechanism that may be managed on the private rewards data structure, at steps 1.1.1.4.1-1.1.1.4.1.2.

Figure 47A:
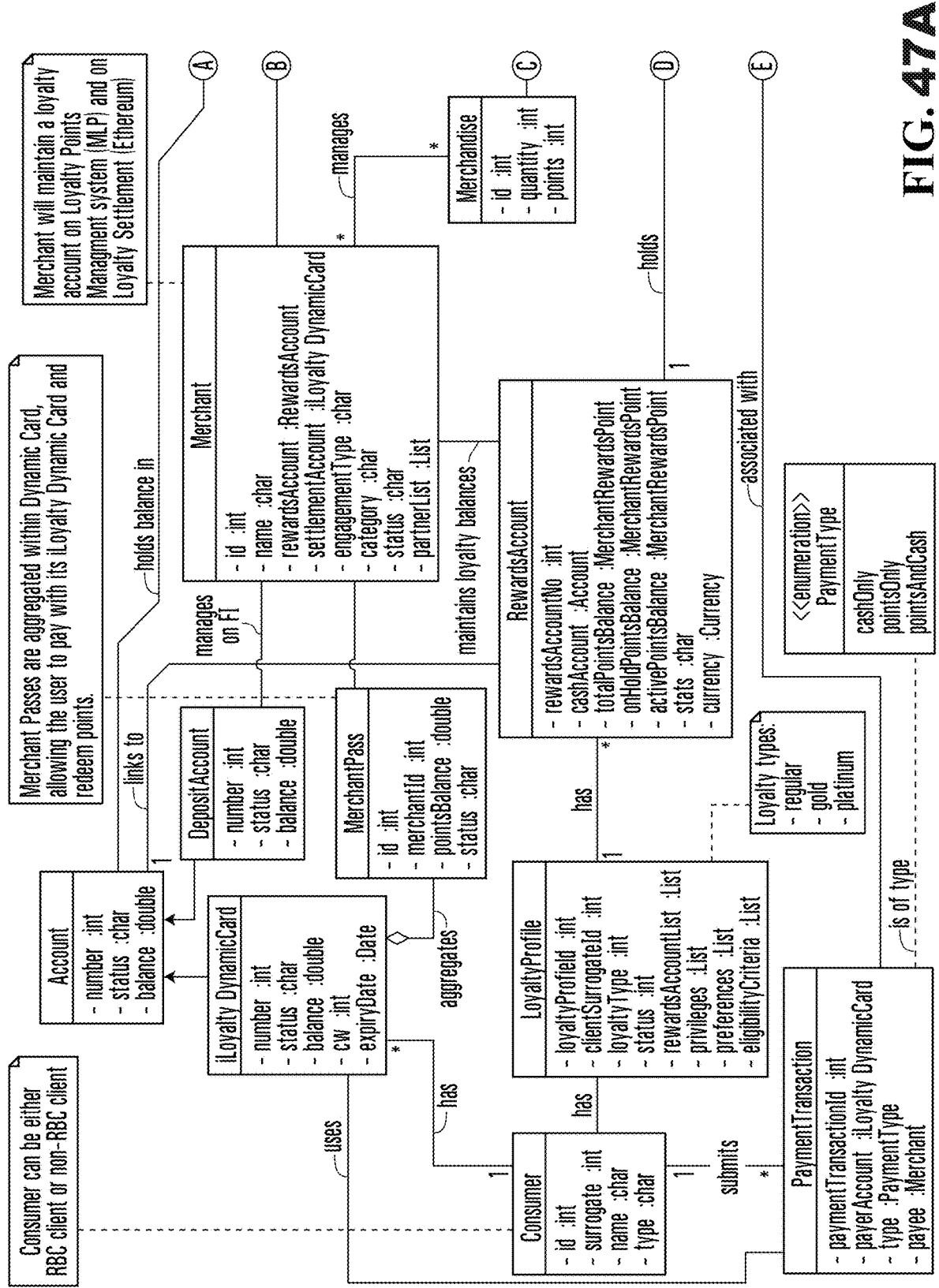
FIGS. 47A and 47B show a conceptual data model, according to some embodiments.
Figure 47B:
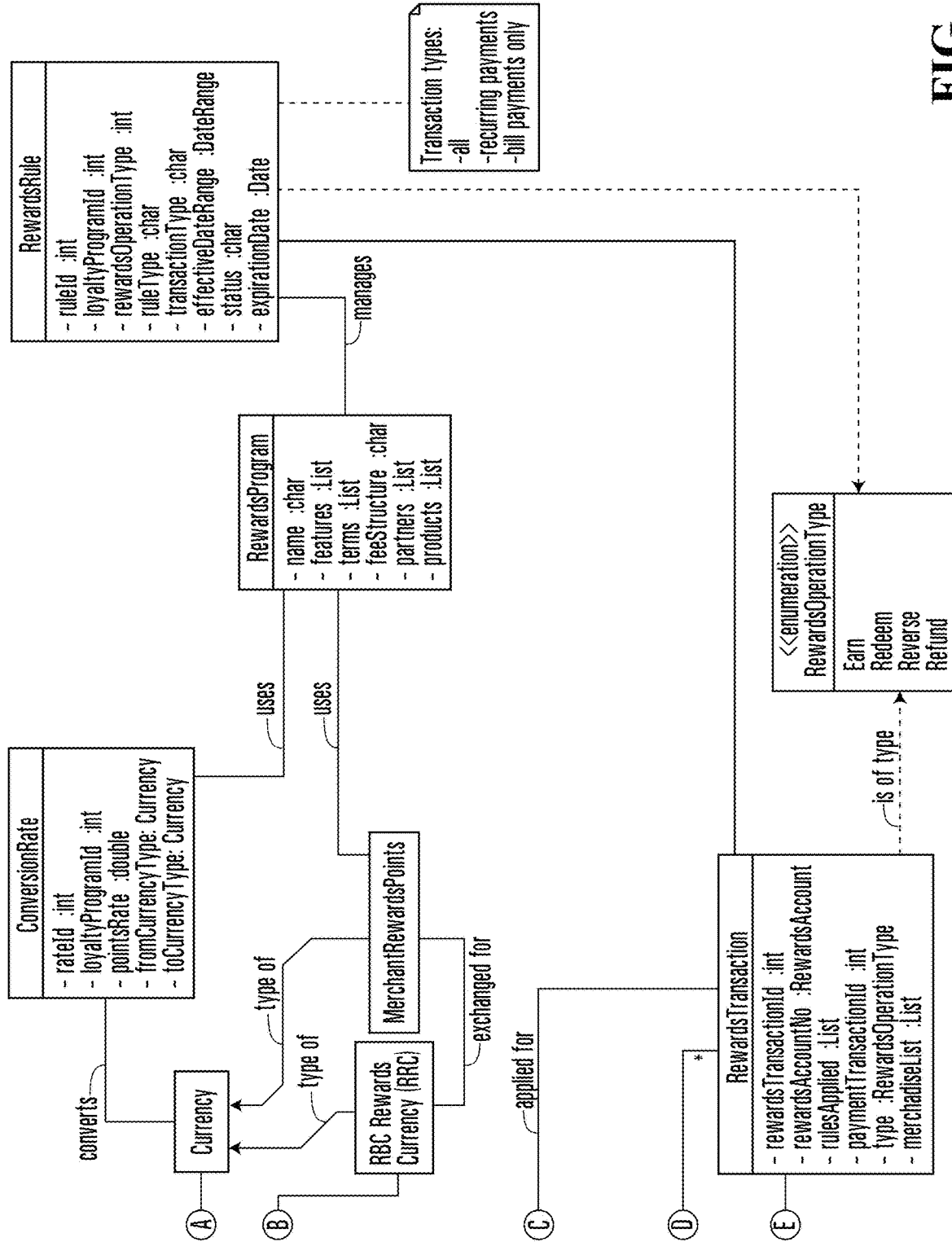

A conceptual data model is provided at FIGS. 47A-47B, illustrating some example data structures and objects that may be utilized for implementation of the system, along with various linkages and associations between the various data structures and objects.

In some embodiments, the loyalty platform may manage loyalty points on a blockchain network. In some embodiments, one or more public blockchain networks are utilized for network management, node management, and rewards partner onboarding. A hybrid solution involving the use of a combination of one or more public blockchain networks and one or more private blockchain networks co-operating (e.g., working in tandem, in communication with one another) is provided, in some embodiments.

Some of the described embodiments are designed, among others, to increase convenience for participants (e.g., merchants) to interact with a platform, on-board, and reconcile their transactions, while managing procedural and technical issues that arise with widely distributed ledger implementations.

Blockchains and distributed ledger technology have been utilized to cooperatively create robust, decentralized networks that are used in various contexts, such as providing alternative currencies (crypto-currencies), smart contracts, proof of existence, among others.

In a typical distributed ledger, a plurality of nodes are employed that in communication with one another in storing and maintaining replicated ledgers that are synchronized and spread geographically across various locations, devices, institutions, etc. The robustness of the system is derived from the propagation of transactions that are posted against the records kept on the distributed ledger, and various propagation rules (e.g., consensus rules) are applied and maintained at each of the computing nodes having a distributed ledger that control how, when, if, etc. a transaction is added to the distributed ledger. The more nodes in a system and the less correlated the nodes are, the more robust the system becomes as it becomes more difficult for a single party or even a coordinated group of parties to perform unauthorized modifications to transactions recorded on the distributed ledger.

For example, with respect to cryptocurrencies, consensus rules are utilized to determine whether a transaction is authorized, and the way in which transaction records are propagated determine how a transaction is ultimately recorded on the distributed ledger. These propagation rules, for example, may be adapted to account for double spending attempts through the use of majority determinations and time codes, etc. The rules are of particular importance as without a centralized authority, the group of nodes as a whole and their distributed ledgers must substitute as the authority. Double spending, for example, can be overcome by waiting for a minimum number of confirmations on distributed ledgers on unrelated nodes such that there is evidence that a particular transaction has been recorded widely on the distributed ledgers (and is thus more likely to have been accepted and less vulnerable to race attacks).

Accordingly, the distributed ledger and its information become a trustworthy source of information that is typically not controlled by a single party. However, as the number of nodes decrease or nodes fall under the control of a single party, it becomes more easy for malicious parties to modify the transaction record (e.g., in the context of Bitcoin, a majority attack may be initiated by a party controlling more than half of the network hash rate, allowing the party to generate new transaction blocks into an otherwise honest network).

In some embodiments, a merchant platform registers with the loyalty blockchain implementation to synchronize loyalty points with the blockchain ledger. A user registers any loyalty card accounts with the user's mobile wallet. The wallet creates a "ghost card" in the wallet that is used to represent all loyalty cards. When a user wants to spend loyalty points at a merchant point of sale checkout (this could work in e-commerce as well), the mobile device, using geo-location, determines where the user is and configures the ghost card token with the loyalty information for the merchant, as resolved by geo-location on the phone. The user can then select how many points to use, and tap the phone at the merchant's POS terminal. The tokenized ghost card is routed via a payment processing network (e.g. as a Visa™ or Interac™ transaction) to the financial institution's backend, which then verifies that the token is in fact for the merchant that received it at the point of sale. Once verified, the backend communicates with the merchant, through the blockchain ledger, to burn the requested amount of points. If successful, a message is passed back through the POS terminal. The user can then proceed to further pay with any other method of payment, if an outstanding amount owing remains, by selecting the appropriate payment card from the user's wallet.

In some embodiments, the mobile device determine the user's geo-location based on the mobile device's GPS, a-GPS, WiFi connections, IP addresses, Bluetooth or other near range connections, and the like.

To earn points, the wallet can also prepare the ghost card in advance of or at checkout time to configure it as a tokenized loyalty card for that merchant, based on the geo-location determination. Alternatively, the mobile wallet can present a barcode or QR code for scanning at checkout based on the same geo-location features.

In some embodiments, a mobile device can be a smart phone, tablet computer, laptop, smart watch, or the like. In some embodiments, the mobile device includes at least one processor configured to provide a mobile wallet and to manage the communications with payment processing servers/networks/financial systems as described herein or otherwise.

In some embodiments, the mobile device includes one or more memory devices for storing program code and/or data for implementing at least aspects of the processes and systems described herein. In some embodiments, the memory device(s) may include one or more secure areas/containers for storing encryption keys, tokens, payment information and/or any other data which may be part of a secure process.

In some embodiments, the "ghost card" in the wallet is formed of one or more linkages, identifiers, and/or data structures that flexibly enable a changing of the "ghost card" based on one or more loyalty programs (or other credential-requiring services) that a user is seeking to interact with at a particular time. For example, the geographic location, identifiers available at various point of sales devices, presence of in-store WiFi networks, etc., may be utilized to automatically identify which loyalty program of the plurality of loyalty programs whose interactions are governed by the "ghost card". In this example, automatic reward program selection is provided, that may reduce the need to have multiple tokens generated at a particular time, each token relating to a specific merchant. Rather, with a "ghost card", a single token that is modifiable is possible, enabling, from a technical perspective, the provisioning of a single token that is flexibly modified at the point of use. For example, all loyalty passes from a mobile wallet are linked to a "rewards pass", which is a single pass to access a loyalty account for a plurality of different merchant stores.

A user may, for example, use the pass by NFC or scanned barcode, and when the customer uses the rewards pass, the logic in the point of sale could detect a specific range of financial institution provided BINs and can discard the payment process and only extract a loyalty ID. Accordingly, in some embodiments, the system may be built upon other payment processes, retrofitting the processes for use in providing a dynamic "ghost card", reducing the need for infrastructure modifications or investments.

Using a single flexible token may provide advantages relating to cybersecurity, data storage efficiency, as well as ease and consistency of transaction flows. A point of sale device, for example, may be able to indicate to the stored mobile wallet and the "ghost card", that a transaction relates to Retailer1. Accordingly, the Retailer1 point of sale device may be able to identify a loyalty account number associated with the "ghost card" by traversing the data structure stored on the "ghost card" (e.g., using an applicable key or otherwise authentication method to enable interaction with the "ghost card" token), the "ghost card" flexibly modifying the token such that it is able to provide data sets to the Retailer1 point of sale device.

In some embodiments, through an initial short-range communication between the user device and the merchant device, the user device may receive data which indicates A further potential advantage to implementation using a single flexible token is that the wallet is able to discern which loyalty rewards to apply, rather than having the user pick which program is being used (e.g., a wallet with 6 linkages, the system may be able to automatically identify that Retailer1 is associated with linkage 4, so the token is flexibly modified for interaction with Retailer1 via linkage 4, linkage 4 used for routing such that information about the loyalty program can be securely accessed).

Figure 31:
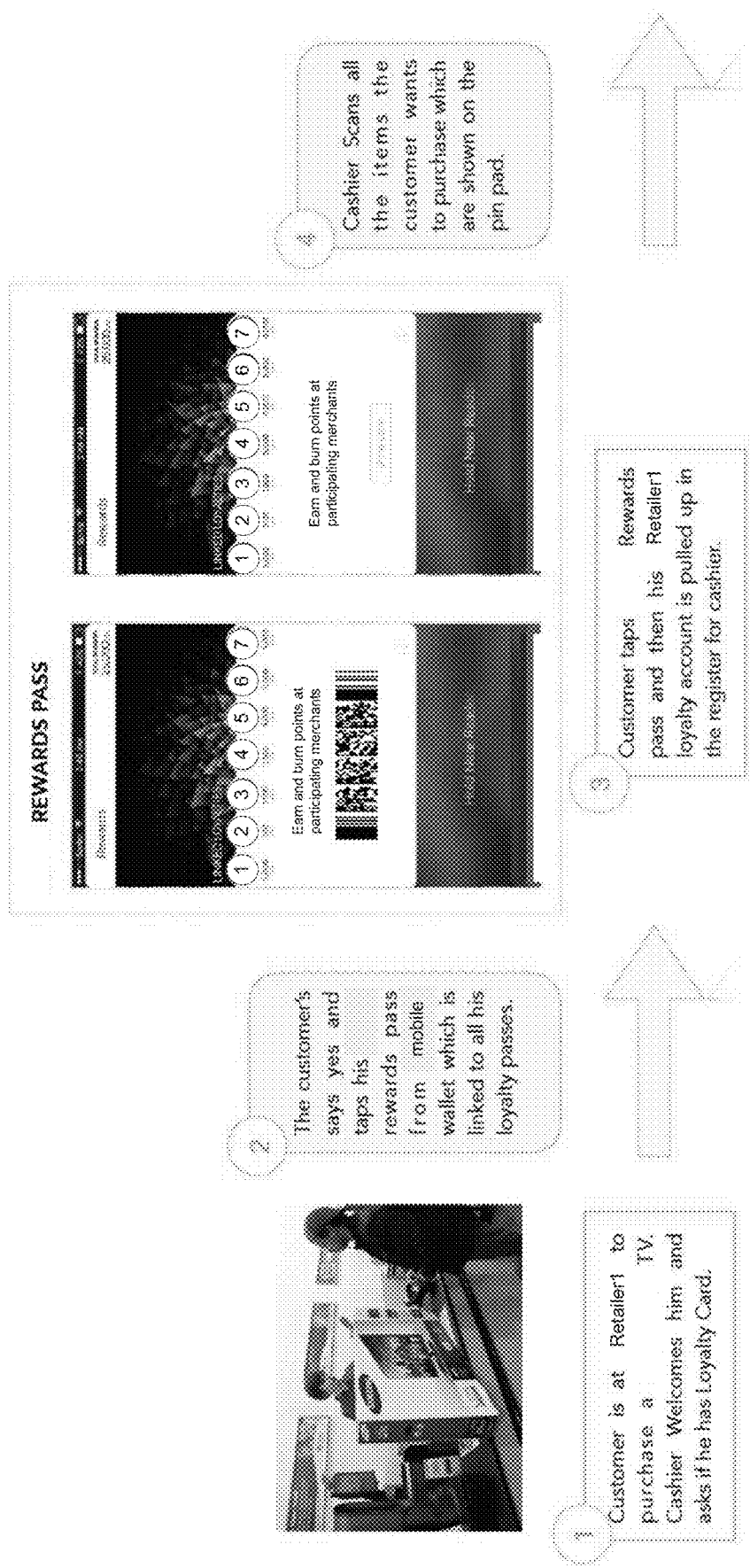
FIGS. 31, 32 and 33 depict a sample method, according to some embodiments.
Figure 32:
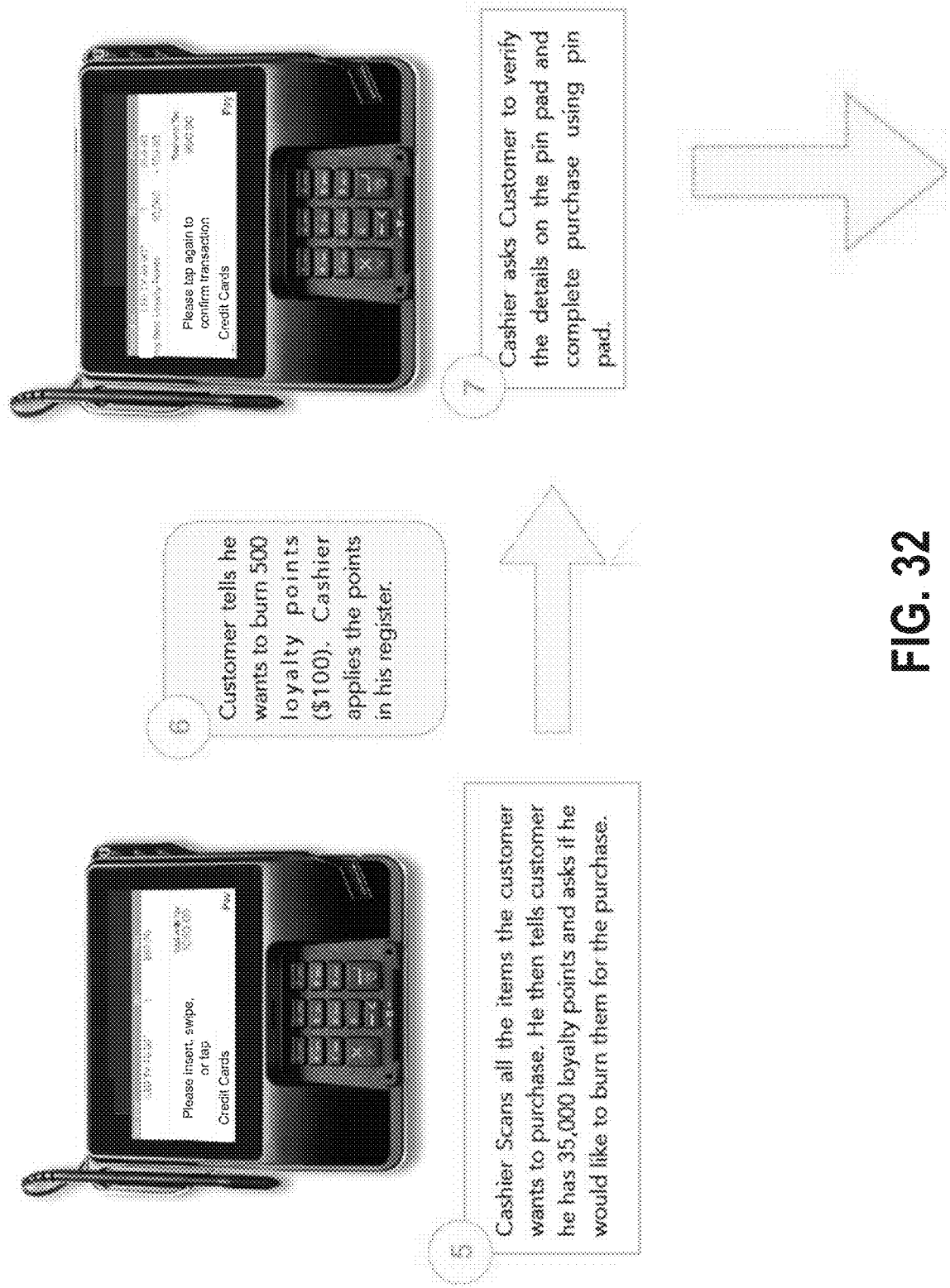
Figure 33:
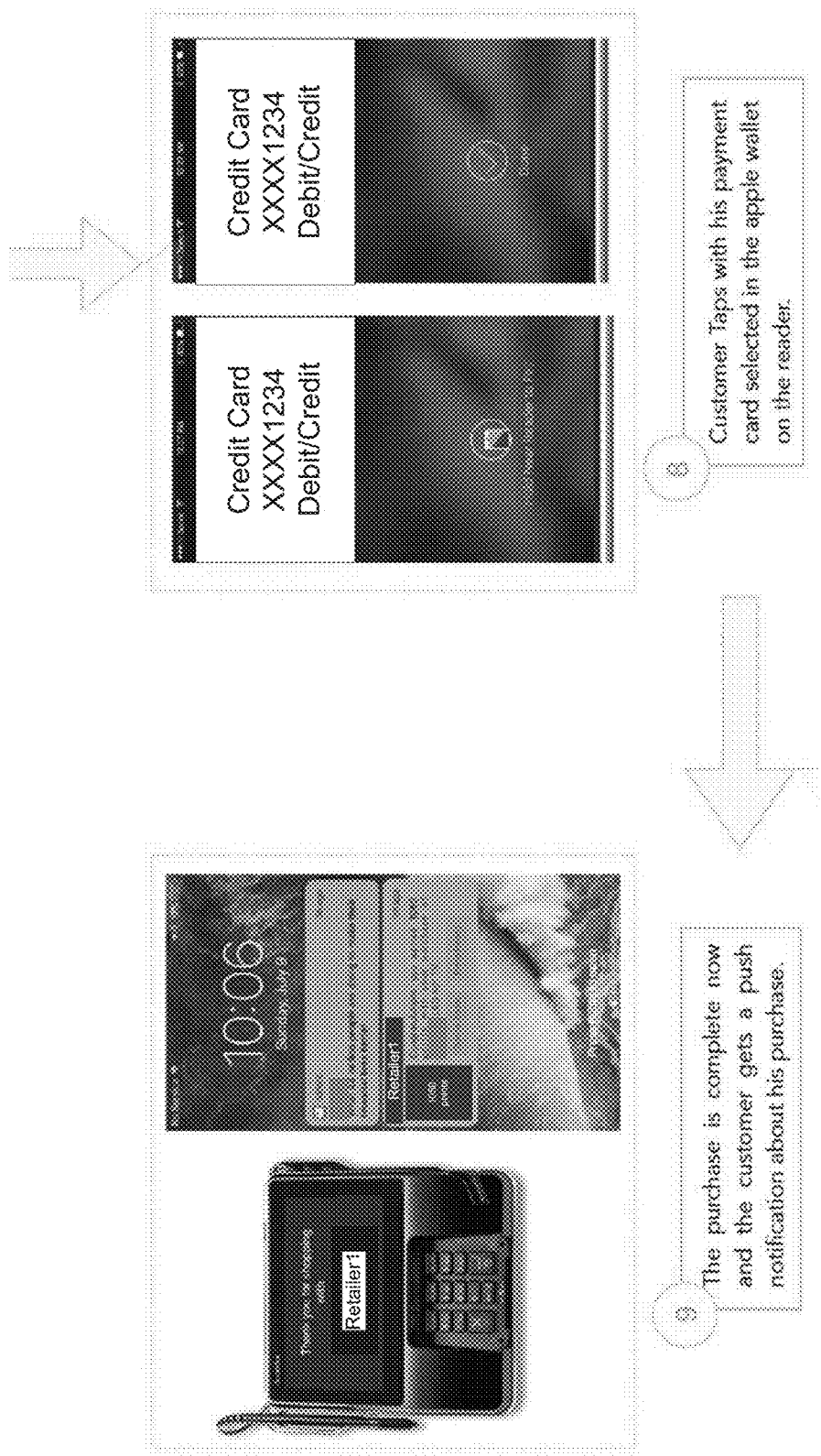

FIGS. 31, 32 and 33 depict a sample method, according to some embodiments. A provisioned customer rewards pass is residing upon a customer's device, the customer rewards pass including a "ghost card", as described in various embodiments above. The method shown can interoperate with various different types of mobile wallets, such as Apple Pay™, Android Pay™, linking a plurality of loyalty programs to generate a single "ghost card" that simulates the functionality of a "value added service" VAS terminal at a physical point of sale device.

The method begins at FIG. 31. At step 1, the customer visits a store (e.g., a store associated with retailer 1), and is purchasing an item, such as a TV. The cashier welcomes the customer, and asks if the customer has a loyalty card.

At step 2, the customer taps a rewards pass from a rewards wallet, which is linked to all of the loyalty passes.

In some embodiments (e.g., for Apple Pay™), this system is configured for linking NFC enabled passes to a "ghost" network enabled card to link loyalty at the time of payment." Accordingly, NFC enabled passes may be utilized in various embodiments for loyalty transactions.

At step 3, the customer's rewards loyalty account is identified and retrieved on the point of sale device (e.g., cash register) for conducting the transaction. For example, the customer's rewards loyalty account information may be rendered onto a point of sales interface that the cashier is able to reference or otherwise interact with.

At step 4, the cashier scans the items for purchase (e.g., the TV).

As continued on FIG. 32, at step 5, the cashier scans all of the items that the customer wishes to purchase, and indicates to the customer that the customer has a number of loyalty points that are available for redemption.

At step 6, the customer indicates that a number of points (e.g., 500, 10,000) should be selected for redemption.

At step 7, the cashier asks the customer to verify the details, and the transaction is completed (e.g., by the customer providing access credentials on a PIN pad, or using another authentication mechanism).

As continued on FIG. 33, at step 8, the customer may then use his/her mobile device to tap a virtual payment card as payment. At step 9, the purchase is complete, and the customer receives a push notification providing details and/or confirmation of the purchase.

Figure 34:
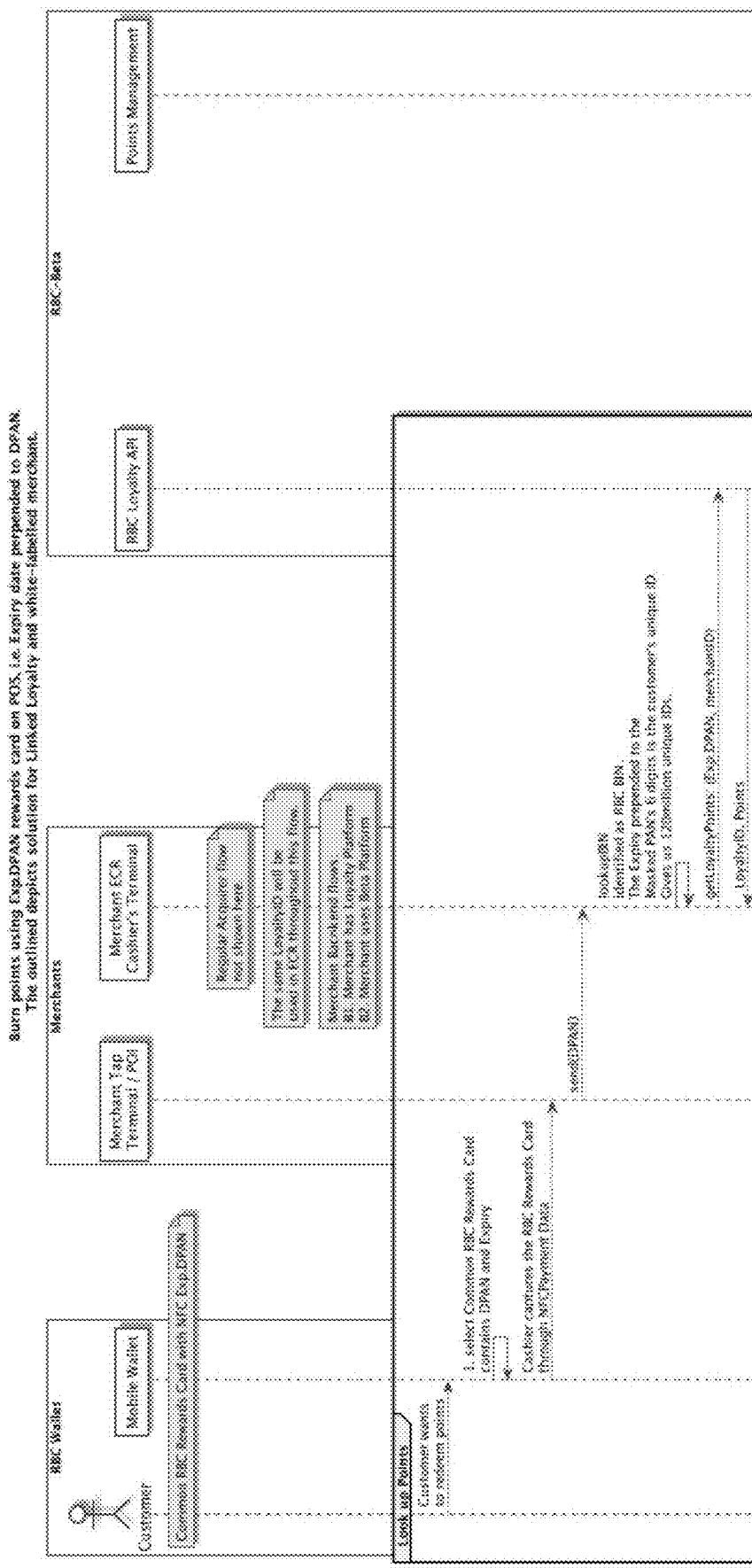
FIGS. 34, 35, and 36 are flow charts showing aspects of example payment processing transactions.
Figure 35:
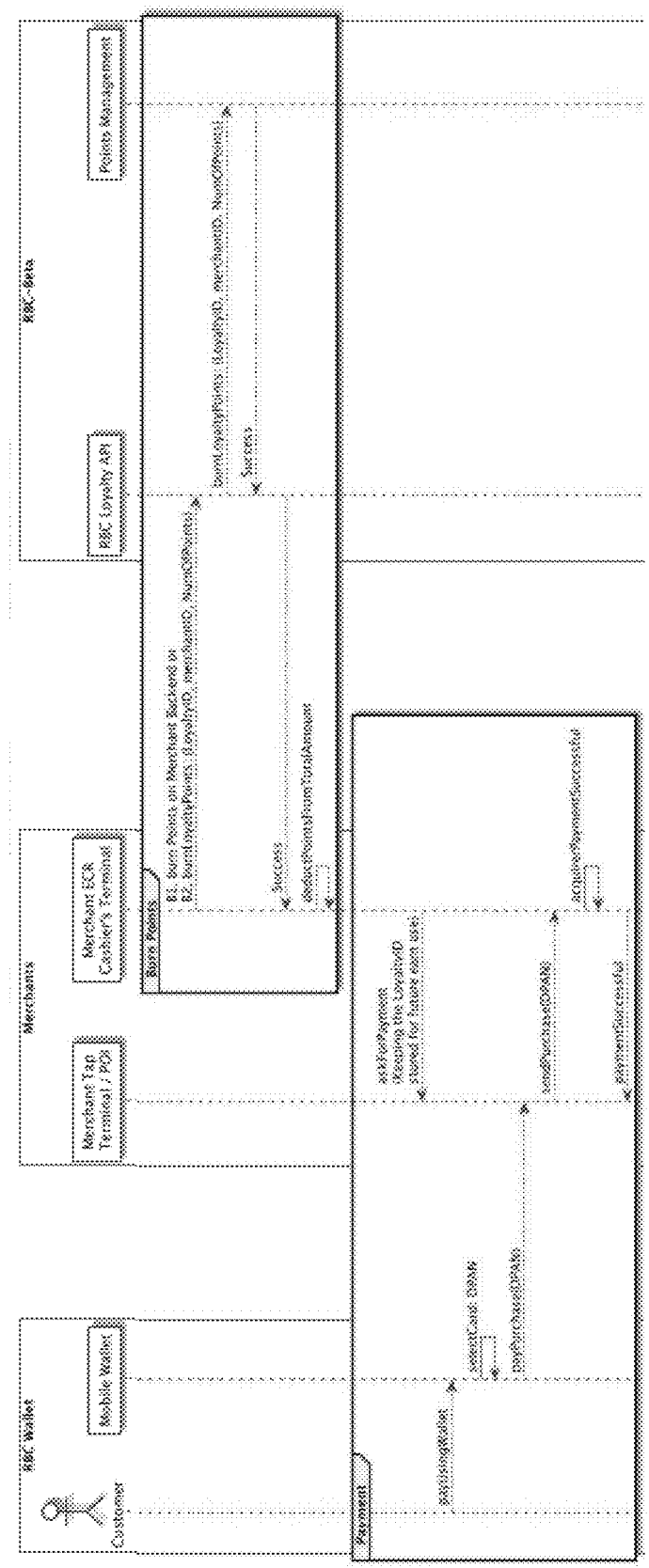
Figure 36:
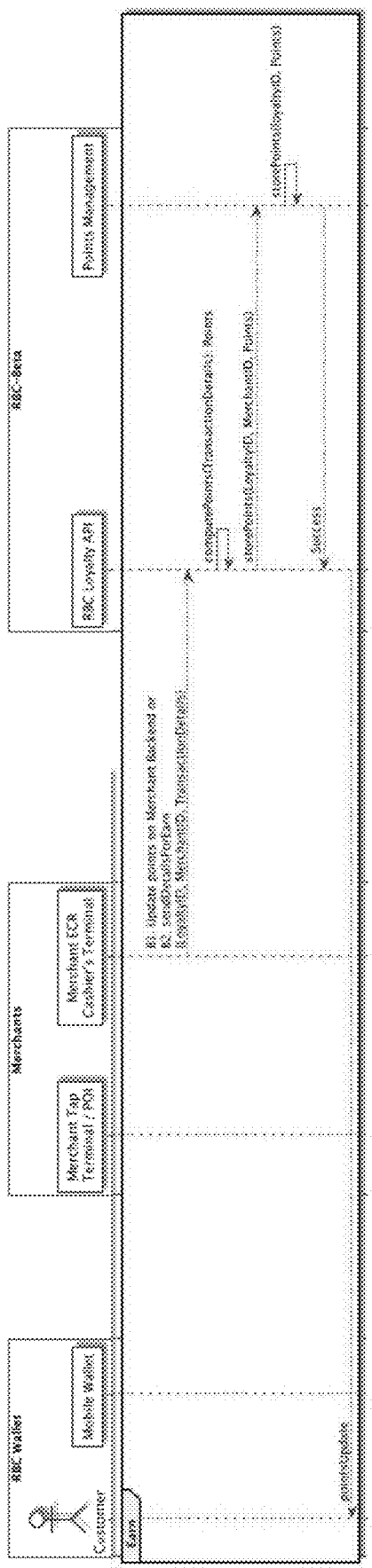

FIGS. 34, 35 and 36 show aspects of example data flows and processes for transaction processing. These figures show some aspects of transaction processing relating to point look-up requests ("Look up Points"), payment requests using points ("Burn Points"), payment requests using a payment accounts such as with a credit card, or bank account ("Payment"), and requests to earn points ("Earn").

In some situations, the complete interaction when a customer is checking out involves all of the processes illustrated in FIGS. 34 through 36. For example, a customer may wish to pay for at least part of a transaction amount using points. In some instances, this may involve checking a points balance, and if available, burning or otherwise using points to pay for at least part of the transaction amount.

In some situations, the rest of the transaction amount may be paid with a payment account such as a credit card account or a bank account. In some embodiments, the token for the payment account may be different than a token for the points account used in the transaction.

In other situations, the token for the payment account may be the same as the token the for points account. For example, a bank loyalty-branded credit/debit card may be associated with both a points account and a bank/credit card account. In some embodiments, the same token may be presented twice, once for the points balance check and/or payment, and again for the bank/credit card payment transaction. In other embodiments, the token may be presented by the mobile wallet only once, and the merchant device may use the same token to process both the points transaction(s) and the payment transaction.

In some situations, in addition to the payment using points and/or bank/credit card accounts, the transaction may also involve the earning of points for the transaction.

In some embodiments, the user device provides via the one or more output devices an output indicating that a dynamically-configured electronic token is in a transaction-ready state, where the dynamically-configured electronic token is associated with a plurality of loyalty accounts. For example, the device may display the rewards pass on a display, the device may vibrate or provide an audible signal, and/or may provide an output via any other output mechanism to indicate that the rewards pass is in a transaction-ready state. In some embodiments, being in a transaction-ready state means that the rewards pass has been selected and is the active "card" in the wallet. In some embodiments, an additional biometric or other input may be required to trigger the routing of a token based on the rewards pass. In another embodiment, being in a transaction-ready state may automatically trigger the routing of the token when the user device is brought into communicable proximity of a point of sale device (e.g. near field communication, RFID, etc.).

In some embodiments, in response to one or more signals providing information regarding a location of the electronic device, the electronic device is configured to obtain token data associated with a loyalty account of the plurality of loyalty accounts corresponding to the location of the electronic device.

In some embodiments, the signals providing information regarding the location of the device represent GPS data or other location data received from a GPS unit on the device, or any other location-based services provided on mobile devices. In some embodiments, the signals providing information regarding the location of the device provide location information based on network data associated with the device such as a network address (e.g. IP address) of the electronic device (which can be mapped to a physical router/location), a network address of a network device with which the electronic device is connected (e.g. a Wi-Fi hotspot), a network identifier of a network to which the electronic device is connected (e.g. WiFi network name). In some embodiments, the signals providing the information regarding the location of the device may be received from a merchant device such as a beacon or point-of-sale device. In some embodiments, the merchant device may communicate explicit location information, or may provide a merchant identifier or other information which can be linked to a location associated with a loyalty platform.

In some embodiments, obtaining the token data includes referencing token data associated with a plurality of loyalty accounts stored on the electronic device or at a network location accessible by the electronic device. As noted herein, these loyalty accounts may have been registered with a user account/dynamic card account associated with the electronic device.

In some embodiments, the electronic device selects the token data associated with a particular loyalty account when the location of the electronic device corresponds to a location associated with a loyalty platform to which the particular loyalty account belongs.

In some embodiments, the electronic device generates a token based on the selected token device as described herein or otherwise. In some embodiments, generating the token includes formatting, configuring, populating fields, encoding, hashing and/or any other data process for creating a data set suitable for processing at a transaction processing system. In some embodiments, the data set must be suitable for being processed by an intermediate system, such as a debit/credit or other payment processing system, as well as an end/acquirer system which can authorize and trigger the appropriate transaction.

In some embodiments, as described herein or otherwise, the token provides data for identifying a loyalty account to be associated with a financial transaction between a customer and merchant.

In some embodiments, the token is generated to be in a format compatible for routing over a defined payment processing protocol.

As illustrated in FIGS. 34-36, one or more of the methods and systems described herein can involve an interaction between a customer device, merchant device(s), and a server or other device(s) which manage points. In some embodiments, the mobile device is configured to provide a mobile wallet application which can store or otherwise provide a token corresponding to a points and/or payment account to a merchant device.

The merchant device(s) can include point-of-sale/point-of-interaction terminals, tap terminals, ECR terminals, and/or any other merchant device which communicates with a customer device and/or a payment/loyalty server.

In a traditional loyalty card transaction, a loyalty card information is inputted to a merchant device such as through a VAS (value-added services) applet on a payment terminal. In some embodiments, the development and/or operation of a VAS applet may be costly and may require additional hardware and software capabilities on merchant device(s). In some instances, a loyalty ID (which could be inputted during a transaction by scanning a loyalty card) is customer identifier that is specific to the particular merchant operating the loyalty program.

With reference to FIG. 34, in some embodiments, aspects of this system may provide for a loyalty system which does not require a VAS applet on the payment terminal. In some embodiments, the system can utilize the infrastructure and protocols of a credit/debit card transaction platform.

In some embodiments, for a debit/credit payment, a primary account number (PAN) or digitized primary account number (DPAN) is used to identify a customer's payment account. In some embodiments, a DPAN is 16 digits long.

In some embodiments, the 1st digit of a DPAN identifies a payment network (e.g. VISA™, MasterCard™, Discover™); digits 2-5 identify an issuer (e.g. RBC, BMO), digits 6-7 identify a region, and digits 7-16 identify an account number and checksum.

In some embodiments, an expiry date field is also transmitted as part of the transaction. In some embodiments, the expiry date is 4 digits long (2 digits for a month, and two digits for the year).

In some embodiments, a masked DPAN can be transmitted as part of the identification information for a transaction. In some embodiments, a masked DPAN can include the first 6 digits of the DPAN, and the last 4 digits of the DPAN. In some instances, the masked DPAN can provide a limited number of unique identifiers when processing a transaction.

In accordance with some aspects of the present disclosure, in some embodiments, a loyalty account transaction can be performed using the traditional DPAN payment platform.

In some embodiments, a combination of the masked DPAN and the expiry fields are used to create a unique identifier for the loyalty program. In some embodiments, this unique identifier can be linked to a merchant-specific user ID. In some situations, this can create a higher level of abstraction for the merchant-specific userID.

As illustrated, for example, in the data sent between the merchant device and the financial/loyalty server (RBC-Beta), the expiry field prepended to digits of the the masked PAN can be used to form a customer's unique ID. In some embodiments, the communication can be through a loyalty API or otherwise.

In some embodiments, the first 4 digits of a masked DPAN are fixed. In some instances, these digits can include payment network information and/or BIN numbers which are used to properly route the transaction. In some embodiments, these 4 digits are used to route the transaction to the proper financial/loyalty server (e.g. RBC-Beta).

In embodiments where the first 4 digits of the masked DPAN are fixed or otherwise reserved, the remaining 6 digits only allow for 10^6 possible combinations. However, in some embodiments, the system described herein may utilize at least a portion of the expiry fields to expand this set.

In some embodiments, the 6 available digits of the masked DPAN are combined with the 4 expiry fields to provide 10^10 possible unique ID combinations.

In some embodiments, the 6 available digits of the masked DPAN are combined with the 2 year digits, and the 2 month digits remain. The 2 month digits can have 12 possible values 1-12 which provides 12*10^8 possible unique ID combinations.

Figure 37:
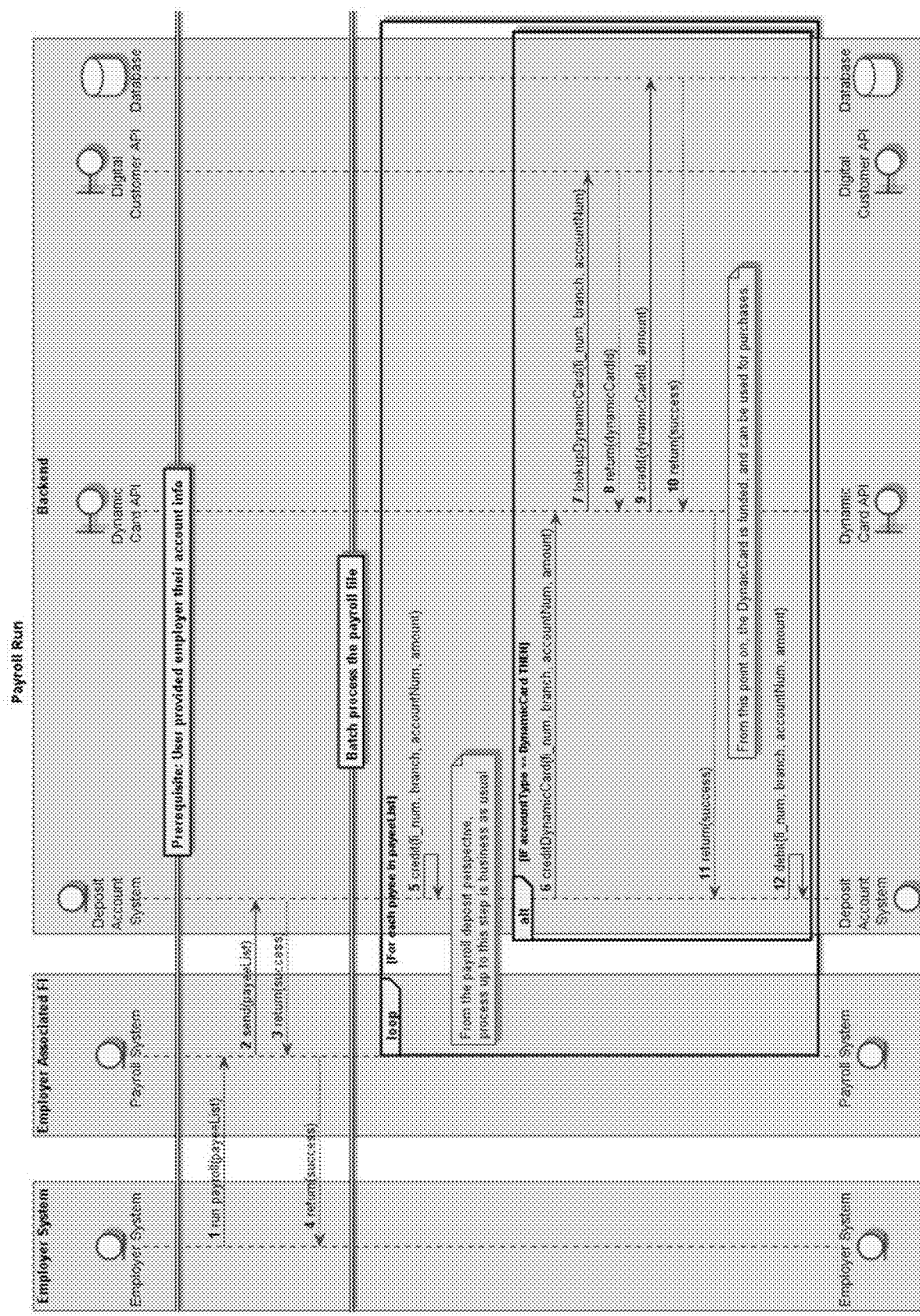
FIG. 37 is a flow chart showing aspects of a payroll transaction involving a dynamic card.

FIG. 37 shows aspects of example data flows and processes for a payroll transaction involving a dynamic card. In some embodiments, an employee profile is registered and associated with a dynamic card identifier. When the system operates a batch process for processing a payroll file, the system determines whether the employee profile is associated with a dynamic card and/or indicates that payroll is to be deposited into a dynamic card account. As illustrated in FIG. 11, the backend APIs credit the dynamic card with the payroll amount, and the employer's account is debited accordingly.

In some embodiments, this process may allow an employer system, which can be independent from the financial institution system, to send payroll payment transactions from its regular financial institution account, and the employee is able to use the dynamic card to make purchases.

In some embodiments, potential employees (e.g. job applicants) applicant data can be stored in a candidate database. If the candidate is hired and accepts the position, the applicant data can be used to generate a digital profile with a dynamic card and digital account.

Figure 38:
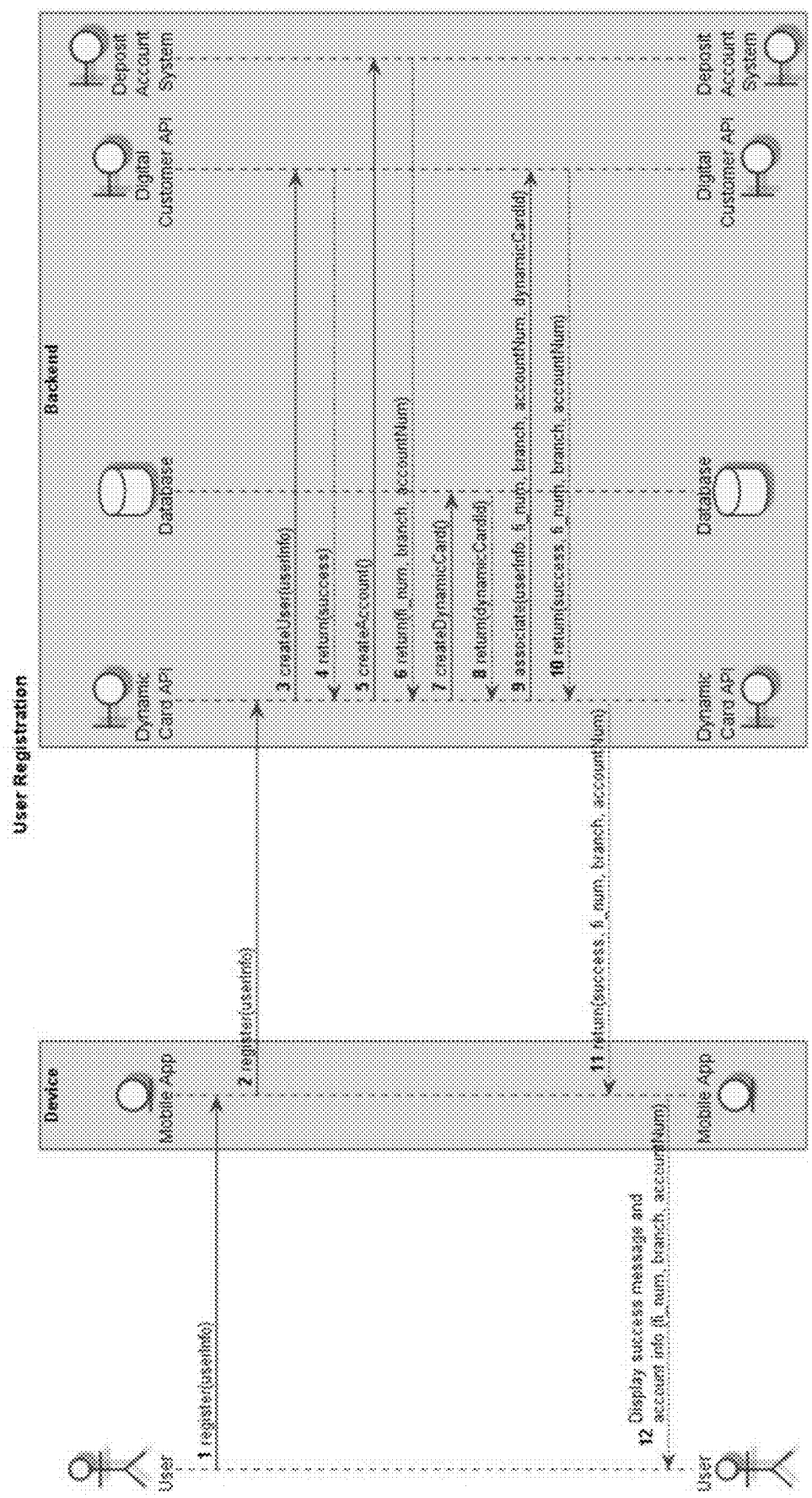
FIG. 38 is a flow chart showing aspects of a dynamic card registration process.

FIG. 38 is a flow chart showing aspects of an example dynamic card registration process. In some embodiments, the registration process can begin at a mobile application operating on a device associated with a new employee (or employer).

Program code is applied to input data to perform the functions described herein and to generate output information.

The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium.

For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The above description is intended to provide a thorough description of various aspects and example embodiments of one or more inventions. Accordingly, various aspects and/or components of such invention(s) have been described throughout at multiple different levels of abstraction. In some instances, embodiments may have been described on both a specific and a relatively general or generic level, for example, where an aspect or component of the embodiment is susceptible to variation in a manner that is not inconsistent with the specific structure(s) and/or operation(s) set forth. In these instances, the specific embodiments set forth herein may not be the only ones contemplated and instead may only be exemplary of a more general or generic configuration. The scope of the invention(s) described herein is therefore defined solely by the language of the claims appended hereto, giving due consideration to applicable doctrines for construing their meaning. Moreover, as will be appreciated by those skilled in the relevant arts, a very wide variety of payment systems and transaction processes are enabled by the invention. While various specific combinations and embodiments have been described, it is very much contemplated that they may be used together in a very wide variety of combinations, even where specific combinations have not been described, due to practical concerns for brevity and clarity.

The invention claimed is:

1. An electronic device comprising:
   at least one processor;
   one or more output devices comprising at least one display screen;
   a data communication interface; and
   at least one persistent memory device, the at least one persistent memory device comprising stored, machine-readable data representing:
      a dynamically-configurable electronic token associated with a plurality of loyalty accounts; and
      an identifier of a user associated with the dynamically-configurable electronic token;
      one or more sets of machine-interpretable instructions;
   the at least one processor adapted, by execution of the one or more sets of machine-interpretable instructions, to:
      receive transaction data from a merchant system, the transaction data for a transaction between the merchant system and the electronic device, the transaction data including a purchase amount and a client identifier; and
      upon determining that the client identifier corresponds with the stored identifier:
         provide via the one or more output devices an output indicating that the dynamically-configurable electronic token is in a transaction-ready state; and
         upon determining that a location of the electronic device corresponds to a location associated with a loyalty account:
            select token data associated with the loyalty account of the plurality of loyalty accounts corresponding to the location of the electronic device; and
            configure the dynamically-configurable electronic token based on the selected token data; and
         via the data communication interface;
            route the dynamically-configurable electronic token, generated from the token data corresponding to the location of the electronic device, for processing by an electronic data process at a transaction processing system associated with the loyalty account; and receive a confirmation that the transaction has been processed.

2. The electronic device of claim 1, wherein providing the output indicating that a dynamically-configurable electronic token is in a transaction-ready state includes displaying on the at least one display screen a user interface element representative of the dynamically-configurable electronic token.

3. The electronic device of claim 1, wherein determining the location of the electronic device is based on at least one of: GPS data associated with the electronic device, a network address of the electronic device, a network address of a network device with which the electronic device is connected, a network identifier of a network to which the electronic device is connected, and a merchant identifier received in a message from a merchant device.

4. The electronic device of claim 1, wherein selecting the token data comprises: selecting the token data associated with the loyalty account when the location of the electronic device corresponds to a location associated with a loyalty platform of the loyalty account.

5. The electronic device of claim 1 wherein the machine-readable data representing instructions are configured to cause the at least one processor to: generate the dynamically-configurable electronic token from the selected token data.

6. The electronic device of claim 1, the machine-readable data representing instructions are configured to cause the at least one processor to: generate the dynamically-configurable electronic token in a format compatible for routing over a defined payment processing protocol.

7. The electronic device of claim 6, wherein the payment processing protocol defines a primary account number field, and wherein generating the token comprises: generating a masked primary account number for the primary account number field, the masked primary account number including: a first portion identifying a payment processing system associated with the dynamically-configured electronic token, and a second portion associated with the loyalty account.

8. The electronic device of claim 7, wherein the payment processing protocol defines an expiry field, and wherein generating the token comprises: generating the second portion of the masked primary account number and an expiry value for the expiry field such that token data for identifying the loyalty account at the payment processing system associated with the dynamically-configured electronic token is split between the second portion of the masked primary account number and the expiry value.

9. The electronic device of claim 1, wherein routing the dynamically-configurable electronic token via the data communication interface comprises: transmitting the token via a point-of-sale device via a near-field communication, via a radio-frequency identification communication, via short-range communication, via a Wi-Fi communication, or by displaying an image including encoded token data for scanning by the point-of-sale device.

10. The electronic device of claim 1, wherein selecting the token data comprises:

traversing a distributed ledger network to obtain the token data, the token data including one or more authorization keys associated with the loyalty account corresponding to the location of the electronic device.

11. A method of processing data representing a transaction request, the method comprising:

receiving transaction data from a merchant system, the transaction data for a transaction between the merchant system and the electronic device, the transaction data including a purchase amount and a client identifier; and upon determining that the client identifier corresponds with the stored identifier:

providing, at an electronic device, an output indicating that a dynamically-configurable electronic token is in a transaction-ready state, where the dynamically-configurable electronic token is associated with a plurality of loyalty accounts; and upon determining that a location of the electronic device corresponds to a location associated with a loyalty account:

selecting token data associated with the loyalty account of the plurality of loyalty accounts corresponding to the location of the electronic device; and configuring the dynamically-configurable electronic token based on the selected token data; and via a data communication interface;

routing the dynamically-configurable electronic token, generated from the token data corresponding to the location of the electronic device, for processing by an electronic data process at a transaction processing system associated with the loyalty account; and receiving a confirmation that the transaction has been processed.

12. The method of claim 11, wherein providing the output indicating that a dynamically-configurable electronic token is in a transaction-ready state includes displaying on at least one display a user interface element representative of the dynamically-configurable electronic token.

13. The method of claim 11, wherein determining the location of the electronic device is based on at least one of: GPS data associated with the electronic device, a network address of the electronic device, a network address of a network device with which the electronic device is connected, a network identifier of a network to which the electronic device is connected, and a merchant identifier received in a message from a merchant device.

14. The method of claim 11, wherein selecting the token data comprises: selecting the token data associated with the loyalty account when the location of the electronic device corresponds to a location associated with a loyalty platform of the loyalty account.

15. The method of claim 11, comprising: generating the dynamically-configurable electronic token in a format compatible for routing over a defined payment processing protocol.

16. The method of claim 15, wherein the payment processing protocol defines a primary account number field, and wherein generating the token comprises: generating a masked primary account number for the primary account number field, the masked primary account number including: a first portion identifying a payment processing system associated with the dynamically-configured electronic token, and a second portion associated with the loyalty account.

17. The method of claim 16, wherein the payment processing protocol defines an expiry field, and wherein generating the token comprises: generating the second portion of the masked primary account number and an expiry value for the expiry field such that token data for identifying the loyalty account at the payment processing system associated with the dynamically-configured electronic token is split between the second portion of the masked primary account number and the expiry value.

18. The method of claim 11, wherein routing the dynamically-configurable electronic token via the data communication interface comprises: transmitting the token via a point-of-sale device via a near-field communication, via a radio-frequency identification communication, via short-range communication, via a Wi-Fi communication, or by displaying an image including encoded token data for scanning by the point-of-sale device.

19. The method of claim 11, wherein selecting the token data comprises:
  traversing a distributed ledger network to obtain the token data, the token data including one or more authorization keys associated with the loyalty account corresponding to the location of the electronic device.

20. A non-transitory, computer readable medium or media having stored thereon instructions which when executed by at least one processor, configure the at least one processor for:
  receiving transaction data from a merchant system, the transaction data for a transaction between the merchant system and the electronic device, the transaction data including a purchase amount and a client identifier; and
  upon determining that the client identifier corresponds with the stored identifier:
    providing at an electronic device, an output indicating that a dynamically-configurable electronic token is in a transaction-ready state, where the dynamically-configurable electronic token is associated with a plurality of loyalty accounts; and
  upon determining that a location of the electronic device corresponds to a location associated with a loyalty account:
    selecting token data associated with the loyalty account of the plurality of loyalty accounts corresponding to the location of the electronic device; and
    configuring the dynamically-configurable electronic token based on the selected token data; and
  via a data communication interface;
    routing the dynamically-configurable electronic token, generated from the token data corresponding to the location of the electronic device, for processing by an electronic data process at a transaction processing system associated with the loyalty account; and
    receiving a confirmation that the transaction has been processed.

* * * * *